US009450917B2

(12) United States Patent
Ooe et al.

(10) Patent No.: US 9,450,917 B2
(45) Date of Patent: Sep. 20, 2016

(54) INFORMATION PROCESSING SYSTEM, APPARATUS, METHOD AND CONTROL PROGRAM CAPABLE OF EXECUTING EFFICIENT DATA COMMUNICATION DISPENSING WITH COMMUNICATION WITH ONCE COMMUNICATED PARTNER

(75) Inventors: Tooru Ooe, Kyoto (JP); Masahiro Shoji, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 12/871,243

(22) Filed: Aug. 30, 2010

(65) Prior Publication Data
US 2011/0060825 A1 Mar. 10, 2011

(30) Foreign Application Priority Data

Sep. 9, 2009 (JP) ................................. 2009-208228

(51) Int. Cl.
| G06F 15/173 | (2006.01) |
| H04L 29/06 | (2006.01) |
| A63F 13/30 | (2014.01) |
| H04W 8/00 | (2009.01) |

(52) U.S. Cl.
CPC ........... *H04L 63/0236* (2013.01); *A63F 13/12* (2013.01); *A63F 2300/401* (2013.01); *A63F 2300/402* (2013.01); *A63F 2300/408* (2013.01); *A63F 2300/572* (2013.01); *H04W 8/005* (2013.01)
USPC ....................................................... 709/206

(58) Field of Classification Search
None
See application file for complete search history.

(56) References Cited

U.S. PATENT DOCUMENTS

| 5,396,225 A | 3/1995 | Okada et al. |
| 5,618,045 A | 4/1997 | Kagan et al. |
| 5,666,293 A | 9/1997 | Metz et al. |
| 5,732,275 A | 3/1998 | Kullick et al. |
| 6,018,720 A | 1/2000 | Fujimoto |

(Continued)

FOREIGN PATENT DOCUMENTS

| CN | 101345565 | 1/2009 |
| EP | 0 710 017 | 5/1996 |

(Continued)

OTHER PUBLICATIONS

Office Action for Japanese Patent Appln. No. 146449/2009, mailed Jan. 11, 2011.

(Continued)

*Primary Examiner* — Scott B Christensen
(74) *Attorney, Agent, or Firm* — Nixon & Vanderhye, P.C.

(57) ABSTRACT

An exchange data communication determining unit determines, based on a received reception wireless frame, whether or not a communication partner is an exchange partner with which the exchange data can be exchanged. Receiving a notice that exchange of the exchange data is possible, a data communication control unit executes a process for giving/receiving the exchange data. A machine identification information registration unit stores an MAC address of a portable game machine in an MAC address list saving area. Again, the wireless frame transmitting/receiving unit sets a transmission wireless frame and executes an exchange partner searching process. An exchange data communication determining unit determines whether or not an MAC address included in the received reception wireless frame is registered with the MAC address list saving area, and if it is registered, the data communication is terminated.

32 Claims, 51 Drawing Sheets

(56) References Cited

U.S. PATENT DOCUMENTS

| | | | |
|---|---|---|---|
| 6,438,573 B1 | 8/2002 | Nilsen | |
| 6,733,382 B2 | 5/2004 | Oe et al. | |
| 6,736,727 B1 | 5/2004 | Doi et al. | |
| 7,054,831 B2 | 5/2006 | Koenig | |
| 7,114,090 B2 | 9/2006 | Kardach et al. | |
| 7,290,072 B2 | 10/2007 | Quraishi et al. | |
| 7,346,708 B2 | 3/2008 | Minamisawa | |
| 7,457,410 B2 | 11/2008 | Yamauchi et al. | |
| 7,493,613 B2 | 2/2009 | D'Souza et al. | |
| 7,565,653 B2 | 7/2009 | Inoue et al. | |
| 7,620,027 B2 | 11/2009 | Igarashi et al. | |
| 7,704,147 B2 | 4/2010 | Quraishi et al. | |
| 7,725,078 B2 | 5/2010 | Kuwahara et al. | |
| 7,729,661 B2 | 6/2010 | Tanaka et al. | |
| 7,794,328 B2 | 9/2010 | Horigome | |
| 7,801,818 B2 | 9/2010 | Tsukazaki et al. | |
| 7,811,171 B2 | 10/2010 | Mitsuyoshi et al. | |
| 7,813,300 B2 | 10/2010 | Takayama et al. | |
| 7,819,750 B2 | 10/2010 | Lam et al. | |
| 7,854,657 B2 | 12/2010 | Shiraiwa | |
| 7,862,433 B2 | 1/2011 | Sato et al. | |
| 7,901,293 B2 | 3/2011 | Oe | |
| 7,929,911 B2 | 4/2011 | Tanaka et al. | |
| 7,934,995 B2 | 5/2011 | Suzuki | |
| 8,052,528 B2 | 11/2011 | Shiraiwa et al. | |
| 8,075,405 B2 | 12/2011 | Sasaki et al. | |
| 8,078,160 B2 | 12/2011 | Quinn | |
| 8,116,679 B2 | 2/2012 | Dunko | |
| 8,185,165 B2 | 5/2012 | Beninghaus et al. | |
| 8,229,962 B1 | 7/2012 | Cavalancia, II | |
| 8,261,258 B1 | 9/2012 | Jianu et al. | |
| 8,433,375 B2 | 4/2013 | Yamazaki et al. | |
| 8,505,008 B2 | 8/2013 | Yamazaki et al. | |
| 8,700,478 B2 | 4/2014 | Kubo et al. | |
| 8,874,037 B2 | 10/2014 | Fujiwara et al. | |
| 8,903,934 B2 | 12/2014 | Konno et al. | |
| 2001/0003714 A1 | 6/2001 | Takata et al. | |
| 2001/0048744 A1 | 12/2001 | Kimura et al. | |
| 2002/0016166 A1 | 2/2002 | Uchida et al. | |
| 2002/0065137 A1 | 5/2002 | Tonomura | |
| 2002/0083160 A1 | 6/2002 | Middleton | |
| 2003/0033413 A1 | 2/2003 | Wilson, Jr. et al. | |
| 2003/0038731 A1 | 2/2003 | Sako et al. | |
| 2003/0126218 A1 | 7/2003 | Sakonsaku | |
| 2003/0134623 A1 | 7/2003 | Kanamaru et al. | |
| 2003/0207700 A1 | 11/2003 | Yamanaka | |
| 2004/0002774 A1 | 1/2004 | Conti et al. | |
| 2004/0082383 A1 | 4/2004 | Muncaster et al. | |
| 2004/0122931 A1* | 6/2004 | Rowland et al. | 709/223 |
| 2004/0127288 A1 | 7/2004 | Furuhashi et al. | |
| 2004/0151126 A1 | 8/2004 | Matsubara | |
| 2004/0215735 A1 | 10/2004 | Nakahara et al. | |
| 2004/0224769 A1 | 11/2004 | Hansen et al. | |
| 2004/0259642 A1 | 12/2004 | Tanaka et al. | |
| 2005/0047356 A1 | 3/2005 | Fujii et al. | |
| 2005/0068928 A1 | 3/2005 | Smith et al. | |
| 2005/0070327 A1 | 3/2005 | Watanabe | |
| 2005/0073764 A1 | 4/2005 | Ogawa et al. | |
| 2005/0154759 A1 | 7/2005 | Hofmeister et al. | |
| 2005/0282639 A1 | 12/2005 | Tanaka et al. | |
| 2006/0068702 A1 | 3/2006 | Miwa et al. | |
| 2006/0106963 A1* | 5/2006 | Sasaki et al. | 710/110 |
| 2006/0166739 A1 | 7/2006 | Lin | |
| 2006/0168574 A1 | 7/2006 | Giannini et al. | |
| 2006/0234631 A1 | 10/2006 | Dieguez | |
| 2006/0247059 A1 | 11/2006 | Nogami et al. | |
| 2006/0282518 A1 | 12/2006 | Karaoguz et al. | |
| 2006/0282834 A1 | 12/2006 | Cheng et al. | |
| 2007/0078004 A1 | 4/2007 | Suzuki et al. | |
| 2007/0105623 A1 | 5/2007 | Tanaka et al. | |
| 2007/0118587 A1 | 5/2007 | Ishikawa et al. | |
| 2007/0121534 A1 | 5/2007 | James et al. | |
| 2007/0123168 A1 | 5/2007 | Takehara et al. | |
| 2007/0136817 A1 | 6/2007 | Nguyen | |
| 2007/0149183 A1 | 6/2007 | Dunko et al. | |
| 2007/0174471 A1 | 7/2007 | Van Rossum | |
| 2007/0195724 A1 | 8/2007 | Yang et al. | |
| 2007/0203969 A1 | 8/2007 | Wakasa et al. | |
| 2007/0204279 A1 | 8/2007 | Warshavsky et al. | |
| 2007/0213795 A1 | 9/2007 | Bradley et al. | |
| 2007/0213975 A1 | 9/2007 | Shimoda et al. | |
| 2007/0232310 A1 | 10/2007 | Schiff et al. | |
| 2007/0249365 A1 | 10/2007 | Jendbro | |
| 2007/0271234 A1 | 11/2007 | Ravikiran | |
| 2008/0039202 A1 | 2/2008 | Sawano et al. | |
| 2008/0076455 A1 | 3/2008 | Kim et al. | |
| 2008/0119281 A1 | 5/2008 | Hirose et al. | |
| 2008/0123582 A1 | 5/2008 | Maekawa | |
| 2008/0139310 A1 | 6/2008 | Kando et al. | |
| 2008/0148350 A1 | 6/2008 | Hawkins et al. | |
| 2008/0188301 A1 | 8/2008 | Kawamoto et al. | |
| 2008/0209071 A1* | 8/2008 | Kubota | 709/238 |
| 2008/0261658 A1 | 10/2008 | Jin et al. | |
| 2009/0011709 A1 | 1/2009 | Akasaka et al. | |
| 2009/0017767 A1 | 1/2009 | Mashimo | |
| 2009/0028094 A1 | 1/2009 | Okada et al. | |
| 2009/0037526 A1 | 2/2009 | Elliott et al. | |
| 2009/0058639 A1 | 3/2009 | Tanaka et al. | |
| 2009/0061870 A1 | 3/2009 | Finkelstein et al. | |
| 2009/0064299 A1 | 3/2009 | Begorre et al. | |
| 2009/0093310 A1 | 4/2009 | Tanaka et al. | |
| 2009/0124393 A1 | 5/2009 | Tanaka et al. | |
| 2009/0137321 A1 | 5/2009 | Katsume et al. | |
| 2009/0143114 A1 | 6/2009 | Vargas et al. | |
| 2009/0143140 A1 | 6/2009 | Kitahara | |
| 2009/0158430 A1 | 6/2009 | Borders | |
| 2009/0186603 A1 | 7/2009 | Usami et al. | |
| 2009/0193365 A1 | 7/2009 | Sugiura | |
| 2009/0217307 A1 | 8/2009 | Ooe | |
| 2009/0253518 A1 | 10/2009 | Sasaki et al. | |
| 2009/0254953 A1 | 10/2009 | Lin | |
| 2009/0307105 A1 | 12/2009 | Lemay et al. | |
| 2009/0310594 A1 | 12/2009 | Nakata et al. | |
| 2010/0083181 A1 | 4/2010 | Matsushima et al. | |
| 2010/0111057 A1 | 5/2010 | Nakamura et al. | |
| 2010/0130254 A1 | 5/2010 | Kamada et al. | |
| 2010/0167697 A1 | 7/2010 | Ishikawa et al. | |
| 2010/0185977 A1 | 7/2010 | Ito | |
| 2010/0312817 A1 | 12/2010 | Steakley | |
| 2010/0325235 A1 | 12/2010 | Konno et al. | |
| 2011/0045910 A1 | 2/2011 | McKenna et al. | |
| 2011/0060825 A1 | 3/2011 | Ooe et al. | |
| 2011/0070950 A1 | 3/2011 | Tanaka et al. | |
| 2011/0143840 A1 | 6/2011 | Sotoike et al. | |
| 2011/0176455 A1 | 7/2011 | Matsunada | |
| 2011/0205953 A1 | 8/2011 | Kuwahara et al. | |
| 2011/0231559 A1 | 9/2011 | Yamaguchi | |
| 2011/0256829 A1 | 10/2011 | Shimomura | |
| 2011/0275358 A1 | 11/2011 | Faenger | |
| 2011/0292033 A1 | 12/2011 | Umezu et al. | |
| 2011/0295709 A1 | 12/2011 | Kubo et al. | |
| 2011/0306294 A1 | 12/2011 | Yamazaki et al. | |
| 2011/0307554 A1 | 12/2011 | Konno et al. | |
| 2011/0307884 A1 | 12/2011 | Wabe | |
| 2011/0307892 A1 | 12/2011 | Yamazaki et al. | |
| 2012/0010000 A1 | 1/2012 | Masuda et al. | |
| 2012/0011256 A1 | 1/2012 | Masuda et al. | |
| 2012/0021703 A1 | 1/2012 | Yamazaki et al. | |
| 2012/0054297 A1 | 3/2012 | Konno et al. | |
| 2012/0071242 A1 | 3/2012 | Fujiwara et al. | |
| 2013/0295927 A1 | 11/2013 | Ekici et al. | |
| 2014/0164181 A1 | 6/2014 | Kubo et al. | |
| 2014/0194189 A1 | 7/2014 | Kubo et al. | |

FOREIGN PATENT DOCUMENTS

| | | |
|---|---|---|
| EP | 1 513 066 | 5/2003 |
| EP | 1 493 474 | 1/2005 |
| EP | 1 810 732 | 7/2007 |
| EP | 1 872 838 | 1/2008 |
| EP | 2 135 650 | 12/2009 |
| JP | 11-053184 | 2/1999 |
| JP | 11-207031 | 8/1999 |
| JP | 2000-167233 | 6/2000 |

(56) References Cited

FOREIGN PATENT DOCUMENTS

| | | |
|---|---|---|
| JP | 2000-181822 | 6/2000 |
| JP | 2000-249569 | 9/2000 |
| JP | 2001-231067 | 5/2001 |
| JP | 2001-175556 | 6/2001 |
| JP | 2002-027552 | 1/2002 |
| JP | 2002-102530 | 4/2002 |
| JP | 2002-159739 | 6/2002 |
| JP | 2002-253866 | 9/2002 |
| JP | 2002-297483 | 10/2002 |
| JP | 2003-023661 | 1/2003 |
| JP | 2003-050771 | 2/2003 |
| JP | 2003-196217 | 7/2003 |
| JP | 2003-219465 | 7/2003 |
| JP | 2003-229809 | 8/2003 |
| JP | 2004-005110 | 1/2004 |
| JP | 2004-057515 | 2/2004 |
| JP | 2004-118291 | 4/2004 |
| JP | 2004221671 | 8/2004 |
| JP | 2004-329948 | 11/2004 |
| JP | 2004-348203 | 12/2004 |
| JP | 2005018377 | 1/2005 |
| JP | 2005-028103 | 2/2005 |
| JP | 2005-242399 | 9/2005 |
| JP | 2005-242886 | 9/2005 |
| JP | 2005-251167 | 9/2005 |
| JP | 2005-266160 | 9/2005 |
| JP | 2006-005630 | 1/2006 |
| JP | 2006-072685 | 3/2006 |
| JP | 2006-101474 | 4/2006 |
| JP | 2006-146306 | 6/2006 |
| JP | 2006-228113 | 8/2006 |
| JP | 2007-004316 | 1/2007 |
| JP | 2007507982 | 3/2007 |
| JP | 2007-88900 | 4/2007 |
| JP | 2007-125185 | 5/2007 |
| JP | 2007-142613 | 6/2007 |
| JP | 2007-164699 | 6/2007 |
| JP | 2007175508 | 7/2007 |
| JP | 2007-330642 | 12/2007 |
| JP | 2008-077524 | 4/2008 |
| JP | 2008-113259 | 5/2008 |
| JP | 2008-125659 | 6/2008 |
| JP | 2008-136737 | 6/2008 |
| JP | 2008-142181 | 6/2008 |
| JP | 2008-153905 | 7/2008 |
| JP | 2008-160303 | 7/2008 |
| JP | 2008-206800 | 9/2008 |
| JP | 2008-310499 | 12/2008 |
| JP | 2009015551 | 1/2009 |
| JP | 2009-026178 | 2/2009 |
| JP | 2009-065306 | 3/2009 |
| JP | 2009-512239 | 3/2009 |
| JP | 2009-147828 | 7/2009 |
| JP | 2009-225000 | 10/2009 |
| JP | 2010-022704 | 2/2010 |
| JP | 2010-028171 | 2/2010 |
| JP | 2010028171 | 2/2010 |
| JP | 2010028672 | 2/2010 |
| JP | 2010-079546 | 4/2010 |
| JP | 2010-086327 | 4/2010 |
| JP | 2011-509541 | 3/2011 |
| WO | 93/23125 | 11/1993 |
| WO | 2005/111815 | 11/2005 |
| WO | 2009/048473 | 4/2009 |
| WO | 2009/148781 | 12/2009 |
| WO | 2010/010645 | 1/2010 |
| WO | 2010/055720 | 5/2010 |

OTHER PUBLICATIONS

U.S. Appl. No. 12/816,672 to Konno et al., filed Jun. 16, 2010.
Kubo et al., U.S. Appl. No. 12/940,426, filed Nov. 5, 2010.
Yamazaki et al., U.S. Appl. No. 12/948,050, filed Nov. 17, 2010.
Yamazxaki et al., U.S. Appl. No. 12/948,371, filed Nov. 17, 2010.
Fujiwara et al., U.S. Appl. No. 12/969,855, filed Dec. 16, 2010.
Wabe et al., U.S. Appl. No. 13/027,723, filed Feb. 15, 2011.
Konno et al., U.S. Appl. No. 13/101,811, filed May 5, 2011.
Fujiwara et al., U.S. Appl. No. 13/111,033, filed May 19, 2011.
Konno et al., U.S. Appl. No. 13/251,204, filed Oct. 1, 2011.
Yamazaki et al., U.S. Appl. No. 13/251,205, filed Oct. 1, 2011.
Miki, "Oideyo Doubutsu No Mori Kanpeki Guidebook", First Edition, Enterbrain, Inc., Hamamura Kouichi, Jan. 9, 2006 (partial English-language translation), 6 pages.
Dragon Quest Monsters Joker 2, Weekly Famitsu, Enterbrain, Inc., Apr. 22, 2010, vol. 25, No. 18, Serial No. 1116, pp. 115-119, with a partial English translation, 8 pages.
Dragon Quest Monsters Joker 2, Nintendo DREAM, Mainichi Communications, Inc., Jul. 1, 2010, vol. 15, No. 7, Serial No. 195, pp. 52-59, with a partial English translation, 12 pages.
Game Broadway STAGE27, Gamaga, SOFTBANK Creative Corp., Jun. 1, 2010, vol. 27, No. 6, Serial No. 475, pp. 36-37, with a partial English translation, 6 pages.
English-language machine translation of JP 11-207031.
English-language machine translation of JP 2006-005630.
English-language machine translation of JP 2006-228113.
English-language machine translation of JP 2007-330642.
English-language machine translation of JP 2008-113259.
English-language machine translation of JP 2008-160303.
English-language machine translation of JP 2009-026178.
English-language machine translation of JP 2002-102530.
Dissidia Final Fantasy Ultimania, Japan, Square Enix Co., Ltd., Feb. 19, 2009, First Edition, p. 502-503 and partial English-language translation thereof.
Bhupender Virk, Development of Low Power Consumption Wireless IC for Realization of Sensor Network with Wireless LAN, Nikkei Electronics, vol. 997, pp. 87-94, Feb. 9, 2009 (with partial translation).
Saeki, K., "Apparent and Substantial Improvement in Function! Report on Nintendo DSi Giving Impression of Development," Impress Watch Corporation, GAME Watch, uploaded on Nov. 1, 2008 [retrieved Feb. 4, 2014]; http://game.watch.impress.co.jp/docs/20081101/dsi1.htm with partial English-language translation thereof.
English-language machine translation of http://game.watch.impress.co.jp/docs/20081101/dsi1.htm [retrieved Apr. 15, 2014].
English-language machine translation of JP 2007-125185.
Konno et al., U.S. Appl. No. 12/816,672, filed Jun. 16, 2010—response to office action filed Mar. 12, 2014.
Kubo et al., U.S. Appl. No. 12/940,426, filed Nov. 5, 2010—now U.S. Pat. No. 8,700,478.
Yamazaki et al., U.S. Appl. No. 12/948,050, filed Nov. 17, 2010—now U.S. Pat. No. 8,433,375.
Yamazaki et al., U.S. Appl. No. 12/948,371, filed Nov. 17, 2010—now U.S. Pat. No. 8,505,008.
Fujiwara et al., U.S. Appl. No. 12/969,855, filed Dec. 16, 2010—awaiting USPTO action.
Wabe et al., U.S. Appl. No. 13/027,723, filed Feb. 15, 2011—final office action mailed Apr. 28, 2014.
Konno et al., U.S. Appl. No. 13/101,811, filed May 5, 2011—RCE filed Jan. 22, 2014.
Fujiwara et al., U.S. Appl. No. 13/111,033, filed May 19, 2011—non-final office action mailed Apr. 25, 2014.
Konno et al., U.S. Appl. No. 13/251,204, filed Oct. 1, 2011—allowed.
Yamazaki et al., U.S. Appl. No. 13/251,205, filed Oct. 1, 2011—RCE filed May 11, 2014.
Kubo et al., U.S. Appl. No. 14/181,690, filed Feb. 16, 2014—awaiting USPTO action.
Kubo et al., U.S. Appl. No. 14/181,692, filed Feb. 16, 2014—awaiting USPTO action.
Konno et al., U.S. Appl. No. 12/816,672, filed Jun. 16, 2010—response to office action filed Nov. 7, 2014.
Ooe et al., U.S. Appl. No. 12/871,243, filed Aug. 30, 2010—response to office action filed Oct. 28, 2014.
Fujiwara et al., U.S. Appl. No. 12/969,855, filed Dec. 16, 2010—non-final office action mailed Oct. 6, 2013.
Wabe et al., U.S. Appl. No. 13/027,723, filed Feb. 15, 2011—non-final office action mailed Oct. 6, 2014.

(56) References Cited

OTHER PUBLICATIONS

Konno et al., U.S. Appl. No. 13/101,811, filed May 5, 2011—allowed.
Fujiwara et al., U.S. Appl. No. 13/111,033, filed May 19, 2011—now U.S. Pat. No. 8,874,037.
Konno et al., U.S. Appl. No. 13/251,204, filed Oct. 1, 2011—now U.S. Pat. No. 8,903,934.
Yamazaki et al., U.S. Appl. No. 13/251,205, filed Oct. 1, 2011—allowed.
Yamazaki et al., U.S. Appl. No. 14/334,520, filed Jul. 17, 2014—awaiting USPTO action.
Yu Kuribayashi, Check in: Castanet [English ver.] Noteworthy push-type system for automatically delivering Java application comes to Japan, netPC, Japan, ASCII corporation, Jul. 1, 1997, vol. 2, No. 7, pp. 66-67 and partial English-language translation of same.
Nintendo 3DS, formal announcement!! E3 2010 report~Perfect analysis of veiled fascinating hardware! This changes portable game devices!?~, Weekly Famitsu, Japan, Enterbrain, Inc., Jun. 24, 2010, vol. 25, No. 27, pp. 12-13 and partial English-language translation of same.
English-language machine translation of JP 2000-167233.
English-language machine translation of JP 2010-022704.
English-language machine translation of JP 2006-072685.
English-language machine translation of JP 2007-164699.
English-language machine translation of JP 2007-507982.
English-language machine translation of JP 2002-297483.
English-language machine translation of JP 2005-242886.
English-language machine translation of JP 2006-146306.
English-language machine translation of JP 2009-225000.
English-language machine translation of JP 2010-079546.
English-language machine translation of JP 2007-004316.
English-language machine translation of JP2004-221671.
English-language machine translation of JP2007-175508.
English-language machine translation of JP2010-028171.
English-language machine translation of JP2010-028672.
English-language machine translation of JP2004-005110.
English-language machine translation of JP2004-118291.
English-language machine translation of JP2008-077524.
English-language machine translation of JP2008-310499.

* cited by examiner

FIG.25A

| OWN MACHINE 1 | | | FLAG DETERMINATION NG |
|---|---|---|---|
| SEND FLAG | RECEIVE FLAG | | |
| 1 | 0 | TRANSMISSION ONLY | (0,1),(1,1) |
| 0 | 1 | RECEPTION ONLY | (1,0),(1,1) |
| 1 | 1 | COMMUNICATION POSSIBLE UNDER ANY CONDITIONS | (0,0),(0,1),(1,0),(1,1) |
| 0 | 0 | BI-DIRECTIONAL COMMUNICATION ONLY | (0,0),(1,1) |

FIG.25B

| | OWN MACHINE 1 | | PORTABLE GAME MACHINE 3 | | |
|---|---|---|---|---|---|
| | SEND FLAG | RECEIVE FLAG | SEND FLAG | RECEIVE FLAG | |
| EXAMPLE 1 | 0 | 1 | 1 | 0 | FLAG DETERMINATION OK |
| EXAMPLE 2 | 1 | 0 | 0 | 1 | FLAG DETERMINATION OK |
| EXAMPLE 3 | 1 | 1 | 1 | 0 | FLAG DETERMINATION OK |
| EXAMPLE 4 | 1 | 0 | 1 | 0 | FLAG DETERMINATION NG |
| EXAMPLE 5 | 0 | 0 | 1 | 0 | FLAG DETERMINATION NG |

1 BIT DETERMINATION WHERE MALE:1, FEMALE: 0

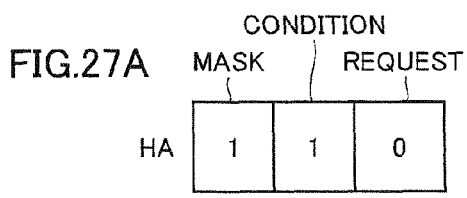

FIG.27A

CONDITION
MASK / REQUEST

HA | 1 | 1 | 0 | USER HA IS MALE USER, WISHING DATA EXCHANGE WITH FEMALE USER

FIG.27B

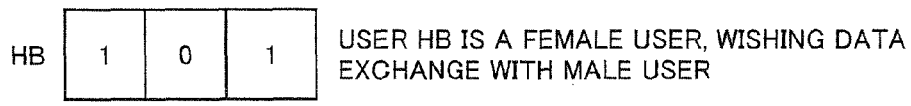

HB | 1 | 0 | 1 | USER HB IS A FEMALE USER, WISHING DATA EXCHANGE WITH MALE USER

FIG.27C

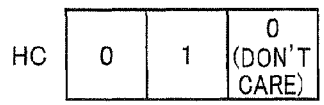

HC | 0 | 1 | 0 (DON'T CARE) | USER HC IS A MALE USER, PARTNER OF DATA EXCHANGE MAY BE MALE OR FEMALE (MASK SET TO 0 MEANS EITHER MALE OR FEMALE IS OK. REQUEST IS "DON'T CARE", THOUGH SET TO 0 HERE.)

FIG.27D

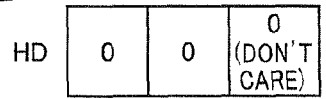

HD | 0 | 0 | 0 (DON'T CARE) | USER HD IS A FEMALE USER, PARTNER OF DATA EXCHANGE MAY BE MALE OR FEMALE (MASK SET TO 0 MEANS EITHER MALE OR FEMALE IS OK. REQUEST IS "DON'T CARE", THOUGH SET TO 0 HERE.)

FIG.28A  USERS HA & HB
   DETERMINATION PROCESS ON THE SIDE OF USER HA
      PARTNER'S CONDITION DATA & USER'S OWN MASK DATA = 0 & 1 = 0.
      USER'S OWN REQUEST DATA & USER'S OWN MASK DATA = 0 & 1 = 0.

USER'S OWN CONDITION DATA & PARTNER'S MASK DATA = 1 & 1 = 1.
      PARTNER'S REQUEST DATA & PARTNER'S MASK DATA = 1 & 1 = 1.

→ OBTAINING CONDITIONS SATISFIED

DETERMINATION PROCESS ON THE SIDE OF USER HB
      PARTNER'S CONDITION DATA & USER'S OWN MASK DATA = 1 & 1 = 1.
      USER'S OWN REQUEST DATA & USER'S OWN MASK DATA = 1 & 1 = 1.

USER'S OWN CONDITION DATA & PARTNER'S MASK DATA = 0 & 1 = 0.
      PARTNER'S REQUEST DATA & PARTNER'S MASK DATA = 0 & 1 = 0.

→ OBTAINING CONDITIONS SATISFIED

FIG.28B  USERS HA & HC
   DETERMINATION PROCESS ON THE SIDE OF USER HA
      PARTNER'S CONDITION DATA & USER'S OWN MASK DATA = 1 & 1 = 1.
      USER'S OWN REQUEST DATA & USER'S OWN MASK DATA = 0 & 1 = 0.

USER'S OWN CONDITION DATA & PARTNER'S MASK DATA = 1 & 0 = 0.
      PARTNER'S REQUEST DATA & PARTNER'S MASK DATA = 0 & 0 = 0.

→ OBTAINING CONDITIONS UNSATISFIED

DETERMINATION PROCESS ON THE SIDE OF USER HC
      PARTNER'S CONDITION DATA & USER'S OWN MASK DATA = 1 & 0 = 0.
      USER'S OWN REQUEST DATA & USER'S OWN MASK DATA = 0 & 0 = 0.

USER'S OWN CONDITION DATA & PARTNER'S MASK DATA = 1 & 1 = 1.
      PARTNER'S REQUEST DATA & PARTNER'S MASK DATA = 0 & 1 = 0.

→ OBTAINING CONDITIONS UNSATISFIED

FIG.28C  USERS HA & HD
   DETERMINATION PROCESS ON THE SIDE OF USER HA
      PARTNER'S CONDITION DATA & USER'S OWN MASK DATA = 0 & 1 = 0.
      USER'S OWN REQUEST DATA & USER'S OWN MASK DATA = 0 & 1 = 0.

USER'S OWN CONDITION DATA & PARTNER'S MASK DATA = 1 & 0 = 0.
      PARTNER'S REQUEST DATA & PARTNER'S MASK DATA = 0 & 0 = 0.

→ OBTAINING CONDITIONS SATISFIED

DETERMINATION PROCESS ON THE SIDE OF USER HD
      PARTNER'S CONDITION DATA & USER'S OWN MASK DATA = 1 & 0 = 0.
      USER'S OWN REQUEST DATA & USER'S OWN MASK DATA = 0 & 0 = 0.

USER'S OWN CONDITION DATA & PARTNER'S MASK DATA = 0 & 1 = 0.
      PARTNER'S REQUEST DATA & PARTNER'S MASK DATA = 0 & 1 = 0.

→ OBTAINING CONDITIONS SATISFIED

FIG.29A

USER HE

| MASK | | CONDITION | | REQUEST | |
|---|---|---|---|---|---|
| COURSE P | COURSE Q | COURSE P | COURSE Q | COURSE P | COURSE Q |
| 0 | 1 | 1 | 1 | 0 (DON'T CARE) | 1 |

USER HE HAS DATA OF COURSES P & Q
  DATA EXCHANGE OF COURSE P MAY OR MAY NOT BE DESIRED
  DATA EXCHANGE OF COURSE Q IS DESIRED

FIG.29B

USER HF

| MASK | | CONDITION | | REQUEST | |
|---|---|---|---|---|---|
| COURSE P | COURSE Q | COURSE P | COURSE Q | COURSE P | COURSE Q |
| 1 | 1 | 1 | 0 | 0 | 1 |

USER HF HAS DATA OF COURSE P
  DATA EXCHANGE OF COURSE P IS DESIRED
  DATA OF COURSE Q REQUESTED

FIG.29C

USER HG

| MASK | | CONDITION | | REQUEST | |
|---|---|---|---|---|---|
| COURSE P | COURSE Q | COURSE P | COURSE Q | COURSE P | COURSE Q |
| 1 | 1 | 0 | 1 | 1 | 1 |

USER HG HAS DATA OF COURSE Q
  DATA OF COURSE P REQUESTED
  DATA EXCHANGE OF COURSE Q IS DESIRED

FIG.30A
    USERS HE AND HF
        DETERMINATION PROCESS ON THE SIDE OF USER HE
            PARTNER'S CONDITION DATA & USER'S OWN MASK DATA = [10] & [01]
                = [00]
            USER'S OWN REQUEST DATA & USER'S OWN MASK DATA = [01] & [11]
                = [01] → NG
            USER'S OWN CONDITION DATA & PARTNER'S MASK DATA = [11] & [11]
                = [11]
            PARTNER'S REQUEST DATA & PARTNER'S MASK DATA = [01] & [11]
                = [01] → NG
        → OBTAINING CONDITIONS UNSATISFIED

DETERMINATION PROCESS ON THE SIDE OF USER HF
            PARTNER'S CONDITION DATA & USER'S OWN MASK DATA = [11] & [11]
                = [11]
            USER'S OWN REQUEST DATA & USER'S OWN MASK DATA = [01] & [11]
                = [01] → NG
            USER'S OWN CONDITION DATA & PARTNER'S MASK DATA = [10] & [01]
                = [00]
            PARTNER'S REQUEST DATA & PARTNER'S MASK DATA = [01] & [01]
                = [01] → NG
        → OBTAINING CONDITIONS UNSATISFIED

FIG.30B
    USERS HE AND HG
        DETERMINATION PROCESS ON THE SIDE OF USER HE
            PARTNER'S CONDITION DATA & USER'S OWN MASK DATA = [01] & [01]
                = [01]
            USER'S OWN REQUEST DATA & USER'S OWN MASK DATA = [01] & [01]
                = [01] → OK
            USER'S OWN CONDITION DATA & PARTNER'S MASK DATA = [11] & [11]
                = [11]
            PARTNER'S REQUEST DATA & PARTNER'S MASK DATA = [11] & [11]
                = [11] → OK
        → OBTAINING CONDITIONS SATISFIED

DETERMINING PROCESS ON THE SIDE OF USER HG
            PARTNER'S CONDITION DATA & USER'S OWN MASK DATA = [11] & [11]
                = [11]
            USER'S OWN REQUEST DATA & USER'S OWN MASK DATA = [11] & [11]
                = [11] → OK
            USER'S OWN CONDITION DATA & PARTNER'S MASK DATA = [11] & [11]
                = [11]
            PARTNER'S REQUEST DATA & PARTNER'S MASK DATA = [11] & [11]
                = [11] → OK
        → OBTAINING CONDITIONS SATISFIED

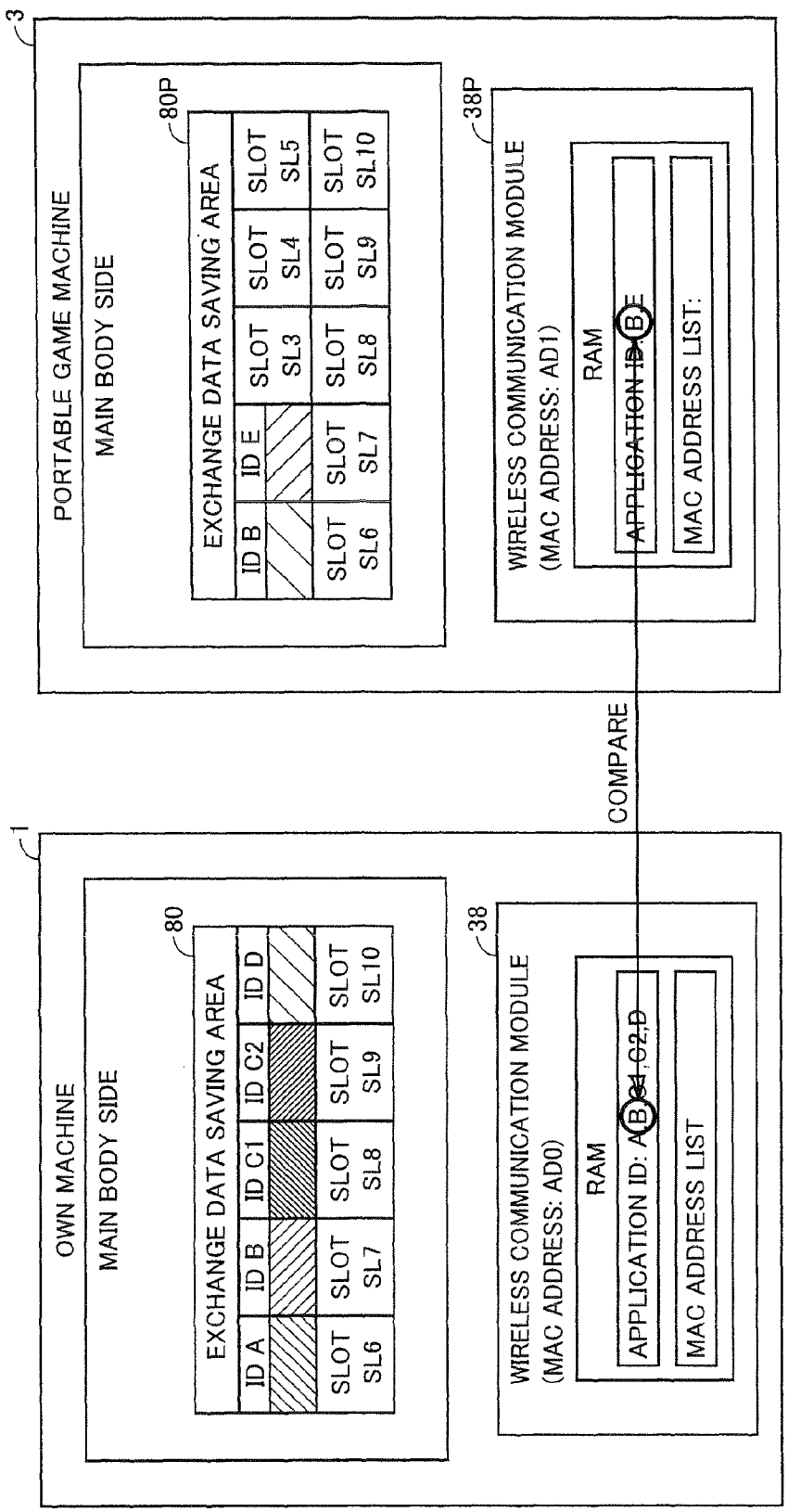

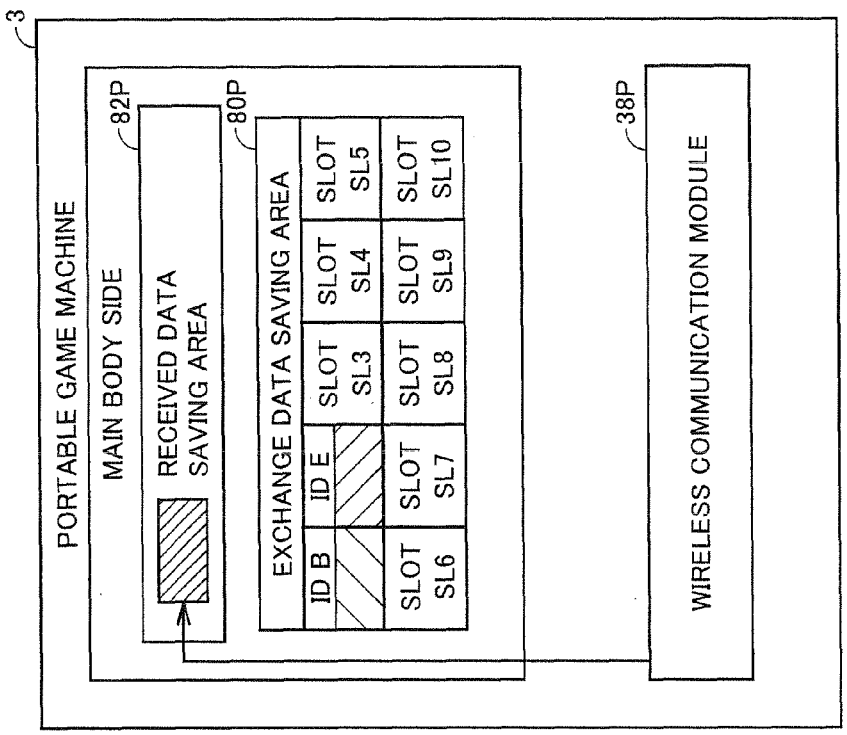
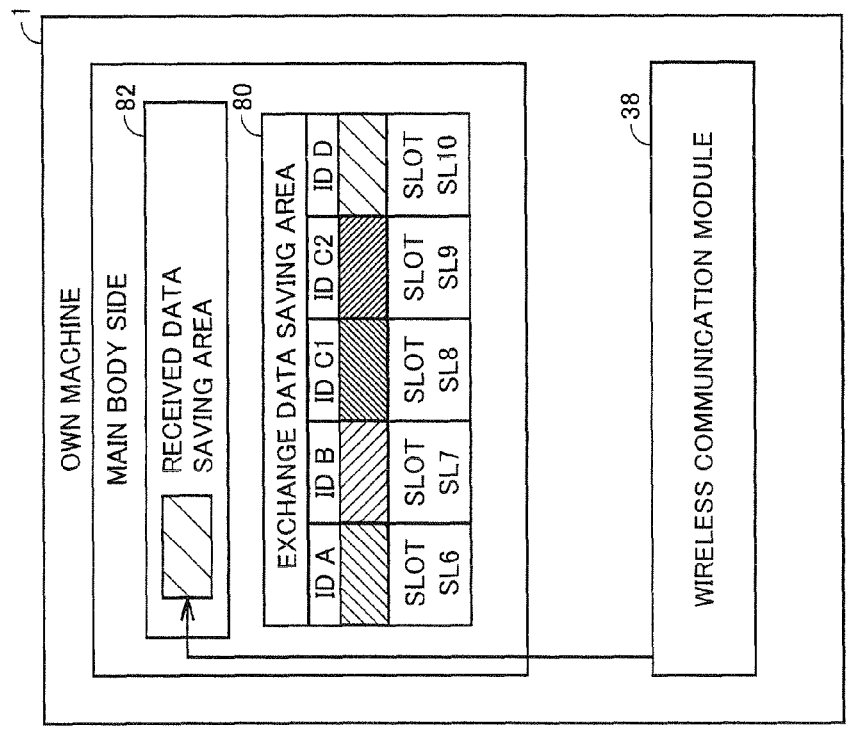
FIG.33

COMMUNICATION PARTNER SEARCH PROCESS (1)

Tcycle :FIXED VALUE, FOR EXAMPLE, 4 sec.
Tsc: RANDOM VALUE BETWEEN 0∼Tcycle
Tsp: Tcycle − Tsc

COMMUNICATION PARTNER SEARCH PROCESS (2)

Tcycle :FIXED VALUE, FOR EXAMPLE, 4 sec.
Tsp: FIXED VALUE, FOR EXAMPLE, 96 ms.
Tsc1: RANDOM VALUE BETWEEN 0∼(Tcycle − Tsp)
Tsc2: Tcycle − Tsc1 − Tsp

INFORMATION PROCESSING SYSTEM, APPARATUS, METHOD AND CONTROL PROGRAM CAPABLE OF EXECUTING EFFICIENT DATA COMMUNICATION DISPENSING WITH COMMUNICATION WITH ONCE COMMUNICATED PARTNER

This nonprovisional application is based on Japanese Patent Application No. 2009-208228 filed with the Japan Patent Office on Sep. 9, 2009, the entire contents of which are hereby incorporated by reference.

BACKGROUND OF THE INVENTION

1. Field of the Invention

The present invention relates to an information processing system, an information processing apparatus, a method of controlling an information processing apparatus and to a recording medium recording a control program for controlling the information processing apparatus. More specifically, the present invention relates to an information processing system, an information processing apparatus, a method of controlling an information processing apparatus and to a recording medium recording a control program for controlling the information processing apparatus, including a plurality of portable information processing apparatuses capable of wireless communication with each other.

2. Description of the Background Art

Conventionally, a system has been known that automatically executes communication when information processing apparatuses come close to each other. By way of example, Japanese Patent Laying-Open No. 2005-28103 discloses a system in which exchange conditions are verified by game devices communicating with each other, and when the exchange conditions are met, game data designated for exchange are exchanged between the game devices.

In the disclosed system, communication takes place with another game device as an unspecified partner, when it comes into the communicable range. Specifically, the user does not explicitly designate a game device as a communication partner and, therefore, it is possible that communication is repeated time and again with a communication partner with which communication has already been done.

SUMMARY OF THE INVENTION

The present invention was made to solve the above-described problem and its object is to provide an information processing system, an information processing apparatus, a method of controlling an information processing apparatus and to a recording medium recording a control program for controlling the information processing apparatus, allowing efficient data communication by dispensing with repetitive communication with a partner with which communication has already been done once.

According to a first aspect, the present invention provides an information processing system including a plurality of information processing apparatuses, wherein each of the information processing apparatuses includes: a storage unit; an identification information receiving unit for receiving identification information identifying an information processing apparatus, transmitted from another one of the plurality of information processing apparatuses; an assignment data communication determining unit determining, based on the identification information of the said another information processing apparatus received by the identification information receiving unit, whether or not an assignment data communication process of performing at least one of transmission of assignment data to the said another information processing apparatus and reception of assignment data from the said another information processing apparatus is to be executed; an assignment data communication control unit controlling the assignment data communication process based on the result of determination by the assignment data communication determining unit; and an identification information registration control unit registering at least the identification information of the said another information processing apparatus as a partner with which the assignment data communication process has been done by the assignment data communication control unit, with the storage unit. If the identification information of the said another information processing apparatus received by the identification information receiving unit is already registered with the storage unit, the assignment data communication determining unit determines not to execute the assignment data communication process.

In accordance with the first aspect, the identification information registration control unit of the information processing apparatus registers at least the identification information of another information processing apparatus as the partner with which the assignment data communication process has been done, with the storage unit. Further, the assignment data communication determining unit determines that, if the identification information of the said another information processing apparatus, which has been exchanged by the identification information receiving unit, is already registered with the storage unit, the assignment data communication process is not to be carried out. Specifically, a data communication control unit 209 communicates with another game machine. In data communication control unit 209, when exchange data is exchanged with the said another game machine, a machine identification information registration unit 210 saves an MAC address as a piece of information identifying the said another game machine in an MAC address list saving area 88. The MAC address saved in MAC address list saving area 88 is saved in MAC address list saving area 70. An exchange data communication determining unit 225 of a wireless communication module 38 determines that communication is not to be carried out, if data is received from a game machine having the same MAC address as the MAC address saved in MAC address list saving area 70. Consequently, efficient data communication can be executed, dispensing with communication with a partner with which communication has already been done once.

According to a second aspect, the information processing apparatuses each include a wireless module. The assignment data communication control unit is capable of making a transition to a sleep state. The wireless module includes: the storage unit; the identification information receiving unit; the assignment data communication determining unit; the identification information registration control unit; and a notifying unit sending a notice to the assignment data communication control unit, if it is determined by the assignment data communication control unit that the assignment data communication process is to be executed. The assignment data communication control unit cancels the sleep state and executes the assignment data communication process when the notice is received from the notifying unit.

In accordance with the second aspect, a notifying unit is provided for sending a notice to the assignment data communication control unit, if it is determined that the assignment data communication process is to be done. When the notice from the notifying unit is received, the assignment data communication control unit cancels the sleep state and executes the assignment data communication process. Specifically, exchange data communication determining unit 225 of wireless communication module 38 determines that communication is not to be carried out, if data is received from a game machine having the same MAC address as the saved MAC address. If the notice from exchange data communication determining unit 225 is not received, data communication control unit 209 does not cancel the sleep state. Therefore, the sleep state is not cancelled for a communication with the partner with which communication has already been done once, and hence, efficient data communication can be executed.

According to a third aspect, preferably, the identification information registration control unit registers at least the identification information of the said another information processing apparatus as a partner with which the determination was made by the assignment data communication determining unit, with the storage unit.

In accordance with the third aspect, the identification information registration control unit of the information processing apparatus registers at least the identification information of another information processing apparatus as the partner of the determination process by the assignment data communication determining unit. When a notice is received from wireless module 38, machine identification information registration unit 210 saves an MAC address as a piece of information identifying the said another game machine in MAC address list saving area 88. Exchange data communication determining unit 225 of wireless communication module 38 determines that the determination process has already been done, if data is received from a game machine having the same MAC address as the saved MAC address and, therefore, efficient data communication can be executed, dispensing with communication with a partner with which communication has already been done once.

According to a fourth aspect, preferably, the identification information receiving unit repeatedly executes a searching process of transmitting a search signal including identification information to an unspecified partner or waiting until the search signal is received from another information processing apparatus, to receive the identification information of the said another information processing apparatus. The assignment data communication determining unit repeatedly determines whether or not the assignment data communication process is to be executed, for each piece of identification information of another, communicable information processing apparatus, obtained in accordance with the searching process by the identification information receiving unit.

In accordance with the fourth aspect, the identification information receiving unit repeatedly executes a searching process for transmitting a searching signal to an unspecified partner or partners or waiting for a searching signal transmitted from another information processing apparatus. The assignment data communication determining unit repeatedly determines whether the assignment data communication process is to be carried out, for each piece of identification information from another information processing apparatus received by the identification information receiving unit. Specifically, a wireless frame transmitting/receiving unit 223 repeats the process for transmitting a transmission wireless frame or waiting until a reception wireless frame from another game machine is received. Further, exchange data communication determining unit 225 determines, every time it receives a reception wireless frame including an MAC address, whether the received MAC address is the same as the saved MAC address. Therefore, when another communicable game machine is searched and communication partner is found, determination is made as to whether or not it is the communication partner with which communication has already been done once, and the process is continuously and repeatedly executed until a communication partner with which exchange is possible is found. Thus, efficient data communication is possible.

According to a fifth aspect, preferably, after the assignment data communication process with the said another information processing apparatus is executed by the assignment data communication control unit, the identification information receiving unit repeatedly executes a searching process of transmitting a search signal including identification information to an unspecified partner or waiting until the search signal is received from the said another information processing apparatus, to receive the identification information of the said another information processing apparatus. The assignment data communication determining unit repeatedly determines whether or not the assignment data communication process is to be executed, for each piece of identification information of the communicable said another information processing apparatus, obtained in accordance with the searching process by the identification information receiving unit. The assignment data communication control unit repeatedly executes the assignment data communication process with the said another information processing apparatus for every result of determination by the assignment data communication determining unit. The identification information registration control unit repeatedly registers the identification information of the said another information processing apparatus as a partner with which the assignment data communication process has been done by the assignment data communication control unit, with the storage unit.

In accordance with the fifth aspect, after the assignment data communication process with the said another information processing apparatus is executed by the assignment data communication control unit, the identification information receiving unit repeatedly executes the searching process for transmitting a searching signal to unspecified partner or partners or waiting for a searching signal transmitted from another information processing apparatus, in order to receive the identification information of another information processing apparatus. The assignment data communication determining unit repeatedly determines whether the received identification information of another information processing apparatus is stored in the storage unit, every time the identification information receiving unit receives identification information from another information processing. The assignment data communication control unit repeatedly executes the assignment data communication process to another information processing apparatus, depending on every determination by the assignment data communication determining unit. The identification information registration control unit repeatedly registers a piece of identification information of another information processing apparatus, every time the assignment data communication process with another information processing apparatus as a partner with which the assignment data communication process has been done is executed by the assignment data communication control unit. Specifically, after the process for giving/receiving exchange data by data communication control unit 209, wireless frame transmitting/receiving unit 223 repeats the process for transmitting a transmission wireless frame or waiting until a reception wireless frame from another game machine is received. Further, exchange data communication determining unit 225 determines, every time it receives a reception wireless frame including an MAC address, whether the received MAC address is the same as the saved MAC address. Data communication control unit 209 executes the process for giving/receiving exchange data with another game machine of which MAC address does not match. Then, machine identification information registration unit 210 saves an MAC address as a piece of information identifying the said another game machine with which the data exchange process has been done, in MAC address list saving area 88. By repeating the above-described process, after the exchange data is once exchanged, searching for unspecified game machine is continued, and the exchange data can be exchanged with another game apparatus thus found. Therefore, it is possible to continuously execute exchange with a large number of communication partners dispensing with communication with a partner with which communication has already been done once, and efficient data communication can be executed.

According to a sixth aspect, preferably, the information processing system further includes an assignment data designating unit designating assignment data to be transmitted to the said another information processing apparatus.

According to a seventh aspect, preferably, the information processing system further includes an assignment data storage unit storing data usable by at least one application program among a plurality of application programs as the assignment data to be offered to the said another information processing apparatus in accordance with a designation by the assignment data designating unit. The assignment data communication control unit transmits the assignment data stored in the assignment data storage unit to the said another information processing apparatus and receives assignment data stored in the said another information processing apparatus, based on the result of determination of the assignment data communication determining unit.

In accordance with the sixth and seventh aspects, the assignment data storage unit stores data usable by at least one application program among a plurality of application programs, in accordance with the designation by the assignment data designating unit. Depending on the result of determination by the assignment data communication determining unit, the assignment data communication control unit transmits the stored assignment data to another information processing apparatus and receives the assignment data that has been stored in the said another information processing apparatus. Specifically, an exchange data saving area 80 saves, in accordance with a designation input of exchange data in an application executing unit 201, the designated exchange data. A data communication executing unit 208 executes the process for giving/receiving the exchange data stored in exchange data saving area 80, with another game machine whose MAC address does not match. Therefore, it is possible to transmit to another game machine exchange data that can be used by the corresponding application owned by the game machine itself and to receive exchange data from the said another game apparatus. Thus, zest of the application using the exchange data can be improved.

According to an eighth aspect, preferably, the information processing apparatus further includes identification information erasing unit erasing the identification information registered with the storage unit, based on prescribed conditions.

According to a ninth aspect, preferably, the identification information erasing unit erases the identification information registered with the storage unit after a prescribed time period.

According to a tenth aspect, preferably, the information processing apparatus further includes an assignment data designating unit designating assignment data to be transmitted to another information processing apparatus. The identification information erasing unit erases, when the assignment data designating unit designates the assignment data, the identification information registered with the storage unit.

In accordance with the eighth to tenth aspects, the identification information erasing unit erases the identification information registered in the storage unit after the lapse of a prescribed time period, or when the assignment data is designated by the assignment data designating unit. Specifically, a machine identification information erasing unit 218 is capable of resetting and thereby erasing the MAC address list stored in MAC address list saving area 88, and if the list is erased, data communication with a communication partner with which communication has already been done in the past becomes possible again and, therefore, data communication with high degree of freedom is realized.

According to an eleventh aspect, preferably, communication conditions (D4) related to the assignment data communication process transmitted from another information processing apparatus are received.

According to a twelfth aspect, preferably, the identification information receiving unit receives the communication conditions with the identification information. The assignment data communication determining unit determines whether or not the assignment data communication process is to be executed, based on the communication conditions and the identification information of the said another information processing apparatus received by the identification information receiving unit.

In accordance with the eleventh and twelfth aspects, based on the communication conditions, determination is made as to whether or not at least one of the data transmission to another information processing apparatus and the data reception from another information processing apparatus is to be carried out. Specifically, communication data determining unit 228 and application ID determining unit 230 of wireless communication module 38 can determine whether or not another game machine is a partner with which exchange data can be exchanged, in accordance with the contents of vender specifying IE data included in the reception wireless frame. Thus, efficient data communication can be executed.

According to a thirteenth aspect, preferably, the information processing apparatus further includes an assignment data storage unit storing data usable by at least one application program among a plurality of application programs as the assignment data to be transmitted to the said another information processing apparatus. The communication conditions include application identification information for identifying an application program corresponding to the assignment data stored in the assignment data storage unit. The assignment data communication determining unit includes: an identification information determining unit determining whether or not the identification information of the said another information processing apparatus received by the identification information receiving unit is registered with the storage unit; and an application identification information determining unit determining whether or not the same application identification information as the application identification information corresponding to the assignment data stored in the assignment data storage unit is included in the received communication conditions of the said another information processing apparatus.

In accordance with the thirteenth aspect, the identification information determining unit determines whether or not the identification information of another information processing apparatus received by the identification information receiving unit is stored in the storage unit. The application identification information determining unit determines whether or not the application identification information same as the application identification information corresponding to the assignment data registered in the assignment data storage unit is included in the received communication conditions of the said another information processing apparatus. Specifically, an apparatus identification information comparing unit 226 determines that communication is not to be carried out, if data is received from a game machine having the same MAC address as the saved MAC address. An application ID determining unit 230 determines whether the application ID corresponding to the exchange data stored in exchange data saving area 80 is included in the vendor specifying IE data of the reception wireless frame. Therefore, if the pieces of application identification information corresponding to the exchange data are compared with each other and found to be matching, it is recognized that the exchange data correspond to the same application and, as the exchange data for the same application can be exchanged, efficient data communication becomes possible.

According to a fourteenth aspect, preferably, the information processing apparatus further includes an assignment data designating unit designating assignment data to be transmitted to another information processing apparatus. The communication conditions include obtaining conditions data for determining whether or not the assignment data is to be obtained in accordance with a combination of assignment data to be transmitted to the said another information processing apparatus and assignment data to be received from the said another information processing apparatus. The assignment data communication determining unit includes: an identification information determining unit determining whether or not the identification information of the said another information processing apparatus received by the identification information receiving unit is registered with the storage unit; and an obtaining conditions data determining unit determining whether or not the obtaining conditions data included in the received communication conditions of the said another information processing apparatus satisfy prescribed conditions.

According to a fifteenth aspect, preferably, the communication conditions further include comparison identification data for designating the obtaining conditions data to be one comparing method among a plurality of comparing methods prepared in advance.

According to a sixteenth aspect, preferably, the obtaining conditions data includes offering attribute data related to the assignment data to be transmitted to another information processing apparatus and requested attribute data related to the assignment data to be received from the said another information processing apparatus. The obtaining conditions data determining unit includes: a first attribute determining unit determining whether or not the offering attribute data included in the obtaining conditions data transmitted to the said another information processing apparatus matches the requested attribute data included in the obtaining conditions data received from the said another information processing apparatus; and a second attribute determining unit determining whether the requested attribute data included in the obtaining conditions data transmitted to the said another information processing apparatus matches the offered attribute data included in the obtaining conditions data received from the said another information processing apparatus.

In accordance with the fourteenth to sixteenth aspects, the communication conditions include obtaining conditions data for determining whether or not the assignment data is to be obtained or not, in accordance with a combination of the assignment data to be transmitted to another information processing apparatus and the assignment data to be received from the said another information processing apparatus. The assignment data communication determining unit includes: the identification information determining unit determining whether or not identification information same as the identification information of the said another information processing apparatus exchanged by the identification information receiving unit is stored in the storage unit; and an obtaining conditions data determining unit determining whether or not the obtaining conditions data included in the received communication conditions of the said another information processing apparatus satisfies prescribed conditions. Specifically, an application ID determining unit 230 determines whether or not the request data related to the exchange data requested for another game machine matches the condition data from the said another game machine, and determines whether the request conditions of its own are satisfied. Further, it determines whether or not the condition data related to the exchange data to be transmitted to another game machine matches the request data from the said another game machine, and determines whether the request conditions of the partner are satisfied. Therefore, as regards the exchange data, conditions requested by the own machine and conditions requested by the partner can be determined. Therefore, it is possible to avoid exchange of exchange data which is not desired. Thus, efficient data communication can be executed.

According to a seventeenth aspect, preferably, the obtaining conditions data includes determination setting data setting whether or not data used for determination is valid/invalid. The first attribute determining unit determines whether or not mask offering attribute data in accordance with the determination setting data related to the offered attribute data included in the obtaining conditions data transmitted to another information processing apparatus matches mask requested attribute data in accordance with the determination setting data related to the requested attribute data included in the obtaining conditions data received from the said another information processing apparatus. The second attribute determining unit determines whether or not the mask requested attribute data in accordance with the determination setting data related to the requested attribute data included in the obtaining conditions data transmitted to the said another information processing apparatus matches the mask offered attribute data in accordance with the determination setting data related to the offered attribute data included in the obtaining conditions data received from the said another information processing apparatus.

In accordance with the seventeenth aspect, the first and second attribute determining unit determines whether or not the mask offering attribute data matches the mask requesting attribute data. Specifically, application ID determining unit 230 determines whether or not the conditions data obtained by multiplying the mask data and the request data matches the conditions data obtained by multiplying the mask data and the condition data, using the mask data. Since the mask data that sets whether the data is valid/invalid is multiplied, various data comparison can be executed.

According to an eighteenth aspect, preferably, the information processing apparatus further includes an identification information changing unit changing the identification information under prescribed conditions.

According to a nineteenth aspect, the identification information changing unit changes the identification information at every prescribed time period.

In accordance with the eighteenth and nineteenth aspects, the identification information changing unit changes the identification information at every prescribed time period. Specifically, a communication setting unit 204 changes the local address of the MAC address at every prescribed time period. Therefore, in the data communication, it becomes possible to prevent the problem that a third party fraudulently uses the MAC address and wrongfully acts as another person, resulting from the fact that the MAC address as the information for identifying the apparatus can be changed, and hence, data communication with improved security can be executed.

According to a twentieth aspect, preferably, the storage unit includes first and second storage areas for registering identification information of another information processing apparatus corresponding to currently used identification information, and identification information of the said another information processing apparatus corresponding to last used identification information, respectively. The information processing apparatus further includes an identification information erasing unit erasing identification information registered with the storage unit based on the prescribed conditions. The identification information erasing unit erases the identification information stored in the second storage area, when the currently used identification information is changed by the identification information changing unit corresponding to the identification information to be changed.

In accordance with the twentieth aspect, the storage unit includes the first and second storage areas for registering the identification information of another information processing apparatus corresponding to the currently used identification information and the identification information of another information processing apparatus corresponding to the last used identification information, respectively. The identification information erasing unit erases, when the identification information currently used is changed by the identification information changing unit corresponding to the identification information to be changed, the identification information stored in the second storage area, to ensure the area for registering the identification information of another information processing apparatus. Specifically, machine identification information erasing unit 218 deletes contents of a sub-list provided corresponding to the MAC address used last time, if it is determined that a prescribed time period for updating the MAC address has passed. Therefore, though it is possible that data communication takes place with the same game machine every time the MAC address is updated, since the sub-list corresponding to the currently used MAC address is held and the sub-list corresponding to the MAC address used last time can be deleted, the MAC address filtering can be done based on the held MAC address while ensuring sufficient data capacity. As a result, even when the MAC address is updated, efficient data communication can be executed.

According to the twenty-first aspect, the information processing apparatus further includes assignment data designating unit designating assignment data to be transmitted to another information processing apparatus. After the assignment data communication process with the said another information processing apparatus is executed by the assignment data communication control unit, the identification information receiving unit repeatedly executes a searching process of transmitting a search signal including identification information to an unspecified partner or waiting until the search signal is received from another information processing apparatus, to receive the identification information of the said another information processing apparatus. The assignment data communication determining unit repeatedly determines whether or not the identification information of another information processing apparatus received by the identification information receiving unit is registered with the storage unit, for each piece of identification information of the communicable said another information processing apparatus, obtained in accordance with the searching process by the identification information receiving unit. The assignment data communication control unit repeatedly executes the assignment data communication process for every result of determination by the assignment data communication determining unit. The identification information registration control unit repeatedly registers the identification information of another information processing apparatus as a partner with which the assignment data communication process has been done by the assignment data communication control unit, with the storage unit.

In accordance with the twenty-first aspect, after the reception of assignment data, the identification information receiving unit repeatedly executes a searching process for transmitting a searching signal to an unspecified partner or partners or waiting for a searching signal transmitted from another information processing apparatus. The assignment data communication determining unit repeatedly determines whether or not the received identification data of another information processing apparatus is stored in the storage unit, for each piece of identification information from another information processing apparatus received by the identification information receiving unit. The assignment data communication control unit repeatedly executes the assignment data communication process, depending on every determination result by the assignment data communication determining unit. The identification information registration control unit repeatedly registers the identification information of another information processing apparatus as a partner with which the assignment data communication process has been done by the assignment data communication control unit, in the storage unit. Specifically, after the exchange data communication process, wireless frame transmitting/receiving unit 223 repeats the process for transmitting a transmission wireless frame or waiting until a reception wireless frame from another game machine is received. Further, exchange data communication determining unit 225 determines, every time it receives a reception wireless frame including an MAC address, whether the received MAC address is the same as the saved MAC address. Data communication control unit 209 repeats transmission and reception of exchange data with another game machine in accordance with a notice from the wireless communication module. Machine identification information registration unit 210 saves an MAC address in MAC address list saving area 88 every time the exchange data is transmitted and received to/from another game machine. Specifically, another communicable game machine is searched for, and if a communication partner is found, whether it is a partner with which communication has been already done once is determined, and exchange data is exchanged with the first-time communication partner and after exchange, the MAC address of the communication partner is saved. Since such a process is continuously repeated, efficient data communication can be executed with a large number of game machines within the communicable range.

According to a twenty-second aspect, the present invention provides an information processing apparatus, including: a storage unit; an identification information receiving unit for receiving identification information identifying an information processing apparatus, transmitted from another information processing apparatuses; an assignment data communication determining unit determining, based on the identification information of the said another information processing apparatus received by the identification information receiving unit, whether or not an assignment data communication process of performing at least one of transmission of assignment data to the said another information processing apparatus and reception of assignment data from the said another information processing apparatus is to be executed; an assignment data communication control unit controlling the assignment data communication process based on the result of determination by the assignment data communication determining unit; and an identification information registration control unit registering at least the identification information of the said another information processing apparatus as a partner with which the assignment data communication process has been done by the assignment data communication control unit, with the storage unit. If the identification information of the said another information processing apparatus received by the identification information receiving unit is already registered with the storage unit, the assignment data communication determining unit determines not to execute the assignment data communication process.

In accordance with the twenty-second aspect, the identification information registration control unit of the information processing apparatus stores, when the assignment data communication process is carried out by the assignment data communication control unit, the identification information of another information processing apparatus in the storage unit. Further, the assignment data communication determining unit determines that, if the identification information of the said another information processing apparatus, which has been received by the identification information receiving unit, is stored in the storage unit, the assignment data communication process to the said another apparatus is not to be carried out. Specifically, data communication control unit 209 communicates with another game machine. In data communication control unit 209, when exchange data is exchanged with the said another game machine, machine identification information registration unit 210 saves an MAC address as a piece of information identifying the said another game machine in MAC address list saving area 88. Exchange data communication determining unit 225 of wireless communication module 38 determines that communication is not to be carried out, if data is received from a game machine having the same MAC address as the saved MAC address. Consequently, efficient data communication can be executed, dispensing with communication with a partner with which communication has already been done once.

According to a twenty-third aspect, the present invention provides a method of controlling an information processing apparatus, including the steps of: receiving identification information identifying an information processing apparatus, transmitted from another information processing apparatus; determining, based on the received identification information of the said another information apparatus, whether or not an assignment data communication process of performing at least one of transmission of assignment data to the said another information processing apparatus and reception of assignment data from the said another information processing apparatus is to be executed; controlling the assignment data communication process based on the result of determination at the determining step; and registering at least the identification information of the said another information processing apparatus as a partner with which the assignment data communication process has been done with a storage unit. At the step of determining whether or not the assignment data communication process is to be executed, the assignment data communication process is determined not to be executed, if the received identification information of the said another information processing apparatus is already registered with the storage unit.

In accordance with the twenty-third aspect, at the step of registering the identification information with the storage unit, the identification information of another information processing apparatus as a partner with which the assignment data communication process has been done is stored in the storage unit. Further, at the step of determining whether or not the assignment data communication is to be carried out, the assignment data communication is not carried out, if the identification information of the said another information processing apparatus is already registered with the storage unit. Specifically, data communication control unit 209 communicates with another game machine. In data communication control unit 209, when exchange data is exchanged with the said another game machine, machine identification information registration unit 210 saves an MAC address as a piece of information identifying the said another game machine in an MAC address list saving area 88. Exchange data communication determining unit 225 of wireless communication module 38 determines that communication is not to be carried out, if data is received from a game machine having the same MAC address as the saved MAC address. Consequently, efficient data communication can be executed, dispensing with communication with a partner with which communication has already been done once.

According to a twenty-fourth aspect, the present invention provides a non-transitory storage medium storing a control program executed by a computer of an information processing apparatus, wherein a computer-readable control program includes: identification information receiving instructions to receive identification information for identifying an information processing apparatus transmitted from another information processing apparatus; assignment data communication determining instructions to determine whether or not an assignment data communication process of performing at least one of transmission of assignment data to the said another information processing apparatus and reception of assignment data from the said another information processing apparatus is to be executed, based on the identification information of the said another information processing apparatus received by the identification information receiving instructions; assignment data communication control instructions to control the assignment data communication process based on the result of determination by the assignment data communication determining instructions; and identification information registration control instructions to register at least the identification information of the said another information processing apparatus as a partner with which the assignment data communication process has been done by the assignment data communication control instructions, with a storage unit. The assignment data communication determining instructions determine that the assignment data communication process is not to be executed, if the received identification information of the said another information processing apparatus is already registered with the storage unit.

In accordance with the twenty-fourth aspect, the identification information registration control instructions stored in the control program executed by the computer of information processing apparatus store, when the assignment data communication process is carried out in accordance with the assignment data communication control instructions, the identification information of another information processing apparatus in the storage unit. The assignment data communication determining instructions determine that, if the identification information of the said another information processing apparatus, which has been received by the identification information receiving instruction, is already registered with the storage unit, the assignment data communication process is not to be carried out. Specifically, data communication control unit 209 communicates with another game machine. In data communication control unit 209, when exchange data is exchanged with the said another game machine, machine identification information registration unit 210 saves an MAC address as a piece of information identifying the said another game machine in MAC address list saving area 88. Exchange data communication determining unit 225 of wireless communication module 38 determines that communication is not to be carried out, if data is received from a game machine having the same MAC address as the saved MAC address. Consequently, efficient data communication can be executed, dispensing with communication with a partner with which communication has already been done once.

According to a twenty-fifth aspect, the present invention provides an information processing system including a plurality of information processing apparatuses and a plurality of fixed terminals. The information processing apparatus includes: a storage unit; an identification information receiving unit for receiving identification information identifying an information processing apparatus or a fixed terminal, transmitted from another one of the plurality of information processing apparatuses or from one of the plurality of fixed terminals; an assignment data communication determining unit determining, based on the identification information of the said another information processing apparatus or the fixed terminal received by the identification information receiving unit, whether or not an assignment data communication process of performing at least one of transmission of assignment data to the said another information processing apparatus or the fixed terminal and reception of assignment data from the said another information processing apparatus or the fixed terminal is to be executed; an assignment data communication control unit controlling the assignment data communication process based on the result of determination by the assignment data communication determining unit; and an identification information registration control unit registering at least the identification information of the said another information processing apparatus or the fixed terminal as a partner with which the assignment data communication process has been done by the assignment data communication control unit, with the storage unit. The assignment data communication determining unit determines not to execute the assignment data communication process, if the identification information of the said another information processing apparatus or the fixed terminal received by the identification information receiving unit is already registered with the storage unit.

In accordance with the twenty-fifth aspect, the identification information registration control unit of the information processing apparatus registers at least the identification information of another information processing apparatus or a fixed terminal as the partner with which the assignment data communication process has been done by the assignment data communication control unit, with the storage unit. Further, the assignment data communication determining unit determines that, if the identification information of the said another information processing apparatus or the fixed terminal, which has been exchanged by the identification information receiving unit, is already registered with the storage unit, the assignment data communication process is not to be carried out. Specifically, data communication control unit 209 communicates with another game machine or a fixed terminal. In data communication control unit 209, when exchange data is exchanged with or a distribution data is obtained from the said another game machine or the fixed terminal, machine identification information registration unit 210 saves an MAC address as a piece of information identifying the said another game machine or the fixed terminal in MAC address list saving area 88 or 88#. The MAC address saved in MAC address list saving area 88 or 88# is saved in MAC address list saving area 70 or 70#. Exchange data communication determining unit 225 or distribution data communication determining unit 225# of wireless communication module 38 determines that communication is not to be carried out, if data is received from a game machine or distribution data is received from a fixed terminal having the same MAC address as the MAC address saved in MAC address list saving area 70 or 70#. Consequently, efficient data communication can be executed, dispensing with communication with a partner with which communication has already been done once.

According to a twenty-sixth aspect, preferably, the storage unit has a first area registering the identification information of the information processing apparatus, and a second area registering the identification information of the fixed terminal, registered by the identification information registration control unit.

In accordance with the twenty-sixth aspect, the storage unit includes a first area for storing the identification information of the information processing apparatus and a second area for storing the identification information of the fixed terminal, stored by the identification information registration control unit. Specifically, MAC address list saving area 88 for storing an MAC address of a game machine and a MAC address list saving area 88# for storing an MAC address of a fixed terminal are provided. Therefore, whether communication is to be done or not can be determined using the MAC addresses saved in respective MAC address list saving areas and, therefore process load of determination can be alleviated, and efficient data communication can be executed.

According to a twenty-seventh aspect, the present invention provides an information processing apparatus, including: a storage unit; an identification information receiving unit for receiving identification information identifying an information processing apparatus or a fixed terminal, transmitted from another information processing apparatuses or from a fixed terminal; an assignment data communication determining unit determining, based on the identification information of the said another information processing apparatus or the fixed terminal received by the identification information receiving unit, whether or not an assignment data communication process of performing at least one of transmission of assignment data to the said another information processing apparatus or the fixed terminal and reception of assignment data from the said another information processing apparatus or the fixed terminal is to be executed; an assignment data communication control unit controlling the assignment data communication process based on the result of determination by the assignment data communication determining unit; and an identification information registration control unit registering at least the identification information of the said another information processing apparatus or the fixed terminal as a partner with which the assignment data communication process has been done by the assignment data communication control unit, with the storage unit. The assignment data communication determining unit determines not to execute the assignment data communication process, if the identification information of the said another information processing apparatus or the fixed terminal received by the identification information receiving unit is already registered with the storage unit.

In accordance with the twenty-seventh aspect, the identification information registration control unit of the information processing apparatus registers at least the identification information of another information processing apparatus or a fixed terminal as the partner, with which the assignment data communication process has been done by the assignment data communication control unit, with the storage unit. Further, the assignment data communication determining unit determines that, if the identification information of the said another information processing apparatus or the fixed terminal, which has been exchanged by the identification information receiving unit, is already registered with the storage unit, the assignment data communication process is not to be carried out. Specifically, data communication control unit 209 communicates with another game machine or a fixed terminal. In data communication control unit 209, when exchange data is exchanged with or a distribution data is obtained from the said another game machine or the fixed terminal, machine identification information registration unit 210 saves an MAC address as a piece of information identifying the said another game machine or the fixed terminal in MAC address list saving area 88 or 88#. The MAC address saved in MAC address list saving area 88 or 88# is saved in MAC address list saving area 70 or 70#. Exchange data communication determining unit 225 or distribution data communication determining unit 225# of wireless communication module 38 determines that communication is not to be carried out, if data is received from a game machine or distribution data is received from a fixed terminal having the same MAC address as the MAC address saved in MAC address list saving area 70 or 70#. Consequently, efficient data communication can be executed, dispensing with communication with a partner with which communication has already been done once.

According to a twenty-eighth aspect, the present invention provides a method of controlling an information processing apparatus, including the steps of: receiving identification information identifying an information processing apparatus or a fixed terminal, transmitted from another information processing apparatuses or from a fixed terminal; determining, based on the received identification information of the said another information processing apparatus or the fixed terminal, whether or not an assignment data communication process of performing at least one of transmission of assignment data to the said another information processing apparatus or the fixed terminal and reception of assignment data from the said another information processing apparatus or the fixed terminal is to be executed; controlling the assignment data communication process based on the result of determination at the determining step; and registering at least the identification information of the said another information processing apparatus or the fixed terminal as a partner with which the assignment data communication process has been done, with a storage unit. At the step of determining whether or not the assignment data communication process is to be executed, the assignment data communication process is determined not to be executed, if the received identification information of the said another information processing apparatus or the fixed terminal is already registered with the storage unit.

In accordance with the twenty-eighth aspect, the method includes at least the step of registering the identification information of another information processing apparatus or a fixed terminal as the partner, with which the assignment data communication process has been done by the assignment data communication control unit, with the storage unit. At the step of determining whether or not the assignment data communication process is to be carried out, it is determined that if the received identification information of the said another information processing apparatus or the fixed terminal is already registered with the storage unit, the assignment data communication process is not to be carried out. Specifically, data communication control unit 209 communicates with another game machine or a fixed terminal. In data communication control unit 209, when exchange data is exchanged with or a distribution data is obtained from the said another game machine or the fixed terminal, machine identification information registration unit 210 saves an MAC address as a piece of information identifying the said another game machine or the fixed terminal in MAC address list saving area 88 or 88# The MAC address saved in MAC address list saving area 88 or 88# is saved in MAC address list saving area 70 or 70#. Exchange data communication determining unit 225 or distribution data communication determining unit 225# of wireless communication module 38 determines that communication is not to be carried out, if data is received from a game machine or distribution data is received from a fixed terminal having the same MAC address as the MAC address saved in MAC address list saving area 70 or 70#. Consequently, efficient data communication can be executed, dispensing with communication with a partner with which communication has already been done once.

According to a twenty-ninth aspect, the present invention provides a non-transitory storage medium storing a control program executed by a computer of an information processing apparatus, wherein a computer-readable control program includes: identification information receiving instructions to receive identification information for identifying an information processing apparatus or a fixed terminal transmitted from another information processing apparatus or a fixed terminal; assignment data communication determining instructions to determine whether or not an assignment data communication process of performing at least one of transmission of assignment data to the said another information processing apparatus or the fixed terminal and reception of assignment data from the said another information processing apparatus or the fixed terminal is to be executed, based on the identification information of the said another information processing apparatus or the fixed terminal received by the identification information receiving instructions; assignment data communication control instructions to control the assignment data communication process based on the result of determination by the assignment data communication determining instructions; and identification information registration control instructions to register at least the identification information of the said another information processing apparatus or the fixed terminal as a partner with which the assignment data communication process has been done by the assignment data communication control instructions, with a storage unit. The assignment data communication determining instructions determine that the assignment data communication process is not to be executed, if the received identification information of the said another information processing apparatus or the fixed terminal is already registered with the storage unit.

In accordance with the twenty-ninth aspect, the program includes at least an identification information registration control instruction for registering the identification information of another information processing apparatus or a fixed terminal as the partner, with which the assignment data communication process has been done by the assignment data communication control unit, with the storage unit. The assignment data communication determining instruction determines, if the identification information of the said another information processing apparatus or the fixed terminal received in accordance with the identification information receiving instruction is already registered with the storage unit, the assignment data communication process is not to be carried out. Specifically, data communication control unit 209 communicates with another game machine or a fixed terminal. In data communication control unit 209, when exchange data is exchanged with or a distribution data is obtained from the said another game machine or the fixed terminal, machine identification information registration unit 210 saves an MAC address as a piece of information identifying the said another game machine or the fixed terminal in MAC address list saving area 88 or 88#. The MAC address saved in MAC address list saving area 88 or 88# is saved in MAC address list saving area 70 or 70#. Exchange data communication determining unit 225 or distribution data communication determining unit 225# of wireless communication module 38 determines that communication is not to be carried out, if data is received from a game machine or distribution data is received from a fixed terminal having the same MAC address as the MAC address saved in MAC address list saving area 70 or 70#. Consequently, efficient data communication can be executed, dispensing with communication with a partner with which communication has already been done once.

According to the present invention, efficient data communication can be executed, dispensing with communication with a partner with which communication has already been done once.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 25A and 25B illustrate comparison of send flag data and receive flag data as transmission/reception conditions data in accordance with an embodiment of the present invention.

FIGS. 27A to 27D show specific examples of obtaining conditions data in accordance with an embodiment of the present invention.

FIGS. 28A to 28C show specific examples of conditions data comparison based on the obtaining conditions data illustrated in FIGS. 27A to 27D.

FIGS. 29A to 29C show other specific examples of obtaining conditions data in accordance with an embodiment of the present invention.

FIGS. 30A and 30B show specific examples of conditions data comparison based on the obtaining conditions data illustrated in FIGS. 29A to 29C.

FIG. 31 is a schematic illustration of application ID comparison in accordance with an embodiment of the present invention.

FIG. 33 is a (second) illustration representing a process for exchanging exchange data between game machines in accordance with an embodiment of the present invention.

DESCRIPTION OF THE PREFERRED EMBODIMENTS

Figure 1:
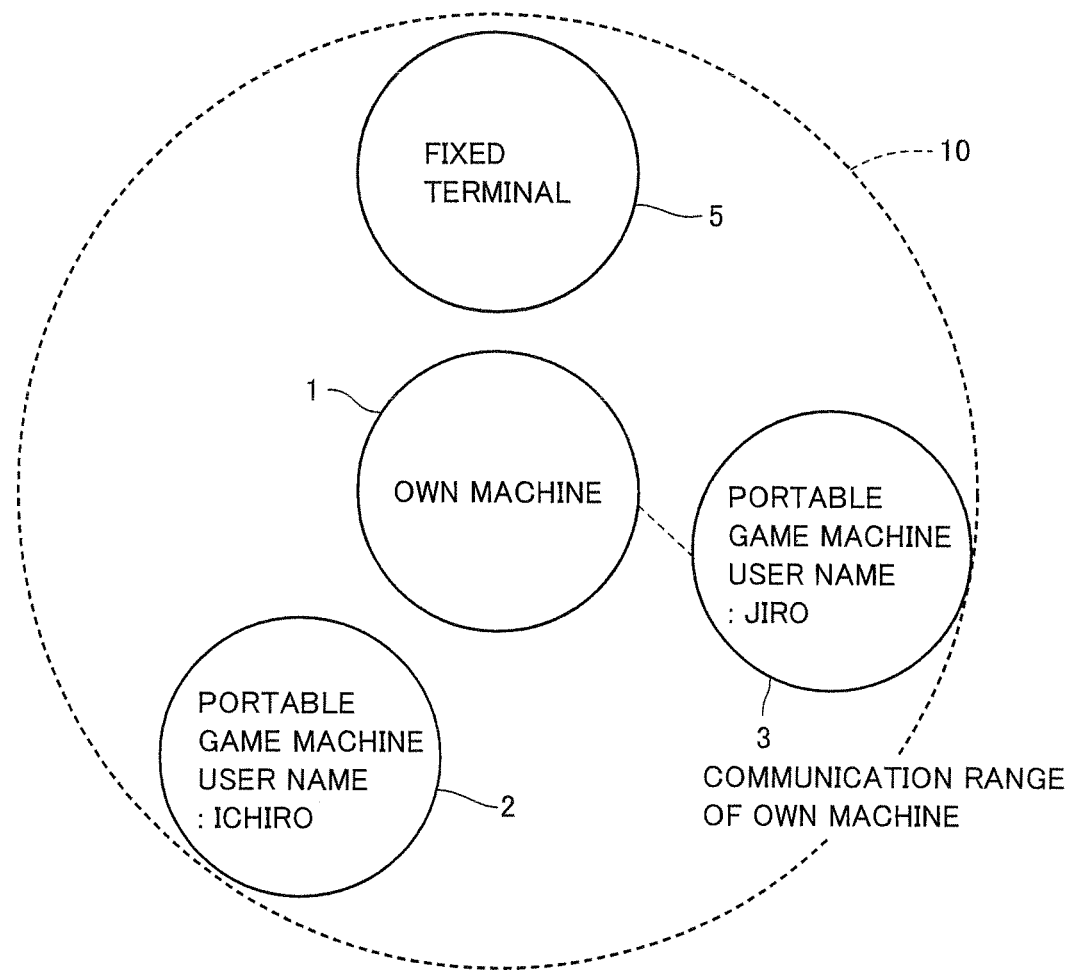
FIG. 1 is an illustration of a typical example of information processing system in accordance with the present invention.

In the following, embodiments of the present invention will be described in detail with reference to the figures. The same or corresponding portions in the figures are denoted by the same reference characters, and description thereof will not be repeated.

First, a typical example of an information processing system in accordance with the present invention will be described with reference to FIG. 1.

Referring to FIG. 1, an information processing system in accordance with an embodiment of the present invention includes a plurality of portable information processing apparatuses. Here, portable game machines (hereinafter also simply referred to as game machines) 1 to 3 are shown as examples of the plurality of portable information processing apparatuses. Through three game machines are shown here, the least required number is two. A configuration including additional portable game machines is also possible.

In the information processing system in accordance with the embodiment of the present invention, a fixed terminal 5 capable of wireless communication with the game machines as portable information processing apparatuses is provided, though the fixed terminal is not an indispensable component.

Game machines 1 to 3 are capable of giving/receiving data by executing wireless communication with each other. Here, an example will be described in which game machine 1 (hereinafter also referred to as an own machine) communicates with other game machines and with fixed terminal 5.

In FIG. 1, a range of communication 10 when game machine 1 (own machine) executes wireless communication is plotted in a dotted line. Specifically, in the example shown in FIG. 1, game machine 1 (own machine) can communicate with each of game machines 2 and 3 and with fixed terminal 5. In FIG. 1, in the communication range 10 of own game machine 1, there are game machines 2 and 3 corresponding to user names "Ichiro" and "Jiro" and game machine 1 is shown to be engaged in wireless communication with game machine 3 having the user name "Jiro".

Game machines 1 and 3 execute wireless communication with each other to exchange data (supply data) with each other. The details thereof will be described later. It is assumed that game machines 1 and 3 can use the exchanged exchange data.

As will be described later, fixed terminal 5 distributes prescribed distribution data to game machines therearound. The game machine, receiving the distribution data distributed from fixed terminal 5, can use the obtained distribution data.

<Game Machine Configuration>

Figure 2:
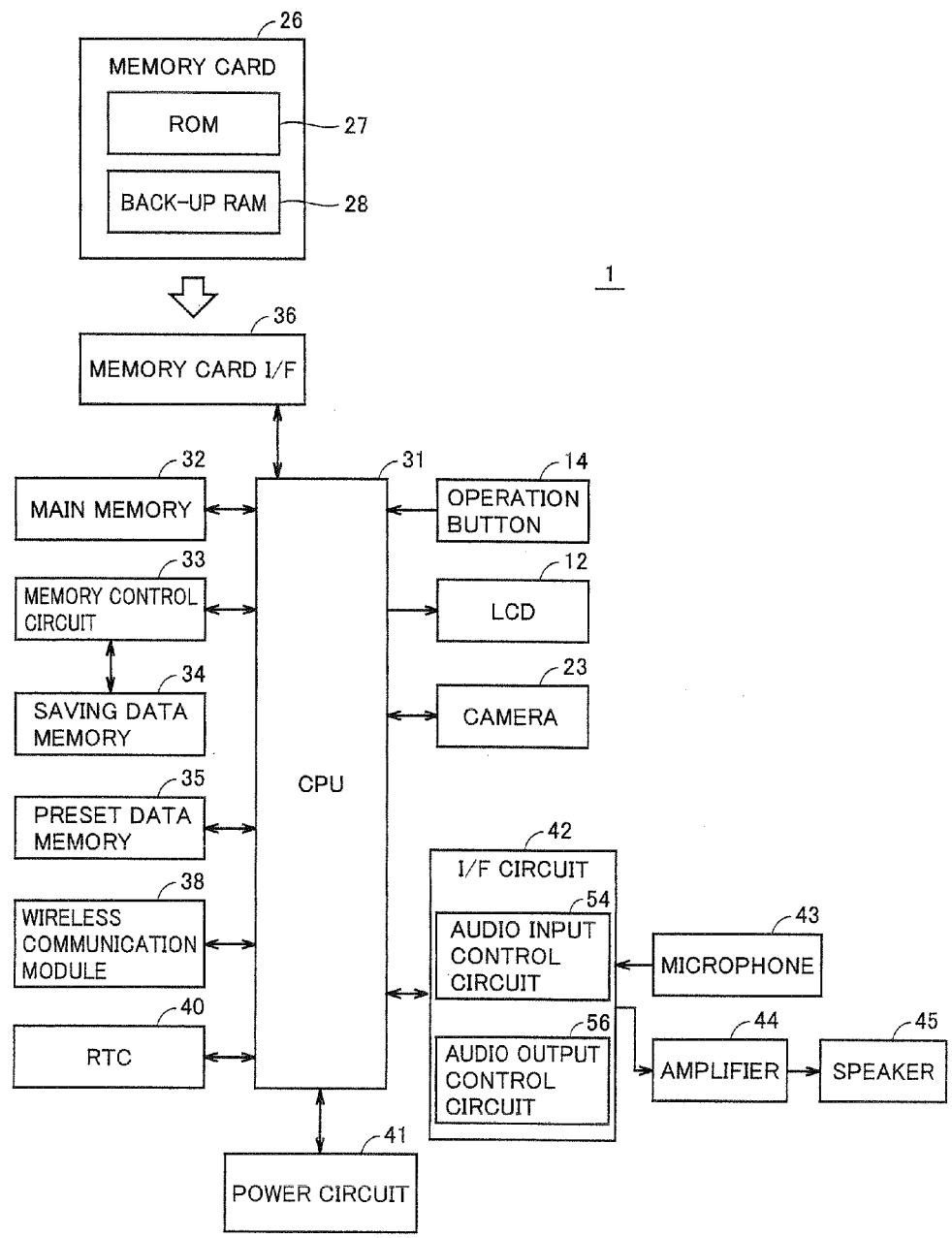
FIG. 2 is a schematic block diagram showing a configuration of a game machine 1 in accordance with an embodiment.

Referring to FIG. 2, a schematic block diagram showing the configuration of game machine 1 in accordance with an embodiment of the present invention will be described.

Game machines 2 and 3 have the same configurations and, therefore, detailed description thereof will not be given here.

Referring to FIG. 2, game machine 1 includes: a CPU 31; a main memory 32; a memory control circuit 33; a saving data memory 34; a preset data memory 35; a memory card interface (memory card I/F) 36; a wireless communication module 38; a real time clock (RTC) 40; and a power circuit 41.

CPU 31 is operation processing means for executing a program. In the present embodiment, the program is stored in a memory (for example, saving data memory 34), a memory card 26 or the like. The program executed by CPU 31 may be recorded in advance in a memory in game machine 1, or it may be obtained from memory card 26, or it may be obtained from another device through communication with the device. CPU 31 is capable of multi-processing. More specifically, it can execute the game exchange process, which will be described later, on the background, while it is executing a game process.

To CPU 31, main memory 32, memory control circuit 33 and preset data memory 35 are connected. Further, saving data memory 34 is connected to memory control circuit 33.

Main memory 32 is storage means used as a work area and buffer area for CPU 31. Specifically, main memory 32 stores various data used for the information processing described above, and stores programs obtained from the outside (from memory card 26 or other devices). In the present embodiment, a PSRAM (Pseudo-RAM) is used, for example, as main memory 32.

As will be described later, saving data memory 34 is storage means for storing a program executed by CPU 31 and data such as images picked-up by a camera 23.

Saving data memory 34 is implemented by a non-volatile storage medium and, by way of example, it is implemented by an NAND type flash memory in the present embodiment. Memory control circuit 33 is a circuit controlling reading and writing of data to/from saving data memory 34, in accordance with instructions from CPU 31.

Preset data memory 35 is storage means for storing data (preset data) including various parameters set in advance in game machine 1. As preset data memory 35, a flash memory connected to CPU 31 by an SPI (Serial Peripheral Interface) may be used.

Memory card I/F 36 is connected to CPU 31. Memory card I/F 36 performs reading/writing of data to/from memory card 26 connected to a connector, in accordance with instructions from CPU 31.

Wireless communication module 38 has a function of performing wireless communication with game machines of the same type, as will be described later.

To CPU 31, RTC 40 and power circuit 41 are further connected. RTC 40 counts time and outputs the result to CPU 31. By way of example, CPU 31 may calculate the current time (date) and the like based on the time counted by RTC 40. Power circuit 41 controls electric power supplied from a power source provided in game machine 1, and supplies electric power to each component of game machine 1.

Further, game machine 1 includes a microphone 43 and an amplifier 44. Microphone 43 and amplifier 44 are connected to an I/F circuit 42. Microphone 43 detects user's voice uttered to game machine 1, and outputs an audio signal representing the voice to I/F circuit 42. Amplifier 44 amplifies the audio signal from I/F circuit 42 and outputs it from a speaker 45. I/F circuit 42 is connected to CPU 31.

I/F circuit 42 includes an audio input control circuit 54 receiving an input of audio signal from microphone 43, and an audio output control circuit 56 controlling an output of audio signal to amplifier 44.

Audio input control circuit 54 detects an input level of an audio signal from microphone 43, performs A/D conversion of the audio signal, or converts the audio signal to audio data of a prescribed format.

Audio output control circuit 56 adjusts the audio signal to be output to amplifier 44, depending on whether the output signal is in stereo setting or monaural setting.

Operation button 14 includes a plurality of operation buttons, not shown, and connected to CPU 31. From operation button 14 to CPU 31, operation data representing an input state of each operation button (whether it is pressed or not) is output. Receiving the operation data from operation button 14, CPU 31 executes a process in accordance with the input to operation button 14.

Camera 23 is connected to CPU 31. Camera 23 picks-up an image in accordance with an instruction from CPU 31, and outputs the picked-up image data to CPU 31. By way of example, CPU 31 issues an image pick-up instruction to camera 23, and the camera, receiving the image pick-up instruction, picks up an image and transmits image data to CPU 31.

Further, an LCD 12 is connected to CPU 31. LCD 12 displays operation images and the like, not shown, in accordance with instructions from CPU 31.

Memory card 26 is detachable to a connector, not shown, and when connected to connector, it is connected to memory card I/F 36. Memory card 26 includes an ROM 27 and a back-up RAM 28, and in ROM 27, an application and the like to be executed by game machine 1 are set (stored) in advance. In ROM 27, an application identification number representing a name (title) for identifying an application stored in ROM 27 is stored. Further, in back-up RAM 28, pending data or resulting data of an application are stored (saved). Further, as will be described later, back-up RAM 28 stores an exchange flag data, if data (exchange data) to be offered to another game machine is stored in the game machine at the time of execution of the application.

Typically, the application identification information (application ID), which will be described later, includes data (identification number) meaning a name (title) for identifying the application. It is not limiting, however, and in the present embodiment, in place of the name for identifying an application, data (exchange conditions data) allowing identification as to whether the data can be exchanged as the exchange data is included.

Figure 3:
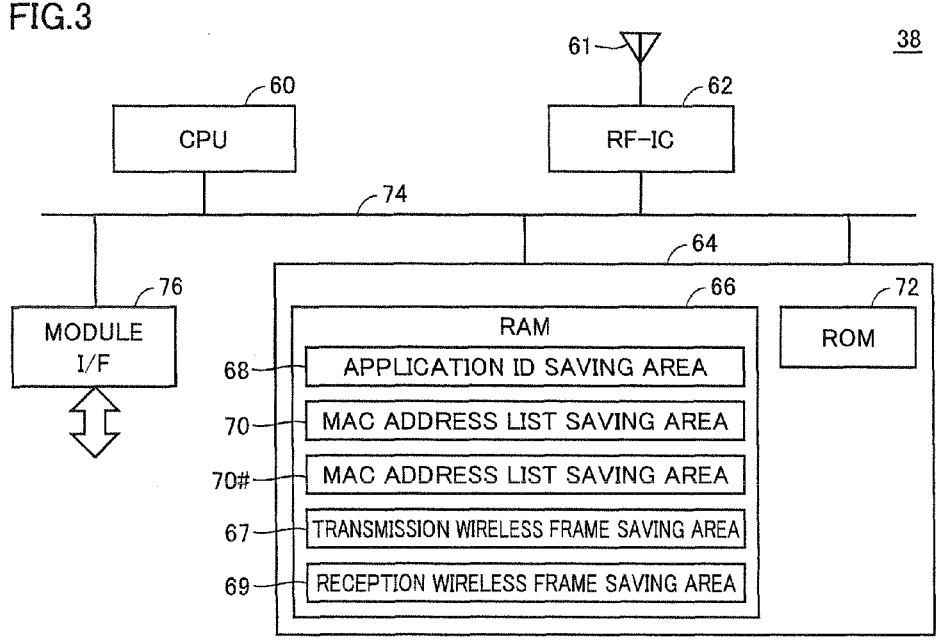
FIG. 3 shows a configuration of wireless communication module 38 in accordance with an embodiment.

Referring to FIG. 3, a configuration of wireless communication module 38 in accordance with the present embodiment will be described.

Referring to FIG. 3, wireless communication module 38 in accordance with an embodiment of the present invention includes: a CPU 60; an RF (Radio Frequency)—IC 62; a memory control unit 64; a module I/F 76, and an internal bus 74 connected to these components.

Memory control unit 64 includes an RAM 66 and an ROM 72 saving at least a part of the program related to wireless communication. RAM 66 has an application ID saving area 68, MAC address list saving areas 70, 70#, a transmission wireless frame saving area 67, and a reception wireless frame saving area 69.

As will be described later, application ID saving area 68 is an area for saving at least one application ID registered in accordance with an instruction from CPU 31. In the present example, it is possible to use a plurality of determination methods as determination algorithms when the application ID is compared with another application ID, as will be described later, and the application IDs may be saved collectively as a list corresponding to each of the determination methods. When saved list by list, a list header information including information indicating the method of determination algorithm (algorithm identification information) is provided for each list.

MAC address list saving area 70 is an area for saving a MAC address of another portable game machine registered in accordance with an instruction from CPU 31, as will be described later. Further, MAC address list saving area 70# is an area for saving a MAC address of a fixed terminal 5 registered in accordance with an instruction from CPU 31, as will be described later. In the present example, a configuration will be described in which the area for saving the MAC address of another portable game machine and the area for saving the MAC address of a fixed terminal are provided separate from each other. It is possible, however, to save the addresses in the same area.

Transmission wireless frame saving area 67 is an area for saving the data of a wireless frame (also referred to as transmission wireless frame) to be transmitted to an external portable game machine through RF-IC 62, as will be described later. Reception wireless frame saving area 69 is an area for saving the data of a wireless frame (also referred to as reception wireless frame) transmitted from an external portable game machine and received through RF-IC 62, as will be described later. In reception wireless frame saving area 69, data of distributed wireless frame transmitted from fixed terminal 5 is also saved, as will be described later.

CPU 60 is operation processing means for executing a program related to wireless communication.

CPU 60 is capable of realizing prescribed functions of wireless communication by a program read from ROM 72 stored in memory control unit 64. Specifically, an application for executing communication between portable terminals and an application for executing communication between a portable terminal and a fixed terminal, as will be described later, are stored, for example, in ROM 72.

When CPU 60 executes the application for executing communication between portable terminals, a process of searching for a communication partner to exchange the exchange data (hereinafter also referred to as the exchange partner searching process) is executed in wireless communication module 38. If a communication partner to exchange the exchange data is found by the exchange partner searching process by wireless communication module 38, a notice is sent to CPU 31 as the main body of game machine 1 as will be described later, and the process for giving/receiving the exchange data is executed. More specifically, in the present embodiment, in accordance with an instruction from CPU 31 as the main body, a process for establishing connection with the communication partner is executed, and after the connection is established, the process for giving/receiving the exchange data is executed.

Similarly, when CPU 60 executes the application for executing communication between a portable terminal and a fixed terminal, a process of searching for a communication partner that provides distribution data (hereinafter also referred to as the distribution partner searching process) is executed in wireless communication module 38. If a communication partner that provides the distribution data is found by the distribution partner searching process by wireless communication module 38, a notice is sent to CPU 31 as the main body of game machine 1 as will be described later, and the process for obtaining distribution data is executed. More specifically, in the present embodiment, in accordance with an instruction from CPU 31 as the main body, a process for establishing connection with a fixed terminal as the communication partner is executed, and after the connection is established, the process for obtaining distribution data is executed.

RF-IC 62 modulates data transmitted in accordance with an instruction of CPU 60 to another game machine, and transmits radio wave from an antenna 61. The radio wave intensity, however, is very weak and it is set to a small value that can be used by a user without any license under the provision of Radio Law. Further, wireless communication module 38 receives radio wave transmitted from another game machine, for example, at antenna 61, and the received data is demodulated at RF-IC 62. The demodulated received data is stored in RAM 66 of memory control unit 64.

Module I/F 76 is an interface between wireless communication module 38 and the main body such as CPU 31 of game machine 1, and through module I/F 76, the received data received at antenna 61 of wireless communication module and stored in RAM 66 is output to CPU 31 and the like as the main body of game machine 1. Further, in accordance with an instruction from CPU 31, exchange data as will be described later stored in saving data memory 34 is input to wireless communication module 38 through module I/F 76, and the data can be output as transmission data, through antenna 61 to another, external game machine, for example, as described above.

The data transmitted to another, external game machine is not limited to data input in accordance with an instruction of CPU 31 as the main body of game machine 1 through module I/F 76. Transmission wireless frame generated based on data stored in RAM 66 or the like provided in memory control unit 64 in accordance with an instruction of CPU 60 in wireless communication module 38 may be output as transmission data. As will be described later, the transmission wireless frame is output as a connection request signal from a machine as a client.

Figure 4:
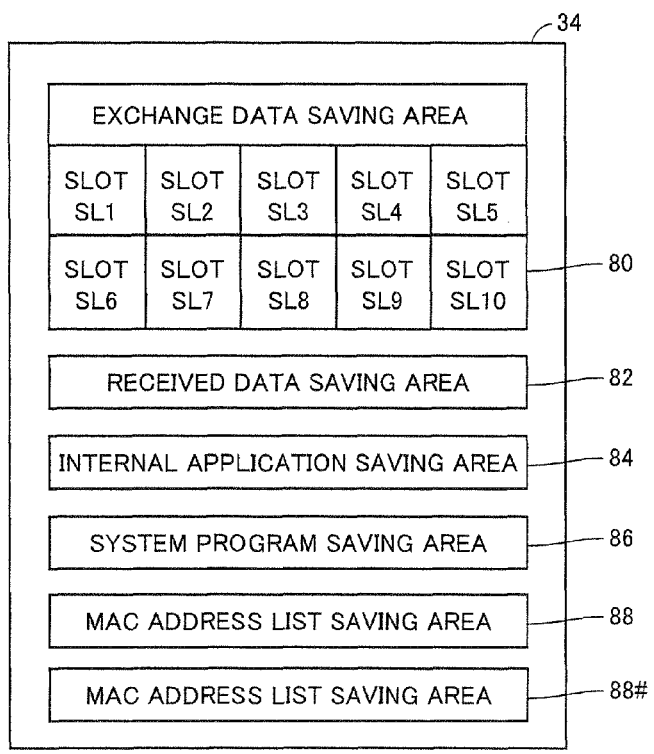
FIG. 4 shows a memory map of a saving data memory 34 in accordance with an embodiment.

Referring to FIG. 4, a memory map of saving data memory 34 in accordance with the present embodiment will be described.

Referring to FIG. 4, saving data memory 34 includes: an exchange data saving area 80; a received data saving area 82; an internal application saving area 84; a system program saving area 86; and MAC address list saving areas 88, 88#.

Exchange data saving area 80 is an area for saving exchange data used when data exchange with another game machine is executed.

In exchange data saving area 80, a plurality of slots SL1 to SL10 are provided as a plurality of storage areas. Each slot SL is an area storing data usable by the application as exchange data offered to another game machine. The data actually used by the application is stored in a state associated with an application ID identifying the corresponding application.

As described above, in the present example, the application ID simply includes data for identifying an application. However, it is not limited to the above, and it may include data (exchange conditions data) allowing identification as to whether the exchange data is data as the object of exchange or not, as will be described later.

Further, when the application ID is to be saved in application ID saving area 68 of wireless communication module 38, if the IDs are saved as lists corresponding to various methods of determination algorithms, it is possible to store information indicating the method of determination algorithm (algorithm identification information) in correspondence with each application ID, to identify to which list the application ID is to be saved.

Received data saving area 82 is an area for saving exchange data received from another game machine, when data exchange with another game machine is executed.

Internal application saving area 84 is an area saving a plurality of applications to be executed by game machine 1, stored in game machine 1. As described above, game machine 1 is capable of executing an application stored in memory card 26. It can also execute the application saved in internal application saving area 84. The application saved in internal application saving area 84 may be saved in advance, or it may be downloaded from the outside through, for example, the Internet, and saved. Internal application saving area 84 includes a saving area for saving application body and a saving area provided application by application, for saving save data exclusively used by the corresponding application (application-dedicated storage area).

Therefore, it follows that when a plurality of applications are saved in internal application saving area 84, a plurality of saving areas are provided, corresponding to respective applications.

System program saving area 86 is an area saving main body function programs for realizing the main body function of the information processing apparatus, including a menu program for selecting an application to be activated and programs for executing the data giving/receiving process for giving/receiving exchange data to/from the communication partner having the exchange data and the program for executing the data obtaining process obtaining the distribution data from a communication partner.

MAC address list saving area 88 is an area for saving MAC address, which is a piece of machine identification information allowing wireless communication module 38 to identify a game machine as a partner communicated in the past. Further, MAC address list saving area 88# is an area for saving MAC address, which is a piece of machine identification information allowing wireless communication module 38 to identify a fixed terminal as a partner communicated in the past. As will be described later, in the communication setting process for executing wireless communication, the MAC addresses saved in MAC address list saving areas 70 and 70# are respectively saved in MAC address list saving areas 88 and 88#.

Data communication of game machine 1 in accordance with the present embodiment can be broadly divided into data communication for giving/receiving exchange data to/from another game machine, and data communication of receiving distribution data from a fixed terminal.

First, the data communication for exchanging exchange data between game machine 1 and another game machine in accordance with an embodiment of the present invention will be described.

<Description of Functional Blocks for Executing Exchange of Exchange Data with Game Machine 3>

Figure 5:
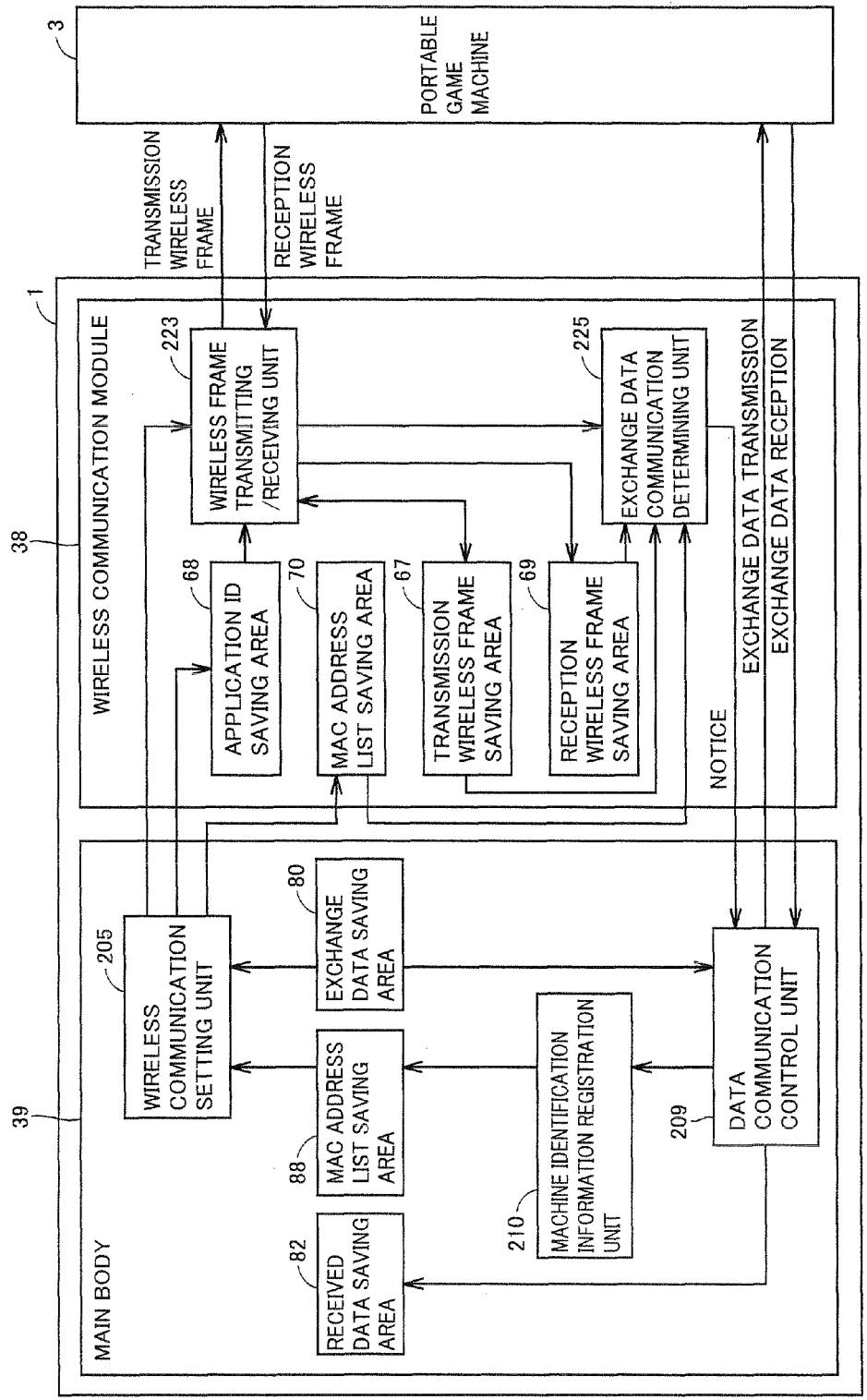
FIG. 5 represents functional blocks executing the exchange of exchange data in game machine 1 in accordance with an embodiment of the present invention.

Referring to FIG. 5, the functional blocks for executing exchange of exchange data in game machine 1 in accordance with an embodiment of the present invention will be described.

Referring to FIG. 5, game machine 1 includes wireless communication module 38, and a main body 39 other than wireless communication module 38.

Main body 39 includes: wireless communication setting unit 205; machine identification information registration unit 210; data communication control unit 209; exchange data saving area 80; received data saving area 82; and MAC address list saving area 88.

Wireless communication module 38 includes: wireless frame transmitting/receiving unit 223; exchange data communication determining unit 225; application ID saving area 68; MAC address list saving area 70; transmission wireless frame saving area 67; and reception wireless frame saving area 69.

Wireless communication setting unit 205 stores the MAC address list stored in MAC address list saving area 88 in MAC address list saving area 70. Further, wireless communication setting unit 205 stores an application ID stored in correspondence with the exchange data saved in exchange data saving area 80 in application ID saving area 68. Further, wireless communication setting unit 205 outputs an instruction to execute wireless communication of wireless communication module 38, to wireless frame transmitting/receiving unit 223.

Wireless frame transmitting/receiving unit 223 of wireless communication module 38 receives the instruction to execute the wireless communication and, in response, sets the transmission wireless frame including the application ID saved in application ID saving area 68 and stores in transmission wireless frame saving area 67, and executes the exchange partner searching process searching for a communication partner, using the set transmission wireless frame. In the present example, it is assumed that wireless frame transmitting/receiving unit 223 transmits the transmission wireless frame to portable game machine 3 as an example of communication partner, and receives the transmission wireless frame transmitted from portable game machine 3, that is, the reception wireless frame. Then, wireless frame transmitting/receiving unit 223 stores the received reception wireless frame in reception wireless frame saving area 69.

Exchange data communication determining unit 225 determines whether or not the communication partner is the exchange partner with which the exchange data is to be exchanged, based on the received reception wireless frame. If it is determined to be the exchange partner, it sends a notice to that effect to main body 39.

Specifically, determination is made as to whether the MAC address as the machine identification information included in the received reception wireless frame is registered with the MAC address list saved in MAC address list saving area 70. Further, determination is made as to whether the received reception wireless frame is a wireless frame allowing processes related to exchange of the exchange data. Further, the application ID included in the received reception wireless frame is compared with the application ID included in the transmission wireless frame saved in transmission wireless frame saving area 67, and based on the result of comparison, whether exchange of exchange data is possible with the communication partner is determined.

If it is determined that the MAC address included in the received reception wireless frame is not registered with the MAC address list, the received reception wireless frame is a wireless frame allowing processing related to exchange of exchange data, and that exchange of exchange data with the communication partner is possible, exchange data communication determining unit 225 sends a notice that exchange of the exchange data is possible, to data communication control unit 209 of main body 39. Here, an example is described in which the notice that exchange of the exchange data is possible is output to data communication control unit 209 of main body 39 when three conditions are satisfied. The notice may be output, however, if at least one of the conditions is satisfied.

Receiving the notice that exchange of the exchange data is possible output from exchange data communication determining unit 225, data communication control unit 209 executes the exchange process of the exchange data by transmitting the exchange data saved in exchange data saving area 80 and receiving the exchange data from portable game machine 3. Then, it stores the received exchange data in received data saving area 82.

When the exchange data received from data communication control unit 209 is stored in received data saving area 82, machine identification information registration unit 210 stores the MAC address as the machine identification information of portable game machine 3 in MAC address list saving area 88. Specifically, it accumulates the machine identification information. Further, every time the received exchange data is stored in received data saving area 82, machine identification information registration unit 210 adds the machine identification information of the portable game machine as the exchange partner in MAC address saving area 88, as will be described later. That the machine identification information of the portable game machine as the exchange partner is added and registered in MAC address saving area 88 means that history of executing exchange of exchange data with the portable game machine corresponding to the machine identification information is recorded.

Then, wireless communication setting unit 205 again stores the MAC address list stored in MAC address list saving area 88 in MAC address list saving area 70, and outputs an instruction to execute wireless communication of wireless module 38 to wireless frame transmitting/receiving unit 223. Specifically, the same processes as described above are repeated.

Wireless frame transmitting/receiving unit 223 of wireless communication module 38 again sets the transmission wireless frame, and executes the exchange partner searching process to search for a communication partner, using the set transmission wireless frame. By way of example, here, the transmission wireless frame is transmitted to portable game machine 3, and the transmission wireless frame transmitted from portable game machine 3, that is, the reception wireless frame, is received.

Exchange data communication determining unit 225 determines whether or not the MAC address as the machine identification information included in the received reception wireless frame is registered with the MAC address list saved in MAC address list saving area 70, as described above.

If exchange of the exchange data has been already done in the past, the MAC address as the machine identification information of portable game machine 3 is stored in the MAC address list as described above and, therefore, exchange data communication determining unit 225 determines that the MAC address is already registered and, the process of exchanging the exchange data as the subsequent data communication is not executed. Specifically, efficient data communication is possible by dispensing with communication with a partner with which communication has already been done in the past.

Main body 39 and wireless communication module 38 may operate independent from each other. Specifically, even when main body 39 has made a transition to a sleep mode, it is possible for wireless communication module 38 to execute the exchange partner searching process searching for the communication partner, using the set transmission wireless frame. Only when a communication partner with which exchange is possible is found, a notice is sent to main body 39, connection with the communication partner is established, and the exchange of exchange data is executed. Therefore, if main body 39 has made a transition to a sleep mode to save power and a communication partner is found through the exchange partner searching process by wireless communication module 38, notice is not given to main body 39 and communication connection is not established, unless exchange with the partner is possible. Therefore, power consumption in game machine 1 as a whole can be saved.

In the following, functional blocks of main body 39 and of wireless communication module 38 will be described in detail.

Figure 6:
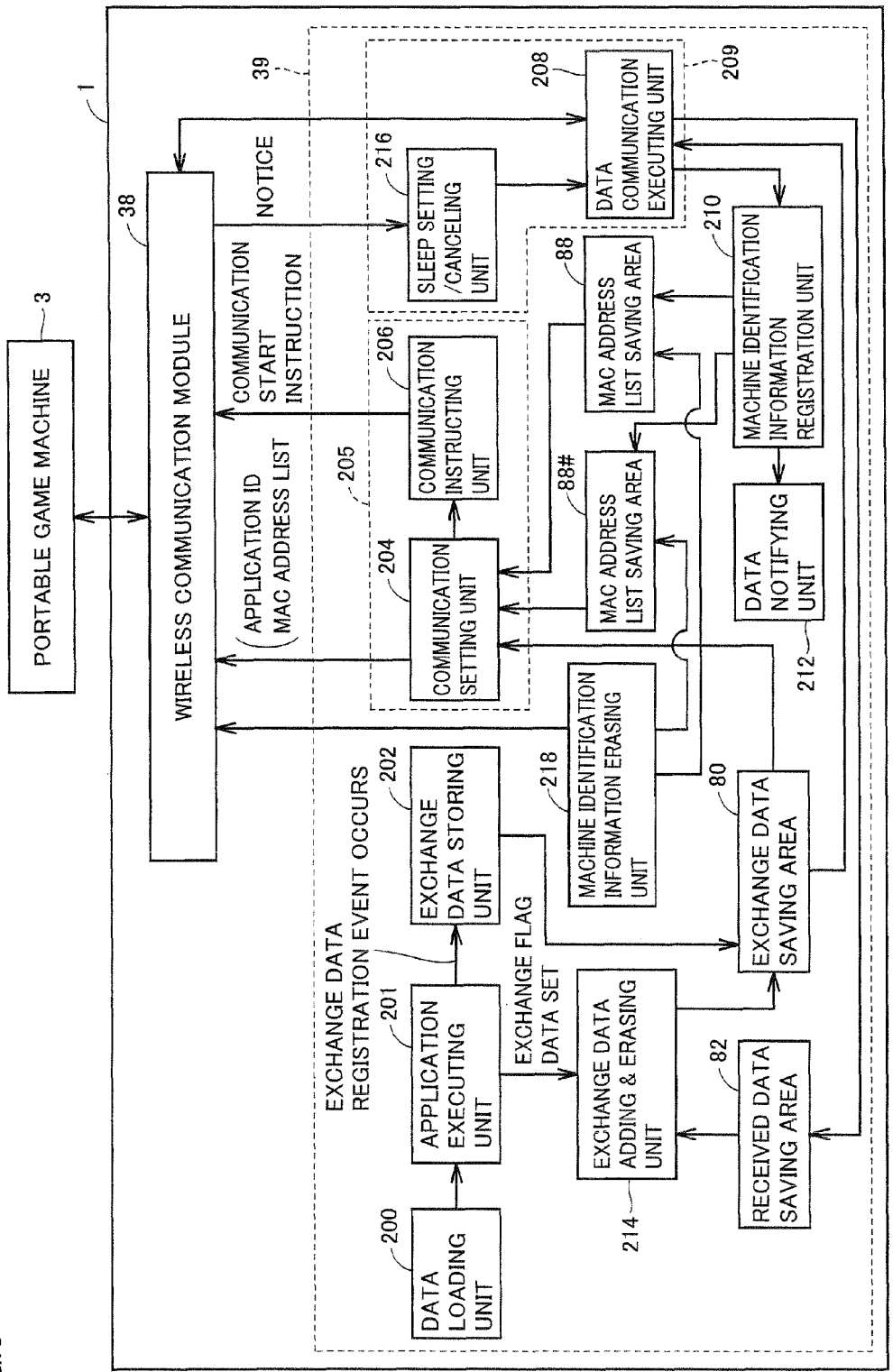
FIG. 6 shows details of the functional block of a main body 39 of a game machine in accordance with an embodiment of the present invention.

With reference to FIG. 6, functional blocks of main body 39 of the game machine in accordance with the present embodiment will be described in detail.

Referring to FIG. 6, here, an example will be described in which CPU 31 executes a main body function program saved in a system program saving area 86 and an application stored in ROM 27 of a memory card 26, to realize a prescribed function. The function may not necessarily be realized by CPU 31, and at least part of the function may be realized by using a dedicated IC (Integrated Circuit). Here, an example is described in which exchange data saving area 80, received data saving area 82, and MAC address saving areas 88 and 88# of saving data memory 34 are accessed not through memory control circuit 33. However, storage in saving data memory 34 may be done through memory control circuit 31

It is noted that the functional blocks of main body 39 will be described as functions common to the process between portable terminals and the process between a portable terminal and a fixed terminal, as will be described later.

Main body 39 includes, in addition to the functions of wireless communication setting unit 205, data communication control unit 209 and machine identification information registration unit 210, functions of a data loading unit 200, an application executing unit 201, an exchange data storing unit 202, a data notifying unit 212, an exchange data adding and erasing unit 214, and a machine identification information erasing unit 218. Wireless communication setting unit 205 includes a communication setting unit 204 and a communication instructing unit 206. Data communication control unit 209 includes a data communication executing unit 208 and a sleep setting/cancelling unit 216.

Of the functions above, data loading unit 200, communication setting unit 204, communication instructing unit 206, data communication executing unit 208, machine identification registration unit 210, data notifying unit 212, sleep setting/canceling unit 216 and machine identification information erasing unit 218 are functions, for example, realized by CPU 31 executing the main body function program. Application executing unit 201, exchange data storing unit 202 and exchange data adding and erasing unit 214 are realized, for example, by CPU 31 executing an application stored in ROM 27 of memory card 26. The functions may be realized in accordance with multi-task control as needed.

Data loading unit 200 loads an application (data).

Application executing unit 201 executes the application based on the loaded or obtained data.

Exchange data storing unit 202 stores, when an exchange data registration event occurs as a result of executing the application, the exchange data in exchange data saving area 80 of saving data memory 34. Here, exchange data storing unit 202 stores the exchange data in correspondence with the application ID for identifying the application.

Further, when saving the application ID in the application ID saving area 68 of wireless communication module 38, if it is to be saved as a list corresponding to each method of determination algorithm, exchange data storing unit 202 also stores information indicating the method of determination algorithm (algorithm identification information) in correspondence with the application ID, to identify to which list the application ID is to be included.

If it is determined that an exchange flag data exists when the application is executed, as will be described later, exchange data adding and erasing unit 214 confirms received data saving area 82 and if there is any exchange data, it obtains the exchange data stored in received data saving area 82, and deletes the exchange data stored in exchange data saving area 80.

If it is determined that wireless communication by wireless communication module 38 is possible, communication setting unit 204 outputs the application ID stored in correspondence with the exchange data stored in exchange data saving area 80 to wireless communication module 38, so that it is stored in application ID saving area 68 of wireless communication module 38.

In the present example, communication setting unit 204 stores the application ID in application ID saving area 68 of wireless communication module 38 in the form of a list corresponding to each method of determination algorithm. Specifically, communication setting unit 204 confirms the algorithm identification information corresponding to the application ID, and stores the application ID in the list provided for each piece of algorithm identification information, in application ID saving area 68.

Further, communication setting unit 204 outputs the MAC address list saved in MAC address list saving area 88, 88# to wireless communication module 38 and saves the list in MAC address list saving area 70, 70#.

As will be described later, it is assumed that communication setting unit 204 is capable of updating MAC address set in transmission wireless frame after a lapse of a prescribed time period.

Further, machine identification information erasing unit 218 accesses and erases data in MAC address list saving areas 88, 88# in accordance with prescribed conditions. In the present embodiment, data in MAC address list saving areas 88 and 88# is erased in accordance with a prescribed operation instruction from a user. Further, MAC address list saving areas 88 and 88# have prescribed data capacity. If a plurality of MAC addresses are saved and the prescribed capacity is full with no space left for saving any more, an instruction is given to erase a saved old MAC address and to save a new MAC address. Further, aside from the prescribed operation instruction from the user, when prescribed conditions are satisfied, for example, after a lapse of a prescribed time period, machine identification information erasing unit 218 erases part of the data in MAC address list saving area, as will be described later. When data in MAC address list saving areas 88, 88# is erased, an instruction may be made to also erase MAC address list stored in MAC address list saving area 70, 70# in RAM 66 of wireless communication module 38.

Though an example in which MAC address list stored in MAC address list saving area 70, 70# is erased is described here, the MAC address list stored in MAC address list saving area 70, 70# of RAM 66 may be erased by an instruction from CPU 60 of wireless communication module 38 after the lapse of a prescribed time period, in wireless communication module 38, regardless of any instruction from the main body.

Communication instructing unit 206 outputs a communication start instruction of wireless communication to wireless communication module 38.

Figure 7:
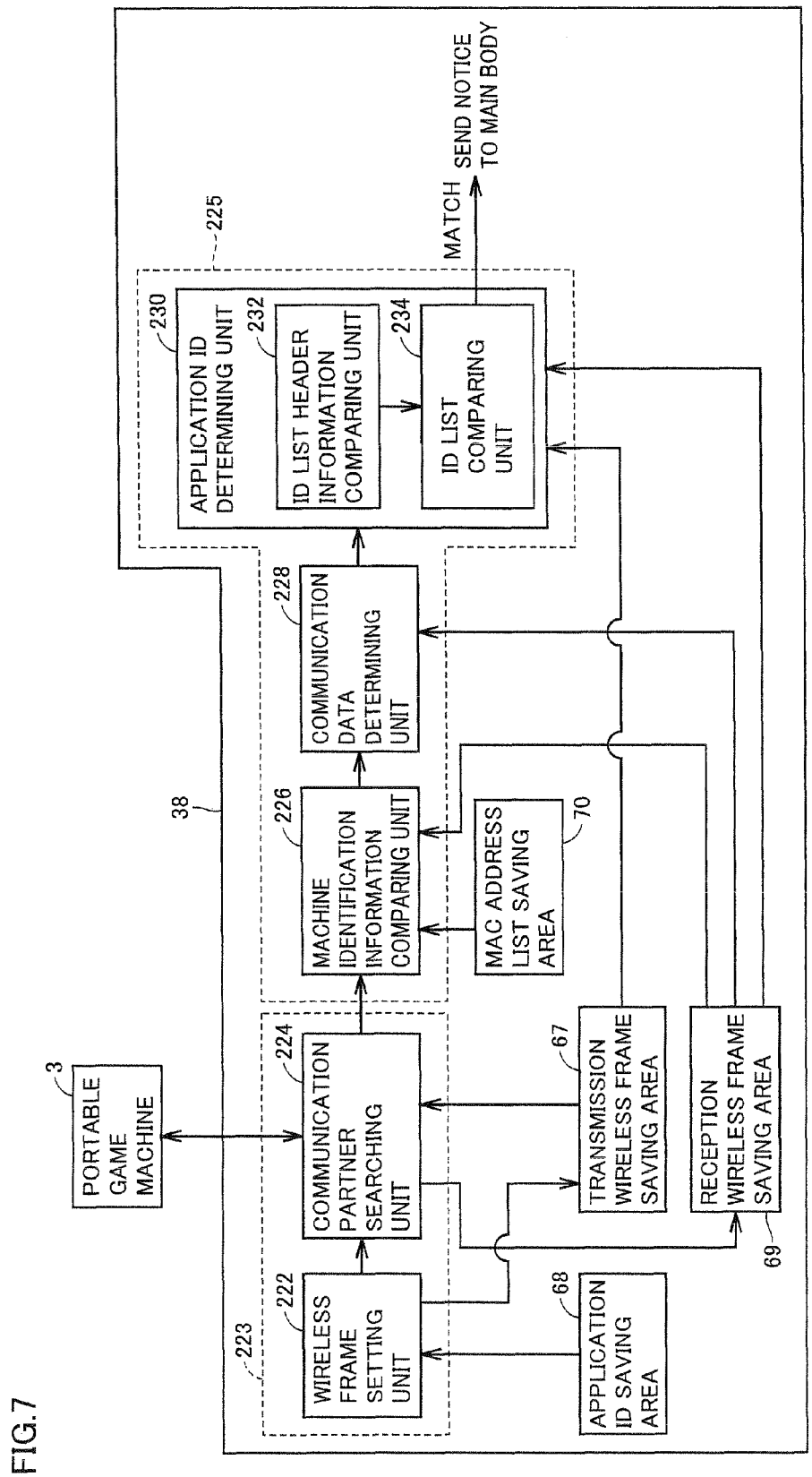
FIG. 7 shows details of the functional block of wireless module 38 executing communication between portable terminals in accordance with an embodiment of the present invention.

Referring to FIG. 7, functional blocks of wireless communication module 38 executing the process between portable terminals in accordance with the present embodiment will be described in detail.

Referring to FIG. 7, here, an example will be described in which prescribed functions are realized by CPU 60 executing an application for the process between portable terminals, stored in ROM 72, will be described. The functions may not necessarily be realized by CPU 60, and at least part of the functions may be realized by a dedicated IC (Integrated Circuit).

Wireless communication module 38 includes wireless frame transmitting/receiving unit 223, and exchange data communication determining unit 225. Wireless frame transmitting/receiving unit 223 includes wireless frame setting unit 222 and communication partner searching unit 224. Exchange data communication determining unit 225 includes a machine identification information comparing unit 226, a communication data determining unit 228, and an application ID determining unit 230. The functions may be realized in accordance with multi-task control as needed.

Wireless frame setting unit 222 sets, in accordance with the communication start instruction of wireless communication, a transmission wireless frame for executing the exchange partner searching process, which will be described later, to search for a communication partner, based on the application ID saved in application ID saving area 68. Details of the transmission wireless frame will be described later. Wireless frame setting unit 222 stores the set transmission wireless frame in transmission wireless frame saving area 67.

Communication partner searching unit 224 executes the exchange partner searching process, searching for a communication partner within the communicable range 10 described above, using the set transmission wireless frame stored in transmission wireless frame saving area 67. Here, an example will be described in which communication is done with portable game machine 3 as a communication partner. Communication partner searching unit 224 receives a transmission wireless frame transmitted from portable game machine 3 in response to wireless transmission frame transmitted to portable game machine 3, as the reception wireless frame and stores it in reception wireless frame saving area 69

When a communication partner is found by communication partner searching unit 224, that is, when the reception wireless frame is received from the communication partner, exchange data communication determining unit 225 determines whether or not the communication partner is an exchange partner with which exchange data can be exchanged, based on the reception wireless frame. If it is determined to be an exchange partner, it sends a notice to that effect.

Specifically, if a communication partner is found by communication partner searching unit 224, machine identification information comparing unit 226 compares the MAC address as the machine identification information included in the reception wireless frame with the MAC address list saved in MAC address list saving area 70, to find if there is any matching address.

If a communication partner is found and if it is determined that the MAC address included in the reception wireless frame does not match any of the MAC address list saved in MAC address list saving area 70 based on the result of comparison by machine identification information comparing unit 226, communication data determining unit 228 confirms the data contents of the received reception wireless frame, to determine whether or not the reception wireless frame can be processed in the process between portable terminals.

If it is determined by communication data determining unit 228 that a reception wireless frame that can be processed has been received, application ID determining unit 230 determines whether or not the application ID stored in the received reception wireless frame satisfies prescribed conditions related to exchange of the exchange data.

Specifically, application ID determining unit 230 includes an ID list header information comparing unit 232 and an ID list comparing unit 234. Processes by each unit will be described later.

If it is determined based on the result of comparison by ID list comparing unit 234 that the prescribed conditions are satisfied (application ID matched), a notice to that effect is sent to the main body.

Again referring to FIG. 6, sleep setting/cancelling unit 216 receives the notice (in the present example, the notice from ID list comparing unit 234 of FIG. 7) from wireless communication module 38.

Sleep setting/cancelling unit 216 sets the sleep state or cancels the sleep state of each function of main body 39, in accordance with prescribed conditions. By way of example, sleep setting/cancelling unit 216 monitors an operation instruction input by a user using operation button 14, and if it is determined that no operation instruction has been input by operation button 14 for a prescribed time period, it sets the sleep state, in which processes by various functions of main body 39 are stopped. By such a function, it becomes possible to have the game machine automatically enter the power saving state, if the user does not operate the game machine. The machine may be set to the sleep state in response to an instruction input from the user. When an operation instruction is made by the user using operation button 14 in the sleep state in which processes by various functions of main body 39 are stopped, sleep setting/canceling unit 216 cancels the sleep state and resumes the original state. Specifically, various processes become possible in main body 39. Further, in the present example, other than when the operation instruction using operation button 14 by the user is received, the sleep state is canceled when a notice is received from wireless communication module 38 while main body 39 is in the sleep state. Though sleep setting/cancelling unit 216 is described as included in data communication control unit 209 as an example, it is not limiting and such a function may be provided separate from data communication control unit 209.

If a notice is sent from wireless communication module 38, sleep setting/cancelling unit 216 outputs the notice to data communication executing unit 208.

If the present state is not the sleep state, sleep setting/cancelling unit 216 directly outputs the notice from wireless communication module 38 to data communication executing unit 208.

Data communication executing unit 208 executes the process for exchanging the exchange data to/from portable game machine 3, in accordance with the notice from wireless communication module 38 in the communication between portable terminals. Specifically, it transmits the exchange data saved in exchange data saving area 80 to portable game machine 3. Then, it saves the exchange data received from portable game machine 3 in received data saving area 82 of saving data memory 34.

As will be described later, data communication executing unit 208 executes the process of obtaining distribution data from fixed terminal 5, in accordance with the notice from wireless communication module 38, in the communication between the portable terminal and the fixed terminal. Specifically, it transmits a request for the distribution data to fixed terminal 5, receives the distribution data transmitted from fixed terminal 5, and saves the data in received data saving area 82 of saving data memory 34.

When the exchange data received by data communication executing unit 208 is stored in received data saving area 82, machine identification information registration unit 210 stores the MAC address as the machine identification information of portable game machine 3 in MAC address list saving area 88.

Further, as will be described later, when the distribution data received by data communication executing unit 208 is stored in received data saving area 82, machine identification information registration unit 210 stores the MAC address as the machine identification information of fixed terminal 5 in MAC address list saving area 88#.

Data notifying unit 212 notifies the user of the fact that the exchange data has been exchanged, or the distribution data has been obtained.

<Storage to Exchange Data Saving Area 80>

Referring to the flowchart of FIG. 8, the process for storing exchange data in exchange data saving area 80 will be described.

In the present example, when a user, executing an application in game machine 1, operates data usable by the application as exchange data to an external game machine, the designated exchange data is stored in exchange data saving area 80. By way of example, execution of an application stored in the ROM of memory card 26 will be described.

When main power of game machine 1 is turned on and the user executes a prescribed operation, CPU 31 (data loading unit 200) of game machine 1 loads data that has been stored in memory card 26 (step S0). Specifically, it develops data in main memory 32.

Next, CPU 31 (application executing unit 201) executes the application based on the data developed on main memory 32 (step S1).

When the application is executed, first, CPU 31 (application executing unit 201) determines whether or not the data stored in back-up RAM 28 includes an exchange flag data, indicating that the exchange data has been stored in exchange data saving area 80 (step S2).

If it is determined at step S2 that the data stored in back-up RAM 28 includes an exchange flag data, indicating that the exchange data has been stored in exchange data saving area 80 (YES at step S2), CPU 31 (application executing unit 201) executes exchange data adding process and erasing process (step S22). These processes, that is the process in exchange data adding and erasing unit 214, will be described later. After execution of the adding and erasing processes, the flow proceeds to step S4.

If it is determined by CPU 31 (application executing unit 201) at step S2 that the data stored in back-up RAM 28 does not include an exchange flag data indicating that the exchange data has been stored in exchange data saving area 80 (NO at step S2), the flow proceeds to step S4.

CPU 31 (application executing unit 201) determines whether or not an event of registering exchange data (hereinafter also referred to as exchange data registration event) occurred by the execution of the application (step S4). Specifically, during execution of the application, whether or not transition is made to a scene urging storage of data usable by the application that is being executed as exchange data in exchange data saving area 80 is determined.

Here, the exchange data refers to data used in the application program. More preferably, it refers to the data obtained or formed by the user while executing the application program.

Though not shown, an example of the exchange data registration event is as follows. A list of data usable by the application including data obtained or formed during the game through execution of the application, stored in the back-up RAM, is displayed on LCD 12, and the user selects data that may be offered to others.

Storage of the exchange data will be described later. By way of example, an item the user got in the game, or data of a character grown through the progress of the game may be offered as exchange data. A user message may be added to an item. Specifically, a user may write a message on a "letter" item, and the message may be stored as exchange data. By offering items and characters reflecting the status of game progress as exchange data, user-by-user individuality can be exhibited, adding zest to the exchange.

The exchange data registration event may be expressed as an event in the game. By way of example, when a user makes an operation of placing or depositing an item or a character at a prescribed location, the data corresponding to the item or character may be stored as exchange data in exchange data saving area 80. For instance, a "letter" item may be put in a bottle and thrown to the sea to create a dramatic atmosphere in the game, and the data of "letter" item thrown to the sea may be stored as the exchange data in exchange data saving area 80.

In exchanging the exchange data, it is possible to impose additional conditions (obtaining conditions data). By way of example, the obtaining conditions data may include sex, age, address or occupation of the owner of the game or a user executing the application who wishes exchange, or the data of which exchange is desired or data indicating such desire may be included in the conditions at the time of exchange. For instance, the obtaining conditions data may be obtained by allowing the user to select the exchange conditions of exchange data in the exchange data registration event mentioned above. Alternatively, the application may set the obtaining conditions data in association with an event in the game. Such obtaining conditions data is included as the exchange conditions data in application ID, as will be described later.

In the present example, the exchange data is described mainly as data to be exchanged with another game machine, in exchange with data held by another game machine. The exchange data, however, includes data not for exchange but simply offered (assignment data). Specifically, when data of one's own machine is transmitted to another game machine one-sidedly or the data of one's own machine is replicated and transmitted one-sidedly, such data is also included in the exchange data. Further, data received one-sidedly from another game machine is also included.

Further, conditions related to transmission/reception of the data may be imposed as additional conditions (transmission/reception conditions data). By way of example, the transmission/reception conditions data may be obtained by allowing the user to select conditions related to transmission/reception of the exchange data at the exchange data registration event mentioned above, or the application may set the transmission/reception conditions data in association with an event in the game. For instance, in the example described above, if a "letter" item is put in a bottle and thrown to the sea to create a dramatic atmosphere in the game, and the data of "letter" item thrown to the sea is used as the exchange data, the transmission/reception conditions data may be set such that the data of one's own is transmitted one-sidedly to another game machine. As another example, a scenario may be set in a game to let the user to look for a desirable item, and the transmission/reception conditions data may be set such that the exchange data of the item desired by the user is received one-sidedly from another game machine. Such transmission/reception conditions data is included as the exchange conditions data in application ID, as will be described later. The transmission/reception conditions data may be set such that the exchange data of an item the user desires is the data received one-sidedly from another game machine. If the exchange data is simply received one-sidedly from another game machine, there is no data to be transmitted to the said another game machine. Therefore, in such a case, an empty data or dummy data may be saved as the exchange data stored in exchange data saving area 80.

In the present example, it is possible to provide a plurality of determining methods as determination algorithms, when the application ID is compared with another application ID. Depending on the data format in the application ID, that is, presence/absence of exchange conditions data, the algorithm identification information indicating the method of determination algorithm is set differently.

By imposing such additional conditions, it becomes possible to realize wide variation of the manner of obtaining exchange data to obtain, for example, the desired exchange data, and the zest of exchange can be improved.

If it is determined that the exchange event has not occurred (NO at step S4), CPU 31 (application executing unit 201) returns to step S1 and executes a normal application. For example, it executes a game process of operating an object in a virtual space based on the user operation.

If it is determined that the exchange data registration event occurred (YES at step S4), CPU 31 (application executing unit 201) determines whether or not an input designating the exchange data is received (step S6).

Next, at step S6, if it is determined that an input designating exchange data is received (YES at step S6), CPU 31 (exchange data storing unit 202) confirms the exchange data saving area 80 (step S8).

If it is determined at step S6 that the input designating exchange data is not received (NO at step S6), it means that the user does not want exchange and, CPU 31 (application executing unit 201) returns to step S1 and executes a normal application.

Next, CPU 31 (exchange data storing unit 202) confirms exchange data saving area 80, and determines whether or not there is an empty slot in exchange data saving area 80 (step S10).

If it is determined at step S10 that exchange data saving area 80 has an empty slot (YES at step S10), CPU 31 (exchange data storing unit 202) stores the exchange data in the empty slot (step S12). At this time, the application ID for identifying the application and the algorithm identification information are registered in correspondence with the slot storing the exchange data, as described above.

If it is determined at step S10 that exchange data saving area 80 has no empty slot (NO at step S10), CPU 31 (exchange data storing unit 202) determines whether or not data in a slot is deleted (step S11). Though not shown, it is possible to notify the user that no slot is empty, and to urge the user to designate deletion of data in any slot. When such designation is made, the data in the corresponding slot is deleted.

If it is determined at step S11 that data in a slot is deleted, CPU 31 (exchange data storing unit 202) returns to step S10. Then, the exchange data is stored in the empty slot.

If it is determined at step S11 that data in the slot is not deleted, CPU 31 (exchange data storing unit 202) returns to step S1 and executes the normal application. The process steps up to here are the processes executed by exchange data storing unit 202.

The subsequent process steps are executed by application executing unit 201.

Next, CPU 31 (application executing unit 201) determines whether or not an instruction to end the application is received from the user (step S14).

If it is determined at step S14 that an instruction to end the application is received from the user, the process executed by CPU 31 (application executing unit 201) proceeds to the next step S16. If it is determined at step S14 that an instruction to end the application is not received from the user (NO at step S14), CPU 31 returns to step S1 and executes the normal application.

Next, at step S16, CPU 31 (application executing unit 201) determines whether or not the exchange data is stored in exchange data saving area 80. If it is determined that the exchange data is stored in exchange data saving area 80 (YES at step S16), CPU 31 (application executing unit 201) saves an exchange flag data indicating that the exchange data has been stored in exchange data saving area 80, together with save data (for example, data to be used in the application such as obtained items and characters, sentences and pictures formed), in back-up RAM 28 (step S18). Then, the process ends (END). If it is determined that the exchange data is not stored in exchange data saving area 80 (NO at step S16), CPU 31 (application executing unit 201) saves only the save data in back-up RAM 28 (step S20). Then, the process ends (END).

By this process, the exchange flag data is saved in back-up RAM 28. Therefore, in the process of determination at step S2, if the exchange flag data is included, the processes of adding and erasing exchange data can be executed.

Though a process for storing the exchange data in exchange data saving area 80 when an application stored in the ROM of memory card 26 is executed has been described as an example, the application is not limited to one that is stored in memory card 26. The process for storing exchange data when an application stored in internal application saving area 84 is executed can be realized, by using a saving area for saving the save data of the application, provided application by application in internal application saving area 84, in correspondence with the back-up RAM described above.

In the example above, the functions of adding and erasing exchange data are described as executed by the application stored in the ROM 27 of memory card 26. The functions may be executed by the main body function program saved in system program saving area 86. Specifically, after the data stored in memory card 26 is loaded, whether or not the exchange flag data exists in the developed data is determined, the processes for adding and erasing exchange data are executed, and thereafter, the application may be executed.

Referring to FIG. 9, an example will be described in which the exchange data is stored in exchange data saving area 80 by the application.

Figure 9A:
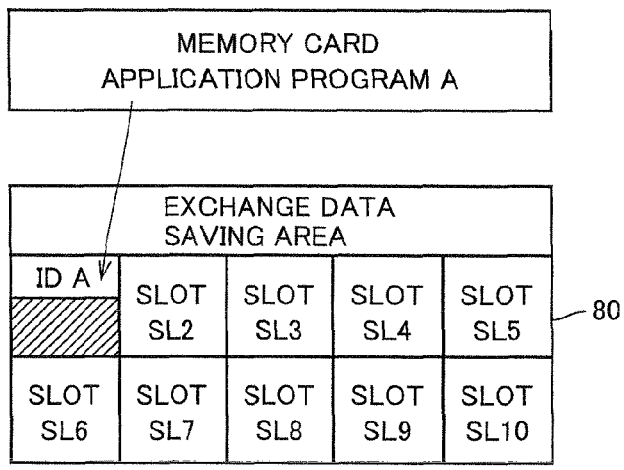
FIGS. 9A to 9C illustrate an example in which exchange data is stored in exchange data saving area 80 by an application.

FIG. 9(A) shows an example in which an application of application name A stored in the memory card described above is executed, and exchange data is stored in correspondence with the application name A as the application ID, in a slot SL1 of exchange data saving area 80. Though the application name is the same as the application ID for the simplicity of description in the present example, these are not necessarily the same, and may be different from each other.

In the present example, it is possible to provide a plurality of determining methods as determination algorithms, when the application ID is compared with another application ID. Though not shown here, algorithm identification information in accordance with the data format in the application ID, that is, presence/absence of exchange conditions data, may be registered as the information indicating the method of determination algorithm, together with the application ID.

Figure 9B:
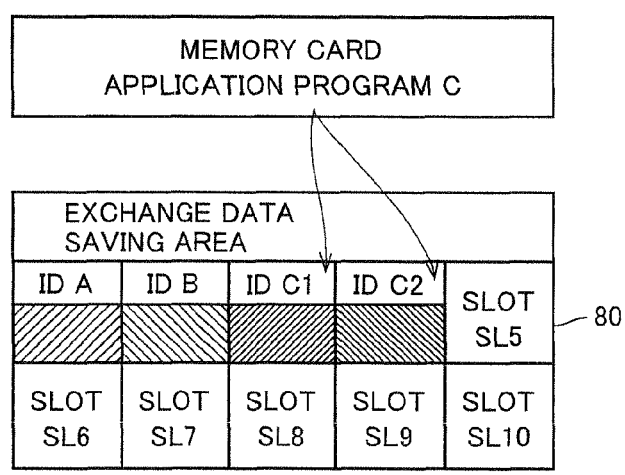

Further, it is not necessary that one exchange data is stored for one application. FIG. 9(B) shows an example in which an application C stored in the memory card described above is executed and exchange data corresponding to the application name C as the application ID are stored in two slots SL3 and SL4 of exchange data saving area 80. It is noted that numerals used here indicate the first data, second data . . . etc., and the same application name may be used as application identification information. As will be described later, when data having attached information (for example, information for identifying exchange data) in addition to the application name C as the application identification information (ID) are registered in slots SL3 and SL4, it becomes possible to utilize more sophisticated exchange conditions (see FIG. 23).

Figure 9C:
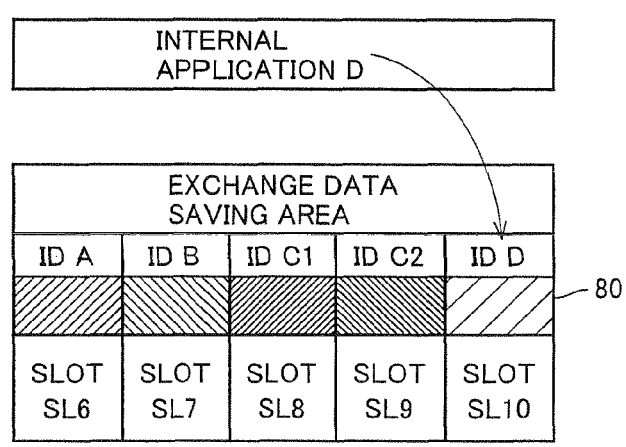

Further, the application is not limited to the applications in a memory card. FIG. 9(C) shows an example in which an internal application D stored in internal application saving area 84 of game machine 1 is executed and the exchange data corresponding to application name D as the application ID is stored in a slot SL5 of exchange data saving area 80.

The exchange data stored in each slot of exchange data saving area 80 in the present example is transmitted to another game machine when prescribed conditions are satisfied.

<Communication Setting for Wireless Communication Module 38>

Next, referring to FIG. 10, the process of communication setting for wireless communication module 38 will be described.

Figure 10:
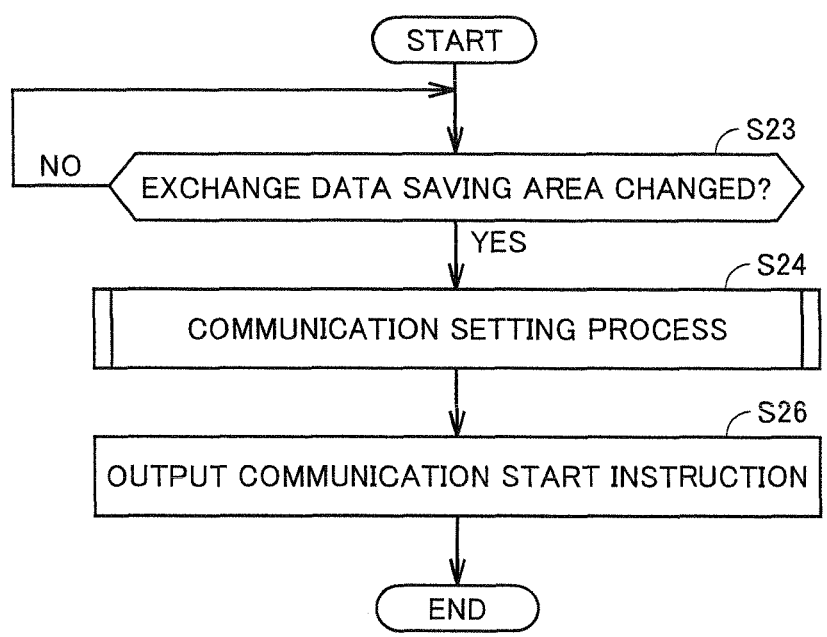
FIG. 10 is a flowchart representing a process of communication setting to wireless communication module 38.

Referring to FIG. 10, CPU 31 (communication setting unit 204) determines whether or not exchange data saving area 80 has been changed (step S23).

Here, an example will be described in which operation takes place using change of contents in exchange data saving area 80 as a trigger. For instance, when the application program stores exchange data in exchange data saving area 80 as described with reference to FIG. 8, the process by communication setting unit 204 is executed in response.

At step S23, if exchange data saving area 80 is changed (YES at step S23), the communication setting is executed (step S24).

Figure 11:
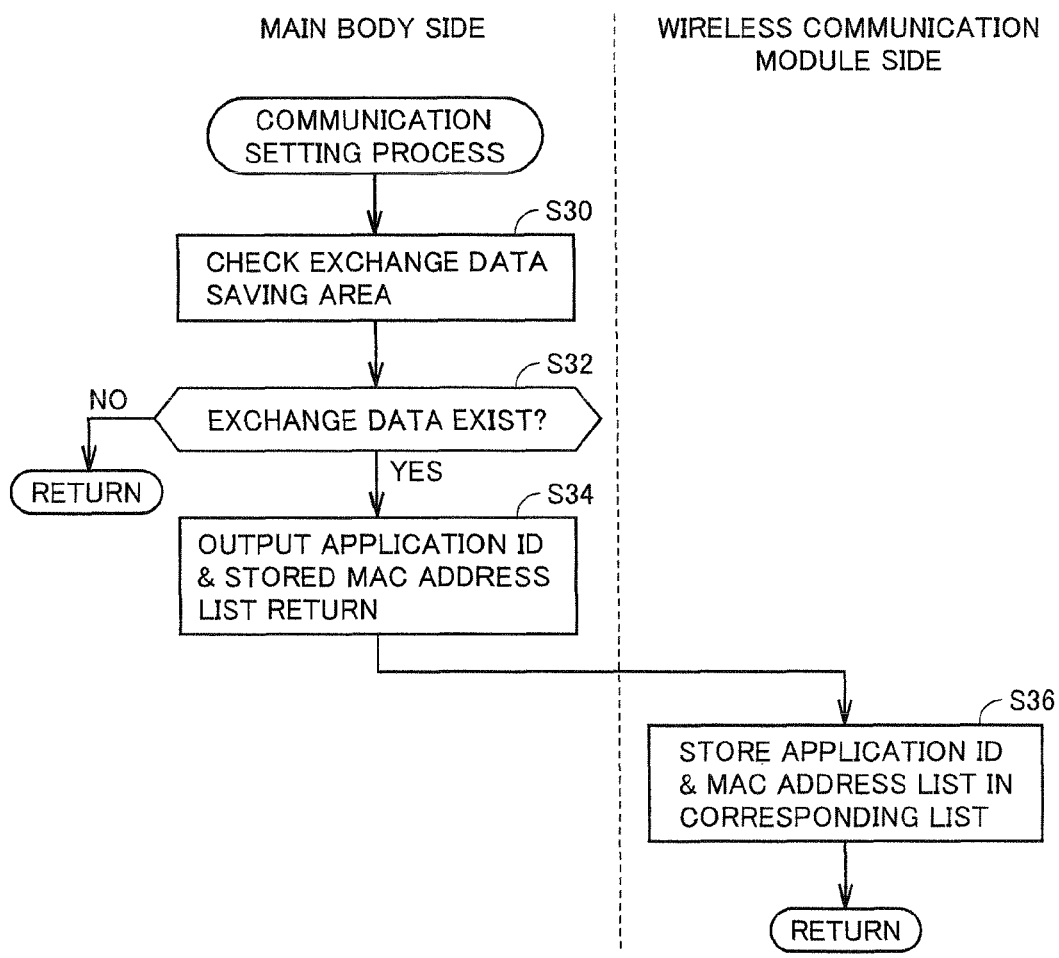
FIG. 11 is a flowchart representing a process of communication setting by a communication setting unit 204 in accordance with an embodiment of the present invention.

Referring to FIG. 11, the communication setting process by CPU 31 (communication setting unit 204) will be described.

Referring to FIG. 11, first, CPU 31 on the main body side (communication setting unit 204) checks exchange data saving area 80 of saving data memory 34 (step S30). Thereafter, CPU 31 (communication setting unit 204) determines whether or not exchange data exists in exchange data saving area 80 of saving data memory 34 (step S32).

If it is determined at step S32 that exchange data exists in a slot of exchange data saving area 80 (YES at step S32), CPU 31 (communication setting unit 204) outputs, to wireless communication module 38, each piece of application ID corresponding to each exchange data stored in the slot and an MAC address list stored in MAC address list saving area 88, 88# (step S34).

On the side of wireless communication module, in accordance with an instruction of CPU 31 (communication setting unit 204), the application ID and the MAC address list are stored in the application ID saving area 68 and MAC address list saving area 70, 70# of RAM 66, respectively (step S36). Then, the process ends (RETURN).

In the present embodiment, the communication process between portable terminals and the communication process between portable and fixed terminals are executed continuously as a series of processes. Therefore, the MAC address list of the fixed terminals used for the MAC address filtering process in the communication process between portable and fixed terminals, which will be described later, is also read from MAC address list saving area 88# and stored in MAC address list saving area 70#. Therefore, communication setting is done not independently but collectively for two different types of communication processes and, therefore, highly efficient communication setting is possible.

Further, as in the present example, MAC address list saving area 70 used for the MAC address filtering process for the communication process between portable terminals and MAC address list 70# used for the MAC address filtering process for the communication process between portable and fixed terminals are provided separately, load of the MAC address filtering process can be alleviated.

Further, in the present example, it is possible to provide a plurality of determining methods as determination algorithms, when the application ID is compared with another application ID, and the application IDs may be saved collectively as a list corresponding to each method of determination, in application ID saving area 68. Specifically, CPU 31 (communication setting unit 204) confirms the algorithm identification information indicating the method of determination algorithm corresponding to the application ID as described above, and instructs to save the application ID in the corresponding list provided for each piece of algorithm identification information of application ID saving area 68. When the IDs are to be saved list by list, list header information including information indicating the method of determination algorithm (algorithm identification information) is allocated to each list.

This process makes it ready to start wireless communication by wireless communication module 38. Specifically, CPU 60 of wireless communication module 38 is now capable of generating transmission wireless frame for the exchange partner searching process and transmitting it to another game machine.

Specifically, CPU 60 is now able to transmit the transmission wireless frame including the application ID, corresponding to the actual exchange data stored in the slots of exchange data saving area 80, stored in application ID saving area 68, to another game machine. If the application IDs are saved collectively as a list corresponding to each of the determination methods in application ID saving area 68, the application IDs may be included list by list in the transmission wireless frame. Here, an example in which a plurality of exchange data are stored in the slots of exchange data saving area 80 will be described. Even when only one exchange data is stored, however, the application ID may be included as a list including one application ID, in the transmission wireless frame.

Receiving the reception wireless frame, the said another game machine confirms the application ID as the contents, compares it with the application ID corresponding to the exchange data held in the said another game machine, and if the pieces of information match, it can determine that exchange data can be exchanged and if they do not match, that exchange data cannot be exchanged.

Further, as the MAC address list output from CPU 31 on the main body side is stored in MAC address list saving area 70, it becomes possible to realize the MAC address filtering process in the communication process between portable terminals, which will be described later.

If it is determined at step S32 that exchange data does not exist in any slot of exchange data saving area 80 (NO at step S32), CPU 31 (communication setting unit 204) ends the process without performing the process steps above (RETURN). Here, since no exchange data is in the slot, the process for giving/receiving the exchange data to/from another game machine in accordance with the communication between portable terminals as will be described later is not executed. It is possible, however, to receive distribution data in accordance with the communication between portable and fixed terminals, which will be described later.

Again referring to FIG. 10, CPU 31 (communication instructing unit 206) outputs an instruction to start wireless communication to wireless communication module 38 (step S26). In response to the instruction, wireless communication by wireless communication module 38 starts. By way of example, if it is determined that an application using wireless communication module 38 has not been executed after the communication setting process by communication setting unit 204, CPU 31 (communication instructing unit 206) outputs the communication start instruction to start wireless communication to wireless communication module 38.

Figure 8:
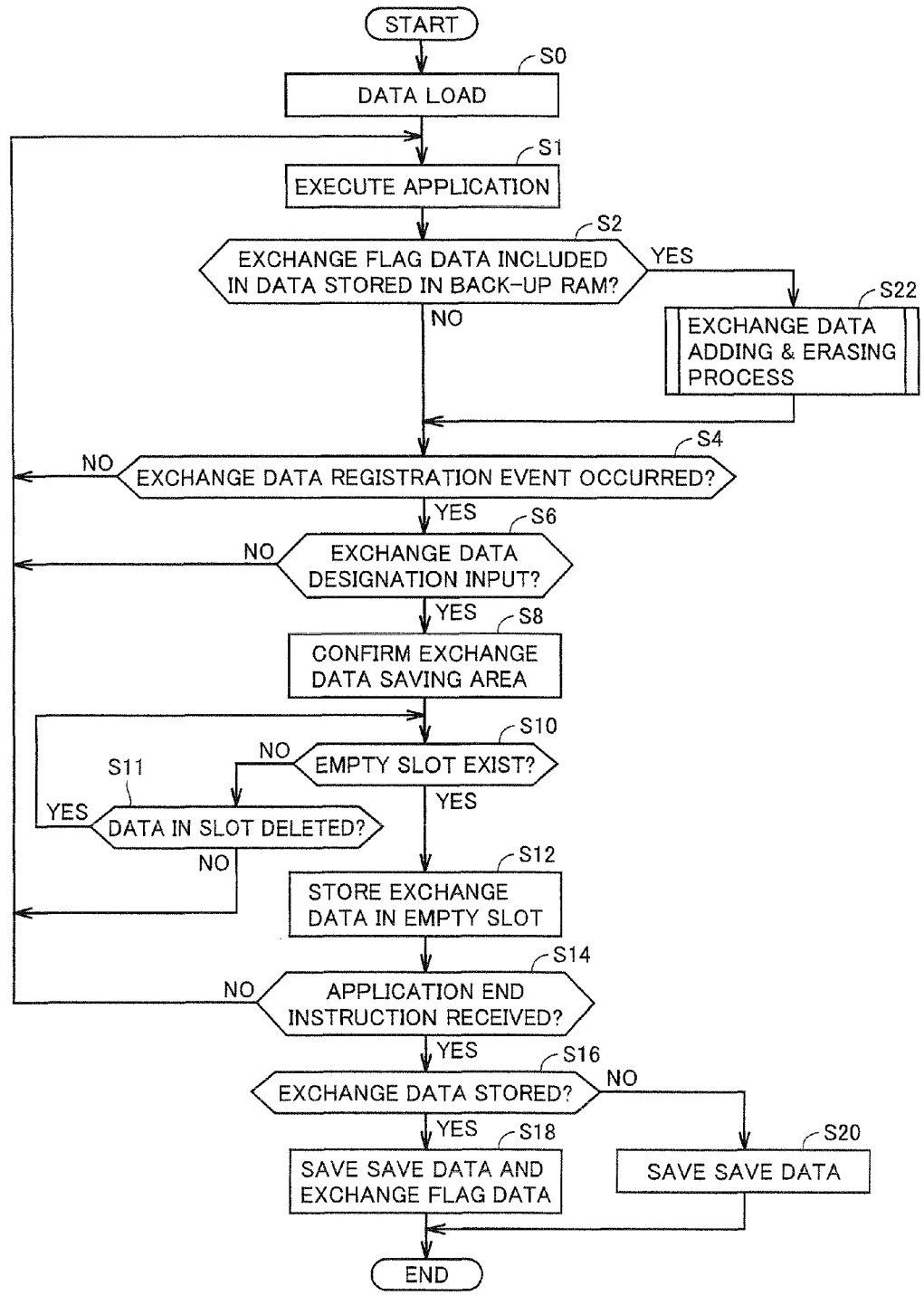
FIG. 8 is a flowchart representing the process for storing exchange data in the exchange data saving area.

Here, an example has been described in which, in preparation for the wireless communication by wireless communication module 38, depending on whether or not the contents of exchange data saving area 80 have been changed, the process by communication setting unit 204 is executed in response to storage of exchange data in exchange data saving area 80 by the application program as described with FIG. 8, and the communication start instruction is output by communication instructing unit 206. Such an operation is not limiting, and it is also possible to start the communication setting process (step S24) when the wireless communication is set to be valid at the time of power on. Alternatively, the communication setting process (step S24) may be started in response to an operation instruction from a user, or the communication setting process (step S24) may be automatically started at every prescribed time period, or these approaches may be combined.

Referring to FIG. 12, the concept of data stored in RAM 66 by the communication setting process will be described.

Figure 12A:
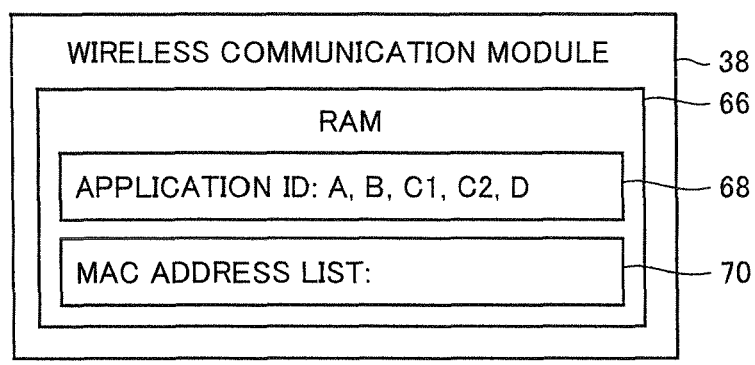
FIGS. 12A and 12B illustrate data stored in RAM 66 by communication setting unit 204.

Referring to FIG. 12(A), here, an example is shown in which pieces of application ID "A, B, C1, C2 and D" are stored in application ID saving area 68 of RAM 66.

In FIG. 12(A), nothing is stored in the MAC address list.

Figure 12B:
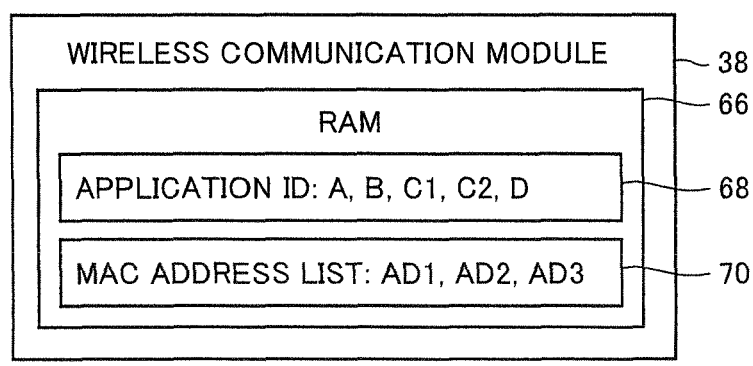

FIG. 12(B) shows an example in which pieces of application identification information (ID) described with reference to FIG. 12(A) are stored in application ID saving area 68, and MAC addresses AD1, AD2 and AD3 as a list of MAC addresses are stored in MAC address list saving area 70. The data of MAC address list is used for MAC address filtering realized by comparison of MAC addresses in the communication between portable terminals, as will be described later.

<Overall Flow of Wireless Communication by Wireless Communication Module 38>

Figure 13:
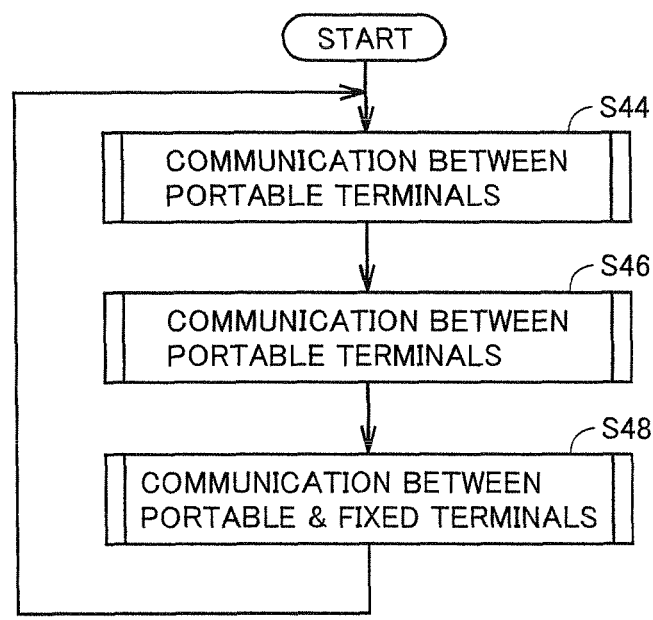
FIG. 13 is a flowchart representing wireless communication executed by wireless communication module 38 in accordance with an embodiment of the present invention.

With reference to FIG. 13, the flow of wireless communication executed by wireless communication module 38 in accordance with an embodiment of the present invention will be described.

Referring to FIG. 13, in accordance with the communication start instruction from CPU 31, CPU 60 of wireless communication module 38 executes the following process. Specifically, CPU 60 executes the communication between portable terminals for a prescribed time period (step S44). Thereafter, it executes the communication between portable terminals again for a prescribed time period (step S46). Next, it executes the communication between portable and fixed terminals for a prescribed time period (step S48). Then, returning to step S44, it again executes the communication between portable terminals.

The length of prescribed time period for executing the communication between portable terminals may or may not be the same as the length of prescribed time period for executing the communication between the portable and fixed terminals.

Though an example in which the communication between portable terminals is executed first and the communication between portable and fixed terminals is executed thereafter, the order is not limiting, and the communication between portable and fixed terminals may be executed first.

Though an example in which communication between portable terminals is executed twice and thereafter communication between portable and fixed terminals is executed once is described in the present embodiment, it is not limiting and the number may be freely set.

The communication between portable terminals (FIG. 14) and the communication between portable and fixed terminals (FIG. 47) are realized by CPU 60 of wireless communication module 38 executing the application for executing the communication between portable terminals and the application for executing the communication between portable and fixed terminals stored in ROM 72, respectively.

Therefore, regardless of whether the application is being executed or not by CPU 31 on the main body side, for example, even when the application is not executed or the main body is in the sleep state of power saving mode, wireless communication module 38 continuously executes the communication between portable terminals and the communication between portable and fixed terminals.

If an application using wireless communication module 38 is to be executed, CPU 31 on the main body side may instruct wireless communication module 38 to stop the wireless communication, to end the wireless communication and to execute another communication based on the application.

When the said another communication ends, CPU 31 outputs, after the communication setting process by communication setting unit 204 described above, the communication start instruction from communication instructing unit 206. Thus, wireless communication including the communication between portable terminals and the communication between portable and fixed terminals can be resumed.

<Communication Between Portable Terminals by Wireless Communication Module 38>

Figure 14:
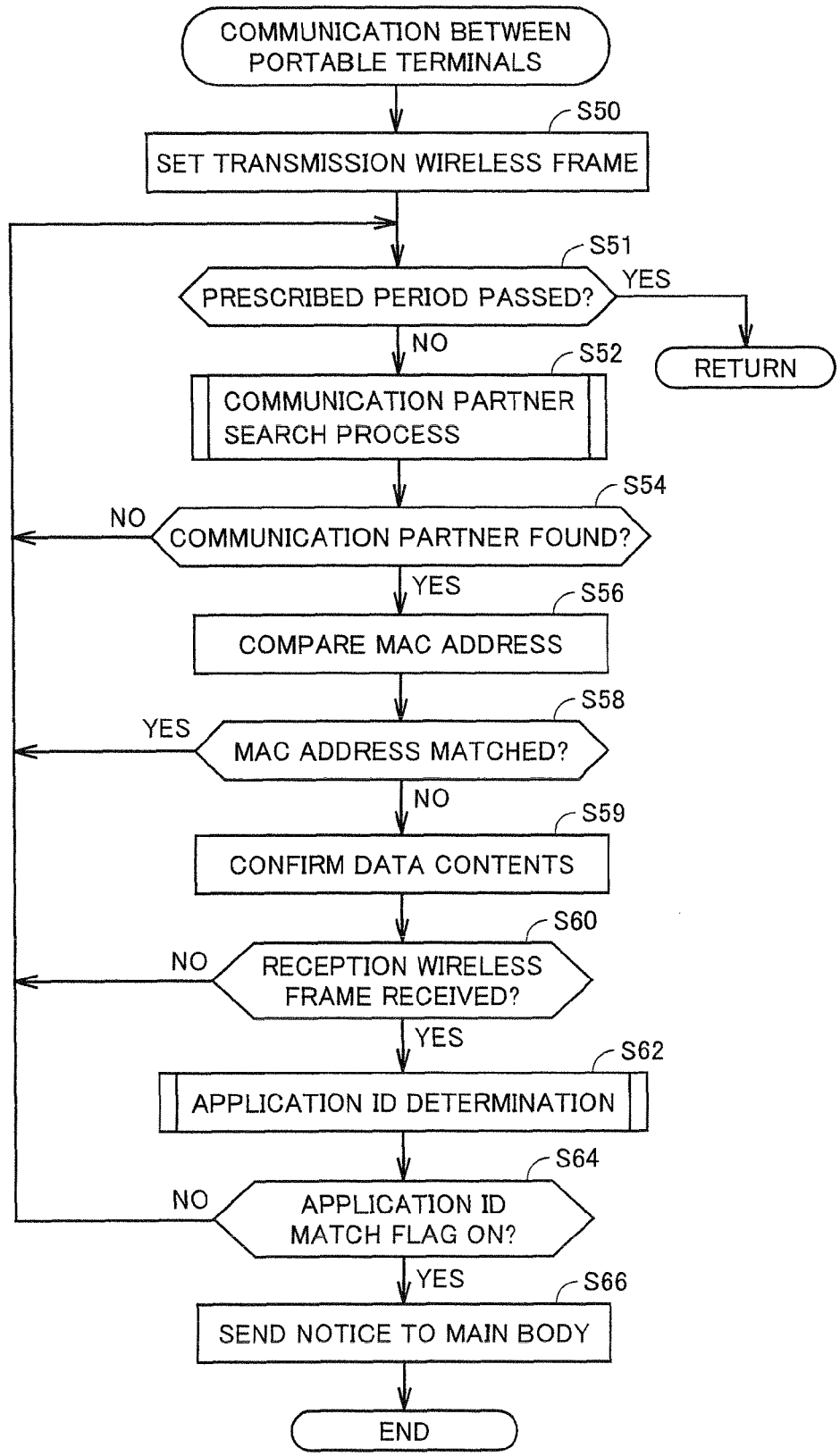
FIG. 14 is a flowchart representing communication between portable terminals in accordance with an embodiment of the present invention.

With reference to FIG. 14, the communication between portable terminals in accordance with an embodiment of the present invention will be described. This is the exchange partner searching process in which wireless communication module 38 searches for a communication partner for exchanging the exchange data. By way of example, this process is realized by CPU 60 executing the application for executing the process between portable terminals stored in ROM 72.

Referring to FIG. 14, first, CPU 60 (wireless frame setting unit 222) sets a transmission wireless frame (step S50).

Specifically, CPU 60 (wireless frame setting unit 222) sets a transmission wireless frame based on the application ID stored in application ID saving area 68 stored in RAM 66 as the transmission data to be transmitted to portable game machine 3.

If the application IDs are saved collectively as a list corresponding to each of the determination methods in application ID saving area 68, the application IDs are included list by list in the transmission wireless frame. In that case, a transmission wireless frame including, together with the list, list header information including algorithm identification information indicating the method of determination algorithm provided for identifying a list, is set. The set transmission wireless frame is saved as transmission data to be externally output through RF-IC 62, in transmission wireless frame saving area 67 of RAM 66, Further, the set transmission wireless frame is used in the application ID determining process, which will be described later.

Figure 15:
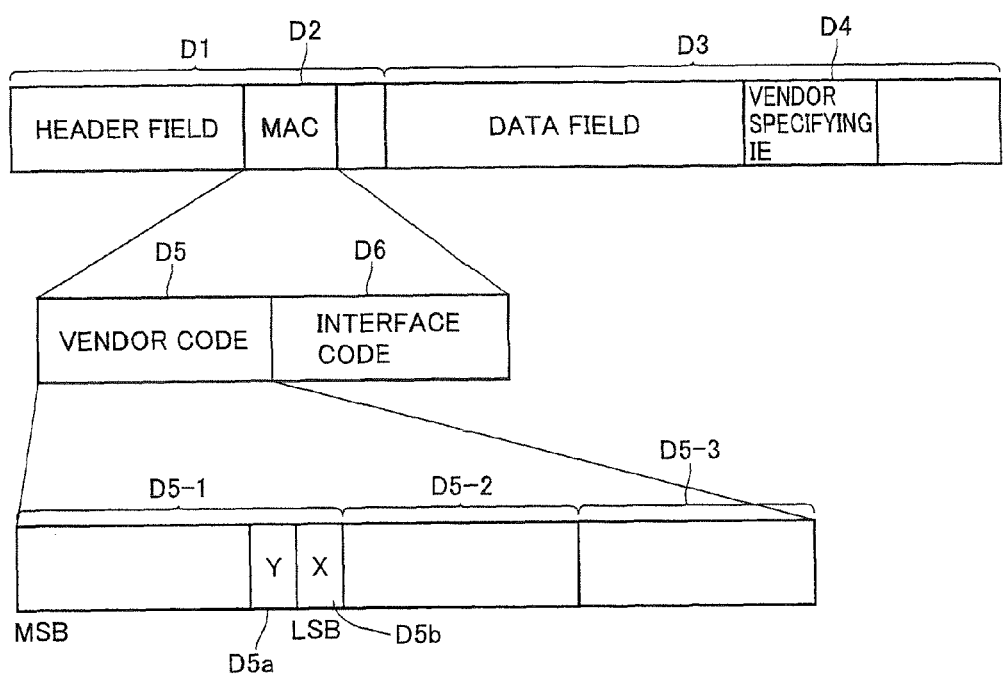
FIG. 15 shows a configuration of a transmission wireless frame transmitted by a game machine in the communication between portable terminals in accordance with an embodiment of the present invention.

With reference to FIG. 15, the configuration of transmission wireless frame transmitted by the game machine in the communication between portable terminals in accordance with the embodiment of the present invention will be described. The reception wireless frame that is received has the same configuration.

Referring to FIG. 15, the transmission wireless frame includes a header field D1 and a data field D3.

Header field D1 includes MAC portion D2 defining MAC address, frame length, and data for causing an interface (wireless communication module) receiving the transmission wireless frame as the reception wireless frame to recognize start of the reception wireless frame and for setting timing to establish synchronization.

Data field D3 includes a plurality of IE (Information Element) data. By way of example, IE data related to an identification code used for wireless communication, SSID (Service Set Identifier), and data of wireless channel (frequency) set to prevent radio wave interference are stored.

Here, an example is shown in which data field D3 includes a vendor specifying IE data D4 as the IE data for the communication between portable terminals. The vendor specifying IE data corresponds to the communication conditions related to whether or not the exchange data communication process is to be executed, in the communication between portable terminals.

The configuration of MAC portion D2 defining the MAC address will be described.

MAC portion D2 includes a vendor code D5 allocated to each vendor of a network device, and an interface code D6 allocated differently to different interface, by each vendor.

Vendor code D5 and interface code D6 are each formed of 3 octets (1 octet=8 bits), and the least significant bit D5$b$ of the first octet D5-1 of the vendor code D5 is provided as X and the second least significant bit D5$a$ is provided as Y, to define the MAC address type.

More specifically, the bit X is used as a bit to determine whether the address is a multicast address indicating a grouped plurality of addresses or a unicast address indicating only one address. In the present example, if bit X=1, it indicates the multicast address and if bit X=0, it indicates the unicast address.

If the address is the unicast address, bit Y is used as a bit for determining whether it is a global address or a local address. In the present example, with bit X=0, if bit Y=0, it indicates the global address and if bit Y=1, it indicates the local address.

In the present example, it is assumed that, as the MAC address type of the communication between portable terminals included in the IE data, these bits are set to bit X=0 and Y=1. In other words, a local address is set in vendor code D5.

As will be described later, the local address may be changed.

Figure 16:
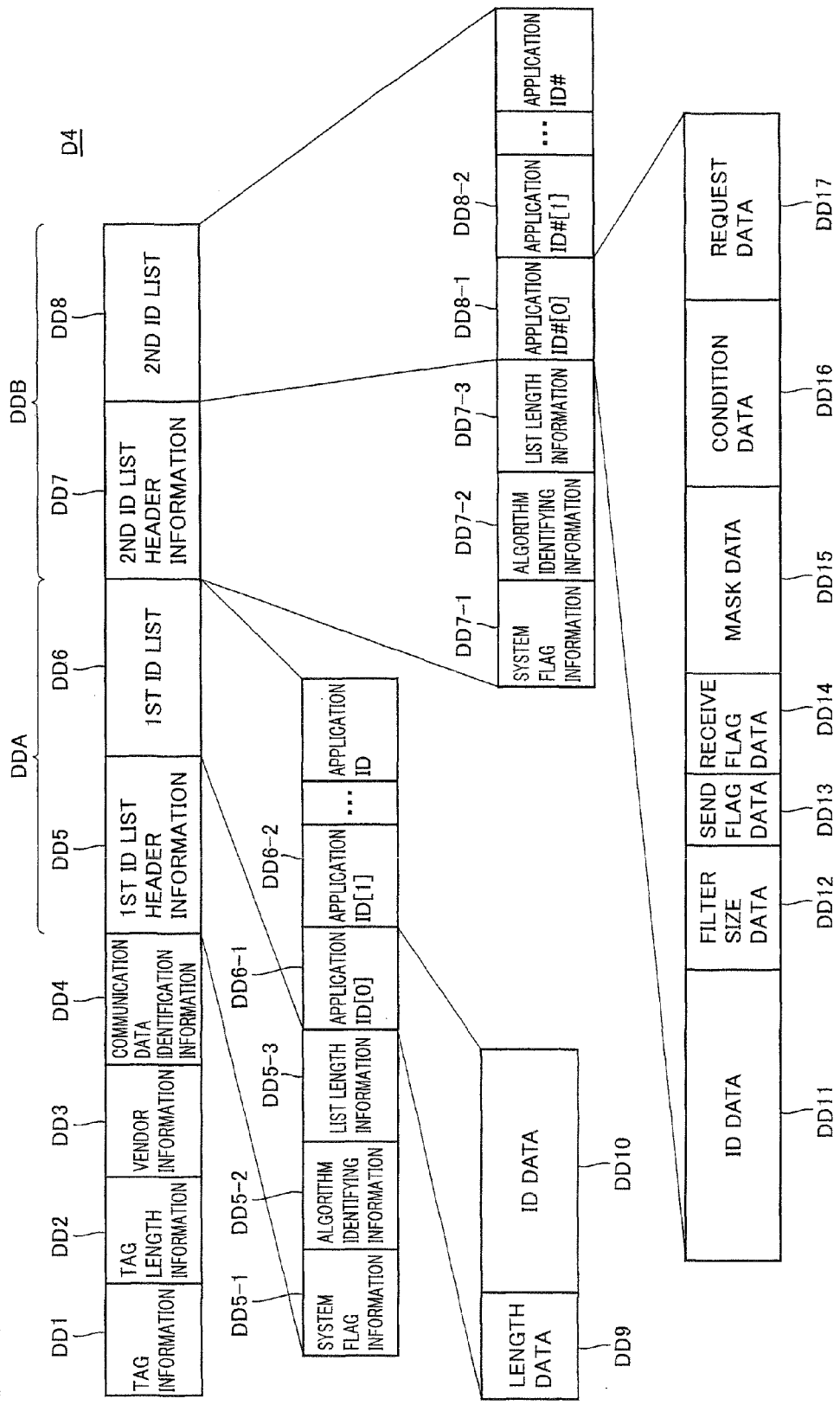
FIG. 16 shows a configuration of a vendor specifying IE data in accordance with an embodiment of the present invention.

With reference to FIG. 16, the configuration of vendor specifying ID data D4 will be described.

Referring to FIG. 16, the vendor specifying IE data includes tag information DD1, tag length information DD2, vendor information DD3, communication data identifying information DD4, a first ID group DDA and a second ID group DDB.

Tag information DD1 is identification data for identifying each of the plurality of IE data. Tag length information DD2 includes data indicating data length of vendor specifying IE data D4.

Vendor information DD3 is data for identifying a company or the like that provides the data.

Communication data identifying information DD4 is data indicating the type of communication data and in the communication between portable terminals, information indicating communication data for communication between portable terminals is stored. In the communication between portable and fixed terminals, the distribution wireless frame transmitted from fixed terminal 5 stores different information indicating communication data for communication between portable and fixed terminals. By confirming the information, determination is made as to whether the data is communication data for communication between portable terminals, that is, whether the reception wireless frame is a wireless frame that can be processed in the process between portable terminals, or determination is made as to whether the received distribution frame is a wireless frame that can be processed in the process between portable and fixed terminals.

Here, an example will be described in which the application IDs are saved collectively as a list corresponding to each of the determination methods in application ID saving area 68. Therefore, lists of application IDs each provided for each piece of algorithm identification information and the list header information provided for identifying the list are included. Such a format enables sharing of algorithm identifying information for identifying the algorithm for comparison among a plurality of application IDs and, therefore, the data amount can be reduced. Further, since a list of application IDs is provided for each algorithm for comparison, searching becomes easier at the time of comparison, and high speed comparing operation becomes possible. The algorithm for comparison will be described later.

Here, an example is shown in which the first ID group DDA and the second ID group DDB are provided in accordance with two different pieces of algorithm identification information defining algorithms for comparison.

The first ID group DDA includes a first ID list header information DD5, and a first ID list DD6.

The first ID list DD6 includes a plurality of application IDs. By way of example, here, application ID[0]DD6-1, application ID[1]DD6-2, . . . are included.

Each application ID includes length data DD9 and ID data DD10. Length data DD9 is for indicating the length used for comparing ID data DD10. ID data DD10 is identification data indicating an application name, preset for each application. The application ID is set when an exchange data registration event occurs or designation of exchange data is input while an application is executed by CPU 31, in association with the exchange data. Here, it is assumed that exchange conditions data and the like are not set.

As the header information of the list of a plurality of application IDs in the first ID list DD6, first ID list header information DD5 is provided.

Specifically, the first ID list header information DD5 includes: system flag information DD5-1 defining the list of application IDs for the exchange data; algorithm identification information DD5-2 defining the algorithm for comparison; and list length information DD5-3 defining the length or number of application IDs provided as the list.

The second ID group DDB includes second ID list header information DD7, and a second ID list DD8.

The second ID list header information DD7 includes: system flag information DD7-1 defining the list of application IDs for the exchange data; algorithm identification information DD7-2 defining the algorithm for comparison; and list length information DD7-3 defining the length or number of application ID#s provided as a list.

The second ID list DD8 includes a plurality of application ID#s. By way of example, here, application ID#[0]DD8-1, application ID#[1]DD8-2, . . . are included.

Each application ID# includes ID data DD11, filter size data DD12, send flag data DD13, receive flag data DD14, mask data DD15, condition data DD16 and request DD17.

Here, application ID# has the transmission/reception conditions data and the obtaining conditions data stored as the exchange conditions data. Specifically, the send flag data and the receive flag data are data representing transmission/reception conditions data. Further, the mask data, the condition data and the request data are data representing the obtaining conditions data. The application ID# is set when an exchange data registration event occurs or designation of exchange data is input while an application is executed by CPU 31, in association with the exchange data. Here, it is assumed, for example, that the exchange conditions data including transmission/reception conditions data and the obtaining conditions data are set in the exchange data registration event.

ID data DD11 is identification data representing an application name set in advance for each application.

File size data DD12 is for defining data length of mask data DD15, condition data DD16 and request data DD17. Therefore, the range of mask data DD15, condition data DD16 and request data DD17 are defined in accordance with the value of file size data DD12.

Send flag data DD13 and receive flag data DD14 define transmission/reception conditions data of the exchange data corresponding to ID data D11 included in application ID#. These are data for defining communication conditions, such as only the transmission is possible, only the reception is possible, only bi-directional communication is possible or communication is possible under any conditions.

Mask data DD15, condition data DD16 and request data DD17 are for defining the obtaining conditions data for the exchange data.

Condition data DD16 is attribute data associated with the exchange data of the own machine to be transmitted to the partner, such as the data held in the own machine or data indicating attribute of the own machine, when the exchange data is to be exchanged. It is used to determine whether or not the exchange data to be transmitted from the own machine satisfies the conditions requested by the partner.

Request data DD17 is attribute data associated with the requested exchange data to be received from the partner when the exchange data is to be exchanged. It is used to determine whether or not the exchange data to be received from the partner satisfies the conditions requested by the own machine.

Mask data DD15 is for setting valid/invalid area of request data DD17 Specifically, if mask data DD15 defines request data DD17 to be invalid, it means that the own machine does not request any conditions in exchanging the exchange data, or the conditions requested by the own machine are always satisfied.

Since the list of application IDs is included as data in the transmission wireless frame, on the receiving side that receives the transmission wireless frame as a reception wireless frame, it is possible to determine, based on the list of application IDs, whether or not the exchange data of the same application is included. What is necessary is simply to determine whether conditions match when compared. Therefore, it may be sufficient to transmit a hash value based on hash function and to compare data on the receiving side, rather than to transmit the application ID itself. The same applies to handling of other pieces of information.

The transmission wireless frame is transmitted to an unspecified partner (game machine), and it is received as a reception wireless frame by an unspecified partner (game machine). As will be described later, the game machine as a client repeatedly executes the transmission without specifying the destination. The game machine (base) that received the transmission wireless frame as the reception wireless frame transmits a transmission wireless frame based on the data held in itself to the game machine (client) that sent the transmission wireless frame, and as the data are exchanged, unspecified game machines execute the communication process with each other.

Though a transmission wireless frame including a plurality of IE (Information Element) data has been described as an example here, the frame is not limited to the above. The transmission wireless frame may include only the vendor specifying IE data.

Though an example has been described in which the transmission wireless frame is set such that, when the application IDs are saved collectively as a list corresponding to each of the determination methods in application ID saving area 68, the application IDs are included list by list in the transmission wireless frame, and list header information including algorithm identification information indicating the method of determination algorithm provided for identifying a list is additionally included. The transmission wireless frame as described above may be set, even when the application IDs are not saved collectively list by list in application ID saving area 68.

For instance, in application ID saving area 68, application IDs and pieces of algorithm identification information corresponding to the application IDs may be saved beforehand. When a transmission wireless frame is to be set, wireless frame setting unit 222 may form a list for each piece of algorithm identification information and the list header information for identifying each list, based on the application IDs and the pieces of algorithm identifying information corresponding to the application IDs saved in application ID saving area 68, to set the transmission wireless frame.

Again referring to FIG. 14, after the transmission wireless frame is set, CPU 60 (communication partner searching unit 224) determines whether or not a prescribed time period has passed (step S51). If it is determined at step S51 that the prescribed time period has not passed (NO at step S51), CPU 60 executes the communication partner search process of searching for a communication partner (another game machine) (step S52). The communication partner search process will be described later.

Thereafter, CPU 60 (communication partner searching unit 224) determines whether or not a communication partner has been found by the communication partner search process (step S54).

If a communication partner is not found at step S54 (NO at step S54), the flow returns to step S51.

If a communication partner is found at step S54 (YES at step S54), CPU 60 (machine identification information comparing unit 226) compares the MAC addresses (step S56). Specifically, it compares the MAC address included in the reception wireless frame with the MAC address stored in MAC address list saving area 70 described above. The MAC address is identification information for identifying the object of communication as described above, and each game machine has its own MAC address allocated thereto. MAC address list saving area 70 has MAC addresses allocated to respective game machines saved therein.

Next, CPU 60 (machine identification information comparing unit 226) determines whether or not the MAC address of another game machine included in the reception wireless frame matches any of the MAC addresses stored in the MAC address list (step S58).

If it is determined at step S58 that the MAC address matches (YES at step S58) the flow again returns to S51. Specifically, the communication with the said another game machine corresponding to the MAC address is terminated without executing subsequent processes. Therefore, every time any data as the communication object is received from another game machine within the communicable range 10, the determination as to whether a match is found with any MAC address as the identification information is repeated.

Figure 17:
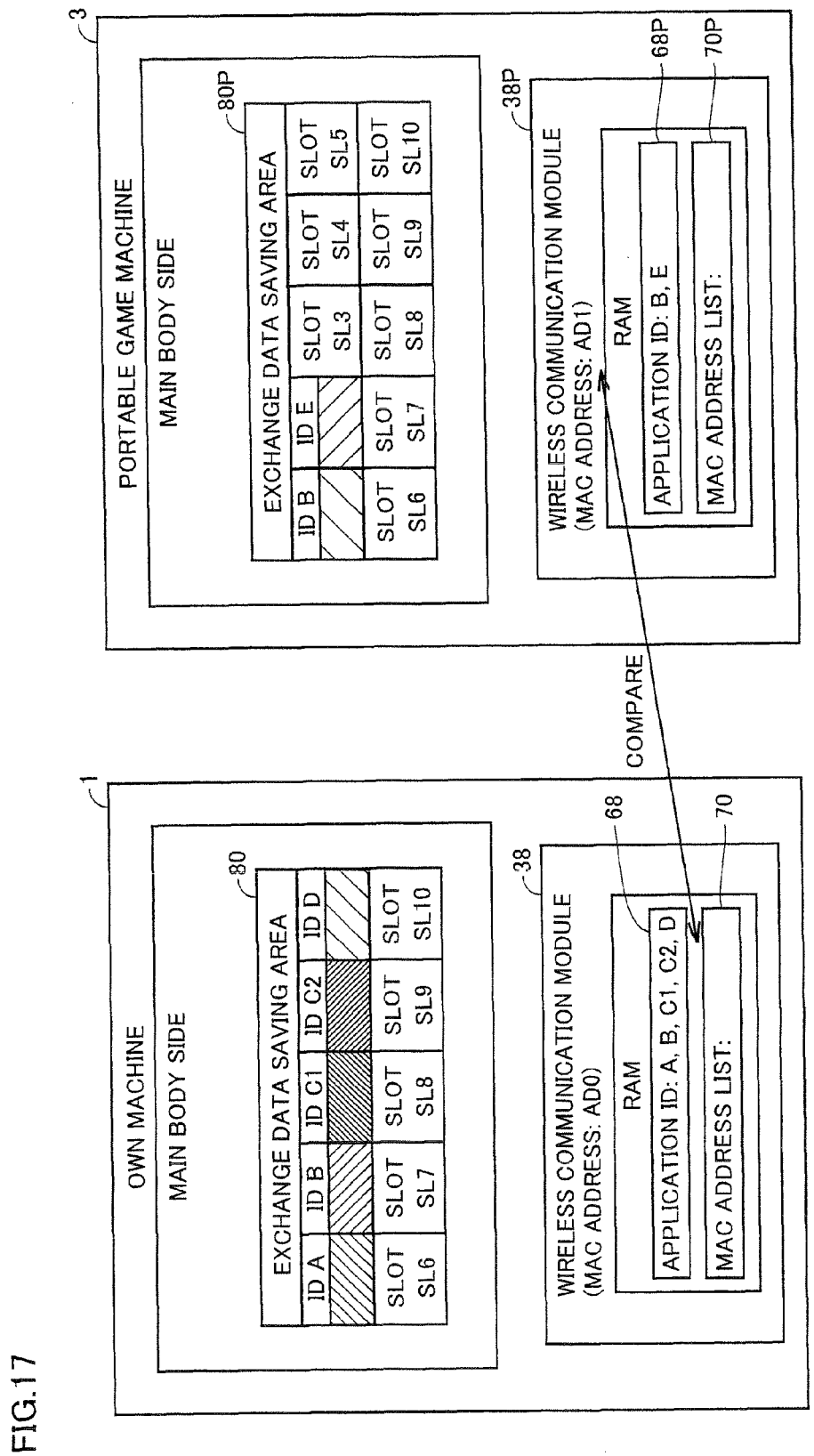
FIG. 17 shows a concept of MAC address comparison in accordance with an embodiment of the present invention.

With reference to FIG. 17, a concept of comparing MAC addresses in accordance with an embodiment of the present invention will, be described.

In the present example, communication connection between game machine 1 and a game machine 3 as another game machine and communication partner, will be described.

Referring to FIG. 17, here, exchange data are stored in slots SL1 to SL5 of exchange data saving area 80, on the side of game machine 1.

As described with reference to FIG. 12(A), in application ID saving area 68 of RAM 66 of wireless communication module 38, application IDs "A, B, C1, C2 and D" are stored.

Nothing is stored in the MAC address list.

Next, the side of game machine 3 will be described. Here, corresponding components of game machine 3 are denoted by the same reference characters with additional letter "P". Specifically, exchange data saving area 80 of game machine 1 corresponds to exchange data saving area 80P of game machine 3.

Further, wireless communication module 38 of game machine 1 corresponds to wireless communication module 38P of game machine 3. The same applies to other components.

Here, an example is shown in which exchange data are stored in slots SL1 and SL2 of exchange data saving area 80P of game machine 3.

In accordance with the same system, on the side of game machine 3 also, application IDs "B, E" are stored in application ID saving area 68P of wireless communication module 38P.

Nothing is stored in the MAC address list. Here, it is assumed that MAC address of the own machine, that is, game machine 1, is set to AD0.

Further, it is assumed that the MAC address of game machine 3 is set to AD1.

Assume, for example, that a reception wireless frame is received from game machine 3. Here, MAC address AD1 of game machine 3 is not registered in the MAC address list of game machine 1 and, therefore, it is determined that MAC addresses do not match. Then, the process proceeds to the next step.

In the present example, the determination of MAC address list registration is described to be done by game machine 1. It is noted that the similar process is also executed on the side of game machine 3.

Figure 18:
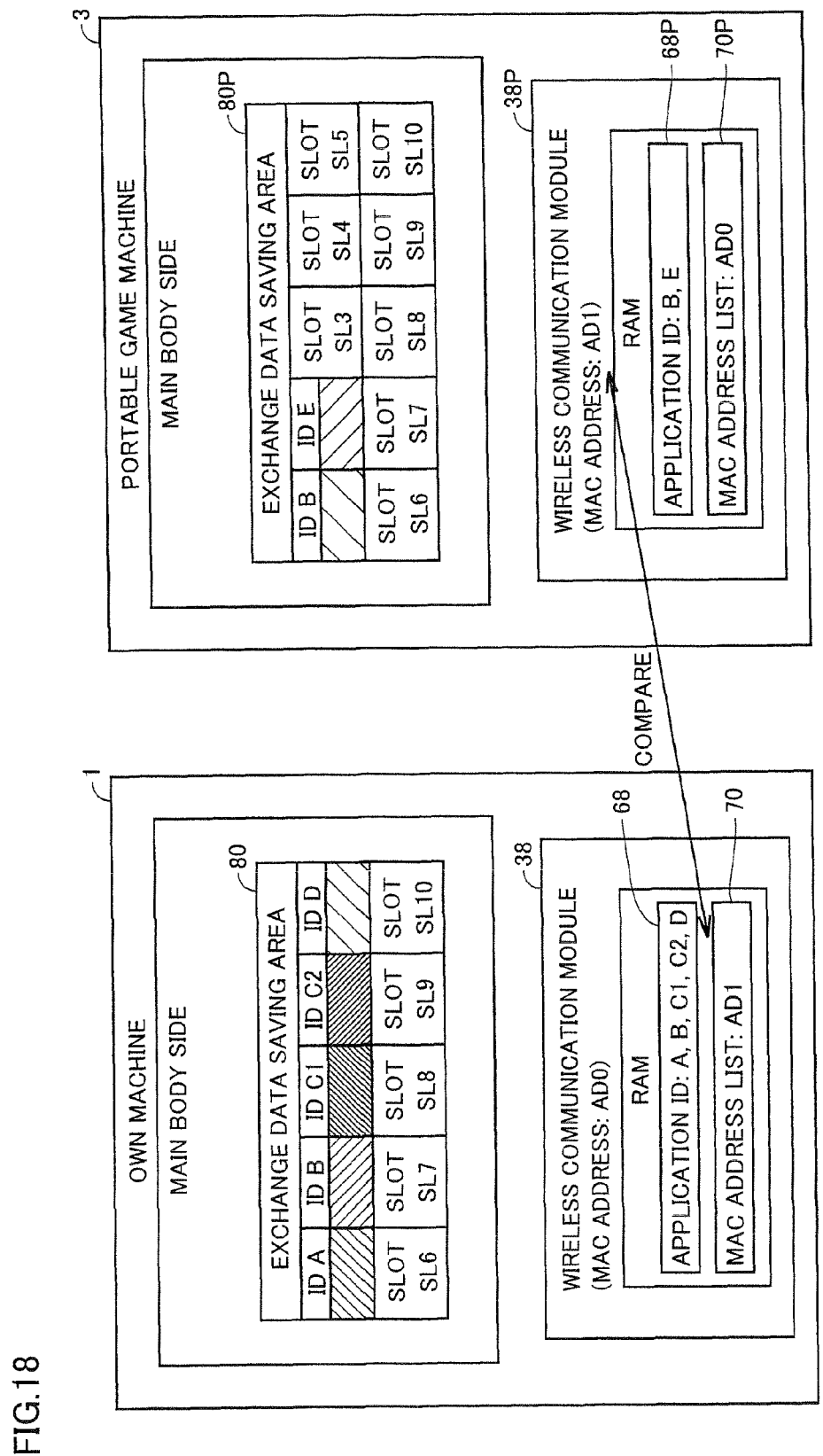
FIG. 18 shows another concept of MAC address comparison in accordance with an embodiment of the present invention.

With reference to FIG. 18, another concept of comparing MAC addresses in accordance with an embodiment of the present invention will be described.

As compared with the configuration of FIG. 17, the configuration of FIG. 18 is different in contents registered in the MAC address list. Specifically, here an example is shown in which MAC address AD1 is registered in MAC address list saving area 70 of wireless communication module 38.

Similarly, in MAC address list saving area 70P on the side of game machine 3, MAC address AD0 is registered.

Assume, for example, that a reception wireless frame is received from game machine 3. Here, since MAC address AD1 of game machine 3 is registered in the MAC address list of game machine 1, it is determined that MAC addresses match.

Therefore, here, subsequent communication process with game machine 3 as another game machine corresponding to the MAC address is not carried out (MAC address filtering). Specifically, substantial communication is not executed with a game machine registered in the MAC address list, with which communication process has been done in the past. Similar process steps are executed on the side of game machine 3.

As described above, the MAC address list stored in MAC address list saving area 70 of RAM 66 can be erased in accordance with a prescribed operation instruction. Once the list is erased, it becomes possible to execute data communication with a machine with which communication process was done in the past. Specifically, the situation of the machine with which giving/receiving of exchange data was done in the past may have been changed in the prescribed time period (for example, new exchange data may have been set), and giving/receiving of exchange data may be possible. Therefore, whether or not exchange of exchange data is possible is again determined, and if possible, giving/receiving of exchange data may be executed.

By way of example, when exchange data is stored in the empty slot at step S12 of FIG. 8, the address list or lists stored in MAC address list saving areas 88 and 70 may be erased.

Again referring to FIG. 14, if it is determined at step S58 that the MAC addresses do not match (NO at step S58), CPU 60 (communication data determining unit 228) confirms the contents of received data (step S59).

Then, CPU 60 (communication data determining unit 228) determines whether or not the reception wireless frame as the received data is a wireless frame that can be processed as the process between portable terminals (step S60).

Specifically, determination is made as to whether the vendor information for identifying the company name or the like that provides the data described with reference to FIG. 16 matches the vendor information held in advance in game machine 1. That the vendor information matches means that the sources of the transmitted data are machines of the same type allowing communication connection, and that the vendor information does not match means the sources of transmitted data are machines of much different types and communication connection to each other is impossible.

Further, determination is made as to whether the communication data identification information matches the communication data identification information held in advance in game machine 1. That the communication data identification information match means it is the communication data for the communication between portable terminals, that is, the wireless frame can be processed in the process between portable terminals. It is assumed that the vendor information as the object of comparison on the side of game machine 1 is registered in advance in ROM 72. Further, it is assumed that the communication data identification information as the object of comparison on the side of game machine 1 is also registered in advance in ROM 72.

The communication data identification information in the communication between portable terminals is different from the communication data identification information included in a distribution wireless frame output from a fixed terminal 5 in the communication between portable and fixed terminals, which will be described later. Therefore, even if a beacon (distribution wireless frame) output from fixed terminal 5 happens to be received in the communication between portable terminals, data communication does not take place as the communication data identification information is different, and thus, what is possible is only the communication between the game machines of the same type.

CPU 60 (communication data determining unit 228) switches the communication data identification information to be compared depending on whether it is the communication between portable terminals or between portable and fixed terminals, and determines whether or not it matches the communication data identification information included in the received data (reception wireless frame).

Specifically, if it is determined at step S60 that a reception wireless frame is not received (NO at step S60), the flow again returns to step S51. Therefore, if data is received from a machine with which communication connection is impossible or data that is not an object of communication is received, the subsequent processes are not executed and the communication is terminated. Though an example has been described in which determination is made as to whether the vendor information and the communication data identification information both match or not, only the determination as to whether the communication data identification information matches may be made.

Next, if it is determined that the reception wireless frame is received (YES at step S60), CPU 60 (application ID determining unit 230) executes the application ID determining process (step S62).

The application ID determining process will be described later.

Then, CPU 60 (application ID determining unit 230) determines whether or not an application ID match flag is on, based on the result of determination (step S64). Specifically, looking up the list of application IDs included in the received reception wireless frame and the list of application IDs included in the transmission wireless frame held in the own machine, determination is made as to whether at least one application ID is determined to be matching. Here, what is determined is whether or not the transmitting side and receiving side have exchange data exchangeable by the communication connection with each other. If both sides have the same application ID, it means that the data can be used by executing the same application after the data exchange. Even if the application ID is not the same, the determination at step S64 may be YES, if there is a data-compatible application and the application ID represents such a compatible application.

If it is determined that the application ID match flag is on (YES at S64), CPU 60 (application ID determining unit 230) sends a notice that another game machine having the exchange data corresponding to the matching application ID is found, that is, the communication partner is an exchange partner to exchange the exchange data, to the main body side (step S66). Then, the process ends (END).

The subsequent process for giving/receiving data, in which connection with another game machine as the communication partner is established and giving/receiving of exchange data corresponding to the matching application ID is executed, is executed as an application of CPU 31 on the main body side, using wireless communication module 38.

Therefore, with this notice that another game machine having the exchange data is found given to the main body side, data communication executed independently by CPU 60 of wireless communication module 38, that is, the exchange partner searching process of searching for a communication partner to exchange the exchange data carried out by wireless communication module 38, is completed.

If the application ID match flag is not on (match flag off) at step S64 (NO at step S64), the flow returns to step S51.

With this process, only when a communication partner capable of exchange is found through the exchange partner searching process by wireless communication module 38, a notice is issued to CPU 31 as the main body, connection with the communication partner is established, and giving/receiving of exchange data is executed. Assume that CPU 31 as the main body is in a sleeping state of power saving mode, and a communication partner is found by the exchange partner searching process by wireless communication module 38. Even in that case, if the exchange is impossible, notice to CPU 31 as the main body is not issued, and communication connection is not established. Therefore, power consumption of game machine 1 as a whole can be reduced.

<Application ID Determining Process>

In the present embodiment, the application ID determining process of the transmission wireless frame shown in FIG. 16, having the application IDs in the form of lists each corresponding to each method of determination, will be described.

Figure 19:
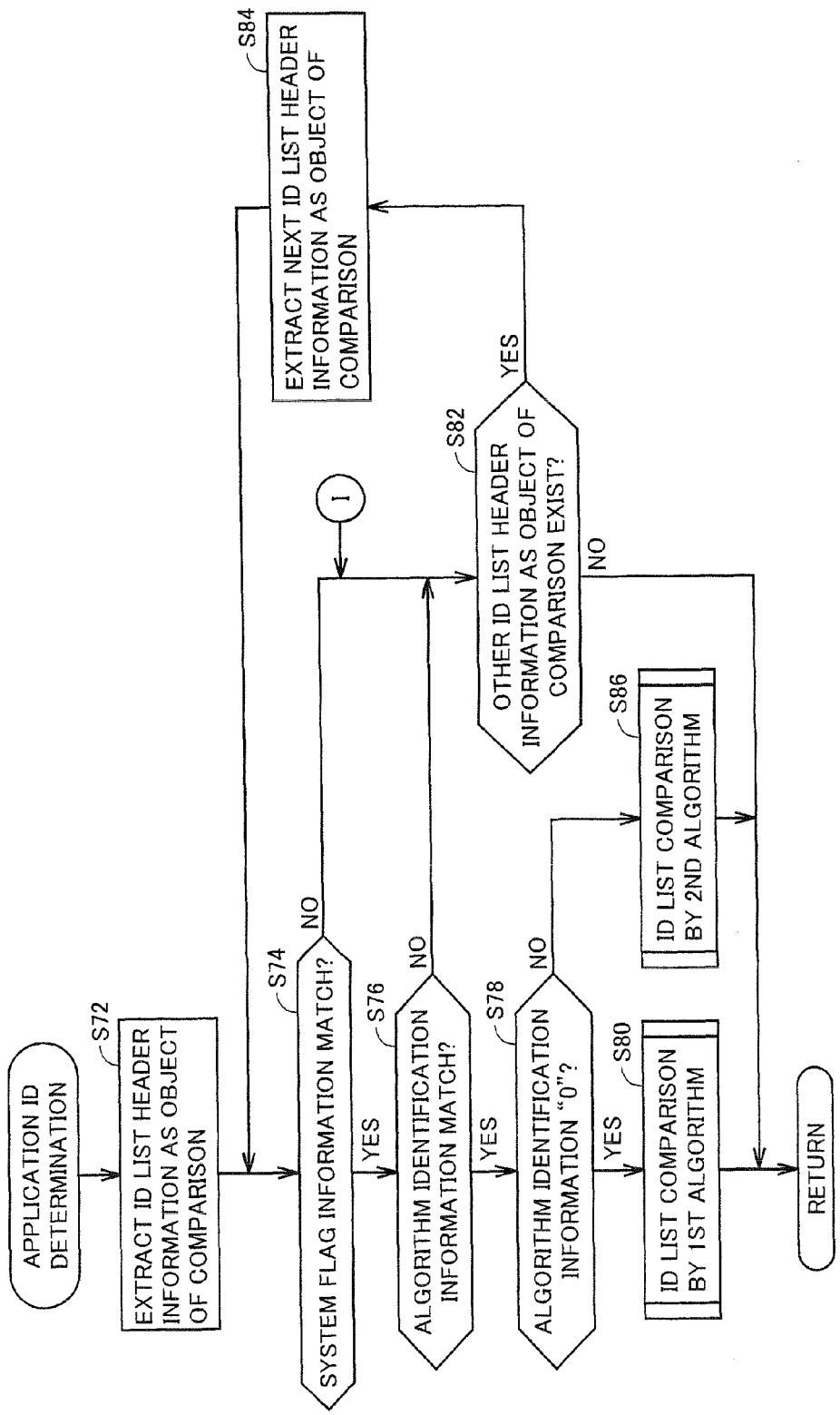
FIG. 19 is a flowchart of an overall operation of an application ID determining unit 230 in accordance with an embodiment of the present invention.

With reference to FIG. 19, the overall flow at application ID determining unit 230 will be described.

Referring to FIG. 19, CPU 60 (ID list header information comparing unit 232) first extracts ID list header information as an object of comparison (step S72).

By way of example, first, it extracts the first ID list header information included in the vendor specifying IE data of the reception wireless frame (portable game machine 3) saved in reception wireless frame saving area 69 and the first ID list header information included in the vendor specifying IE data of the transmission wireless frame (own machine 1) saved in transmission wireless frame saving area 67.

As will be described later, in the present flow, the pieces of ID list header information are extracted one by one from the reception wireless frame saved in reception wireless frame saving area 69 and from the transmission wireless frame saved in transmission wireless frame saving area 67 and the comparison process is executed for every combination, until the system flag information and the algorithm identification information match.

Thereafter, CPU 60 (ID list header information comparing unit 232) determines whether or not the system flag information included in the ID list header information extracted from the reception wireless frame saved in the reception wireless frame saving area 69 matches the system flag information included in the ID list header information extracted from transmission wireless frame saved in transmission wireless frame saving area 67 (step S74).

If it is determined at step S74 that the pieces of system flag information match (YES at step S74), CPU 60 (ID list header information comparing unit 232) determines whether or not the algorithm identification information included in the ID list header information extracted from the received data matches the algorithm identification information extracted from the transmission wireless frame saved in the transmission wireless frame saving area 67 (step S76).

If it is determined at step S76 that the pieces of algorithm identification information do not match (NO at step S76), the flow proceeds to step S82.

If it is determined at step S76 that the pieces of algorithm identification information match (YES at step S76), CPU 60 (ID list header information comparing unit 232) determines whether or not the algorithm identification information included in the ID list header information extracted from the reception wireless frame saved in reception wireless frame saving area 69 is "0" (step S78).

At step S78, if the algorithm identification information is "0", CPU 60 (ID list comparing unit 234) executes the ID list comparing process in accordance with a first algorithm (step S80). Then, the process ends (RETURN). The ID list comparing process in accordance with the first algorithm will be described later.

If the algorithm identification information is not "0", that is, if it is "1" at step S78, CPU 60 (ID list comparing unit 234) executes the ID list comparing process in accordance with a second algorithm (step S86). Then, the process ends (RETURN). The ID list comparing process in accordance with the second algorithm will be described later.

If it is determined at step S74 that the pieces of system flag information do not match (NO at step S74), CPU 60 (ID list header information comparing unit 232) determines whether or not there is any other ID list header information as an object of comparison (step S82).

If it is determined at step S82 that there is another piece of ID list header information as an object of comparison, the ID list header information as the next object of comparison is extracted (step S84). Then, the flow proceeds to step S74 and similar processes are repeated. By way of example, here, the second ID list header information is extracted.

If CPU 60 (ID list header comparing unit 232) determines at step S82 that there is no other ID list header information to be the object of comparison, the process ends (RETURN).

Specifically, pieces of ID list header information are extracted from the reception wireless frame saved in reception wireless frame saving area 69 and from the transmission wireless frame saved in transmission wireless frame saving area 67, and if matching cannot be found in every combination, it is determined that the exchange data does not exist, and the process ends.

By way of example, here, assume that the transmission wireless frame (own machine 1) includes two pieces of ID list header information and the reception wireless frame (portable game machine) also includes two pieces of ID list header information, and the pieces of ID list header information are extracted and comparison is made on every combination. First, the first ID list header information included in the vendor specifying IE data of the transmission wireless frame (own machine 1) is extracted, and the first ID list header information included in the reception wireless frame (portable game machine) is extracted, and these pieces of information are compared with each other. Next, the first ID list header information included in the vendor specifying IE data of the transmission wireless frame (own machine 1) is extracted, and the second ID list header information included in the reception wireless frame (portable game machine) is extracted, and these pieces of information are compared with each other. Thereafter, the second ID list header information included in the vendor specifying IE data of the transmission wireless frame (own machine 1) is extracted, and the first ID list header information included in the reception wireless frame (portable game machine) is extracted, and these pieces of information are compared with each other. Next, the second ID list header information included in the vendor specifying IE data of the transmission wireless frame (own machine 1) is extracted, and the second ID list header information included in the reception wireless frame (portable game machine) is extracted, and these pieces of information are compared with each other.

Simply stated, first, the first piece of ID list header information is extracted from the transmission wireless frame (own machine 1) and fixed, and pieces of ID list header information are extracted in order from the reception wireless frame (portable game machine) and compared. If the pieces of system flag information and algorithm identification information do not match, next, the next piece of ID list header information is extracted from the transmission wireless frame (own machine 1) and fixed, and pieces of ID list header information are extracted in order from the reception wireless frame (portable game machine) and compared. Such a process is repeated for a number of times corresponding to the number of pieces of the ID list header information included in the transmission wireless frame (own machine 1). When the last piece of ID list header information is extracted from the transmission wireless frame (own machine 1) and fixed, and pieces of ID list header information are extracted in order from the reception wireless frame (portable game machine) and compared and still the pieces of system flag information and algorithm identification information do not match, it is determined at step S82 that there is no piece of ID list header information as the object of comparison (NO at step S82), and the application ID determining process ends (RETURN).

By the method described above, whether or not the comparing process is to be continued is determined, based on the reception wireless frame saved in reception wireless frame saving area 69 and the ID list header information included in the vendor specifying IE of the transmission wireless frame saved in transmission wireless frame saving area 67 before starting comparison of application IDs and, therefore, it becomes possible to execute the comparing process at high speed.

Figure 20:
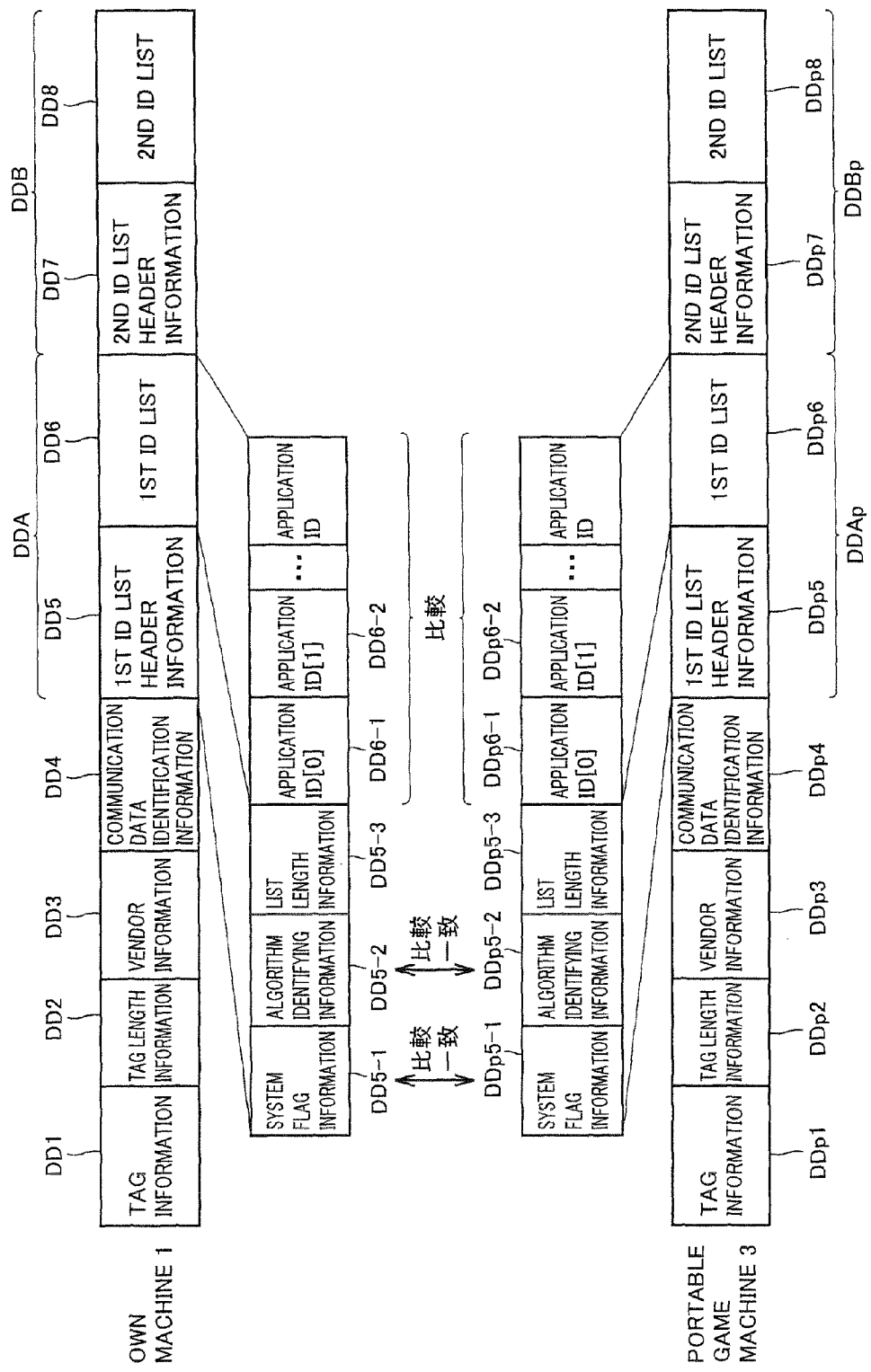
FIG. 20 illustrates comparison of vendor specifying IE as the object of comparison in accordance with an embodiment of the present invention.

With reference to FIG. 20, the comparison of vendor specifying IE as the object of comparison in accordance with the present embodiment will be described.

FIG. 20 shows a data configuration similar to that described with reference to FIG. 16.

The upper side represents the configuration of vendor specifying IE included in the transmission wireless frame saved in transmission wireless frame saving area 67 of own machine 1, and the lower side represents the configuration of vendor specifying IE included in the reception wireless frame saved in reception wireless frame saving area 69 of portable game machine 3.

In the example shown here, system flag information DD5-1 included in the first ID list header information DD5 of own machine 1 is compared with system flag information DDp5-1 included in the first ID list header information DDp5 of portable game machine 3 and these pieces of information are found to be matching, algorithm identification information DD5-2 is compared with algorithm identification information DDp5-2 and these pieces of information are found to be matching, and application ID[0], ID[1], . . . included in the first ID list DD6 of own machine 1 and application ID[0], ID[1], . . . included in the first ID list DDp6 of portable game machine 3 are to be compared.

Figure 21:
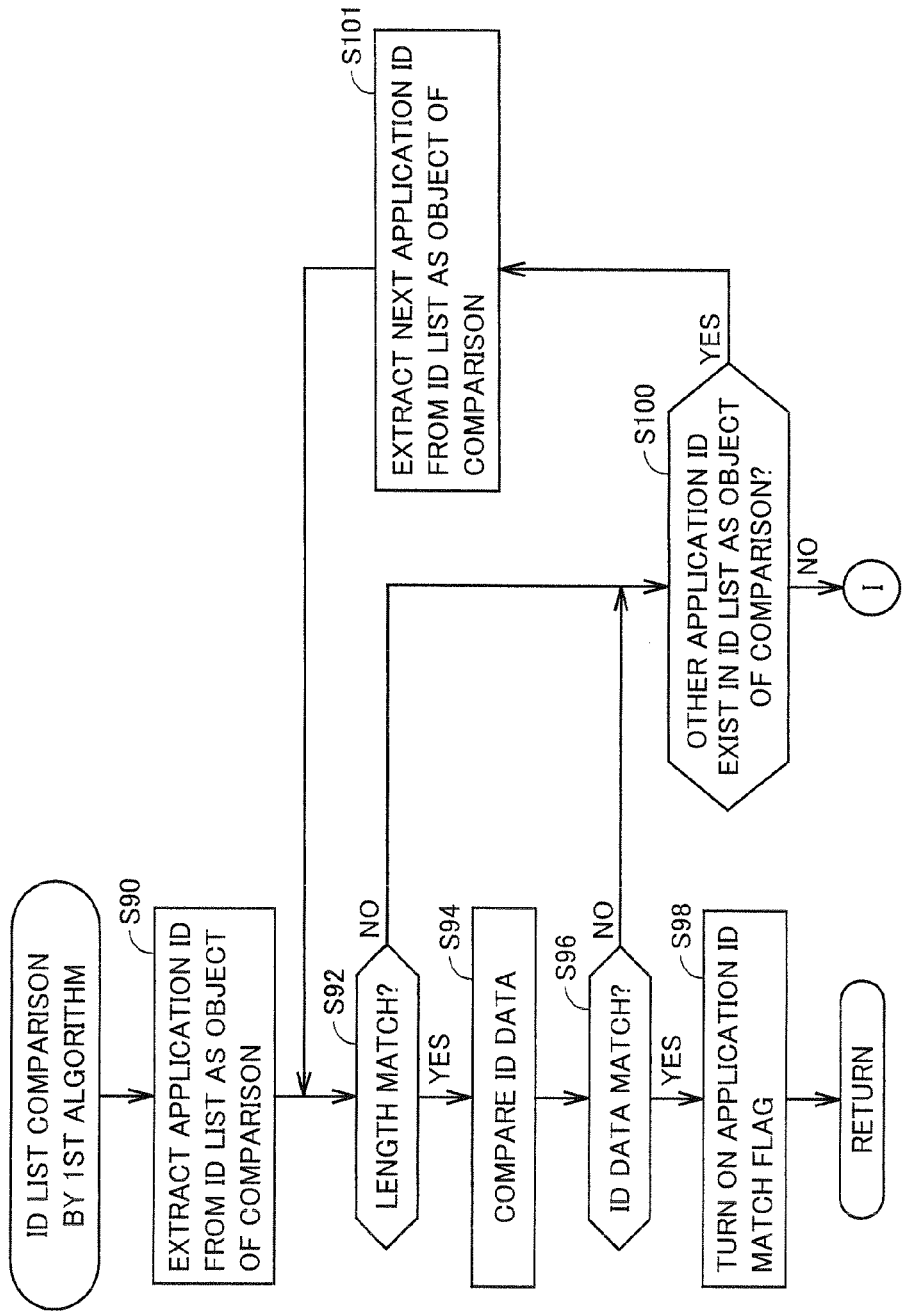
FIG. 21 is a flowchart representing a process of ID list comparison in accordance with a first algorithm.

With reference to FIG. 21, the ID list comparing process in accordance with the first algorithm will be described.

Referring to FIG. 21, CPU 60 (ID list comparing unit 234) first extracts an application ID from the ID list as the object of comparison (step S90).

By way of example, an application ID[0] of the first ID list DD6 of the transmission wireless frame (own machine 1) saved in transmission wireless frame saving area 67, and an application ID[0] of the first ID list DDp6 of the reception wireless frame (portable game machine 3) saved in reception wireless frame saving area 69 are extracted, as shown in FIG. 20.

In this flow, application IDs are extracted one by one from each ID list as the object of comparison and the comparing process is executed on every combination, until the length of comparison and the ID data match, as will be described later.

Next, CPU 60 (ID list comparing unit 234) determines whether or not the lengths to be compared are matching (step S92).

If it is determined at step S92 that the lengths to be compared match (YES at step S92), CPU 60 (ID list comparing unit 234) compares the ID data (step S94).

Then, CPU 60 (ID list comparing unit 234) determines whether or not the ID data match (step S96).

If it is determined at step S96 that the ID data do not match (NO at step S96), the flow proceeds to step S100.

If it is determined at step S96 that the ID data match (YES at step S96), CPU 60 (ID list comparing unit 234) turns on the application ID match flag (step S98). Then, the process ends (RETURN).

If it is determined at step S92 that the lengths to be compared do not match, CPU 60 (ID list comparing unit 234) determines whether or not there is any other application ID in the ID list as the object of comparison (step S100). If it is determined at step S100 that there is an application ID in the ID list as the object of comparison, another application ID is extracted from the ID list as the object of comparison (step S101). Then, the flow again returns to step S92.

Specifically, an application ID[1] of the first ID list DD6 of the transmission wireless frame (own machine 1) saved in transmission wireless frame saving area 67 is extracted, for example, and the similar process is executed, as shown in FIG. 20.

If it is determined at step S100 that there is no other application ID in the ID list as the object of comparison, CPU 60 (ID list comparing unit 234) proceeds to "I".

Specifically, if application IDs are extracted one by one from the reception wireless frame saved in reception wireless frame saving area 69 and from the transmission wireless frame saved in transmission wireless frame saving area 67 and if matching cannot be found in every combination, the flow proceeds to step S82 of FIG. 19, and the process steps described above are again repeated.

Here, an example will be described in which the first ID list DD6 of the transmission wireless frame (own machine 1) saved in transmission wireless frame saving area 67 and the first ID list DDp6 of the reception wireless frame (portable game device 3) saved in reception wireless frame saving area 69 are extracted as the ID lists as the object of comparison. It is assumed that the first ID list DD6 and the first ID list DDp6 both have (n+1) application IDs.

In this example, application IDs are extracted one by one from each of the ID lists as the object of comparison, and comparison is made on every combination. First, an application ID[0]DD6-1 of the first ID list DD6 of the transmission wireless frame (own machine 1) is extracted, and an application ID[0]DDp6-1 of the first ID list DDp6 of the reception wireless frame (portable game machine) is extracted, and these IDs are compared. Next, an application ID[1]DDp6-2 of the first ID list DDp6 of the reception wireless frame (portable game machine) is extracted and compared with the application ID[0]DD6-1 of the first ID list DD6 of the transmission wireless frame (own machine 1).

Next, application ID[2], application ID[3], ... application ID[n] of the first ID list DDp6 included the reception wireless frame (portable game machine) are extracted successively and compared with the application ID[0]DD6-1 of the first ID list DD6 of the transmission wireless frame (own machine 1).

Thereafter, an application ID[1]DD6-2 of the first ID list DD6 of the transmission wireless frame (own machine 1) is extracted, and an application ID[0]DDp6-1 of the first ID list DDp6 of the reception wireless frame (portable game machine) is extracted, and these IDs are compared. Next, an application ID[1]DDp6-2 of the first ID list DDp6 of the reception wireless frame (portable game machine) is extracted and compared with the application ID[1]DD6-2 of the first ID list DD6 of the transmission wireless frame (own machine 1).

Next, application ID[2], application ID[3], ... application ID[n] of the first ID list DDp6 included the reception wireless frame (portable game machine) are extracted successively and compared with the application ID[1]DD6-2 of the first ID list DD6 of the transmission wireless frame (own machine 1). This process is repeated in the similar manner for the application ID[2], application ID[3], ... application ID[n] of the first ID list DD6 of the transmission wireless frame (own machine 1).

Simply stated, from the ID lists as the objects of comparison, first, a first application ID is extracted from the transmission wireless frame (own machine 1) and fixed, and application IDs are successively extracted from the reception wireless frame (portable game machine) and compared. If the lengths to be compared and the ID data do not match, the next application ID is extracted from the transmission wireless frame (own machine 1) and fixed, and application IDs are successively extracted from the reception wireless frame (portable game machine) and compared. Such a process is repeated for a number of times corresponding to the number of application IDs included in the ID list of the transmission wireless frame (own machine 1). If the last application ID is extracted from the transmission wireless frame (own machine 1) and fixed, and application IDs are successively extracted from the reception wireless frame (portable game machine) and compared and still the lengths to be compared and the ID data do not match, it is determined at step S100 that no other application ID exists in the ID list as the object of comparison (NO at step S100), and the flow proceeds to "I".

The comparison between ID data will be described in the following.

Figure 22:
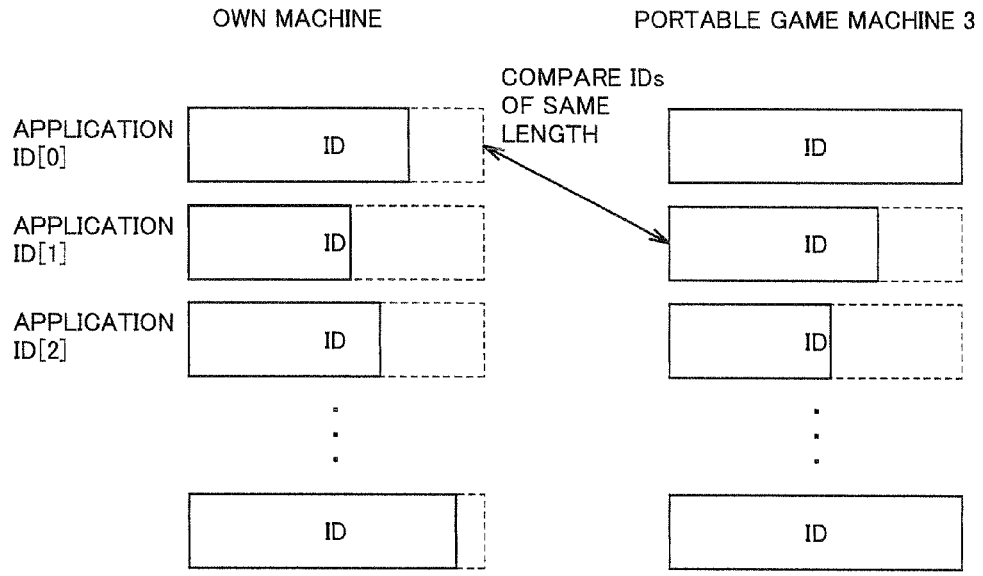
FIG. 22 illustrates comparison of ID data in accordance with an embodiment of the present invention.

With reference to FIG. 22, the comparison of ID data in accordance with the embodiment of the present invention will be described.

Referring to FIG. 22, when ID data of application ID included in the transmission wireless frame saved in transmission wireless frame saving area 67 of own machine 1 is compared with the ID data of application ID included in the reception wireless frame saved in reception wireless frame saving area 69 of portable game machine 3, the ID data having the same length are compared with each other. By way of example, assume that the ID data is information for specifying an application, such as the application name.

Specifically, using the length data indicating the length of ID data described above, included in application ID described with reference to FIG. 16, data comparison is executed only with the ID data having the matching length.

Specifically, comparison is done only with the ID data having the same length data, that is, the ID data of which length to be compared is the same. Therefore, it is unnecessary to compare ID data of which length to be compared is different. Thus, it becomes possible to execute comparison of application IDs at high speed.

In the foregoing, a method has been described in which the application ID match flag is set on when the ID data of own machine 1 matches ID data of portable game machine 3 of the same length. The manner of comparison is not limited to the above, and comparison may be executed in different manners.

Figure 23:
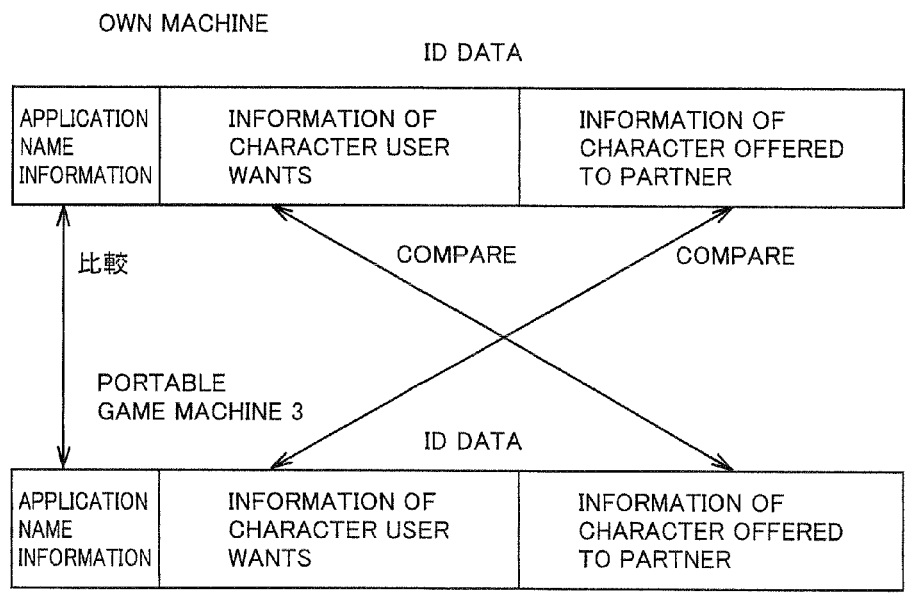
FIG. 23 illustrates another comparison of ID data in accordance with an embodiment of the present invention.

With reference to FIG. 23, a different manner of comparing ID data in accordance with the present embodiment will be described.

Referring to FIG. 23, here, ID data includes not only the information specifying the application name or the like (application name information) but also other pieces of information.

As other pieces of information, a piece of character information that the user of own machine wants, and a piece of character information that the user of own machine offers to the partner, are stored using at least a part of ID data of the own machine.

Similarly, on the side of another game machine, not only the application name information but also other pieces of information are stored, including a piece of character information the user of another game machine wants and a piece of character information the user of another game machine offers, using at least a part of the ID data.

Then, determination is made as to whether the pieces of application name information match, as to whether the piece of character information the user wants included in the ID data of the own machine matches the piece of character information offered included in the ID data of another game machine, and as to whether the piece of character information offered to the partner included in the ID data of the own machine matches the piece of character information wanted included in the ID data of another game machine. If the pieces of application name information match and pieces of character information to be exchanged also match, it is determined that pieces of application ID match.

By the comparing method described above, before actually exchanging the exchange data between game machine 1 as the own machine and game machine 3 as another game machine, if it is determined based on the contents of exchange data (character information) to be exchanged that the exchange data are mutually desired data, the application ID match flag is turned on to notify the main body. If either one of the machines does not wish exchange, the application ID match flag is not turned on, and the notice is not given to the main body. Therefore, it becomes possible to exchange only the exchange data desired by the users.

Specifically, since the ID data includes other pieces of information (for example, exchange data) in addition to the information for specifying an application such as the application name, it becomes possible to avoid undesirable process for giving/receiving data, and hence, zest in using the game machine as the information processing apparatus increases.

For the comparison, the method may be distinguished from the method described with reference to FIG. 22, by using, for example, a different piece of algorithm identification information.

Next, a highly sophisticated exchange process, realized by adding exchange conditions data as additional conditions to the ID data will be described.

Specifically, an example including transmission/reception conditions data and obtaining conditions data as the exchange conditions data will be described.

Figure 24:
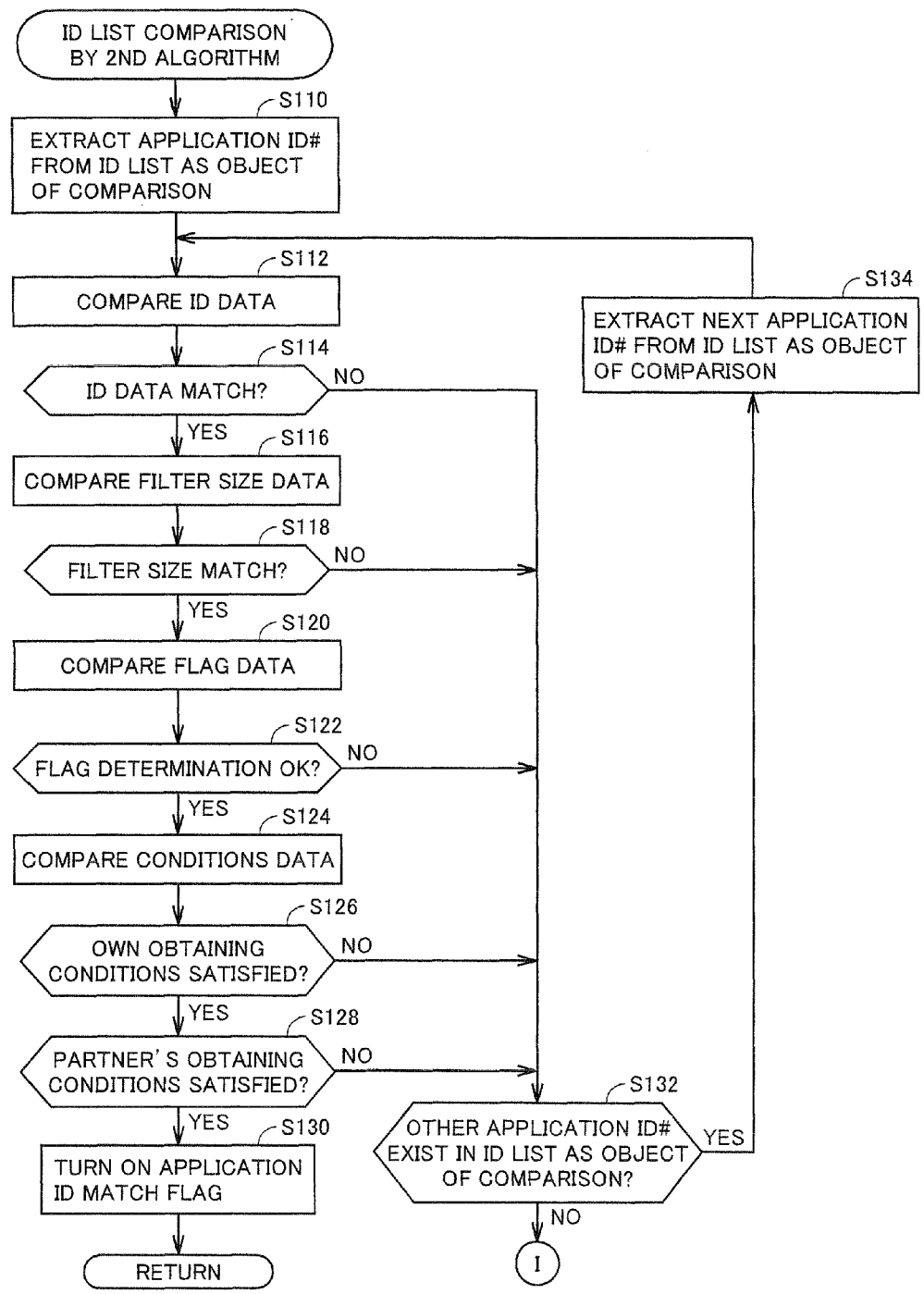
FIG. 24 is a flowchart representing a process of ID list comparison in accordance with a second algorithm.

With reference to FIG. 24, an ID list comparing process in accordance with a second algorithm will be described.

Here, if the algorithm identification information is "1", CPU 60 (ID list comparing unit 234) executes the ID list comparing process in accordance with the second algorithm.

In the present example, it is assumed that the algorithm identification information included in the second ID list header information included in the vendor specifying IE data of the transmission wireless frame (own machine 1) saved in transmission wireless frame saving area 67 and the algorithm identification information included in the second ID list header information included in the vendor specifying IE data of the reception wireless frame (portable game machine 3) saved in reception wireless frame saving area 69 are both "1".

Here, for example, the second ID list included in the transmission wireless frame saved in transmission wireless frame saving area 67 and the second ID list included in the reception wireless frame saved in reception wireless frame saving area 69 described with reference to FIG. 20 are the objects of comparison.

Referring to FIG. 24, first, CPU 60 (ID list comparing unit 234) extracts application ID#s from the ID lists as the object of comparison (step S110).

By way of example, as shown in FIG. 20, it extracts an application ID#[0] of the second ID list DD8 of the transmission wireless frame (own machine 1) saved in transmission wireless frame saving area 67 and an application ID#[0] of the second ID list DDp8 of the reception wireless frame (portable game machine 3) saved in reception wireless frame saving area 69.

As will be described later, in this flow, application IDs are extracted one by one from each of the ID lists as the objects of comparison and the comparing process is executed on every combination, until determination conditions related to the ID data and the obtaining conditions are satisfied.

Next, CPU 60 (ID list comparing unit 234) compares the ID data included in the extracted application ID#s (step S112).

Specifically, it compares the ID data of application ID#[0] of the second ID list DD8 with the ID data of application ID#[0] of the second ID list DDp8.

Next, at step S112, CPU 60 (ID list comparing unit 234) determines whether or not the ID data match (step S114).

If it is determined at step S114 that the ID data match (YES at step S14), CPU 60 (ID list comparing unit 234) compares filter size data (step S116).

Next, CPU 60 (ID list comparing unit 234) determines whether or not the filter sizes match (step S118). Specifically, it compares the filter size data of application ID#[0] of the second ID list DD8 with the filter size data of application ID#[0] of the second ID list DDp8, As described above, the filter size data defines the data size of each of the mask data, the condition data and the request data.

If the filter size data are different, it means that the data as the object of comparison have different size. Therefore, it is possible to determine that the conditions do not match, without executing the subsequent process of data comparison.

If it is determined at step S118 that the filter sizes match (YES at S118), CPU 60 (ID list comparing unit 234) next determines whether or not the transmission/reception conditions data of each other are satisfied. Specifically, it compares the send flag data and the receive flag data as the transmission/reception conditions data (step S120). Comparison of send flag data and receive flag data will be described later.

Then, CPU 60 (ID list comparing unit 234) determines whether or not the transmission/reception conditions data of each other are satisfied, that is, whether the flag data determination is OK, from the result of comparison (step S122).

With reference to FIG. 25, the comparison of send flag data and receive flag data as the transmission/reception conditions data in accordance with an embodiment of the present invention will be described.

Referring to FIG. 25(A), the forms of send flag data and receive flag data as the transmission/reception conditions data in own machine 1 will be described.

Specifically, in accordance with combinations of send flag and receive flag, the transmission/reception conditions data for the exchange data can be set.

If the send flag is "1" and the receive flag is "0", it means that only the transmission communication of the exchange data from own machine 1 is possible.

If the send flag is "0" and the receive flag is "1", it means that only the reception communication of the exchange data from another game machine is possible.

If the send flag and the receive flag are "1" and "1", it means that communication of exchange data is possible under both conditions. Therefore, here, the manner of communication will be defined by the transmission/reception conditions of the communication partner.

If the send flag and the receive flag are "0" and "0", it means that only the bi-directional communication of exchange data is possible between own machine 1 and another game machine.

As regards the transmission/reception conditions data, a situation when the transmission/reception conditions are satisfied, that is, when the flag data determination is OK (hereinafter also simply referred to as "flag determination OK") will be described.

If the send flag is "1" and the receive flag is "0" on the side of own machine 1, the flag determination is OK if the send flag is "0" and the receive flag is "1", or if the send flag is "1" and the receive flag is "1" on the side of the communication partner.

If the send flag is "0" and the receive flag is "1" on the side of own machine 1, the flag determination is OK if the send flag is "1" and the receive flag is "0", or if the send flag is "1" and the receive flag is "1" on the side of the communication partner.

If the send flag is "1" and the receive flag is "1" on the side of own machine 1, the flag determination is OK if the send flag is "0" and the receive flag is "0", if the send flag is "0" and the receive flag is "1", the send flag is "1" and the receive flag is "0", or if the send flag is "1" and the receive flag is "1" on the side of the communication partner.

If the send flag is "0" and the receive flag is "0" on the side of own machine 1, the flag determination is OK if the send flag is "0" and the receive flag is "0", or if the send flag is "1" and the receive flag is "1" on the side of the communication partner.

Specific examples of flag data comparison related to the transmission/reception conditions data will be described with reference to FIG. 25(B).

In Example 1, comparison is made with the send flag being "0" and the receive flag being "1" on the side of own machine 1, and the send flag being "1" and the receive flag being "0" on the side of portable game machine 3. Therefore, it means that the transmission/conditions data of own machine 1 is that only the reception communication is possible, and the transmission/reception conditions data of portable game machine 3 is that only the transmission communication is possible. Accordingly, flag determination is OK and communication is possible.

In Example 2, comparison is made with the send flag being "1" and the receive flag being "0" on the side of own machine 1, and the send flag being "0" and the receive flag being "1" on the side of portable game machine 3. Therefore, it means that the transmission/conditions data of own machine 1 is that only the transmission communication is possible, and the transmission/reception conditions data of portable game machine 3 is that only the reception communication is possible. Accordingly, flag determination is OK and communication is possible.

In Example 3, comparison is made with the send flag being "1" and the receive flag being "1" on the side of own machine 1, and the send flag being "1" and the receive flag being "0" on the side of portable game machine 3. Therefore, it means that the transmission/conditions data of own machine 1 is that communication is possible under both conditions, and the transmission/reception conditions data of portable game machine 3 is that only the transmission communication is possible. Accordingly, flag determination is OK and communication is possible.

In Example 4, comparison is made with the send flag being "1" and the receive flag being "0" on the side of own machine 1, and the send flag being "1" and the receive flag being "0" on the side of portable game machine 3. Therefore, it means that the transmission/conditions data of own machine 1 is that only the transmission communication is possible, and the transmission/reception conditions data of portable game machine 3 is that only the transmission communication is possible. Accordingly, flag determination is NG and communication is impossible.

In Example 5, comparison is made with the send flag being "0" and the receive flag being "0" on the side of own machine 1, and the send flag being "1" and the receive flag being "0" on the side of portable game machine 3. Therefore, it means that the transmission/conditions data of own machine 1 is that only the bi-directional communication is possible, and the transmission/reception conditions data of portable game machine 3 is that only the transmission communication is possible. Accordingly, flag determination is NG and communication is impossible.

Using such a method, by adding the transmission/reception conditions data (send flag data and receive flag data) as the exchange conditions data to the ID data for comparison, it becomes possible to increase variation of the manner of communication at the time of data exchange, or it is possible to indicate that only the transmission of exchange data is desired, only the reception of exchange data is desired, only the transmission/reception of exchange data is desired with the communication partner, or to indicate that communication may be done in accordance with the transmission/reception conditions data of the communication partner. Thus, zest of data communication can be improved.

Again referring to FIG. 24, if the flag determination is OK at step S122 (YES at S122), CPU 60 (ID list comparing unit 234) determines whether or not obtaining conditions are satisfied with each other. Specifically, as the determination as to whether the obtaining conditions are satisfied, the conditions data are compared (step S124). Comparison of conditions data will be described later.

Next, CPU 60 (ID list comparing unit 234) determines whether or not the obtaining conditions of own machine are satisfied (step S126).

If it is determined that the obtaining conditions of own machine are satisfied (YES at step S126), then, CPU 60 determines whether or not the obtaining conditions of the partner are satisfied (step S128).

If it is determined that the obtaining conditions of the partner are satisfied (YES at step S128), CPU 60 (ID list comparing unit 234) turns on the application ID match flag (S130). Then the process ends (RETURN).

With reference to FIG. 26, comparison of conditions data in accordance with an embodiment of the present invention will be described.

Figure 26A:
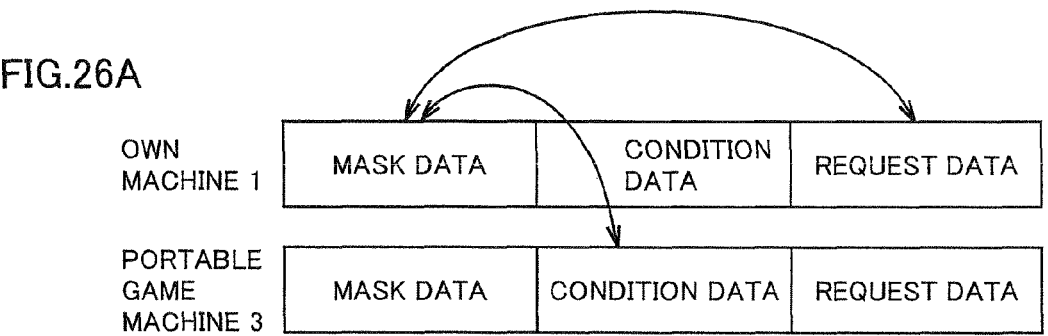
FIGS. 26A and 26B illustrate comparison of conditions data in accordance with an embodiment of the present invention.

FIG. 26(A) illustrates comparison of conditions data related to whether or not the obtaining conditions of the own machine are satisfied.

The conditions data are generated from the obtaining conditions data of own machine 1 (mask data, condition data, request data) and the obtaining conditions data of portable game machine 3 (mask data, condition data, request data).

Specifically, as the comparison of conditions data, whether or not the product of the mask data of own machine 1 and the condition data of portable game machine 3 has the same value as the product of the mask data of own machine 1 and the request data of own machine 1 is determined.

Figure 26B:
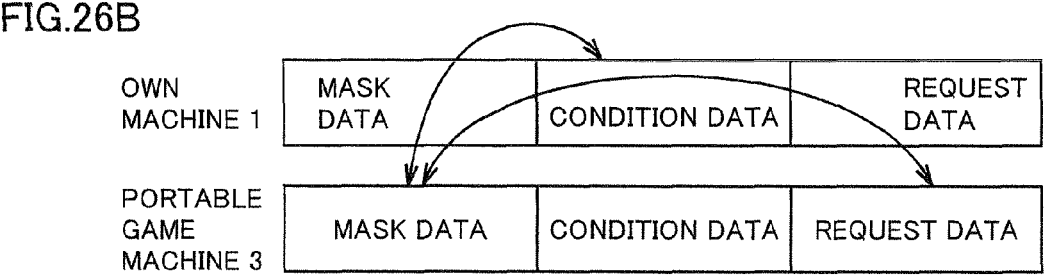

FIG. 26(B) illustrates comparison of conditions data related to whether or not the obtaining conditions of the partner are satisfied.

Specifically, as the comparison of conditions data, whether or not the product of the mask data of portable game machine 3 and the condition data of own machine 1 has the same value as the product of the mask data of portable game machine 3 and the request data of portable game machine 3 is determined.

With reference to FIG. 27, specific examples of obtaining conditions data in accordance with the present embodiment will be described.

FIG. 27 shows four examples of obtaining conditions data.

Specifically, obtaining conditions data set by users HA, HB, HC and HD are shown.

It is assumed that the mask data, condition data and request data are each of 1 bit.

Here, description will be given assuming that, for storing the exchange data in the exchange data registration event, sex is set as the obtaining conditions data, when users HA, HB, HC and HD wish to have data exchanged.

Specifically, data indicating sex (male: "1", female: "0") is used as attribute data related to the exchange data of the own machine to be transmitted to the partner and the exchange data to be received from the partner.

FIG. 27(A) shows obtaining conditions data of user HA, in which mask data is "1", condition data is "1" and request data is "0". Here, the condition data being "1" indicates that the user HA is a male user, and the request data being "0" indicates that data exchange with a female user is requested. If the mask data is "0", setting of the request data can be invalidated. In other words, the sex of the partner with which data exchange is requested is not specifically limited.

FIG. 27(B) shows obtaining conditions data of user HB, in which mask data is "1", condition data is "0" and request data is "1". Here, the condition data being "0" indicates that the user HB is a female user, and the request data being "1" indicates that data exchange with a male user is requested.

FIG. 27(C) shows obtaining conditions data of user HC, in which mask data is "0", condition data is "1" and request data is "0". Here, the condition data being "1" indicates that the user HC is a male user. Since the mask data is "0", the sex of the partner of data exchange is not limited. Therefore, the request data may be "0" or "1" that is, "don't care." For simplicity of description, here it is set to "0".

FIG. 27(D) shows obtaining conditions data of user HD, in which mask data is "0", condition data is "0" and request data is "0". Here, the condition data being "0" indicates that the user HD is a female user. Since the mask data is "0", the sex of the partner of data exchange is not limited. Therefore, the request data may be "0" or "1" that is, "don't care." For simplicity of description, here it is set to "0".

With reference to FIG. 28, specific examples of conditions data comparison, based on the obtaining conditions data shown in FIG. 27 will be described.

Here, consider comparison of conditions data of user HA with other users, that is, users HB, HC and HD.

FIG. 28(A) shows comparison between conditions data of users HA and FIB.

The process on the side of user HA is as follows.

The product of the condition data of the partner and the user's own mask data is "0" & "1"="0".

The product of the user's own request data and the user's own mask data is "0" & "1"="0".

Therefore, here, the user's conditions data match and hence, the user's own obtaining conditions are satisfied.

The product of the user's own condition data and the mask data of the partner is "1" & "1"="1".

The product of the request data of the partner and the mask data of the partner is "1" & "1"="1".

Therefore, conditions data of the partner match and hence, the obtaining conditions of the partner are satisfied.

Specifically, in the data comparison of obtaining conditions on the side of user HA, the user's own obtaining conditions and the partner's obtaining conditions are both satisfied.

Similar to the processes on the side of user HA described above, the comparison process is also performed on the side of user HB.

The product of the condition data of the partner and the user's own mask data is "1" & "1"="1".

The product of the user's own request data and the user's own mask data is "1" & "1"="1".

Therefore, here, the user's conditions data match and hence, the user's own obtaining conditions are satisfied.

The product of the user's own condition data and the mask data of the partner is "0" & "1"="0".

The product of the request data of the partner and the mask data of the partner is "0" & "1"="0".

Therefore, conditions data of the partner match and hence, the obtaining conditions of the partner are satisfied.

Specifically, in the data comparison of obtaining conditions on the side of user HB, the user's own obtaining conditions and the partner's obtaining conditions are both satisfied.

Therefore, user HA, who is a male user wishing to exchange data with a female user, can exchange data with user HB, who is a female user, since the conditions of data exchange are satisfied.

FIG. 28(B) shows comparison between conditions data of users HA and HC.

The process on the side of user HA is as follows.

The product of the condition data of the partner and the user's own mask data is "1" & "1"="1".

The product of the user's own request data and the user's own mask data is "0" & "1"="0".

Therefore, here, the user's conditions data do not match and hence, the user's own obtaining conditions are not satisfied.

The product of the user's own condition data and the mask data of the partner is "1" & "0"="0".

The product of the request data of the partner and the mask data of the partner is "0" & "0"="0".

Therefore, conditions data of the partner match and hence, the obtaining conditions of the partner are satisfied.

Specifically, in the data comparison of obtaining conditions on the side of user HA, the partner's conditions data are satisfied and hence, the obtaining conditions are satisfied, while the user's own conditions data are not satisfied, and hence, the user's own obtaining conditions are not satisfied.

Similar to the processes on the side of user HA described above, the comparison process is also performed on the side of user HC.

The product of the condition data of the partner and the user's own mask data is "1" & "0"="0".

The product of the user's own request data and the user's own mask data is "0" & "0"="0".

Therefore, here, the user's conditions data match and hence, the user's own obtaining conditions are satisfied.

The product of the user's own condition data and the mask data of the partner is "1" & "1"="1".

The product of the request data of the partner and the mask data of the partner is "0" & "1"="0".

Therefore, conditions data of the partner do not match and hence, the obtaining conditions of the partner are not satisfied.

Specifically, in the data comparison of obtaining conditions on the side of user HC, though the user's own conditions data match and the user's own obtaining conditions are satisfied, the conditions data of the partner do not match and hence, the obtaining conditions of the partner are not satisfied.

Specifically, user HC, who is a male user and who does not care the sex of the partner of data exchange, can exchange the exchange data with user HA, who is a male user. On the other hand, user HA, who is a male user, does not wish to exchange data with male user HC. Therefore, data exchange is impossible.

FIG. 28(C) shows comparison between conditions data of users HA and HD.

The process on the side of user HA is as follows.

The product of the condition data of the partner and the user's own mask data is "0"& "1"="0".

The product of the user's own request data and the user's own mask data is "0" & "1"="0".

Therefore, here, the user's conditions data match and hence, the user's own obtaining conditions are satisfied.

The product of the user's own condition data and the mask data of the partner is "1" & "0"="0".

The product of the request data of the partner and the mask data of the partner is "0" & "0"="0".

Therefore, conditions data of the partner match and hence, the obtaining conditions of the partner are satisfied.

Specifically, in the data comparison of obtaining conditions on the side of user HA, the user's own obtaining conditions and the partner's obtaining conditions are both satisfied.

Similar to the processes on the side of user HA described above, the comparison process is also performed on the side of user HD.

The product of the condition data of the partner and the user's own mask data is "1" & "0"="0".

The product of the user's own request data and the user's own mask data is "0" & "0"="0".

Therefore, here, the user's conditions data match and hence, the user's own obtaining conditions are satisfied.

The product of the user's own condition data and the mask data of the partner is "0" & "1"="0".

The product of the request data of the partner and the mask data of the partner is "0" & "1"="0".

Therefore, conditions data of the partner match and hence, the obtaining conditions of the partner are satisfied.

Specifically, in the comparison of obtaining conditions on the side of user HD, the user's own obtaining conditions and the partner's obtaining conditions are both satisfied.

Specifically, user HD, who is a female user and who does not care the sex of the partner of data exchange, can exchange the exchange data with user HA, who is a male user. Further, user HA is a male user and wishes to exchange data with a female user HD. Therefore data exchange is possible.

Though an example of comparison using sex as the obtaining conditions data has been described above, it is not limiting, and other data may be set as the obtaining conditions data.

Referring to FIG. 29, another specific example of the obtaining conditions data in accordance with an embodiment of the present invention will be described.

FIG. 29 shows three examples of obtaining conditions data.

Specifically, obtaining conditions data set by users HE, HF and HG are shown.

It is assumed that the mask data, condition data and request data are each consisting of 2 bits.

Here, description will be given assuming that, for storing the exchange data in the exchange data registration event, users HE, HF and HG set course data of a game of which data exchange is desired, as the obtaining conditions data.

More specifically, in the example described below, as the attribute data related to the exchange data of the own machine to be transmitted to the partner and the exchange data to be received from the partner, presence/absence of data (present: "1", absent: "0") and whether exchange is desired or not (desired: "1", not desired: "0") are used.

Here, condition data consists of 2 bits, which correspond to a course P and a course Q, respectively. If the user has the data of the corresponding course, the corresponding bit of the condition data assumes "1", and if the user does not have the data of the corresponding course, the bit assumes "0".

Request data consists of 2 bits, which also correspond to course P and course Q. If the user wishes to obtain the data of the corresponding course, the corresponding bit of the request data assumes "1", and if the user does not wish to obtain the data of the corresponding course, the bit assumes "0".

Mask data consists of 2 bits, which also correspond to course P and course Q. If the mask data bit is "0", setting of the request data can be invalidated. In other words, the exchange data may or may not be obtained.

FIG. 29(A) shows the obtaining conditions data of user HE, in which the mask data is "01", condition data is "11" and the request data is "01" for the courses P and Q.

Here, the condition data being "11" indicates that user HE has the data of courses P and Q. The request data being "01" indicates that data exchange of course Q is desired. Since the mask data for course P is "0", the request data of course P may be "0" or "1", that is, "don't care." Here, for simplicity of description, it is set to "0".

FIG. 29(B) shows the obtaining conditions data of user HF, in which the mask data is "11", condition data is "10" and the request data is "01" for the courses P and Q.

Here, the condition data being "10" indicates that user HF has the data of course P. The request data being "01" indicates that data exchange of course Q is desired.

FIG. 29(C) shows the obtaining conditions data of user HG, in which the mask data is "11", condition data is "01" and the request data is "11" for the courses P and Q.

Here, the condition data being "01" indicates that user HG has the data of course Q. The request data being "11" indicates that data exchange of courses P and Q is desired.

With reference to FIG. 30, specific examples of conditions data comparison, based on the obtaining conditions data shown in FIG. 29 will be described.

Here, consider comparison of conditions data of user HE with other users, that is, users HF and HG.

FIG. 30(A) shows comparison between conditions data of users HE and HF.

The process on the side of user HE is as follows.

The product of the condition data of the partner and the user's own mask data is "10" & "01"="00".

The product of the user's own request data and the user's own mask data is "01" & "11"="01".

Therefore, here, the user's conditions data do not match and hence, the user's own obtaining conditions are not satisfied.

The product of the user's own condition data and the mask data of the partner is "11" & "11"="11".

The product of the request data of the partner and the mask data of the partner is "01" & "11"="01".

Therefore, conditions data of the partner do not match and hence, the obtaining conditions of the partner are not satisfied.

Specifically, in the data comparison of obtaining conditions on the side of user HE, the user's own obtaining conditions and the partner's obtaining conditions are both unsatisfied.

Similar to the processes on the side of user HE described above, the comparison process is also performed on the side of user HF.

The product of the condition data of the partner and the user's own mask data is "11" & "11"="11".

The product of the user's own request data and the user's own mask data is "01" & "11"="01".

Therefore, here, the user's conditions data do not match and hence, the user's own obtaining conditions are not satisfied.

The product of the user's own condition data and the mask data of the partner is "10" & "01"="00".

The product of the request data of the partner and the mask data of the partner is "01" & "01"="01".

Therefore, conditions data of the partner do not match and hence, the obtaining conditions of the partner are not satisfied.

Specifically, in the data comparison of obtaining conditions on the side of user HF, the user's own obtaining conditions and the partner's obtaining conditions are both unsatisfied.

Between user HE who wishes to exchange data of course Q and user HF who does not have the data of course Q, the obtaining conditions data for data exchange are not satisfied and, therefore, data exchange is impossible.

FIG. 30(B) shows comparison between conditions data of users HE and HG.

The process on the side of user HE is as follows.

The product of the condition data of the partner and the user's own mask data is "01" & "01"="01".

The product of the user's own request data and the user's own mask data is "01" & "01"="01".

Therefore, here, the user's conditions data match and hence, the user's own obtaining conditions are satisfied.

The product of the user's own condition data and the mask data of the partner is "11" & "11"="11".

The product of the request data of the partner and the mask data of the partner is "11" & "11"="11".

Therefore, conditions data of the partner match and hence, the obtaining conditions of the partner are satisfied.

Specifically, in the data comparison of obtaining conditions on the side of user HE, the user's own obtaining conditions and the partner's obtaining conditions are both satisfied.

Similar to the processes on the side of user HE described above, the comparison process is also performed on the side of user HG.

The product of the condition data of the partner and the user's own mask data is "11" & "11"="11".

The product of the user's own request data and the user's own mask data is "11" & "11"="11".

Therefore, here, the user's conditions data match and hence, the user's own obtaining conditions are satisfied.

The product of the user's own condition data and the mask data of the partner is "11" & "11"="11".

The product of the request data of the partner and the mask data of the partner is "11" & "11"="11".

Therefore, conditions data of the partner match and hence, the obtaining conditions of the partner are satisfied.

Specifically, in the data comparison of obtaining conditions on the side of user HG, the user's own obtaining conditions and the partner's obtaining conditions are both satisfied.

Between user HE who wishes to exchange data of course Q and user HG who has the data of course Q, the obtaining conditions data for data exchange are satisfied, and between user HG who wishes to exchange data of course P and user HE who has the data of course P, the obtaining conditions data for data exchange are satisfied. Therefore, data exchange is possible.

Again referring to FIG. 24, if it is determined at step S114 that the ID data does not match (NO at S114), determination is made as to whether there is any other application ID# in the ID list as the object of comparison (step S132).

If the filter size does not match at step S118 (NO at S118), the flow proceeds to step S132.

If the flag determination is not OK at step S122 (NO at step S122), the flow proceeds to step S132.

If the own obtaining conditions are not satisfied at step S126 (NO at step S126), the flow proceeds to step S132.

If the partner's obtaining conditions are not satisfied at step S128 (NO at step S128), the flow proceeds to step S132.

At step S132, if another application ID# exists in the ID list as the object of comparison (YES at step S132), the next application ID# is extracted from the ID list as the object of comparison (step S134). Then, the flow proceeds to step S112, and similar processes are repeated.

By way of example, an application ID#[1] of the second ID list DD8 is extracted and similar processes are executed, as shown in FIG. 16.

At step S132, if there is no other application ID# in the ID list as the object of comparison (NO at step S132), the flow proceeds to "I".

Specifically, until the determination conditions of the ID data and the obtaining conditions data are satisfied, application ID#s are extracted one by one from the reception wireless frame saved in reception wireless frame saving area 69 and the transmission wireless frame saved in transmission wireless frame saving area 67, and if conditions are not satisfied in every combination, the flow proceeds to step S82 of FIG. 19, and the processes described above are again repeated.

Here, an example will be described in which the second ID list DD8 of the transmission wireless frame (own machine 1) saved in transmission wireless frame saving area 67 and the second ID list DDp8 of the reception wireless frame (portable game machine 3) saved in reception wireless frame saving area 69 are extracted as the ID lists as the objects of comparison will be described. It is assumed that the second ID list DD8 and the second ID list DDp8 both hold (n+1) application ID#s.

In such a situation, consider that application ID#s are extracted one by one from each of the ID lists as the objects of comparison and every combination is compared. First, an application ID#[0]DD8-1 of the second ID list DD8 of the transmission wireless frame (own machine 1) is extracted, and an application ID#[0]DDp8-1 of the second ID list DDp8 included in the reception wireless frame (portable game machine) is extracted, and these are compared with each other. Thereafter, an application ID#[1]DDp8-2 of the second ID list DDp8 included in the reception wireless frame (portable game machine) is extracted and compared with application ID#[0]DD8-1 of the second ID list DD8 of the transmission wireless frame (own machine 1).

Next, application ID[#2], application ID#[3], . . . application ID#[n] of the second ID list DDp8 included the reception wireless frame (portable game machine) are extracted successively and compared with the application ID#[0]DD8-1 of the second ID list DD8 of the transmission wireless frame (own machine 1).

Thereafter, an application ID#[1]DD8-2 of the second ID list DD8 of the transmission wireless frame (own machine 1) is extracted, and an application ID#[0]DDp8-1 of the second ID list DDp8 of the reception wireless frame (portable game machine) is extracted, and these IDs are compared. Next, an application ID#[1]DDp8-2 of the second ID list DDp8 of the reception wireless frame (portable game machine) is extracted and compared with the application ID#[1]DD8-2 of the second ID list DD8 of the transmission wireless frame (own machine 1).

Next, application ID#[2], application ID#[3], . . . application ID#[n] of the second ID list DDp8 included the reception wireless frame (portable game machine) are extracted successively and compared with the application ID#[1]DD8-2 of the second ID list DD8 of the transmission wireless frame (own machine 1). This process is repeated in the similar manner for the application ID#[2], application ID#[3], . . . application ID#[n] of the second ID list DD8 of the transmission wireless frame (own machine 1).

Simply stated, from the ID lists as the objects of comparison, first, a first application ID# is extracted from the transmission wireless frame (own machine 1) and fixed, and application ID#s are successively extracted from the reception wireless frame (portable game machine) and compared. If the ID data or obtaining conditions data as determination conditions do not match, the next application ID# is extracted from the transmission wireless frame (own machine 1) and fixed, and application ID#s are successively extracted from the reception wireless frame (portable game machine) and compared. Such a process is repeated for a number of times corresponding to the number of application ID#s included in the ID list of the transmission wireless frame (own machine 1). If the last application ID# is extracted from the transmission wireless frame (own machine 1) and fixed, and application ID#s are successively extracted from the reception wireless frame (portable game machine) and compared and still the ID data or obtaining conditions data as determination conditions do not match, it is determined at step S132 that no application ID# exists in the ID list as the object of comparison (NO at step S132), and the flow proceeds to "I".

In the flow of FIG. 24, a method has been described in which flag data comparison (step S120) and the conditions data comparison (step S124) are executed in a manner not related to each other. If the transmission/reception conditions data of own machine 1 designates only the transmission communication as described with reference to FIG. 25, for example, reception of the exchange data from the partner is not desired. Therefore, the determination as to whether the user's own obtaining conditions are satisfied or not is unnecessary. On the contrary, if the transmission/reception conditions data of own machine 1 designates only the reception communication, transmission of the exchange data to the partner is not desired. Therefore, determination as to whether the obtaining conditions of the partner are satisfied or not is unnecessary. Therefore, the process of comparing and determining conditions data from step S124 to step S128 may be changed depending on the result of flag data comparison at step S120.

Though the ID list comparing process performed in accordance with the first and second algorithms when the algorithm identification information is "0" and "1", respectively, has been described, the manner of comparison is not limited to the above. For instance, a different piece of algorithm identification information (such as "2") may be provided, and the ID list comparing process in accordance with a different algorithm may be executed.

Though a format of obtaining conditions data including the mask data has been described here, the format may consist of the condition data and the request data. In such a case, in the comparison of conditions data, whether the user's own obtaining conditions and the partner's obtaining conditions are satisfied or not may be determined by comparing the user's own condition data with the request data of the partner and by comparing the user's own request data with the condition data of the partner.

With reference FIG. 31, a concept of comparing the application IDs in accordance with an embodiment of the present invention will be described.

FIG. 31 shows situations of game machines 1 and 3 similar to the example of FIG. 17. In application ID saving area 68 of RAM 66 of wireless communication module 38, application IDs "A, B, C1, C2 and D" are stored. In application ID saving area 68P of wireless communication module 38P of game machine 3, application IDs "B and E" are stored.

As described above, based on the data stored in application ID saving area 68, the transmission wireless frame for transmission is set, and by the comparison with application ID included in the reception wireless frame for reception, whether or not the match flag is on is determined.

Here, the match flag is ON for the application ID "B".

Figure 32:
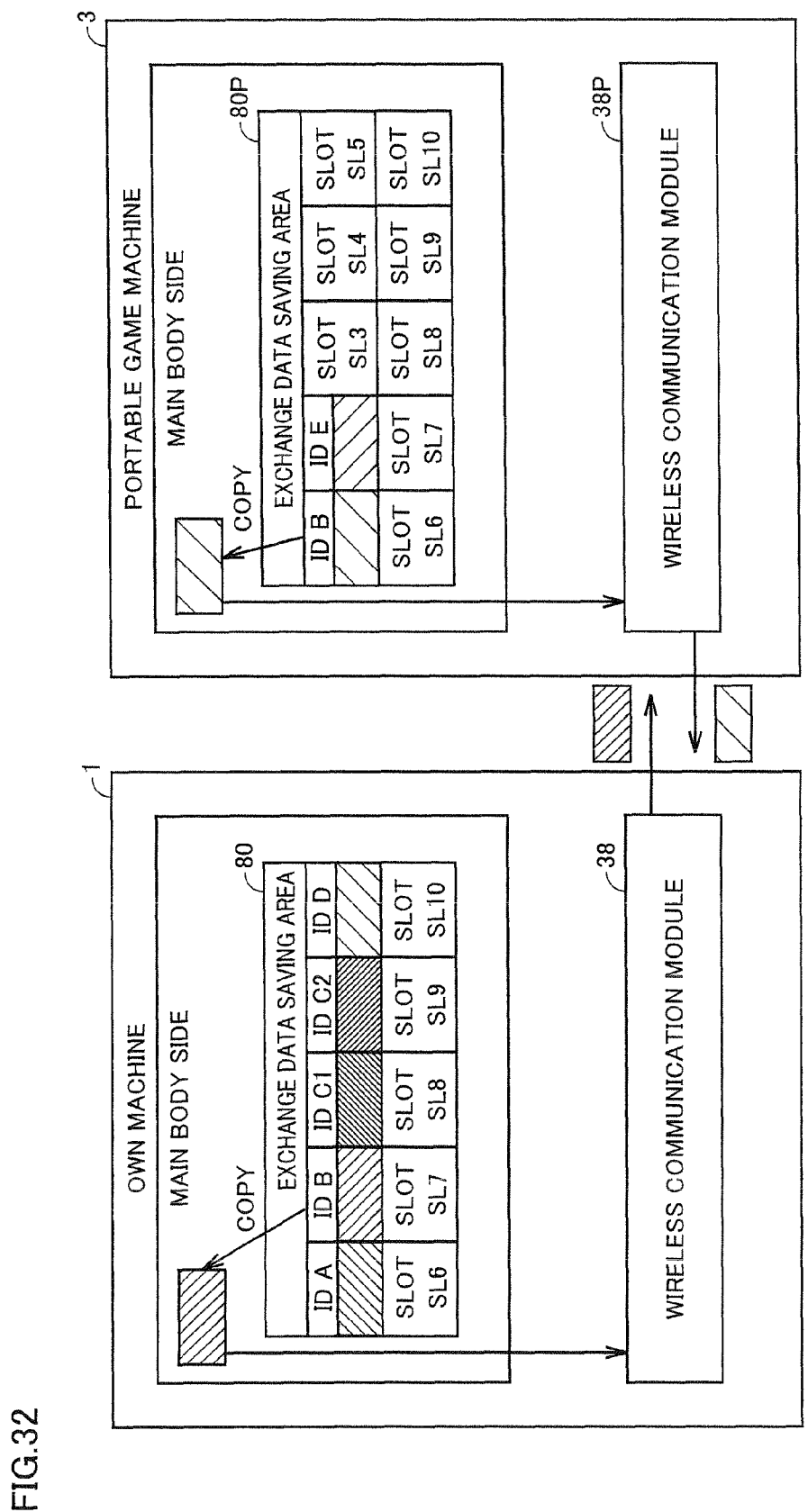
FIG. 32 is a (first) illustration representing a process for exchanging exchange data between game machines in accordance with an embodiment of the present invention.
Figure 34:
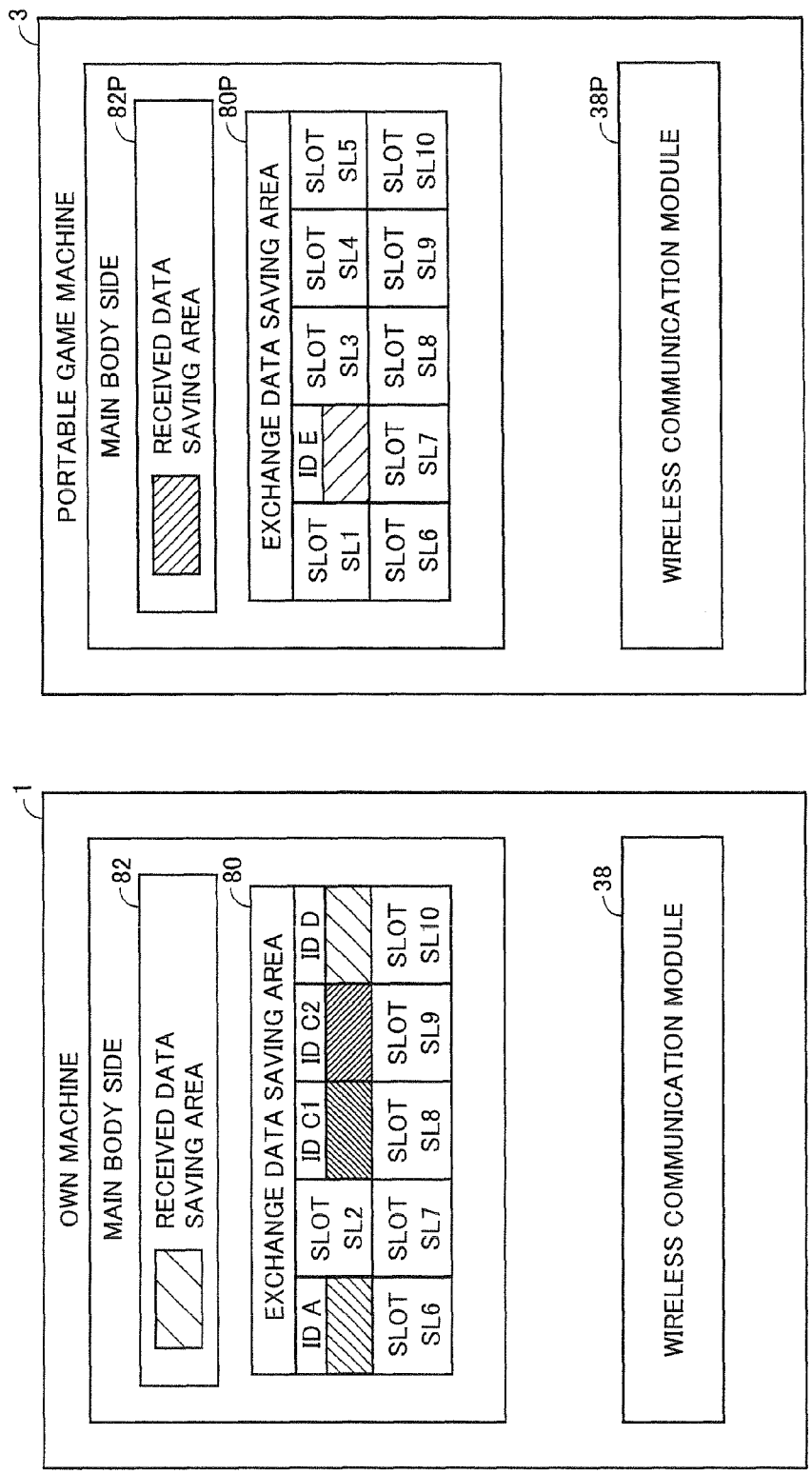
FIG. 34 is a (third) illustration representing a process for exchanging exchange data between game machines in accordance with an embodiment of the present invention.

With reference to FIGS. 32 to 34, the process for exchanging exchange data between the game machines in accordance with the present embodiment will be described.

In this example, execution of the process for giving/receiving exchange data between game machine 1 and game machine 3 as another game machine and a communication partner, will be described.

As described above, receiving a notice from wireless communication module 38 that another game machine having the exchange data corresponding to the matching application ID has been found, CPU 31 (data communication executing unit 208) executes the process for giving/receiving data.

Referring to FIG. 32, first, data is read from a slot (exchange data saving area 80) storing the exchange data corresponding to the matching application ID, and copied. By way of example, copy data is formed in main memory 32. Then, the copy data is transmitted to game machine 3 through wireless communication module 38.

In game machine 3 also, a notice that another game machine having the exchange data corresponding to the matching application ID has been found is output from wireless communication module 38P to the main body, as in game machine 1.

Then, on the main body side, data is read from a slot (exchange data saving area 80) storing the exchange data corresponding to the matching application ID, and copied. The copy data is transmitted to game machine 1 through wireless communication module 38P.

Referring to FIG. 33, game machine 1 obtains the exchange data transmitted from game machine 3 through wireless communication module 38, and stores, together with the application ID, in received data saving area 82.

Similarly, game machine 3 obtains the exchange data transmitted from game machine 1 through wireless communication module 38P, and stores, together with the application ID, in received data saving area 82P.

Then, referring to FIG. 34, the data in the slot that has stored the exchange data in exchange data saving area 80 of game machine 1 is erased. In the present example, data in the area corresponding to slot SL2 of exchange data saving area 80 is erased.

Similarly, the data in the slot that has stored the exchange data in exchange data saving area 80P of game machine 3 is erased. In the present example, data in the area corresponding to slot SL1 of exchange data saving area 80P is erased.

By this process, the exchange data that has been transmitted to the communication partner is erased, and hence, the exchange data exchanging process is completed.

As will be described later, erasure of exchange data is carried out as the data in the exchange data saving area is erased when the application using the exchange data that has been stored in the slot is activated and the application is executed.

Though the exchange data is erased in the present example, the exchange data may not be erased but maintained as it is. In that case, what takes place is not an exchange data exchanging process but giving/receiving of replicated data.

Though an example in which one exchange data corresponding to matching application ID is subjected to the exchange process is described here, what is exchanged is not limited to one exchange data. If a plurality of exchange data exist corresponding to the matching application ID, similar process is carried out for each exchange data.

Figure 35:
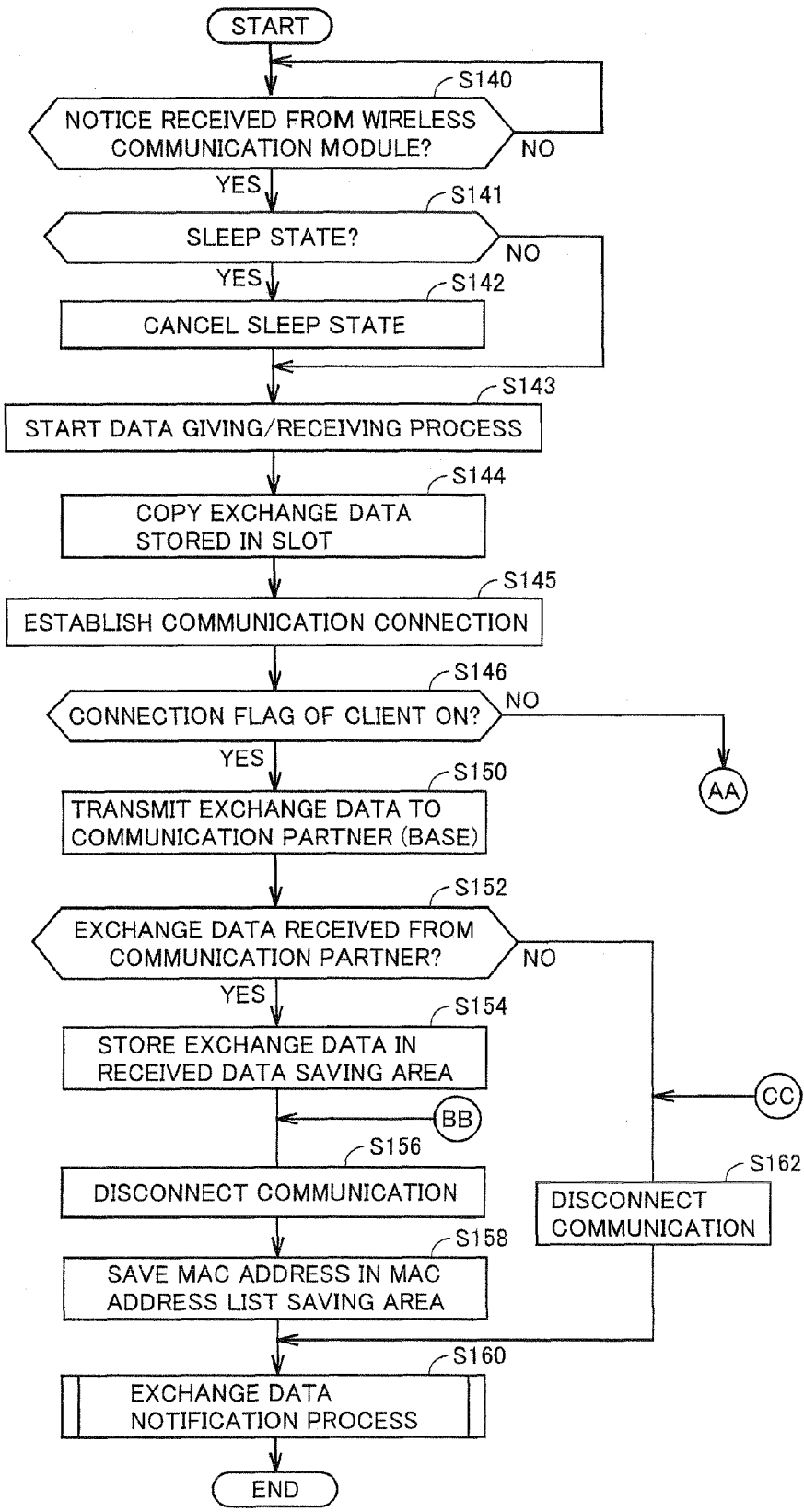
FIG. 35 is a (first) flowchart of an exchange data giving/receiving process.
Figure 36:
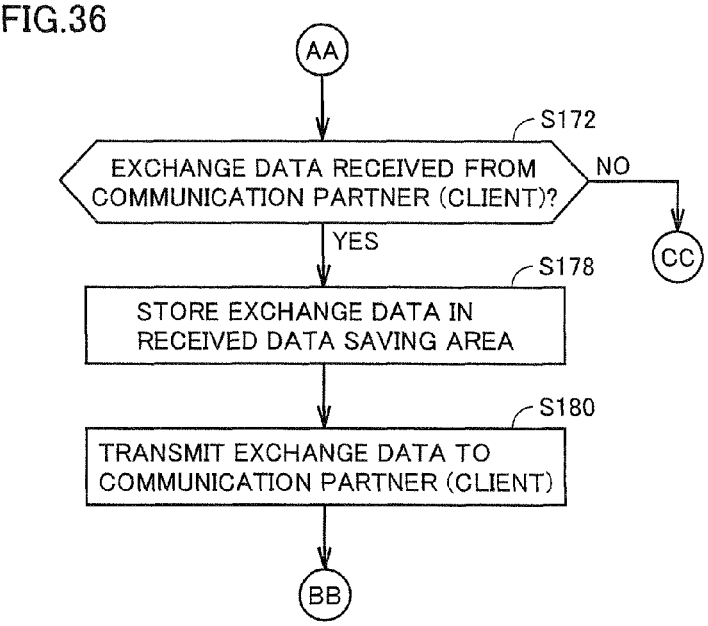
FIG. 36 is a (second) flowchart of an exchange data giving/receiving process.

Referring to FIGS. 35 and 36, the process flow of giving/receiving data as above will be described. The data giving/receiving process is realized by CPU 31 executing a main body function program stored in system program saving area 86 mentioned above. The data giving/receiving process starts, for example, when the main body is activated, and it is continuously executed on the background.

Referring to FIG. 35, first, CPU 31 (sleep setting/canceling unit 216) determines whether or not there is any notice from wireless communication module 38 (step S140).

If it is determined at step S140 that a notice has been received from wireless communication module 38 (YES at step S140), CPU 31 (sleep setting/canceling unit 216) determines whether or not the function of the main body side is in the sleep state (step S141).

If it is determined that the function of the main body side is in the sleep state (YES at step S141), CPU 31 (sleep setting/canceling unit 216) cancels the sleep state (step S142).

Thereafter, CPU 31 (data communication executing unit 208) starts the process of giving/receiving data (step S143). If it is determined that the function on the main body side is not in the sleep state (NO at step S141), the flow proceeds to step S143.

First, CPU 31 (data communication executing unit 208) copies the exchange data corresponding to the matching application ID stored in a slot, from exchange data saving area 80 (step S144). Specifically, as described with reference to FIG. 32, CPU 31 (data communication executing unit 208) forms copy data in main memory 32.

Next, based on connection information such as MAC address of the communication partner included in the notice that a game machine having the exchange data has been found transmitted from wireless communication module 38, CPU 31 (data communication executing unit 208) establishes communication connection with the communication partner (step S145). Here, an example in which connection with the communication partner is established after receiving the notice that a game machine is found is described, that is, an example in which connection is executed by CPU 31 (data communication executing unit 208), is described. It is also possible to execute the process for establishing connection with the communication partner before receiving the notice that a game machine is found, for example, between steps S64 and S66 of FIG. 14, by wireless communication module 38.

Of the two game machines executing the process for giving/receiving data, one serves as a base and one as a client. Here, it is assumed that a game machine as a client, which issued the connection request signal, outputs the exchange data to the game machine as the base. Here, description will be given assuming that game machine 1 is a client.

Next, CPU 31 (data communication executing unit 208) determines whether or not a connection flag of a client is on, to determine whether the own machine is a base or a client (step S146). Setting of the connection flag will be described later.

If the connection flag of a client is on, that is, if it is determined that the own machine is a client (YES at step S146), it transmits the exchange data to the communication partner (base) (step S150).

If the connection flag as a client is not on, that is, if it is determined that the own machine is a base (NO at step S146), the flow proceeds to "AA". The process steps after "AA" are processes on the base side, which will be described later.

Next, CPU 31 determines whether or not the exchange data has been received within a prescribed time period from the communication partner (base) (step S152).

If it is determined at step S152 that the exchange data has been received within the prescribed time period (YES at step S152), CPU 31 (data communication executing unit 208) stores the exchange data in received data saving area 82 (step S154). Specifically, as described with reference to FIG. 33, the exchange data received through wireless communication module 38 is stored together with the application identification information (ID) in received data saving area 82.

Next, CPU 31 (data communication executing unit 208) disconnects the communication with the communication partner (base) (step S160). Specifically, by the process described above, the process for giving/receiving exchange data with the communication partner ends.

Next, CPU 31 (machine identifying information registration unit 210) stores the MAC address identifying the communication partner in MAC address list saving area 88 provided in saving data memory 34 (step S158). The MAC address saved in MAC address list saving area 88 comes to be included as a part of the MAC address list, and used in the communication initializing process described above.

Here, an example is described in which CPU 31 (machine identification information registration unit 210) saves (registers) the MAC address identifying the communication partner in the MAC address list saving area 88 provided in saving data memory 34, on condition that the process for giving/receiving the exchange data (communication process) has been executed with the communication partner (registration condition). It is noted, however, that the conditions for registering the MAC address is not limited only to the process for giving/receiving the exchange data. The MAC address may be registered when the process for giving/receiving the exchange data is executed and, in addition, a process for determining other conditions may be executed, and the MAC address may be registered if it is determined that such additional conditions are satisfied.

Since the MAC address list is saved in MAC address list saving area 70 by the communication setting process, it becomes possible, by the MAC address filtering process, to prevent accumulative communication with the same game machine. Thus, highly efficient and effective data communication can be executed.

In the present example, the MAC address list stored in MAC address list saving area 88 provided in saving memory 34 on the main body side and the MAC address list stored in MAC address list saving area 70 of wireless communication module 38 are the same, and the method described above may be realized using only the MAC address list saving area 70.

On the other hand, by providing MAC address saving area 88 in saving memory 34 on the main body side and saving the MAC address in MAC address saving area 88, it becomes possible to facilitate edition of MAC address data such as addition or deletion, than data edition in MAC address saving area 70 that requires an access to wireless communication module 38.

Next, CPU 31 (data notifying unit 212) executes a data notification process (step S164). The data notification process will be described later. Then, the process ends (END).

If it is determined at step S152 that CPU 31 (data communication executing unit 208) has not received the exchange data from the communication partner (base) within the prescribed time period (NO at step S152), the control proceeds to step S162.

At step S162, CPU 31 (data communication executing unit 208) disconnects the communication with the communication partner (base). Then, the flow proceeds to step S160. Here, since the exchange data could not appropriately be obtained, the communication is disconnected without saving the MAC address in MAC address list saving area 70. Therefore, it is possible to again execute the process described above in accordance with communication between portable terminals, to resume the process for giving/receiving the exchange data.

Next, the process on the base side will be described.

Here, a process when game machine 3 serves as a base will be described.

On the base side, the process steps S140 to S144 described with reference to FIG. 35 are the same as the client side process.

Referring to FIG. 36, if the connection flag of a client is not on, that is, connection flag as a base is on and it is determined that the own machine is a base (NO at step S146), CPU 31 (data communication executing unit 208) determines whether or not the exchange data has been received within a prescribed time period from the communication partner (client) (step S172).

Next, if it is determined at step S172 that the exchange data has been received within the prescribed time period from the communication partner (client) (YES at step S172), the exchange data is stored together with the application ID in received data saving area 82 (step S178).

Next, CPU 31 (data communication executing unit 208) transmits the exchange data to the communication partner (client) (step S180).

Next, the flow proceeds to "BB". Specifically, the flow proceeds to step S156 of FIG. 35. The following process steps are the same as described above.

If it is determined at step S172 that the exchange data has not been received within the prescribed time period from the communication partner (client) (NO at S172), CPU 31 (data communication executing unit 208) next proceeds to "CC". Specifically, the flow proceeds to step S162 of FIG. 35.

Though the process of giving/receiving the exchange data has been described here, if the application ID includes the transmission/reception conditions data, for example if the transmission conditions only are included as the transmission/reception conditions data, the process from step S152 to S154 may be skipped. Specifically, the communication with the communication partner is disconnected without executing the reception of exchange data from the communication partner. If the reception communication only is included as the transmission/reception conditions data, the process of step S150, that is, the process for transmitting the exchange data to the communication partner is skipped. Specifically, CPU 31 (data communication executing unit 208) may change the process for giving/receiving the exchange data in accordance with the transmission/reception conditions data included in the application ID.

Here, an example has been described in which when the exchange data is saved in received data saving area 82, that is, when the process for giving/receiving the exchange data (communication process) is executed with the communication partner, CPU 31 (machine identification information registration unit 210) saves the MAC address for identifying the communication partner, for example, in MAC address saving area 88 provided in saving data memory 34. The order of processing, however, is not specifically limited, and the MAC address for identifying the communication partner may be saved after the sleep state is canceled at step S142, before starting the process for giving/receiving data.

Specifically, in such a configuration, when a notice is sent from wireless communication module 38 to the main body, that is, when the sleep state is cancelled if the main body has been in the sleeping state, the MAC address of the game machine that canceled the sleep state is saved by machine identification information registration unit 210 in MAC address list saving area 88. By such a process, communication is not performed with a communication partner of which notice is once given to the main body, that is, the communication partner that canceled the sleep state if it had been in the sleep state. Therefore, efficient data communication is possible.

With this configuration, here, CPU 31 (machine identification information registration unit 210) saves (registers) the MAC address for identifying the communication partner in MAC address saving area 88 provided in saving data memory 34, on condition that a notice has been received by the main body portion, that is, in the main body that has been in the sleeping state, the sleep state was canceled (registration conditions). It is noted, however, that the conditions for registering the MAC address are not limited only to the notice being received by the main body, or cancellation of the sleep state of the main body that has been in the sleeping state. The MAC address may be registered when the sleep state is canceled and, in addition, a process for determining other conditions may be executed, and the MAC address may be registered if it is determined that such additional conditions are satisfied.

<Data Notification Process>

Figure 37:
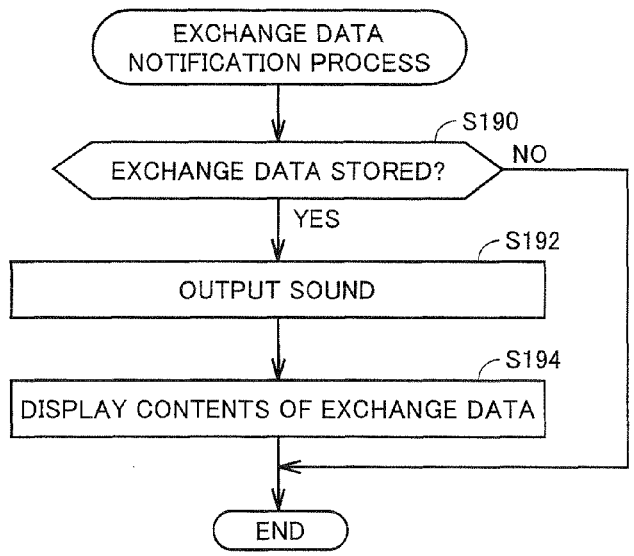
FIG. 37 represents an exchange data notification process in accordance with an embodiment of the present invention.

Referring to FIG. 37, the data notification process in accordance with an embodiment of the present invention will be described. The data notification process is realized, for example, by CPU 31 executing a system program stored in system program saving area 86 mentioned above.

Referring to FIG. 37, CPU 31 (data notifying unit 212) determines whether or not the exchange data is stored in received data saving area 82 (step S190).

Then, if it is determined that the exchange data has been stored in received data saving area 82 (YES at step S190), CPU 31 (data notifying unit 212) outputs a sound effect (step S192). Specifically, CPU 31 (data notifying unit 212) instructs output of a sound prepared in advance from speaker 45 described with reference to FIG. 2. Then, CPU 31 (data notifying unit 212) displays the contents of exchanged data (step S194). Specifically, CPU 31 (data notifying unit 212) instructs LCD 12 to output a display indicating presence of the exchange data. Then, the process ends (END).

By the output of sound effect from speaker 45 and the display on LCD 12, the user can recognize that the exchange data is stored.

That the exchange of exchange data is done is notified to the user by audio and visual notification using the sound effect from speaker 45 and the display on LCD 12 in the present example. Either one of these may be sufficient. Alternatively, exchange of exchange data may be notified to the user by sense of touch, by vibrating the game machine utilizing the vibration function.

As the exchange data is stored, it is assumed that the user activates the application that can use the exchange data. When the application is activated, the exchange data that has been stored in the exchange data saving area is erased.

<Exchange Data Adding and Erasing Process>

Figure 38:
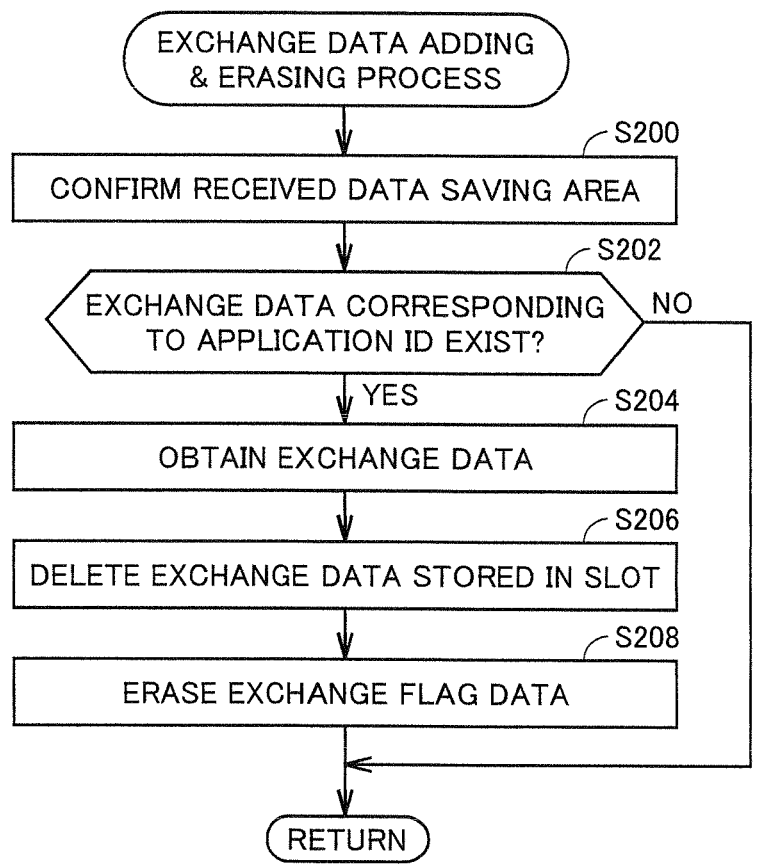
FIG. 38 is a flowchart representing the exchange data adding and erasing process in accordance with an embodiment.

Referring to FIG. 38, the process for adding and erasing exchange data in accordance with an embodiment will be described. Specifically, the process at step S22 of FIG. 8 will be described.

By way of example, the process for adding and erasing the exchange data is realized by CPU 31 executing an application program stored in ROM 27 of memory card 26.

Referring to FIG. 38, first, CPU 31 (exchange data adding and erasing unit 214) checks the received data saving area 82 (step S200).

Then, CPU 31 (exchange data adding and erasing unit 214) determines whether or not the exchange data that corresponds to the application ID of the application that is being executed with the data loaded exists in received data saving area 82 (step S202).

Next, if it is determined that the exchange data corresponding to the application ID exists in received data saving area 82, CPU 31 (exchange data adding and erasing unit 214) obtains the exchange data (step S204).

By these process steps, it becomes possible to execute the application using the obtained exchange data.

Here, the obtained exchange data may be transferred and saved as save data, in a save area (back-up RAM) of its own. Further, with this operation, the exchange data in received data saving area 82 may be erased.

Here, an example is described in which whether or not the exchange data exists in received data saving area 82 is determined, and if it exists in received data saving area 82, the exchange data is obtained. At this time, the fact that the exchange data has been obtained (more preferably, contents of the obtained exchange data) may be presented to the user. Further, it is possible to urge the user to select whether or not the exchange data is to be used.

Next, CPU 31 (exchange data adding and erasing unit 214) deletes the exchange data that corresponds to the application ID stored in the slot (step S206).

Here, the exchange data stored as save data in the save area (back-up RAM) of its own may be deleted.

By this process, the exchange data corresponding to the application ID that has been stored in the slot of exchange data saving area 80 is deleted and, thus, the process for giving/receiving the exchange data is completed.

Next, as the exchange data that has been stored in exchange data saving area 80 is deleted, CPU 31 (exchange data adding and erasing unit 214) erases the exchange flag data that has been stored in back-up RAM 28 (step S208).

Then, the process ends (RETURN).

Then, the flow proceeds to step S4, as described with reference to FIG. 8.

Here, an example has been described in which at the time of activating the application, the received data saving area 82 is checked based on presence/absence of the exchange flag data, and if the exchange data exists, the exchange data stored in the received data saving area 82 is obtained and the exchange data stored in exchange data saving area 80 is deleted. It is also possible to delete the exchange data stored in exchange data saving area 80 even if the application is not activated. By way of example, in response to CPU 31 storing exchange data from another game machine in received data saving area 82, an instruction may be issued to delete the exchange data stored in exchange data saving area 80.

Though an example has been described in which the exchange data corresponding to the application ID stored in the slot of exchange data saving area 80 is erased, the exchange data may not be erased but maintained as it is. In that case, what takes place is not an exchange data exchanging process but giving/receiving of replicated data. By way of example, if the transmission/reception conditions data are included in the application ID as described above, and only the reception communication is included as the transmission/reception conditions data, the exchange data may not be erased but maintained as it is.

<Communication Partner Search Process>

Referring to FIGS. 39 to 42, the communication partner search process at step S52 (FIG. 14) mentioned above will be described.

In this process, game machine 1 as a base or a client executes exchange partner searching process, searching for a communicable partner, with other game machines.

Game machine 1 transmits a connection request signal as the transmission wireless frame described above, to unidentified addresses, to search for another game machine existing in communication range 10 (though a method of periodically and repeatedly transmit the connection request signal will be described in the present example, a so-called probe request method may be used).

In this example, it is assumed that the game machine as a client transmits the connection request as the transmission wireless frame. The game machine as the base waits until the connection request signal as the transmission wireless frame transmitted from the client side (that is, reception wireless frame) is received. If the signal is received, in response, it transmits a connection response signal as the transmission wireless frame of the base, to the game machine as the client.

By the transmission/reception of the connection request signal and the connection response signal, data communication between the game machines as the base and client becomes possible. Though an example in which the connection request signal is transmitted from the game machine as a client and the connection response signal is transmitted by the game machine as a base is described here, the relation between the base and client may be reversed.

In the communication partner search process, each game machine 1 alternately repeats the process of operating as a base to receive the search from a client, and the process of operating as a client to search for a base.

Specifically, using a prescribed time period (Tcycle of FIG. 39) as one period, part of each period is used as a period for a client operation (Tsp in FIG. 39) and remaining part is used as a period for a base operation (Tsc). Here, connection is possible between a game machine operating as a client and a game machine operating as a base, while connection is impossible between a game machine operating as a client and another game machine operating as a client, and between a game machine operating as a base and another game machine operating as a base.

Therefore, if the period for operating as a client and the period for operating as a base are fixed, data communication is impossible between game machines that happen to have the periods fixed in matching manner.

In order to prevent such a problem, the ratio or arrangement of the period for operating as a client and the period for operating as a base is set to be changed at random.

Figure 39A:
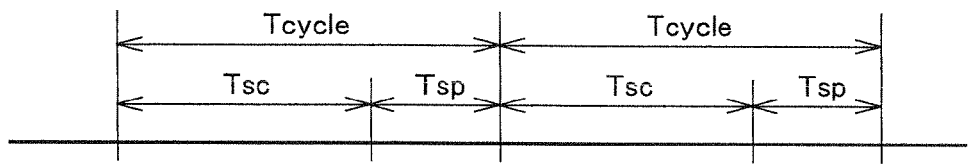
FIGS. 39A and 39B illustrate a communication partner search process.
Figure 39B:
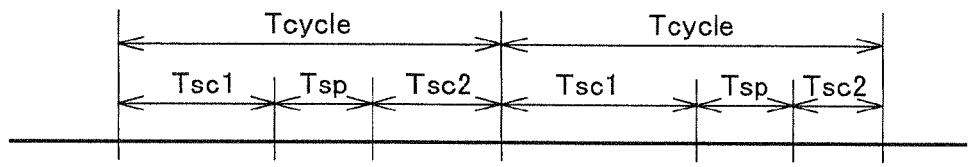

A method of changing the ratio at random corresponds to "communication partner search process (1)" shown in FIG. 39(A), and a method of changing the arrangement at random corresponds to "communication partner search process (2)" shown in FIG. 39(B).

Referring to FIG. 39(A), in communication partner search process (1), the ratio of Tsp and Tsc is determined at random. The time period of this process is determined to be a fixed value of Tcycle (for example, 4 seconds), the length of Tsc is determined to be a random value of 0 to Tcycle, and the length of Tsp is determined to be (Tcycle Tsc). Further, Tsc and Tsp are set in this order in Tcycle. Since the length of Tsc is determined at random every time, the length of Tsp is also determined at random. Thus, the situation in which data communication cannot be executed with another game machine existing in communication range 10 can be avoided. If the time period Tsp becomes too short, it becomes difficult to accurately search for another game machine, preventing execution of data communication with another game machine. Therefore, it may be preferable to set a minimum period of Tsp and if such period cannot be ensured, the value Tsc may be determined again.

Though Tsc and Tsp are determined in this order to set Tcycle here, it may be set with the order reversed.

Referring to FIG. 39(B), in communication partner search process (2), arrangement of Tsp and Tsc is determined at random, as described above. In other words, the length of Tsp is fixed, and the position of starting Tsp in Tcycle is set at random. Specifically, as shown in FIG. 39(B), in communication partner search process (2), Tcycle (here, a fixed value set to 4 seconds) includes Tsp determined to be a fixed value, and Tsc1 and Tsc2 determined at random and provided before and after Tsp. Specifically, in Tcycle, Tsc1, Tsp and Tsc2 are provided in this order. Further, the length of Tsc1 is determined at random between 0 to (Tcycle-Tsp), and the length of Tsc2 is determined by subtracting the randomly determined Tsc1 and Tsp from Tcycle.

Though the start position of Tsp is set at random as Tsc and Tsp are determined in this order to set Tcycle here, the start position of Tsc may be set at random if Tcycle is set with Tsp and Tsc determined in this order.

In communication partner search process (1) or (2), in the time period Tsp, game machine 1 repeats the process of transmitting the connection request signal including the exchange determination data to unspecified addresses and thereafter trying to receive the connection response signal including the exchange determination data transmitted from another game machine 3. In the time period Tsc, game machine 1 repeats the process of trying to receive the connection request signal transmitted from another game machine and if the signal is successfully received, transmitting a connection response signal.

Further, in order to prevent wasteful power consumption, game machine 1 is adapted to transmit the connection request signal including the exchange determination signal at every prescribed period (in this example, 64 ms), while it is operating as a client. Specifically, data transmission is done intermittently.

In the following, communication partner search process (1) and communication partner search process (2) will be described in detail with reference to flowcharts, respectively.

Figure 40:
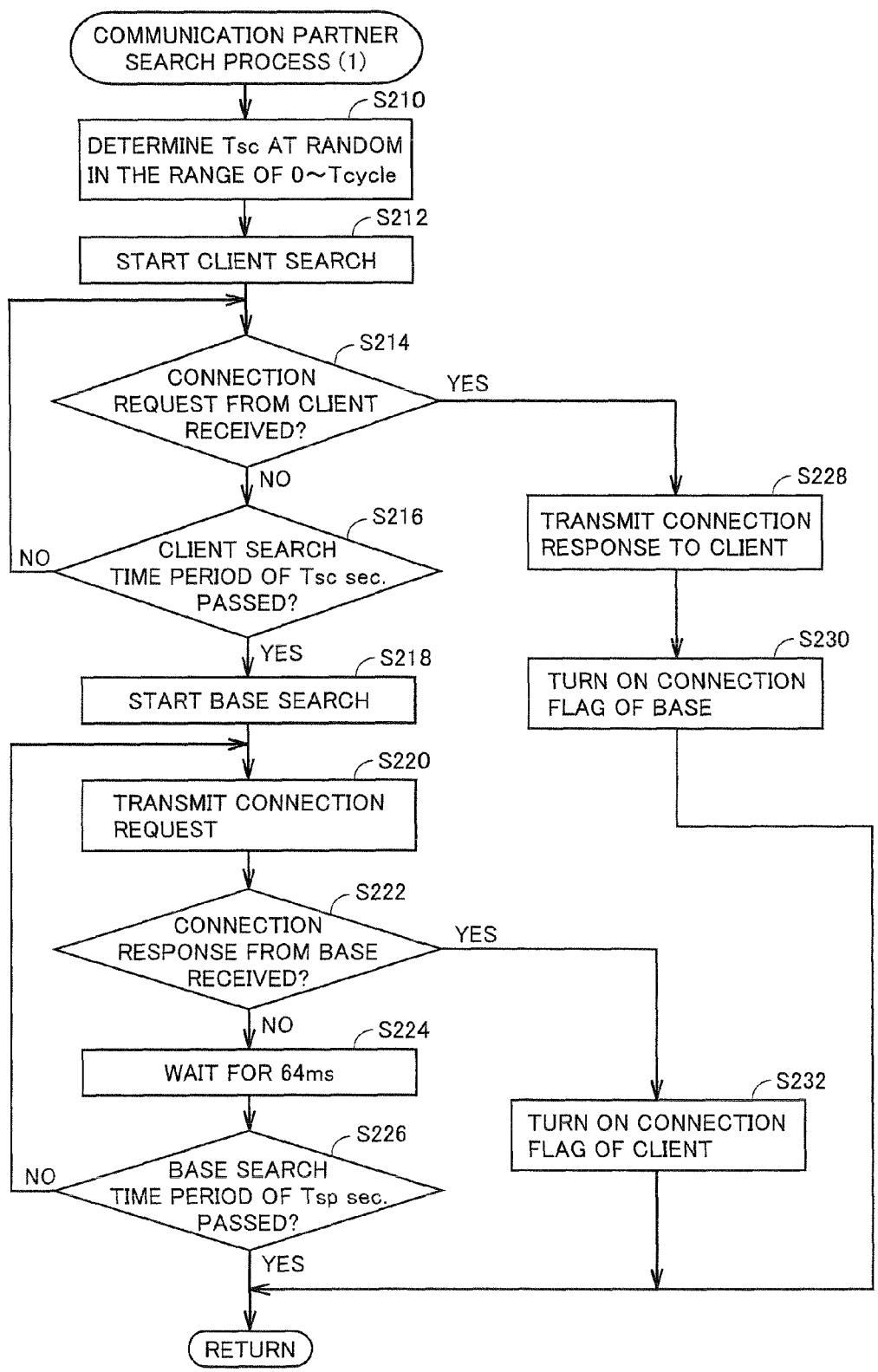
FIG. 40 is a flowchart representing a communication partner search process (1).

FIG. 40 is a flowchart representing communication partner search process (1).

Referring to FIG. 40, when communication partner search process (1) starts, at step S210, Tsc is determined at random between 0 to Tcycle. Though not shown, since Tcycle is a fixed value, when Tsc is determined, Tsp is also determined.

Following steps S212 to S216, S228 and S230 are the process steps executed in Tsc mentioned above, in which the game machine operates as a base and searches for a client, Steps S218 to S226 and S232 are the process steps executed in Tsp mentioned above, in which the game machine operates as a client and searches for a base.

At step S212, searching for a client starts. Though not shown, a timer circuit starts here. Next, at step S214, whether or not the connection request signal as the transmission wireless frame transmitted from the client (that is, a reception wireless frame) has been received is determined.

If the connection request signal as the transmission wireless frame transmitted from the client (that is, the reception wireless frame) is received (YES at step S214), at step S228, a connection response signal as a transmission wireless frame is transmitted to the client and, at step S230, a connection flag as a base is turned on and the communication partner search process (1) returns. Specifically, it is made clear that the game machine is capable of communication connection as a base to another game machine.

Though not shown in FIG. 40, when communication partner search process (I) starts, the connection flag as a client is turned off (reset) (the same applies to the connection flag as a base, as will be described later).

If a connection request signal is not received from any client (NO at S214), at step S216, whether or not the time period of Tsc seconds as the client search time period, that is, the period in which the game machine is a base and connection from another game machine is tried, has passed is determined.

If the client search time period Tsc has not been expired at step S216 (NO at S216), the flow directly returns to step S214.

If the client search time period of Tsc seconds has passed (YES at step S216), searching for a base starts at step S218, that is, the timer circuit is reset and started, and at step S220, the connection request signal as the transmission wireless frame is transmitted to unspecified addresses.

Next, at step S222, whether or not the connection response signal as the transmission wireless frame transmitted from the base (that is, the reception wireless frame) has been received is determined. If the connection response signal as the transmission wireless frame transmitted from the base (that is, the reception wireless frame) is received (YES at step S222), at step S232, the connection flag as a client is turned on, and communication partner search process (1) is returned. Specifically, it is made clear that the game machine is capable of communication connection as a client to another game machine.

If the connection response signal as the transmission wireless frame transmitted from the base (that is, the reception wireless frame) is not received (NO at step S222), at step S224, the control waits for 64 ms, and at step S226, whether or not the time period of Tsp seconds, that is, base search time period in which the game machine as a client tries to connect to another game machine, has passed is determined.

If the base search time period of Tsp seconds has not yet passed (NO at step S226), the flow directly returns to step S220.

If the base search time period of Tsp seconds has passed (YES at step S226), it is determined that the time period Tcycle has passed, and communication partner search process (1) is returned.

Since the flow waits for 64 ms at step S226, the process of repeating transmission of the connection request signal as the transmission wireless frame to unspecified addresses at step S220 comes to be done intermittently, whereby power consumption can be reduced.

Figure 41:
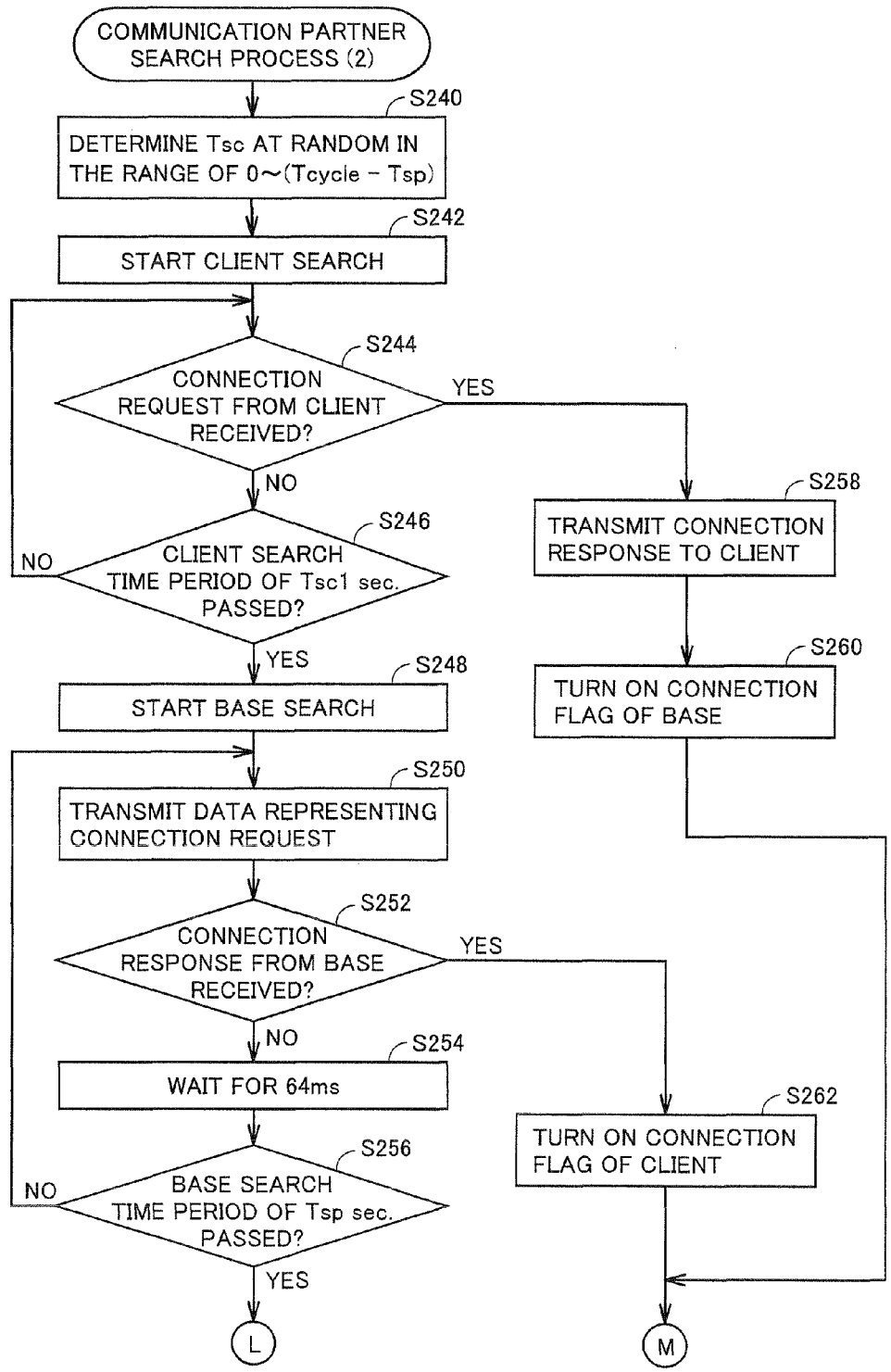
FIG. 41 is a (first) flowchart representing a communication partner search process (2).
Figure 42:
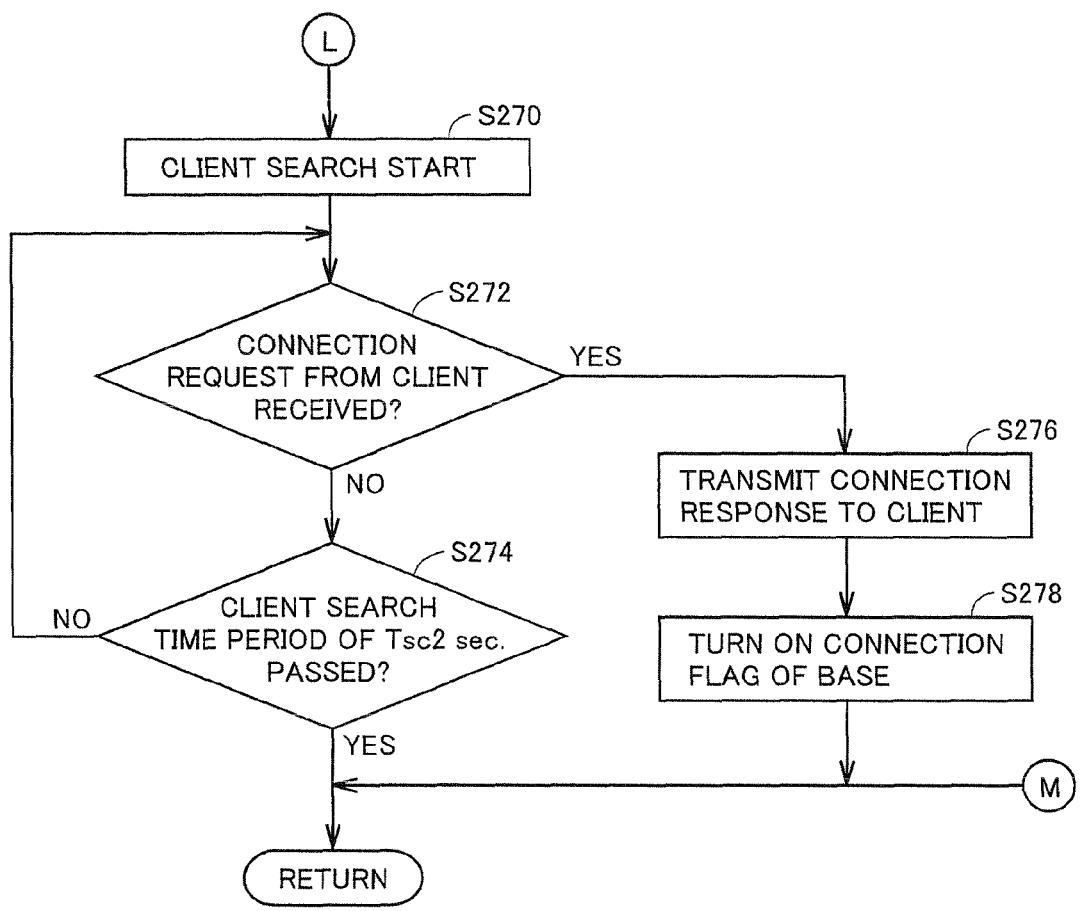
FIG. 42 is a (second) flowchart representing a communication partner search process (2).

FIGS. 41 and 42 are flowcharts representing communication partner search process (2).

Referring to FIG. 41, when communication partner search process (2) starts, at step S240, Tsc1 is determined at random in a range from 0 to (Tcycle-Tsp). As described above, in communication partner search process (2), Tcycle and Tsp are fixed values and, therefore, when Tsc1 is determined, Tsc2 is also determined.

Following step S242 to S246, S258 and S260 are the process steps executed in Tsc1 mentioned above, in which the game machine operates as a base and searches for a client. Steps S248 to 256 and S262 are the process steps executed in Tsp mentioned above, in which the game machine operates as a client and searches for a base. Further, steps S270 to S274, S276 and S278 are the process steps executed in Tsc2 mentioned above, in which the game machine operates as a base and searches for a client.

At step S242, searching for a client starts. Though not shown, a timer circuit starts here. Next, at step S244, whether or not the connection request signal as the transmission wireless frame transmitted from the client (that is, the reception wireless frame) has been received from a client is determined.

If the connection request signal as the transmission wireless frame transmitted from the client (that is, the reception wireless frame) is received (YES at step S244), at step S258, a connection response signal as the transmission wireless frame is transmitted from the base to the client and, thereafter, at step S260, connection flag as a base is turned on and the communication partner search process (2) returns. Specifically, it is made clear that the game machine is capable of communication connection as a base to another game machine.

Though not shown in FIG. 41, as in communication partner search process (1), when communication partner search process (2) starts, the connection flag as a client and the connection flag as a base are turned off.

If a connection request signal as the transmission wireless frame (that is, the reception wireless frame) is not received from any client (NO at step S244), at step S246, whether or not the period of Tsc1 seconds as the client search time period, that is, the period in which the game machine is a base and connection from another game machine is tried, has passed is determined.

If the client search time period of Tsc1 seconds has not been expired at step S193 (NO at step S246), the flow directly returns to step S244.

If the client search time period of Tsc1 seconds has passed (YES at step S246), searching for a base starts at step S248, that is, the timer circuit is reset and started, and at step S250, the connection request signal as the transmission wireless frame is transmitted to unspecified addresses.

Next, at step S252, whether or not the connection response signal as the transmission wireless frame transmitted from the base (that is, the reception wireless frame) has been received or not is determined. If the connection response signal as the transmission wireless frame transmitted from the base (that is, the reception wireless frame) is received (YES at step S252), at step S262, the connection flag as a client is turned on, and communication partner search process (2) is returned. Specifically, it is made clear that the game machine is capable of communication connection as a client to another game machine.

If the connection response signal as the transmission wireless frame transmitted from the base (that is, the reception wireless frame) is not received (NO at step S252), at step S254, the control waits for 64 ms, and at step S256, whether or not the period of Tsp seconds as the base search time period, in which the game machine as a client tries to connect to another game machine has passed, is determined.

If the base search time period of Tsp seconds has not yet passed (NO at step S256), the flow directly returns to step S250.

If the base search time period of Tsp seconds has passed (YES at step S256), searching of a client starts at step S270 shown in FIG. 42. At this time, the timer circuit is reset and started.

Next, at step S272, whether or not the connection request signal as the transmission wireless frame transmitted from the client (that is, the reception wireless frame) is received or not is determined.

If the connection request signal as the transmission wireless frame transmitted from the client (that is, the reception wireless frame) is received (YES at step S272), at step S276, a connection response signal is transmitted to the client, and at step S278, a connection flag as a base is turned on and communication partner search process (2) is returned.

If the connection request signal it not received from any client (NO at step S272), at step S274, whether or not the period of Tsc2 seconds as the client search time period has passed is determined.

If the client search time period of Tsc2 seconds has not yet passed (NO at step S274), the flow directly returns to step S272.

If the client search time period of Tsc2 seconds has passed (YES at step S274), it is determined that the period of Tcycle has passed, and communication partner search process (2) is returned.

Figure 43:
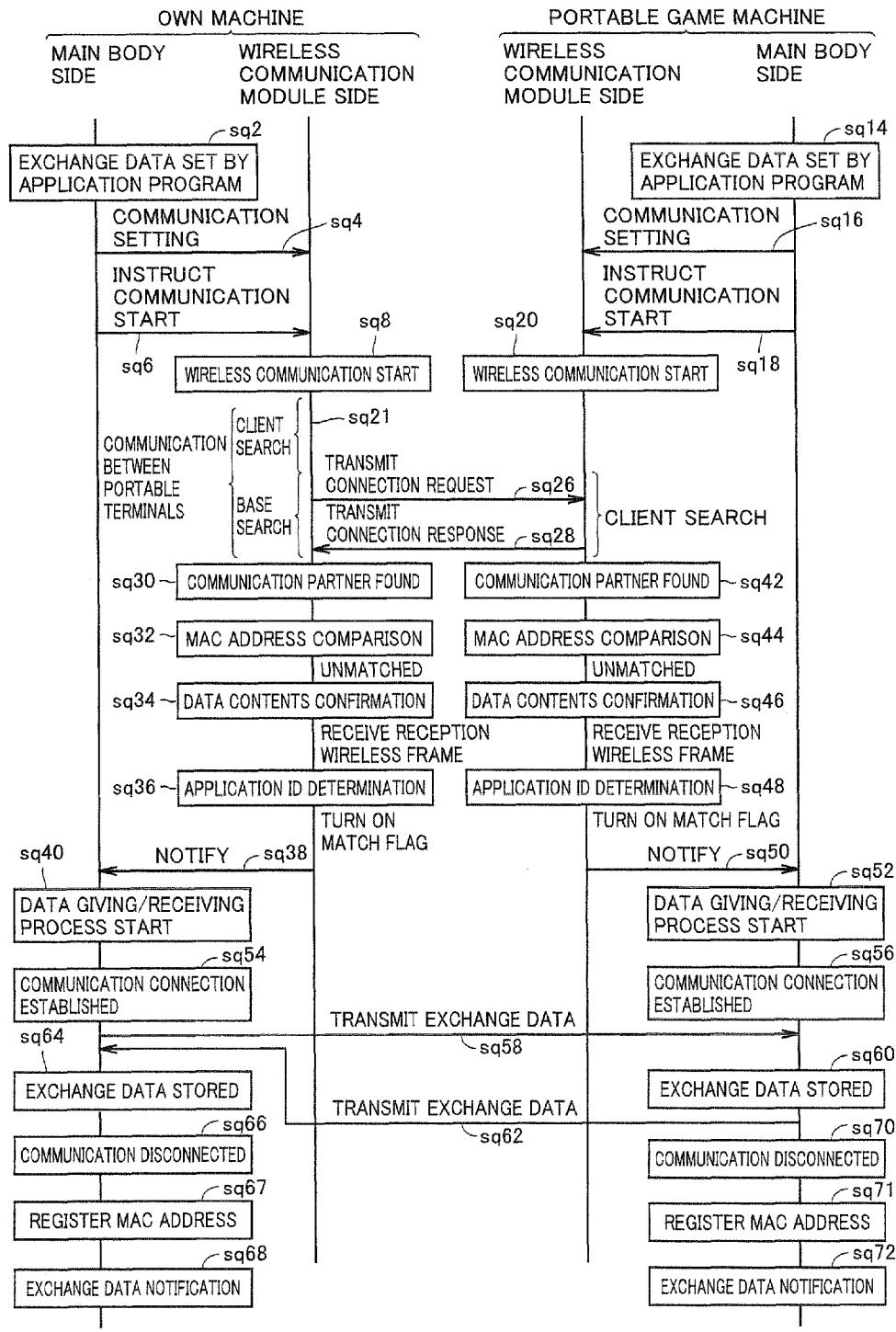
FIG. 43 shows how the data is passed when the exchange data is given/received in accordance with an embodiment of the present invention.

With reference to FIG. 43, the giving/receiving of exchange data in accordance with an embodiment of the present invention will be described Referring to FIG. 43, in CPU 31 on the main body side, exchange data is set by the execution of an application program (sequence sq2). Then, CPU 31 on the main body side outputs data for communication initialization to wireless communication module 38 (sequence sq4). Specifically, it outputs data related to an application ID list of the exchange data and the MAC address list. The application ID of the exchange data is stored in application ID saving area 68, and the MAC address list in MAC address list saving area 88 is stored in MAC address list saving area 70. In the present example, the application IDs are collectively saved as a list corresponding to each method of determination, in application ID saving area 68. As described above, the MAC address list in MAC address list saving area 88# is also saved in MAC address list saving area 70#.

Then, CPU 31 on the main body side outputs a communication start instruction to wireless communication module 38 (sequence sq6).

In response to the communication start instruction, wireless communication process by wireless communication module 38 starts (sequence sq8). In the present embodiment, in wireless communication module 38, the communication between portable terminals as the exchange partner searching process, for searching for a communication partner to exchange the exchange data, starts.

On the other hand, in game machine 3, the exchange data is set by the execution of an application program, by the CPU on the main body side (sequence sq14). Then, the CPU on the main body side outputs data for communication setting to wireless communication module 38P (sequence sq16). Specifically, it outputs data related to the application ID of exchange data and the MAC address list. The application ID of the exchange data is stored in application ID saving area 68P, and the MAC address list is stored in MAC address list saving area 70P. In this example, the application IDs are collectively saved as a list corresponding to each method of determination, in application ID saving area 68

Then, the CPU on the main body side outputs a communication start instruction to wireless communication module 38P (sequence sq18).

In response to the communication start instruction, wireless communication process by wireless communication module 38P starts (sequence sq20). Then, the communication between portable terminals starts in the similar manner as described above.

Again, in game machine 1, a client search is executed in the communication between portable terminals, in the manner as described above (sequence sq21). Then, a base search is executed (sequence sq22).

Then, in the base search, if the connection request signal is transmitted from wireless communication module 38 of game machine 1 to wireless communication module 38P of game machine 3 (sequence sq26), wireless communication module 38P of game machine 3 receives the transmission wireless frame (that is, reception wireless frame) from game machine 1 and transmits a connection response signal as the transmission wireless frame of game machine 3 to wireless communication module 38 of game machine 1 (sequence sp28).

Then, wireless communication module 38 receives the input of connection response signal as the transmission wireless frame transmitted from wireless communication module 38P (that is, the reception wireless frame).

By this process, in game machine 1 as the own machine, the connection flag of a client is turned on. In game machine 3, the connection flag of a base is turned on.

Since the connection flag of a client is turned on, game machine 1 determines that communication connection with the base as a communication partner is possible, that is, a communication partner has been found (sequence sq30). Since the connection flag as a base is turned on, game machine 3 determines that communication connection with the client as a communication partner is possible, that is, a communication partner has been found (sequence sq42).

After the communication partner is found, in game machine 1, the MAC addresses are compared (sequence sq32). Specifically, the MAC address included in the reception wireless frame received from game machine 3 as the communication partner is compared with the MAC address list saved in MAC address list saving area 70 and whether these addresses match or not is determined.

If the addresses do not match, that is, if it is determined that communication has not been done before with the partner, the data contents are confirmed next (sequence sq34). Specifically, whether or not the reception wireless frame is a wireless frame that can be processed in the process between portable terminals is determined.

If it is determined that a reception wireless frame that can be processed in the process between portable terminals is received, the application ID determining process is executed (sequence sq36).

If the match flag is turned on by the application ID determining process, wireless communication module 38 notifies the CPU on the main body side that game machine 3 capable of exchanging the exchange data corresponding to the matching application ID has been found (sequence sq38).

Consequently, the CPU on the main body side recognizes, by the notification from wireless communication module 38, that an exchange partner capable of communication connection has been found, and the process for giving/receiving data starts (sequence sq40).

On the other hand, through similar processes, on the side of game machine 3, after the communication partner is found (sequence sq42), the MAC addresses are compared (sequence sq44), and if the addresses do not match, that is, if communication has not been done before with the partner, pieces of identification information are compared (sequence sq46) If it is determined that a reception wireless frame that can be processed in the process between portable terminals is received, the application ID determining process is executed (sequence sq48), and if the match flag is turned on, a notice is sent to the CPU on the main body side that game machine 1 allowing exchange has been found (sequence sq50).

Thus, in game machine 3 also, the process for giving/receiving data starts (sequence sq52).

Next, after the start of data giving/receiving process, CPU 31 on the main body side of game machine 1 establishes the communication connection with game machine 3 (sequence sq54).

Similarly, after the start of data giving/receiving process, the CPU on the main body side of game machine 3 establishes the communication connection with game machine 1 (sequence sq56).

Thereafter, game machine 1 transmits the exchange data (sequence sq58).

The exchange data is the copy data obtained by copying the exchange data stored in the slot.

Game machine 3 receives the exchange data transmitted from game machine 1 and stores the exchange data (sequence sq60).

Then, game machine 3 transmits the exchange data (sequence sq62). The exchange data is copy data obtained by copying the exchange data stored in the slot.

Game machine 1 receives the exchange data transmitted from game machine 3, and stores the exchange data (sequence sq64).

Thereafter, the communication is disconnected (sequence sq66).

Then, the MAC address is registered (sequence sq67).

Thereafter, data notification process is executed (sequence sp68).

Similarly, in game machine 3, after the exchange data is stored, the communication is disconnected (sequence sq70). Then, the MAC address is registered (sequence sq71), and data notification process is executed (sequence sp72).

Then, receiving the notification of exchange data, when the user executes the application using the exchange data, the process for erasing the exchange data that has been stored in the slot is executed, and the process for exchanging the exchange data is completed.

In the sequence described above, sequences sq4, sq6, sq16, sq18, sq40, sq52 to sq72 are functions of the main body side of each game machine, realized by a main body function program stored in system program saving area 86, as described above. Sequences sq8, sq20 to sq38 and sq42 to sq50 are realized by a program read from ROM 72 stored in memory control unit 64 in wireless communication module 38, in each game machine, as described above.

According to the embodiment, by wireless communication, exchange data utilized in a prescribed application can be automatically exchanged with a game machine with which communication connection can be established, even when the application is not being executed. Therefore, chances of negotiating exchange data with acquaintances can be increased. Further, according to the embodiment, by the wireless communication, no matter whether an application is executed or not in CPU 31 on the main body side, the exchange data utilized in a prescribed application can be automatically exchanged with a game machine with which communication connection can be established, even when the application is not being executed. Therefore, it is unnecessary to have a memory card 26 storing the application attached. Thus, it is highly convenient, and since what will be exchanged is unknown, higher zest can be added. Further, the partner to exchange is not limited to acquaintances. Therefore, it is highly possible that the exchange data can be exchanged if the user goes to anywhere people gather. Thus, the fun of exchanging increases. The zest of application utilizing the exchange data increases. Further, only after the communication process is executed between wireless communication modules and exchange is determined to be possible, the notice is given to the CPU on the main body side and the process for giving/receiving exchange data is executed. Thus, the processing load of the CPU can be alleviated, and power consumption can be reduced.

After the process for giving/receiving the exchange data is executed, again the exchange partner searching process starts in the wireless communication module 38.

Specifically, by the process of giving/receiving the exchange data, the contents in exchange data saving area 80 comes to be changed. Therefore, in accordance with the flow described with reference to FIG. 10, CPU 31 (communication setting unit 204) executes the communication setting process (step S24). The details of communication setting process have already been described with reference to FIG. 11 and, therefore, description will not be repeated. Thereafter, CPU 31 (communication instructing unit 206) outputs a communication start instruction to wireless communication module 38 (step S26).

Consequently, again, the communication between portable terminals starts in wireless communication module 38, as described in connection with step S44 of FIG. 13 (step S44). Details of the communication between portable terminals are as described with reference to FIG. 14.

In the communication between portable terminals, as described with reference to FIG. 18, MAC address filtering process is executed, to dispense with repetitive communication with a game machine (here, game machine 3) having the matching MAC address.

Specifically, substantial communication is not executed with a game machine (here, game machine 3) as a communication partner registered in the MAC address list, with which communication has already been done.

Therefore, in the game machine in accordance with the present embodiment, a game machine within the communicable range is automatically and repeatedly searched, and a found game machine is set as a candidate for communication. Here, it is possible that one game machine is repeatedly searched and found a number of times. By the MAC address filtering process as described above, accumulative communication with the same game machine can be prevented and, therefore, highly efficient and effective data communication can be executed.

<Modification>

In the communication between portable terminals above, in setting the transmission wireless frame, the vendor specifying IE data as communication conditions is included together with the MAC address to be transmitted. For higher security, however, it is possible to transmit a transmission wireless frame including only the MAC address may be sent first, and thereafter, another transmission wireless frame including the vendor specifying IE data may be transmitted/received.

Specifically, using the MAC address included in the preceding transmission wireless frame, the MAC address filtering process may be executed.

In that case, exchange data communication determining unit 225 provided as a function of wireless communication module 38 described with reference to FIG. 7 may only have the configuration of machine identification information comparing unit 226.

With such a configuration, MAC address filtering process is done by machine identification information comparing unit 226 and if the MAC addresses do not match, a notice may be sent to the main body.

Then, after the communication connection described above is established, the afore-mentioned another transmission wireless frame may be transmitted/received, for example, to execute the processes of communication data determining unit 228 and application ID determining unit 230, as other functions of exchange data communication determining unit 225 described above as the functions of the main body, by executing a main body function program.

In the example also, it is possible to save the MAC address for identifying the communication partner by machine identification information registration unit 210 before starting the process of giving/receiving data, after the sleep state is canceled at step S142, as described above.

Specifically, in the present configuration, once the process flow of exchange data communication determining unit 225 including the machine identification information comparing unit 226 is passed, the MAC address of another game machine that passed the determination process by the exchange data communication determining unit 225 is saved in MAC address list saving area 88 by machine identification information registration unit 210. By the process described above, highly efficient data communication can be executed, dispensing with communication with a communication partner that once passed the determination process.

Here, an example has been described in which CPU 31 (machine identification information registration unit 210) saves (registers) the MAC address for identifying the communication partner in MAC address list saving area 88 provided in saving data memory 34, on condition (registration condition) that it has passed the determination process by exchange data communication determining unit 225. It is noted, however, that the conditions for registering the MAC address is not limited only to the fact that the determination process by exchange data communication determining unit 225 has passed. The MAC address may be registered when the determination process is passed and, in addition, a process for determining other conditions may be executed, and the MAC address may be registered if it is determined that such additional conditions are satisfied.

Here, an example in which processes of communication data determining unit 228 and application ID determining unit 230 are executed as functions of the main body has been described. If it is determined by communication data determining unit 228 that a reception wireless frame is not received, that is, data is received from a machine with which communication connection is impossible, or data that is not the object of communication is received, it is considered unnecessary to execute data communication again.

Therefore, in that case also, the MAC address of the machine that transmitted such data may be saved in MAC address list saving area 88 by machine identification information registration unit 210.

Thus, the MAC address of a machine that is not an object of communication is saved in MAC address list saving area 88. Thus, highly efficient data communication can be executed dispensing with communication with a partner with which communication has already been done once.

Similarly, in the determining process of application ID determining unit 230, if the match flag of application ID is not on, that is, if the game machine of interest is determined not to be an exchange partner of exchange data, it is considered unnecessary to execute data communication again.

Therefore, in this case also, the MAC address of such a machine may be saved in MAC address list saving area 88 by machine identification information registration unit 210.

Thus, the MAC address of a machine that is not an exchange partner of exchange data is saved in MAC address list saving area 88. Thus, highly efficient data communication can be executed dispensing with communication with a partner with which communication has already been done once.

<Communication Between Portable and Fixed Terminals>

Next, data communication of game machine 1 for receiving distribution data from a fixed terminal in accordance with an embodiment of the present invention will be described.

Figure 44:
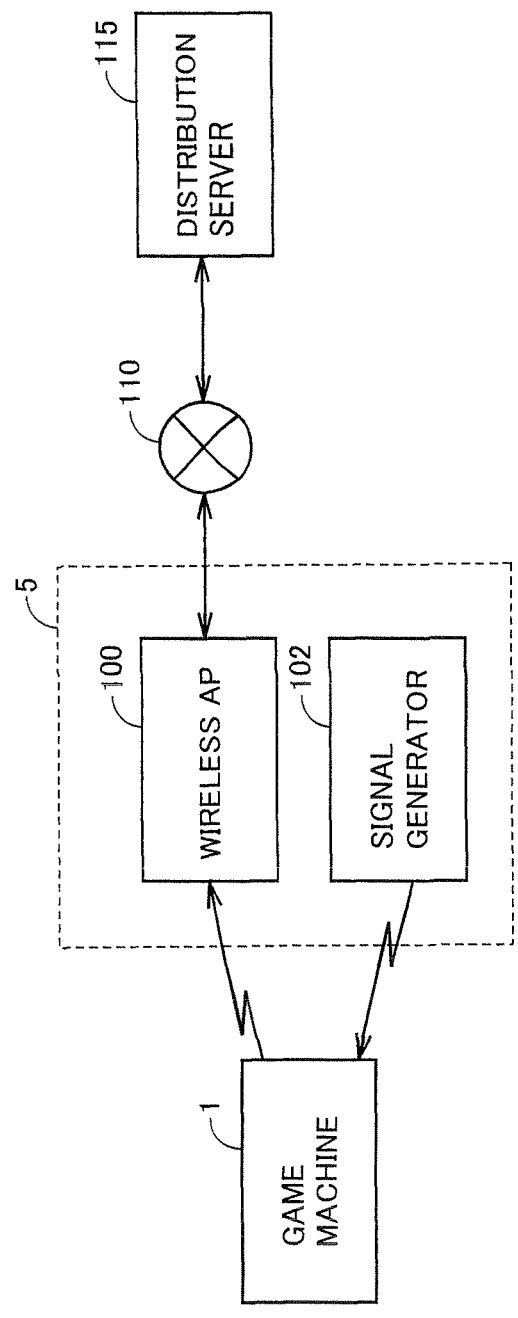
FIG. 44 is a schematic illustration related to a communication process between portable game machine 1 and fixed terminal 5 in accordance with an embodiment of the present invention.

Referring to FIG. 44, the communication process between portable game machine 1 and fixed terminal 5 in accordance with an embodiment of the present invention will be briefly described.

Referring to FIG. 44, fixed terminal 5 includes a wireless access point device 100 and a signal generator 102. Wireless access point device 100 is connected through a network 110 to a distribution server 115, Signal generator 102 transmits a distribution wireless frame including connection information required for connection with wireless access point device 100, to unspecified addresses.

Access point device 100 transmits distribution data obtained (downloaded) from distribution server 115 through network 110, in response to a request for the distribution data from game machine 1.

<Description of Functional Block Executing Reception of Distribution Data from Fixed Terminal 5>

Figure 45:
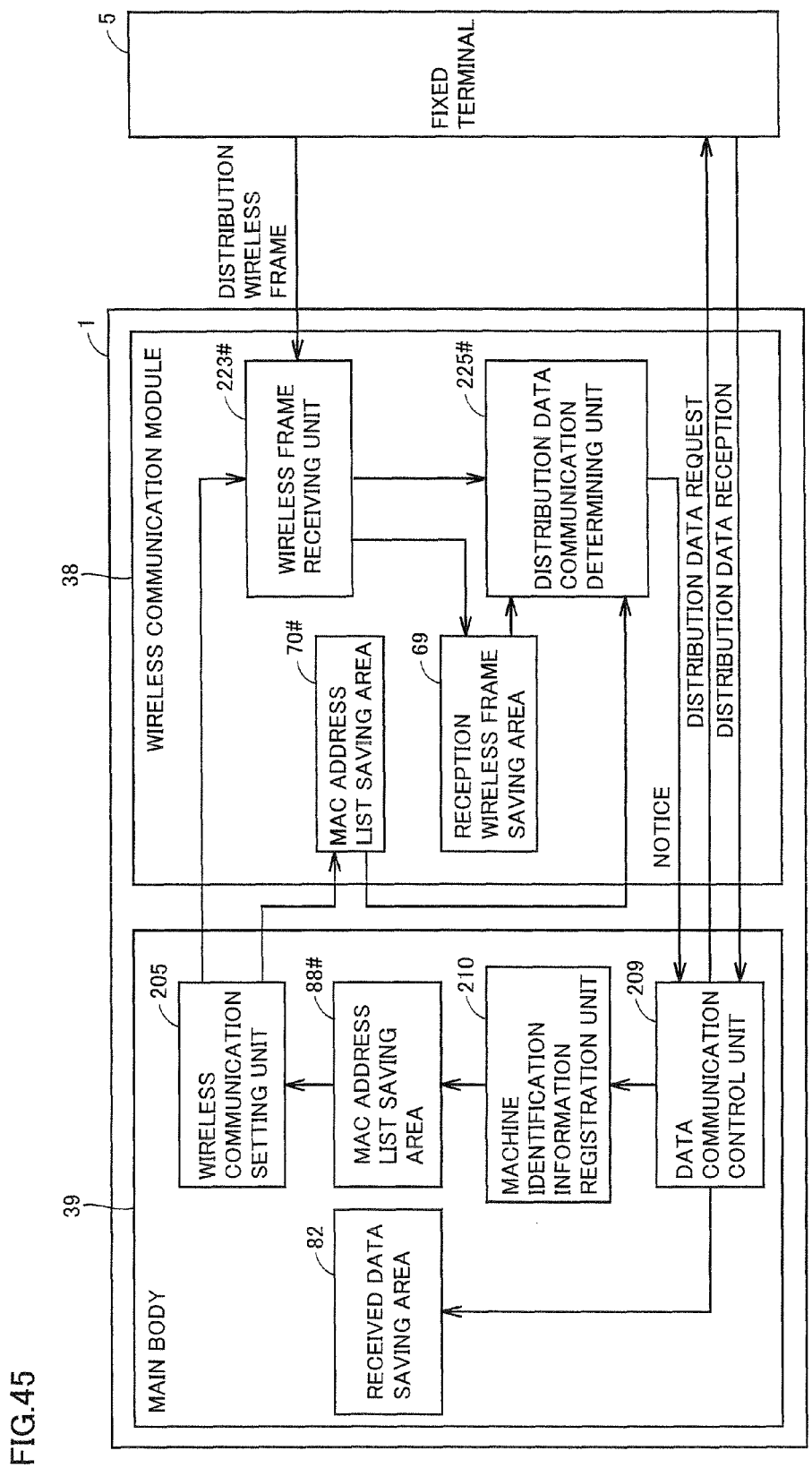
FIG. 45 shows functional blocks for receiving distribution data in game machine 1 in accordance with an embodiment of the present invention.

Referring to FIG. 45, the functional block for receiving the distribution data in game machine 1 in accordance with an embodiment of the present invention will be described.

Referring to FIG. 45, game machine 1 includes wireless communication module 38, and main body 39 other than wireless communication module 38.

Main body 39 includes: wireless communication setting unit 205; machine identification information registration unit 210; data communication control unit 209; received data saving area 82; and MAC address list saving area 88#.

Wireless communication module 38 includes: wireless frame receiving unit 223#; distribution data communication determining unit 225#; MAC address list saving area 70#; and reception wireless frame saving area 69.

Wireless communication setting unit 205 stores the MAC address list stored in MAC address list saving area 88# in MAC address list saving area 70#. Further, wireless communication setting unit 205 outputs an instruction to execute wireless communication of wireless communication module 38 to wireless frame receiving unit 223#.

Wireless frame receiving unit 223# of wireless communication module 38 receives the instruction to execute the wireless communication and, in response, executes a distribution partner searching process, searching for a distribution partner. In the present example, it is assumed that wireless frame receiving unit 223# receives, by way of example, a distribution wireless frame transmitted from fixed terminal 5 as a reception wireless frame. Wireless frame receiving unit 223# stores the received reception wireless frame in reception wireless frame saving area 69.

Distribution data communication determining unit 225# determines, based on the received distribution wireless frame (reception wireless frame), whether or not the communication partner is a distribution partner for distributing the distribution data, and if it is determined to be the distribution partner, it sends a notice to that effect to main body 39.

Specifically, whether or not the MAC address as the machine identifying information included in the distribution wireless frame (reception wireless frame) is registered with the MAC address list saved in MAC address list saving area 70# is determined. Further, whether or not the distribution wireless frame (reception wireless frame) is a wireless frame that can be processed in the distribution data obtaining process is also determined.

If the MAC address included in the distribution wireless frame is not registered in the MAC address list and the distribution wireless frame is determined to be a wireless frame capable of obtaining distribution data, distribution data communication determining unit 225# sends a notice that reception of distribution data is possible to data communication control unit 209 of main body 39. Though the notice that reception of distribution data is possible is output to data communication control unit 209 of main body 39 when two conditions are satisfied here, the notice may be output when at least one condition is satisfied.

Receiving the notice that reception of distribution data is possible output from distribution data communication determining unit 225#, data communication control unit 209 executes a distribution data obtaining process, of requesting fixed terminal 5 for the transmission of distribution data, and receiving the distribution data transmitted from fixed terminal 5. The received distribution data is stored in received data saving area 82.

If the distribution data received by data communication control unit 209 is stored in received data saving area 82, machine identification information registration unit 210 stores the MAC address as the machine identification information of fixed terminal 5 as the distribution partner in MAC address list saving area 88#.

Then, wireless communication setting unit 205 again stores the MAC address list stored in MAC address list saving area 88# in MAC address list saving area 70#, and outputs an instruction to execute wireless communication of wireless communication module 38 to wireless frame receiving unit 223#. Namely, the same process as described above is repeated.

Receiving the instruction to execute wireless communication again, wireless frame receiving unit 223# of wireless communication module 38 executes the distribution partner searching process to search for a distribution partner. Here again, it is assumed that a distribution wireless frame distributed from fixed terminal 5, that is, reception wireless frame, is received.

As described above, distribution data communication determining unit 225# determines whether or not the MAC address list as the machine identification information included in the distribution wireless frame is registered in the MAC address list saved in MAC address list saving area 70#.

If the distribution data obtaining process has been done in the past, the MAC address as the machine identification information of fixed terminal 5 is stored in the MAC address list as described above and, therefore, distribution data communication determining unit 225# determines that the MAC address is registered and, therefore, the subsequent data communication of distribution data obtaining process is not executed. Specifically, highly efficient data communication can be executed dispensing with communication with a partner with which communication has already been done.

Main body 39 and wireless communication module 38 may operate independent from each other. Specifically, even when main body 39 has made a transition to a sleep mode, it is possible for wireless communication module 38 to execute the distribution partner searching process searching for the distribution partner. Only when a distribution partner from which reception is possible is found, a notice is sent to main body 39, connection with the communication partner is established, and the distribution data obtaining process is executed. Therefore, if main body has made a transition to a sleep mode to save power and a communication partner is found through the distribution partner searching process by wireless communication module 38, notice is not given to main body 39 and communication connection is not established, unless exchange with the partner is possible. Therefore, power consumption in game machine 1 as a whole can be saved.

Figure 46:
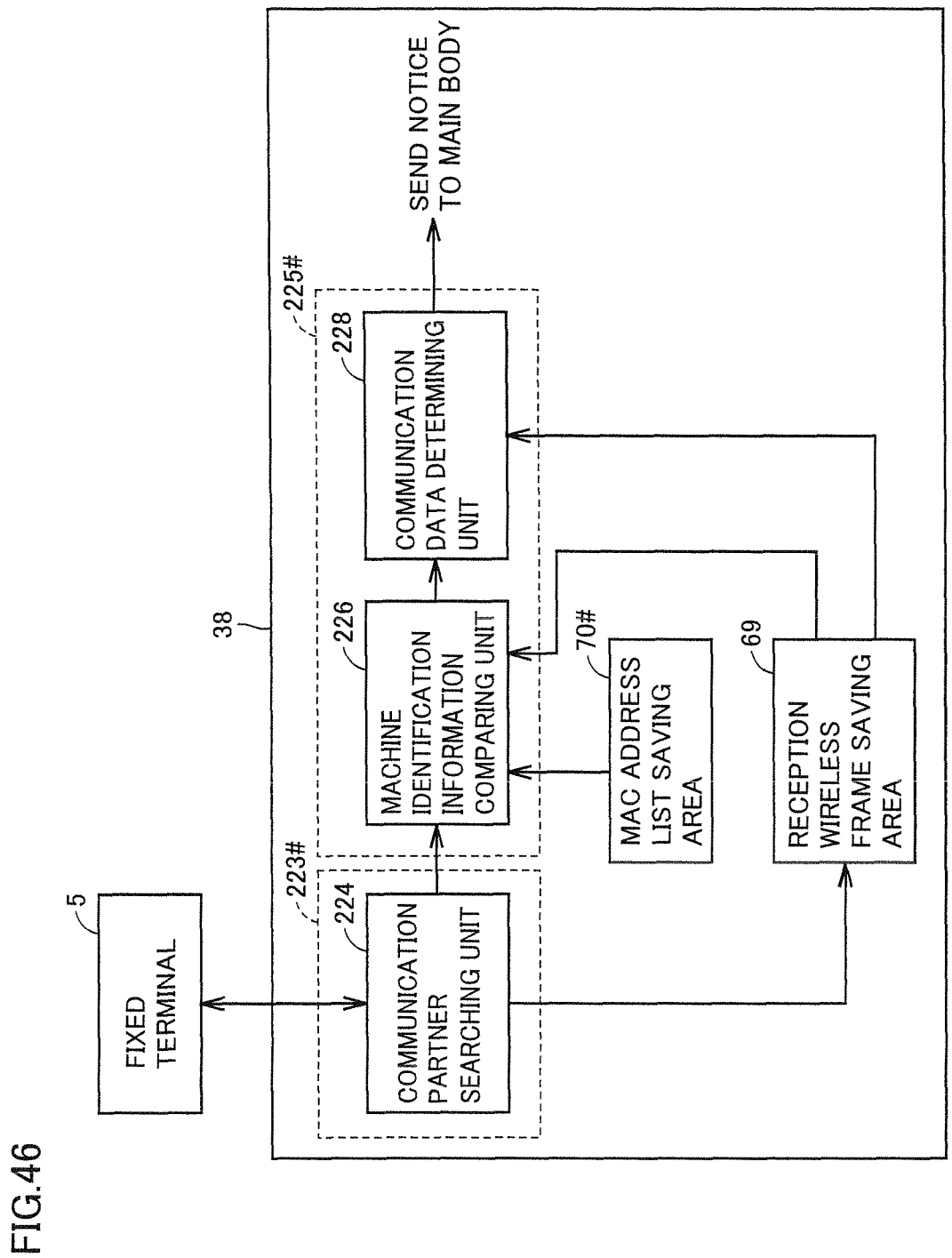
FIG. 46 shows details of the functional blocks of wireless communication module 38 executing the process between a portable terminal and a fixed terminal in accordance with an embodiment of the present invention.

With reference to FIG. 46, details of the functional blocks of wireless communication module 38 executing the process between portable and fixed terminals in accordance with an embodiment of the present invention will be described.

Referring to FIG. 46, here, an example will be described in which a prescribed function is realized by CPU 60 executing an application for executing the process between portable and fixed terminals saved in ROM 72 will be described. The function may not necessarily be realized by CPU 60, and at least part of the function may be realized by using a dedicated IC (Integrated Circuit).

Wireless communication module 38 includes a wireless frame receiving unit 223# and a distribution data communication determining unit 225#.

Wireless frame receiving unit 223# includes a communication partner searching unit 224. Distribution data communication determining unit 225# includes a machine identification information comparing unit 226 and a communication data determining unit 228. It is assumed that each function is realized by multi-task control as needed.

Different from the functional block of FIG. 7, the configuration does not include wireless frame setting unit 222, as the transmission wireless frame is not transmitted.

Communication partner searching unit 224 executes a distribution partner searching process of searching for a communication partner within communicable range 10. Here, an example will be described in which communication takes place with fixed terminal 5 as a communication partner. Communication partner searching unit 224 waits until the distribution wireless frame is received from fixed terminal 5, and when received, it stores the distribution wireless frame as a reception wireless frame, in reception wireless frame saving area 69.

When a communication partner is found by communication partner searching unit 224, that is, when a distribution wireless frame is received from the communication partner, distribution data communication determining unit 225# determines whether or not the communication partner is a distribution partner from which distribution data can be received, based on the distribution wireless frame, and if it is determined to be a distribution partner, a notice is issued.

Specifically, when a communication partner is found by communication partner searching unit 224, machine identification information comparing unit 226 compares the MAC address as the machine identification information included in the distribution wireless frame received from fixed terminal 5 as the communication partner with the MAC address list saved in MAC address list saving area 70# to determine whether there is any matching address.

If a communication partner is found and if it is determined that the MAC address list included in the distribution wireless frame does not match with any of the MAC addresses in MAC address list saved in MAC address list saving area 70# from the result of comparison by machine identification information comparing unit 226, communication data determining unit 228 confirms the data contents in the distribution wireless frame, and determines whether or not the distribution wireless frame is a wireless frame that can be processed in the process between portable and fixed terminals.

Then, if it is determined that the distribution wireless frame is a wireless frame that can be processed in the process between portable and fixed terminals, communication data determining unit 228 sends a notice to that effect to the main body.

The subsequent process steps are executed as functions of main body 39 of game machine 1.

Details of the functional blocks of main body 39 of game machine 1 are basically the same as the configuration described above with reference to FIG. 6. Therefore, description will be given with reference to FIG. 6.

Specifically, a sleep setting/cancelling unit 216 receives the notice from wireless communication module 38 (notice from communication data determining unit 228 shown in FIG. 46).

When the notice is received from wireless communication module 38, sleep setting/canceling unit 216 outputs the notice to data communication executing unit 208.

In accordance with the notice from wireless communication module 38, data communication executing unit 208 executes the process for obtaining distribution data from fixed terminal 5. Specifically, it transmits a distribution data request to fixed terminal 5. Then, it receives the distribution data transmitted from fixed terminal 5.

Then, it saves the distribution data received from fixed terminal 5 in received data saving area 82 of saving data memory 34.

When the distribution data received by data communication executing unit 208 is saved in received data saving area 82, machine identification information registration unit 210 stores the MAC address as the machine identification information of fixed terminal 5 as the communication partner in MAC address list saving area 88#.

Data notifying unit 212 notifies the user of the fact that the distribution data is obtained.

<Communication Between Portable and Fixed Terminals by Wireless Communication Module 38>

Figure 47:
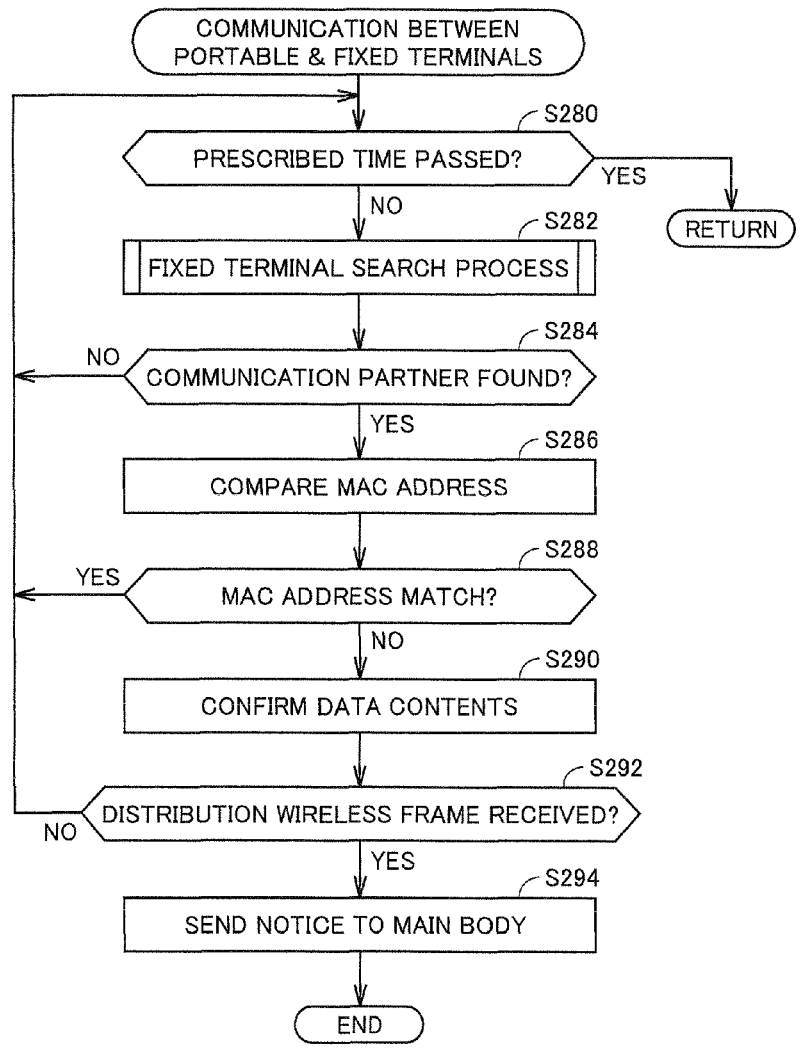
FIG. 47 is a flowchart representing communication between portable and fixed terminals in accordance with an embodiment of the present invention.

With reference to FIG. 47, communication between portable and fixed terminals in accordance with an embodiment of the present invention will be described. This is the distribution partner searching process performed by wireless communication module 38 searching for a communication partner to which the distribution data is provided and, by way of example, this process is realized by CPU 60 executing an application for executing the process between portable and fixed terminals stored in ROM 72.

Referring to FIG. 47, first, CPU 60 (communication partner searching unit 224) determines whether or not a prescribed time period has passed (step S280). If it is determined at step S280 that the prescribed time period has not yet passed (NO at step S280), CPU 60 executes the communication partner search process of searching for a communication partner (fixed terminal) (step S282). The communication partner search process will be described later.

Next, CPU 60 (communication partner searching unit 224) determines whether or not a communication partner has been found by the communication partner search process (step S284).

If a communication partner is not found at step S284 (NO at step S284), the flow returns to step S280.

If a communication partner is found at step S284 (YES at step S284), CPU 60 (machine identification information comparing unit 226) compares the MAC address (step S286). Specifically, the MAC address included in the distribution wireless frame is compared with MAC addresses stored in MAC address list saving area 70# described above. The MAC address is a piece of identification information for identifying an object of communication as described above, and each fixed terminal has its own MAC address allocated thereto. In MAC address list saving area 70#, MAC addresses allocated to respective fixed terminals are saved.

Next, CPU 60 (machine identification information comparing unit 226) determines whether or not the MAC address of the fixed terminal included in the distributed wireless frame matches any of the MAC addresses stored in the MAC address list (step S288).

If it is determined at step S288 that the MAC address matched (YES at step S288), the flow returns to step S280. Specifically, the communication with fixed terminal 5 corresponding to the MAC address is terminated without executing the subsequent process. Namely, the MAC address filtering process described above is executed. Therefore, every time data as the communication object is received from another game machine within communicable range 10, determination as to whether the MAC address as the identification information matches or not is repeated.

The concept of MAC address comparison is the same as that described with reference to FIGS. 17 and 18 and, therefore, details thereof will not be repeated.

If it is determined at step S288 that MAC address does not match (NO at step S288), CPU 60 (communication data determining unit 228) confirms the contents of received data (step S290).

Figure 48:
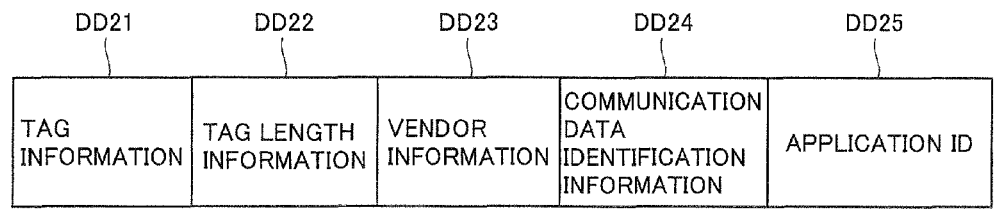
FIG. 48 shows a configuration of a distribution wireless frame received as a beacon in a game machine in the communication between portable and fixed terminals in accordance with an embodiment of the present invention.

With reference to FIG. 48, the configuration of distribution wireless frame received as a beacon by a game machine in the communication between portable and fixed terminals in the embodiment of the present invention will be described.

The configuration of distribution wireless frame transmitted from signal generator 102 of fixed terminal 5 is substantially the same as transmission wireless frame shown in FIG. 15, except for the configuration of vendor specifying IE data described with reference to FIG. 16.

More specifically, the vendor specifying IE data included in the distribution wireless frame received as the beacon includes tag information DD21, tag length information DD22, vendor information DD23, communication data identification information DD24 and an application ID DD25.

Tag information DD21 is identification data identifying each of a plurality of IE data. Tag length information DD22 includes data indicating the data length of vendor specifying IE data.

Vendor information DD23 is data for identifying a company or the like that provides the data.

Communication data identification information DD24 is data indicating the type of communication data. For the communication between portable and fixed terminals, information indicating communication data of communication between portable and fixed terminals is stored.

Thereafter, application ID DD25 follows.

The distribution wireless frame is transmitted from fixed terminal 5 to an unspecified partner (game machine) and received by an unspecified partner (game machine), as will be described later. Fixed terminal 5 as a base repeatedly repeats the transmission to a communication partner as a client, without specifying the destination.

Again referring to FIG. 47, next, CPU 60 determines whether or not the distribution wireless frame included in the received data is received (step S288).

Specifically, it determines whether or not the pieces of vender information, indicating a company or the like providing the data described with reference to FIG. 48 match the vendor information held in advance in game machine 1. That the pieces of vender information match means sources of transmitted data are devices of the same type allowing communication connection, and that the pieces of information do not match means sources of transmitted data are devices of totally different types, and connection for communication is impossible.

Further, determination is made as to whether the communication data identification information matches the communication data identification information held in advance in game machine 1. That the communication data identification information matches means that the communication data is for communication between portable and fixed terminals, or that the wireless frame can be processed in the process between portable and fixed terminals. It is assumed that the vendor information as the object of comparison on the side of game machine 1 is registered in advance in ROM 72. It is also assumed that the communication data identification information as the object of comparison on the side of game machine 1 is registered in advance in ROM 72.

The communication data identification information in the communication between portable and fixed terminals is different from the communication data identification information in the communication between portable terminals. Therefore, even when data output from game machine 3 is received, the data is not accepted as the communication data identification information is different and, hence, communication only with fixed terminal 5 is possible.

CPU 60 (communication data determining unit 228) switches the communication data identification information to be the object of comparison depending on whether the communication is between portable terminals or between portable and fixed terminals, and determines whether or not the communication data identification information included in the received data matches.

Specifically, if it is determined at step S288 by CPU 60 (communication data determining unit 228) that the distribution wireless frame is not received (NO at step S288), the flow returns to step S280.

Therefore, if data is received from a machine with which communication connection is impossible, or if data that is not an object of communication is received, communication is terminated without executing the subsequent process. Though an example in which matching of the vendor information and communication data identification information are both determined has been described in the foregoing, only the matching of communication data identification information may be determined.

If it is determined at step S292 that the distribution wireless frame is received (YES at step S292), CPU 60 (communication data determining unit 228) sends a notice that fixed terminal 5 having distribution data has been found, to the main body (step S294). Then, the process ends (END).

The following data obtaining process of establishing connection with fixed terminal 5 as a communication partner and obtaining the distribution data is executed as an application of CPU 31 on the main body side, using wireless communication module 38.

Therefore, with this notice that fixed terminal 5 having the distribution data is found given to the main body side, data communication executed independently by CPU 60 of wireless communication module 38, that is, the distribution partner searching process of searching for a communication partner to obtain the distribution data carried out by wireless communication module 38, is completed.

If it is determined by CPU 60 (communication data determining unit 228) at step S292 that the distribution wireless frame is not received (NO at step S292), the flow returns to step S280.

Therefore, here, only when a communication partner from which the distribution data can be obtained is found by the distribution partner searching process by wireless communication module 38, a notice is sent to CPU 31 on the main body, communication with the communication partner is established, and the process for obtaining the distribution data is executed. Therefore, if CPU 31 on the main body side is in the sleep state of power saving mode and a communication partner is found by the distribution partner searching process by wireless communication module 38, the notice to CPU 31 on the main body side is not sent and communication connection is not established, if it is determined that the distribution data cannot be obtained. Therefore, power consumption of game machine 1 as a whole can be reduced.

Figure 49:
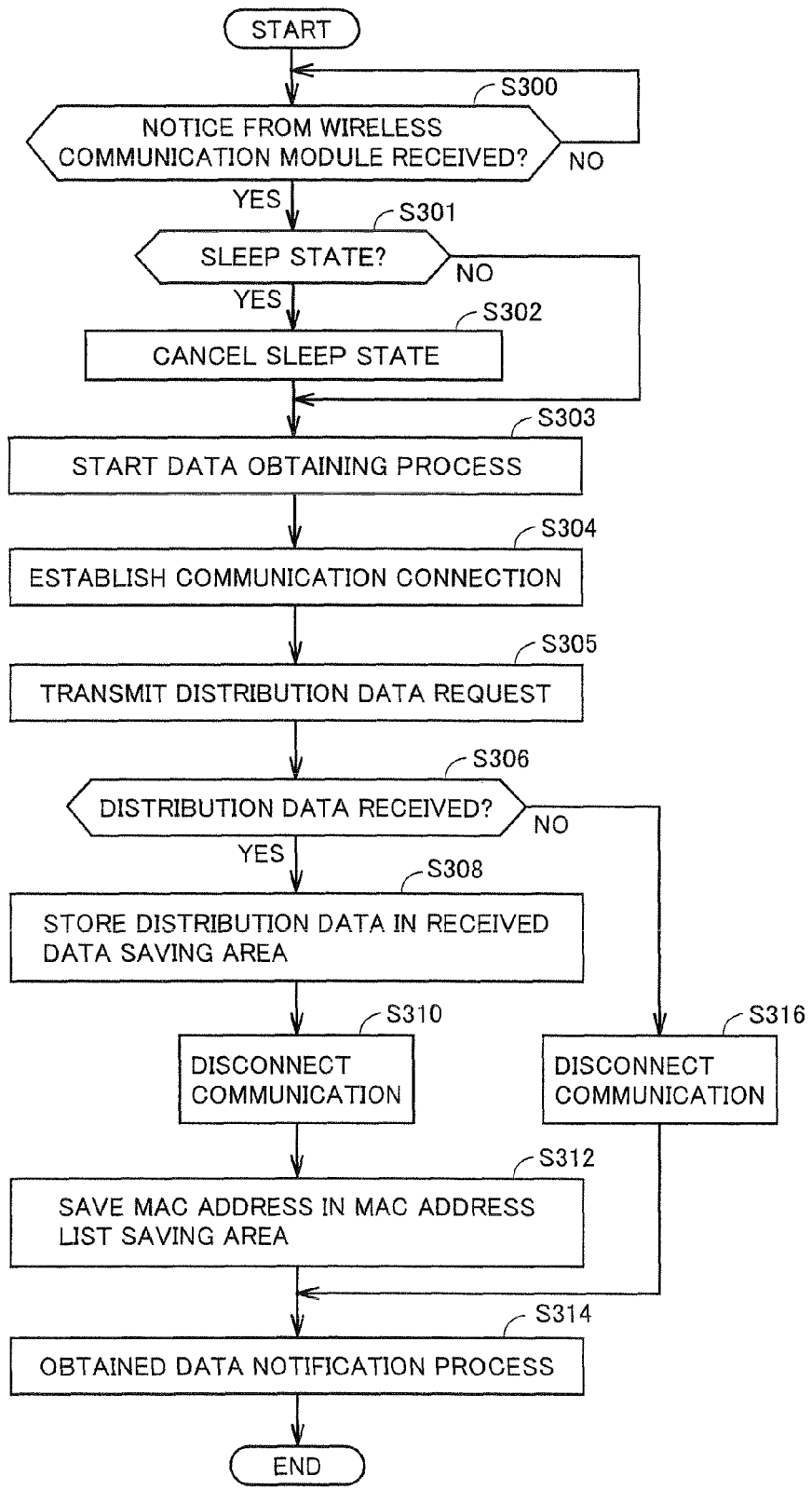
FIG. 49 is a flowchart of a data obtaining process for obtaining distribution data.

With reference to FIG. 49, the flow of data obtaining process for obtaining the distribution data will be described. The data obtaining process is realized, for example, by CPU 31 executing a main body function program stored in system program saving area 86 described above. By way of example, the data obtaining process is started at the time of activation of the main body and continuously executed on the background.

Referring to FIG. 49, first, CPU 31 (sleep setting/canceling unit 216) determines whether or not a notice is received from wireless communication module 38 (step S292).

If it is determined at step S292 that a notice is received from wireless communication module 38 (YES at step S292), CPU 31 (sleep setting/canceling unit 216) determines whether or not the main body functions are in the sleep state (step S301).

If it is determined that the main body functions are in the sleep state (YES at step S301), CPU 31 (sleep setting/canceling unit 216) cancels the sleep state (step S302).

Then, CPU 31 (data communication executing unit 208) starts the data obtaining process (step S303). If it is determined that the main body functions are not in the sleep state (NO ate step S301), the flow proceeds to step S303.

Thereafter, based on the connection information such as the MAC address of the communication partner included in the notice that a fixed terminal having distribution data is found transmitted from wireless communication module 38, CPU 31 (data communication executing unit 208) establishes communication connection with the communication partner (step S304). In this example, communication connection is established with a wireless access point device 100 of fixed terminal 5. Though an example in which connection with the communication partner is established after the notice that the fixed terminal is found is received, that is, an example in which connection is executed by CPU 31 (data communication executing unit 208) is described here, the process for establishing the connection with the communication partner may be executed before the game machine found notice is issued, for example, between steps S292 and S294 of FIG. 47 by wireless communication module 38.

Next, CPU 31 (data communication executing unit 208) transmits a request for the distribution data (step S305).

Thereafter, CPU 31 (data communication execution unit 208) determines whether or not the distribution data is received (step S306).

If it is determined at step S306 that the distribution data is received (YES at step S306), CPU 31 (data communication executing unit 208) stores the distribution data in received data saving area 82 (step S308).

Next, CPU 31 (data communication executing unit 208) disconnects the communication with the communication partner (fixed terminal 5) (step S310). By this process, the data obtaining process for obtaining the distribution data from the fixed terminal as the communication partner ends.

Next, CPU 31 (machine identification information registration unit 210) saves the MAC address identifying the communication partner in MAC address list saving area 88# provided in saving data memory 34 (step S312). The MAC address saved in MAC address list saving area 88# comes to be a part of the MAC address list to be used for the communication setting process described above.

By the communication setting process, the MAC address list comes to be saved in MAC address list saving area 70#. Therefore, by the MAC address filtering process described above, it becomes possible to avoid accumulative communication with the same fixed terminal. Thus, highly efficient and effective data communication can be executed.

In the present example, the MAC address list saved in MAC address saving area 88# provided in the saving memory 34 on the main body and the MAC address list stored in MAC address list saving area 70# of wireless communication module 38 are the same. Therefore, the method described above may be realized using only the MAC address saving area 70#.

On the other hand, by providing MAC address saving area 88# in saving memory 34 on the main body side and saving the MAC addresses in MAC address saving area 88#, it becomes possible to execute edition, such as addition and deletion, of MAC address data more easily and at higher speed, than the edition of data in MAC address saving area 70 by accessing to wireless communication module 38

Then, CPU 31 (data notifying unit 212) executes the obtained data notification process (step S304). Then, the process ends (END). The obtained data notification process is similar to that described with reference to FIG. 37 and when the distribution data is obtained, a notice is given to the user by outputting a sound, or by displaying the contents.

If it is determined by CPU 31 (data communication executing unit 208) at step S306 that the distribution data is not received from the fixed terminal as the communication partner within a prescribed time period (NO at step S306), the flow proceeds to step S316.

At step S316, CPU 31 (data communication executing unit 208) disconnects the communication with the fixed terminal as the communication partner. Then, the flow proceeds to step S314. Therefore, here, since the distribution data could not successfully be obtained, the communication is disconnected without saving the MAC address in MAC address list saving area 704. Therefore, it is possible to execute the process described above in accordance with the communication between portable and fixed terminals to resume the process for obtaining distribution data.

Figure 50:
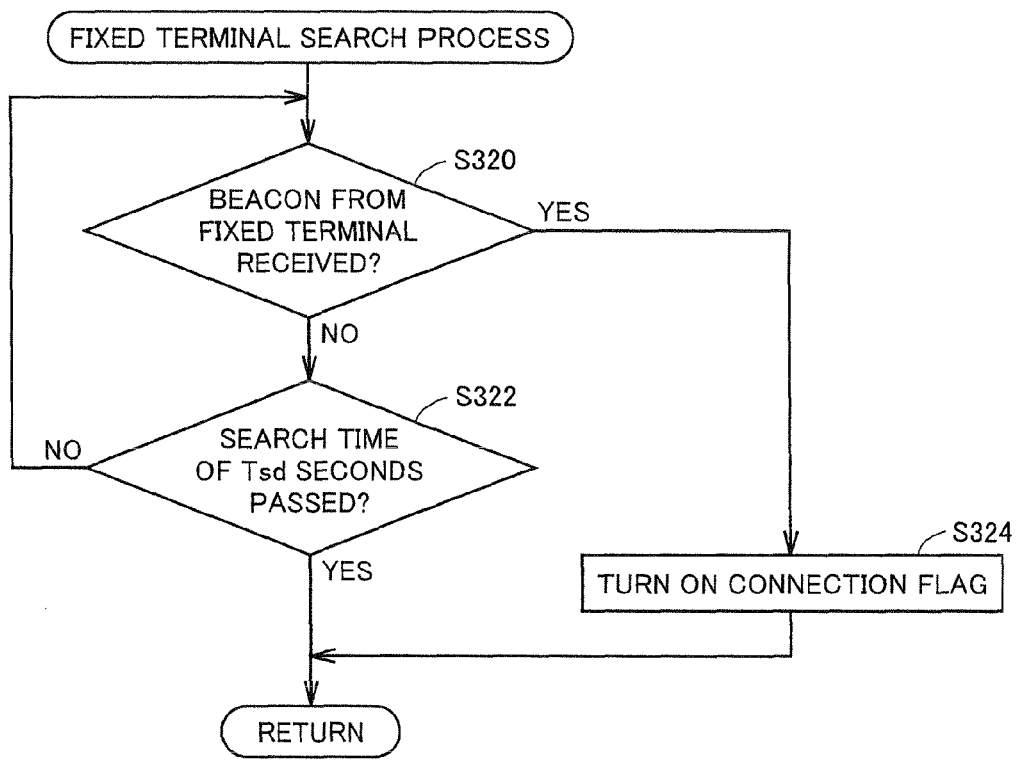
FIG. 50 is a flowchart representing a fixed terminal search process.

Referring to FIG. 50, a flowchart representing the communication partner search process will be described.

In this process, game machine 1 as a client executes data communication with fixed terminal 5 as a base, and game machine 1 waits until a beacon is received from fixed terminal 5 as a base. In the communication partner search process, game machine 1 always operates as a client, and executes a process of searching for a base. Here, an example in which the beacon is transmitted only from fixed terminal 5 and game machine 1 waits for reception of the beacon, is described. The reason for this is that, since fixed terminal 5 is an attached device, data communication can be executed with higher efficiency if the beacon is transmitted only from fixed terminal 5, than when the signal is output from a portable game machine.

Referring to FIG. 50, though not shown, when the fixed terminal search process starts, a timer circuit is started.

At step S312, whether or not the beacon is received from fixed terminal 5 as a base is determined.

If the beacon is received from fixed terminal 5 (YES at step S312), a connection flag is turned on at step S320, and the fixed terminal search process is returned. Specifically, it is made clear that a client is capable of communication connection with fixed terminal 5 as the base.

Though not shown in FIG. 50, when the fixed terminal search process starts, the connection flag is turned off (reset).

If the connection request signal from the base is not at all received (NO at step S312), it is determined at step S314 whether or not the time period of Tsd seconds in which the client tries to connect to fixed terminal 5 has passed.

If the base search time period of Tsd seconds has not yet passed at step S314 (NO at step S314), the flow directly returns to step S312.

If the base search time period of Tsd seconds passed (YES at step S314), the fixed terminal search process is returned.

Figure 51:
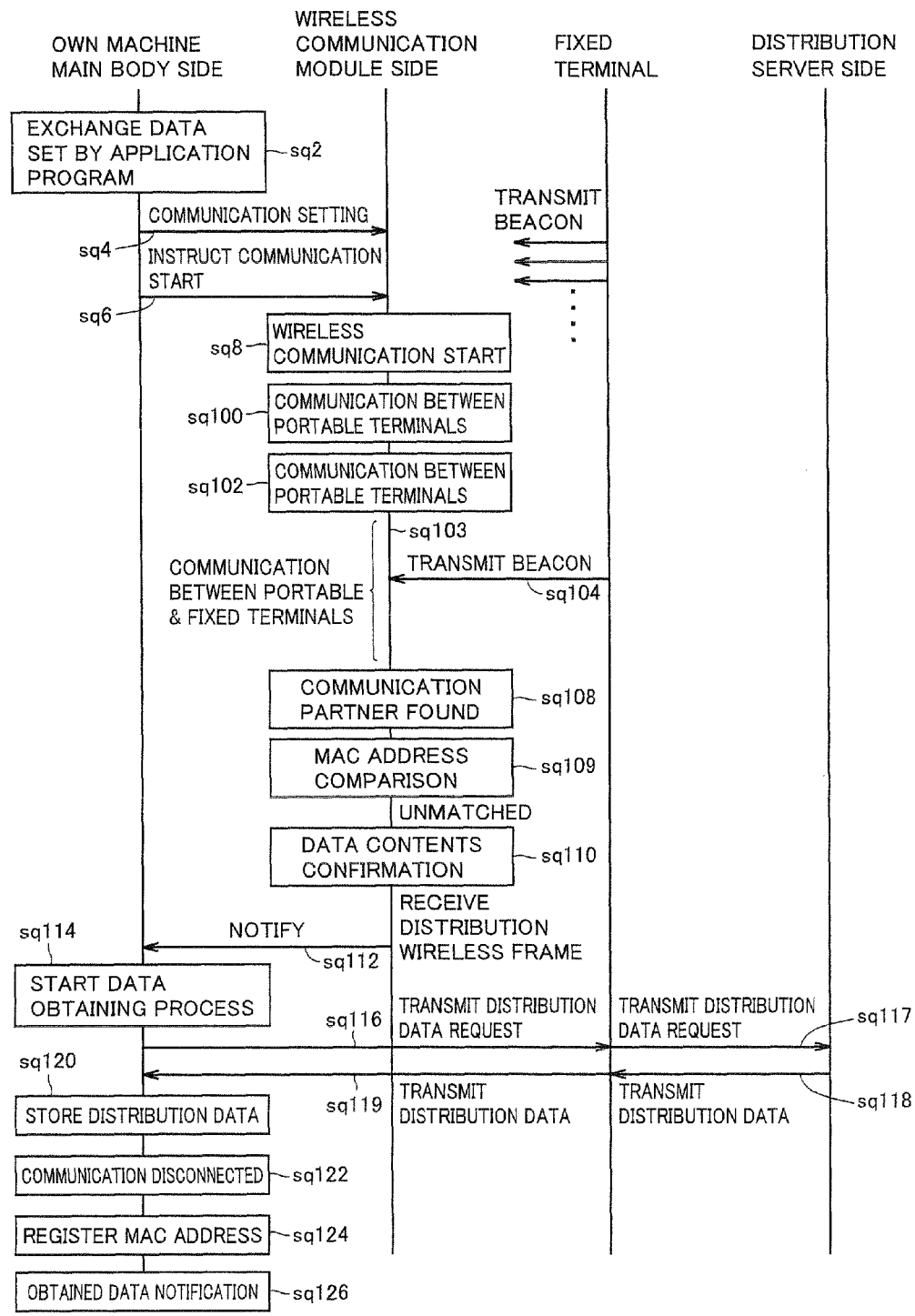
FIG. 51 illustrates giving/receiving data for obtaining distribution data in accordance with an embodiment of the present invention.

Referring to FIG. 51, giving/receiving of distribution data in accordance with the embodiment of the present invention will be described.

Referring to FIG. 51, sequences sq2 to sq8 are the same as described with reference to FIG. 43, and by CPU 31 on the main body side, exchange data is set by the execution of application program (sequence sq2). Then, CPU 31 on the main body side outputs data for communication initialization to wireless communication module 38 (sequence sq4). Then, CPU 31 on the main body side outputs a data communication start instruction to wireless communication module 38 (sequence sq6).

In response to the communication start instruction, wireless communication by wireless communication module 38 starts (sequence sq8).

It is assumed that first, the communication between portable terminals searching for a communication partner to exchange exchange data is started by wireless communication module 38 (sequence sq100), and the communication partner could not be found in a prescribed time period.

Assume that the communication between portable terminals starts thereafter (sequence sq102), and the communication partner could not be found in the prescribed time period, either.

Then, the communication between portable and fixed terminals starts (sequence sq103).

As described above, fixed terminal 5 repeatedly outputs (transmits) the beacon from signal generator 102.

Wireless communication module 38 of game machine 1 receives an input of the beacon transmitted from fixed terminal 5 (sequence sq104).

Thus, the connection flag of game machine 1 as the own machine is turned on.

As the connection flag is turned on, wireless communication module 38 of game machine 1 determines that communication connection with the fixed terminal becomes possible, that is, a communication partner has been found (sequence sq108).

Then, wireless communication module 38 of game machine 1 confirms the data contents (sequence sq110).

If it is determined that the distribution wireless frame has been received, wireless communication module 38 notifies the CPU on the main body side that fixed terminal 5 from which the distribution data can be provided, is found (sequence sq112).

Thus, by the notice from wireless communication module 38, the CPU on the main body side recognizes that communication connection with fixed terminal 5 that distributes distribution data is possible, and starts the data obtaining process (sequence sq114).

After the start of data obtaining process, CPU 31 on the main body side of game machine 1 transmits a distribution data request (sequence sq116).

Access point device 100 of fixed terminal 5 receives the distribution data request from game machine 1, and transmits the distribution data request to distribution server 115 through network 110 (sequence sq117.

Then, in accordance with the distribution data request from wireless access point device 100, distribution server 115 transmits the distribution data (sequence sq118).

After receiving the distribution data from distribution server 115 through network 110, wireless access point device 100 transmits the distribution data to game machine 1 (sequence sq119).

Then, game machine 1 receives the distribution data transmitted from wireless access point device 100 of fixed terminal 5, and stores the received distribution data (sequence sq120).

Then, the communication is disconnected (sequence sq122).

Thereafter, the MAC address is registered (sequence sq124).

Then, the obtained data is notified (sequence sq126).

In the sequence above, sequences sq4, sq6, sq114 to sq126 are the functions of the main body side, and realized by the main body function program stored in system program saving area 86, for example. Sequences sq8 and sq100 to sq110 are realized for example, by a program read from ROM 72 stored in memory control unit 64 of wireless communication module 38, as described above.

By this embodiment, it is possible to automatically obtain the distribution data from fixed terminal 5 with which communication connection is established, by wireless communication.

By way of example, if the distribution data represents a coupon that can be used at a store, if one simply holds game machine 1, he/she can obtain the distribution data representing the coupon by wireless communication with fixed terminal 5, and this adds zest of obtaining the distribution data.

Further, by way of example, the obtained distribution data representing a coupon may be stored as exchange data, in the slot of exchange data saving area 80 described above. For example, the distribution data may include an application to have the data stored as exchange data in the exchange data saving area. By this process, it becomes possible to provide the distribution data to others as the exchange data, by the communication between portable terminals.

Specifically, even the distribution data that can be obtained only from fixed terminal 5 may be provided to other users through the communication between portable terminals, and this adds zest to the distribution data.

After the execution of the process for obtaining distribution data, the distribution partner searching process by wireless communication module 38 is started again.

By way of example, it is possible to automatically start the communication setting process at every prescribed time period, as described above. Details of the communication setting process have been described with reference to FIG. 11 and, therefore, description will not be repeated. Next, CPU 31 (communication instructing unit 206) outputs a communication start signal to wireless communication module 38 (step S26).

Thus, the communication between portable terminals is executed again by wireless communication module 38 as described with reference to step S44 of FIG. 13 (step S44). Next, the communication between portable terminals is again executed (step S46).

If a communication partner cannot be found in a prescribed time period in the communication between portable terminals, the communication between portable and fixed terminals is again executed.

Details of the communication between portable and fixed terminals are as described with reference to FIG. 47.

As described with reference to FIG. 47, in the communication between portable and fixed terminals, the MAC address filtering process is executed, to avoid accumulative communication with a fixed terminal having the matching MAC address.

Specifically, substantial communication is not executed with a fixed terminal (in the present example, fixed terminal 5) as a communication partner with which communication has been done once and whose address is registered in the MAC address list.

In the game machine in accordance with the embodiment of the present invention, a fixed terminal in the communicable range is automatically and repeatedly searched, and the found fixed terminal is set as a communication candidate. Here, it is possible that the same fixed terminal is searched and found time and again. By the MAC address filtering process as described above, however, repetitive communication with the same fixed terminal can be prevented. Thus, highly efficient and effective data communication can be executed.

Though the configuration of FIG. 46 does not include application ID determining unit 230 such as described with reference to FIG. 7, the application ID determining unit may also be provided for the communication between portable and fixed terminals, to determine whether or not the application ID stored in the received distribution wireless frame satisfies prescribed conditions related to reception of the distribution data. Specifically, similar to the method described with reference to the communication between portable terminals, the determination process of application ID saved in transmission wireless frame may be executed. By way of example, assume that the application ID saved in transmission wireless frame includes the transmission/reception conditions data (send flag data and receive flag data), with the setting that only the data reception is desired. Then, the determination process may be executed, in which the application ID is compared with the application ID included in the distribution wireless frame to determine whether the IDs match.

In fixed terminal 5 shown in FIG. 44, wireless access point device 100 and signal generator 102 are provided as separate devices. These two devices may be provided as one integrated device. Specifically, wireless access point device 100 may be adapted to have the function of signal generator 102 and it may output the connection request signal.

Alternatively, by providing signal generator 102 as a dedicated device for transmitting only the connection request signal as in the configuration of FIG. 44, the processing load on wireless access point device 100 can be alleviated and, hence, data communication of distribution data with a plurality of game machines may be executed with high efficiency.

Further, as signal generator 102, a game machine communicating with fixed terminal 5 may be used as a dedicated signal generator that transmits only the connection request signal. Since it has the same information such as the vendor information as the game machine to be the communication partner, a signal generator can be realized in a simple manner.

Figure 52:
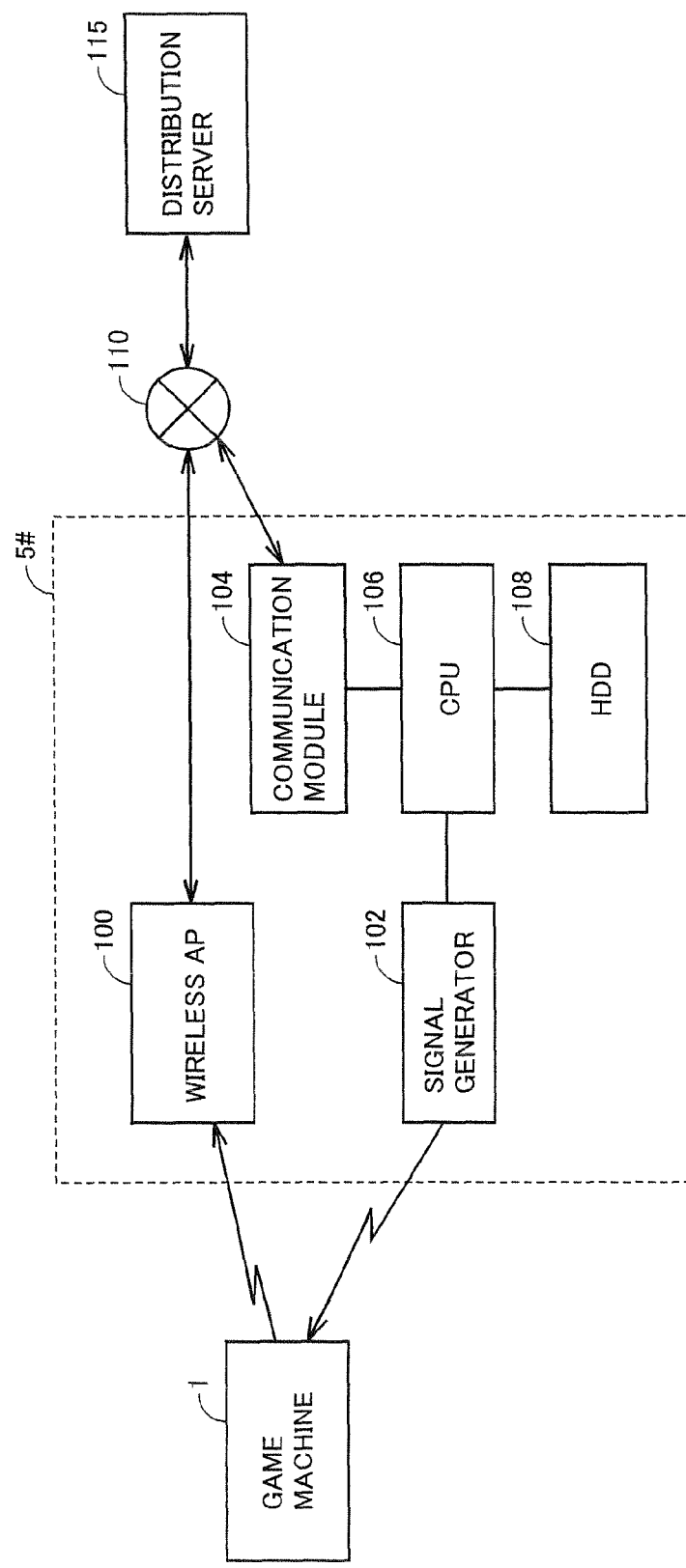
FIG. 52 schematically shows a communication process between a portable game machine 1 and a fixed terminal 5# in accordance with an embodiment of the present invention.

Referring to FIG. 52, the communication process between portable game machine 1 and fixed terminal 5# in accordance with an embodiment of the present invention will be described.

Referring to FIG. 52, fixed terminal 5# is different from fixed terminal 5 shown in FIG. 44 in that it additionally includes a communication module 104, a CPU 106 and an HDD 108. Other configurations are the same as those described with reference to FIG. 44 and, therefore, detailed description thereof will not be repeated.

It is assumed that communication module 104 is connected to network 110. Further, it is assumed that CPU 106 is connected to communication module 104, HDD (Hard Disk Drive) 108 and signal generator 102, and controls these components. Here, as an example, it is assumed that CPU 106 can output the distribution data stored in HDD 108 to other device, through network 110 connected to communication module 104.

By such a configuration, it is possible for wireless access point device 100 to obtain the distribution data from distribution server 115 through the same process as described above. Further, it is also possible to connect to communication module 104 connected through network 110, to obtain the distribution data stored in HDD 108 and to transmit the data from wireless access point 100 to a game machine.

By way of example, assume that fixed terminal 5# is installed in each of a plurality of stores. If each store customizes the distribution data stored in HDD 108, it becomes possible to transmit the customized distribution data to a game machine, and this adds the zest of obtaining distribution data by a game machine.

<MAC Address Update>

Next, a method of improving security with respect to the setting of transmission wireless frame in the communication between portable terminals will be described.

As described above, as the information for identifying a machine, the MAC address is used. It is possible, however, that a third party fraudulently uses the MAC address to disguise as another machine.

Here, to improve security, the MAC address is updated.

Specifically, CPU 31 (communication setting unit 204) updates the contents of local address set in the vendor code described with reference to FIG. 15.

Figure 53:
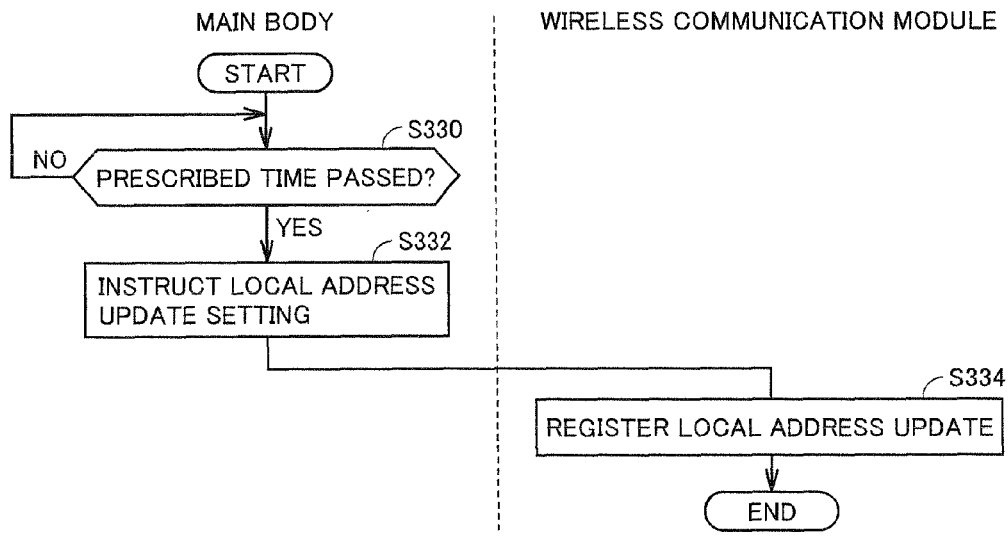
FIG. 53 is a flowchart representing update of a local address in accordance with an embodiment of the present invention.

Referring to FIG. 53, the flow of updating the local address will be described.

Referring to FIG. 53, first, CPU 31 (communication setting unit 204) on the main body side determines whether or not a prescribed time period has passed (step S330). By way of example, the prescribed time period is set to 6 hours.

If it is determined at step S330 that the prescribed time period has passed (YES at step S330), CPU 31 (communication setting unit 204) instructs local address update setting (step S332).

CPU 60 on the side of wireless communication module updates and registers the local address in accordance with the instruction of local address update setting (step S334). Specifically, it updates the local address value to be set in the transmission wireless frame and registers the value with RAM 66.

Then, the process ends (RETURN).

By this process, the local address of each machine is updated after the lapse of a prescribed time period.

Therefore, since the contents of MAC address is updated after the lapse of a prescribed time period, the MAC address is not uniquely defined. By introducing such a scheme preventing unique identification of the device by MAC address, the security can be improved.

<Erasure of MAC Address List>

In the foregoing description, the data in MAC address list saving area 88 is erased by CPU 31 (machine identification information erasing unit 218) in accordance with a prescribed instruction from the user, or when a prescribed data capacity becomes full and the saving area is no longer available, an old MAC address is erased and a new MAC address is saved, to ensure the saving area. The MAC address list may be erased in a manner linked with the MAC address update.

As described above, when the local address of each machine is updated after a prescribed time period, it is possible that as the MAC addresses of other game machines are updated, the exchange data giving/receiving process is executed accumulatively with a partner with which the process has already been done in the past.

Figure 54:
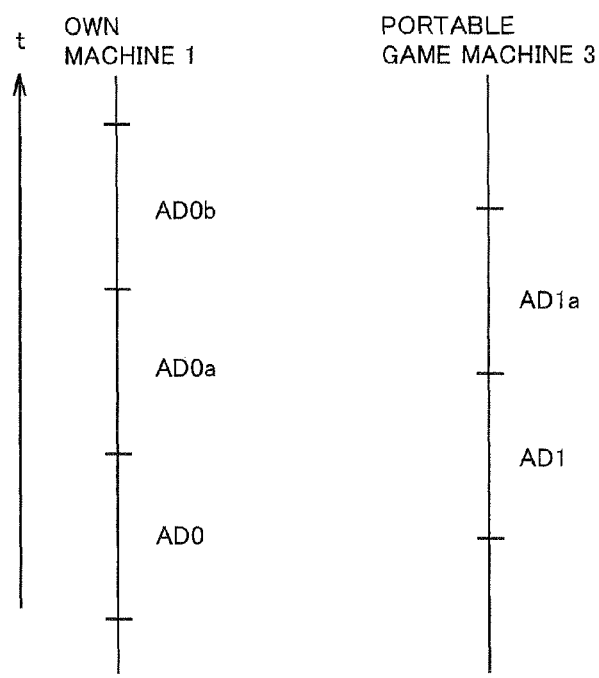
FIG. 54 illustrates an MAC address updating process in accordance with an embodiment of the present invention.

With reference to FIG. 54, the MAC address updating process will be described.

Referring to FIG. 54, here, description will be given on own machine 1 and portable game machine 3.

Here, an example is shown in which the MAC address of own machine 1 is updated from AD0 to AD0a and AD0b in time-sequential manner.

Further, the MAC address of portable game machine 3 is updated from AD1 to AD1a.

Therefore, it is possible that data communication takes place with the same machine (portable game machine 3) every time the MAC address is updated, and the data capacity to be ensured in MAC address list saving area may possibly become large.

On the other hand, as shown in FIG. 54, the MAC address update timing differs machine by machine.

Assume that the process for giving/receiving exchange data is executed with portable game machine 3 while the MAC address of own machine 1 is AD0. Then, the MAC address AD1 of portable game machine 3 is registered.

When the MAC address of own machine 1 is updated from AD0 to AD0a (1st update), it is not always the case that the MAC address of portable game machine 3 has been updated. Therefore, the MAC address AD1 of portable game machine 3 registered while the MAC address was AD0 is not erased but maintained as it is, whereby wasteful data communication can be avoided.

Assume that, after a prescribed time period, the MAC address of own machine 1 is updated from AD0a to AD0b (2nd update). Here, the MAC address of portable game machine 3 has already been updated from AD1 to AD1a, since the prescribed time period has passed.

Therefore, it is unnecessary to maintain the MAC address AD1 of portable game machine 3 that was left last time.

Therefore, in the present example, the MAC address list corresponding to the currently used MAC address list is maintained and the MAC address list corresponding to the last MAC address list is maintained, while the MAC address list corresponding to the earlier MAC address, that is, the second last MAC address list is erased.

With reference to FIG. 55, the configuration of MAC address list saving area 88 will be described. Here, two areas are provided as MAC address list saving areas. Assume that a MAC address list saving area 88a is for the current time and a MAC address list saving area 88b is used after the prescribed time period.

Figure 55A:
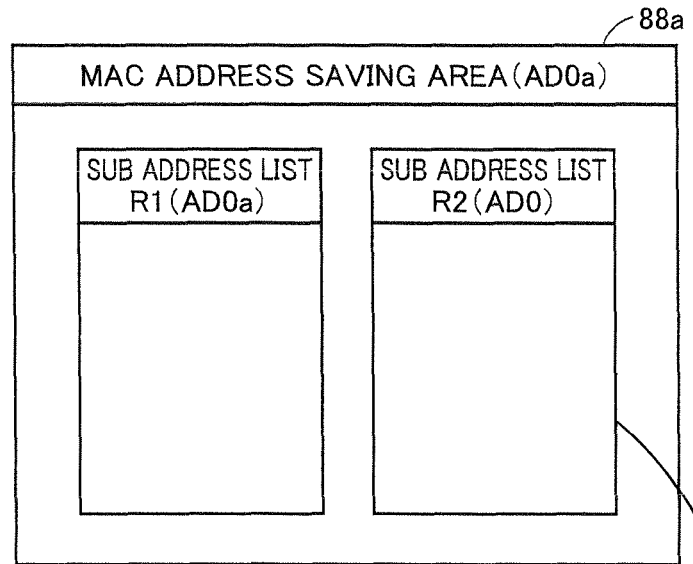
FIGS. 55A and 55B show a configuration of MAC address list saving area 88 in accordance with an embodiment of the present invention.

Referring to FIG. 55(A), MAC address list saving area 88a includes two sub-lists R1 and R2. Here, it is assumed that data communication is being executed using MAC address AD0a.

More specifically, an area (sub-list R1) for saving the MAC address of another game machine by executing the process for giving/receiving the exchange data using the current MAC address (AD0a), and an area (sub-list R2) for saving the MAC address of another game machine by executing the process for giving/receiving the exchange data using the last MAC address (AD0), used before the currently used MAC address, are provided.

Next, with reference to FIG. 56, the flow of erasing the MAC address list in accordance with the present embodiment will be described.

Figure 56:
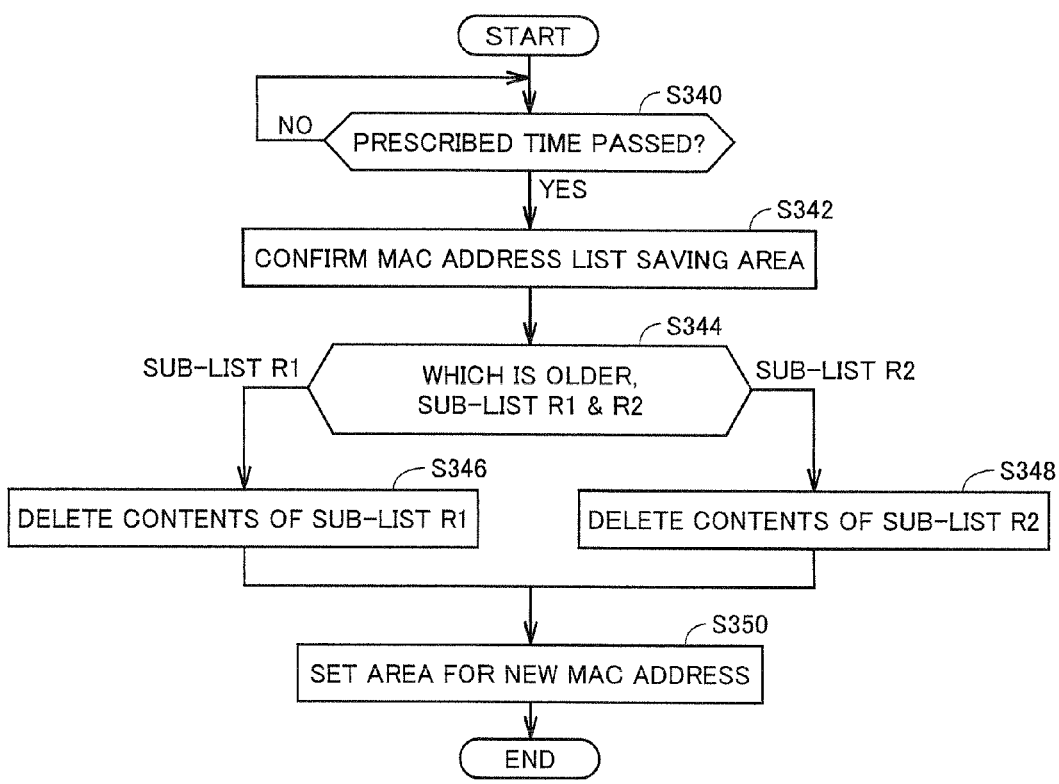
FIG. 56 is a flowchart representing erasure of MAC address list in accordance with an embodiment of the present invention.

Referring to FIG. 56, first, CPU 31 (machine identification information erasing unit 218) determines whether or not the prescribed time period has passed (step S340) By way of example, the prescribed time period is set to be about 6 hours.

If it is determined at step S340 that the prescribed time period has passed (YES at step S340), CPU 31 (machine identification information erasing unit 218) confirms the MAC address list saving area 88 (step S342).

Next, which of the sub-lists R1 and R2 provided in MAC address list saving area 88a is older is determined (step S344).

If sub-list R1 is determined to be older, the contents of sub-list R1 are deleted (step S346).

If sub-list R2 is determined to be older, the contents of sub-list R2 are deleted (step S348).

Then, the deleted area is set to be the area for the new MAC address (step S350).

Then, the process ends (END).

Figure 55B:
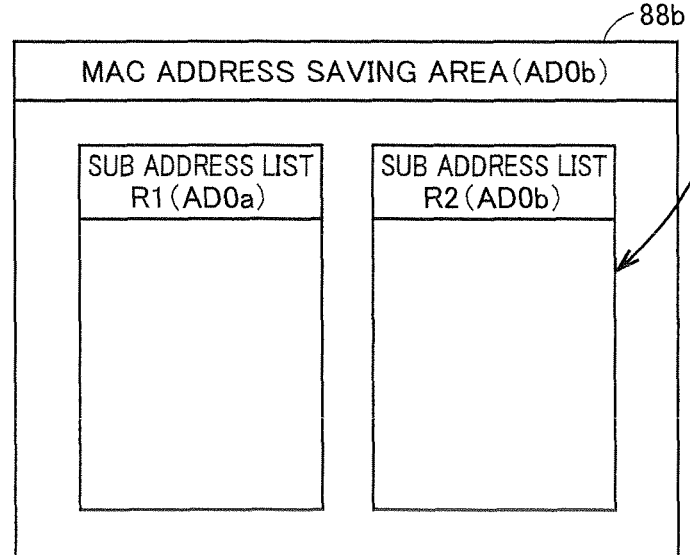

Referring to FIG. 55(B), here, an example is shown in which the MAC address AD0a is updated to MAC address AD0b after the prescribed time period.

Here, in MAC address list saving area 88*b*, of the two sub-lists R1 and R2, the contents of older sub-list R2 (MAC address AD0) are deleted and set for the new MAC address (MAC address AD0*b*).

By such an approach, it follows that every time the MAC address is updated, data contents of one of the two areas are deleted. Therefore, the data amount of the MAC address list saving area as a whole is not increased.

Further, when the MAC address is updated, the sub-list corresponding to the currently used MAC address can be maintained and, therefore, MAC address filtering can be executed based on the maintained MAC address. Therefore, even when the MAC address is updated, highly efficient data communication can be continued.

Here, CPU 31 (machine identification information erasing unit 218) may delete the data contents of MAC address list saving area 88# saving the MAC addresses of communication between portable and fixed terminals, together with the MAC address list saving area 88 saving the MAC addresses of communication between portable terminals. It is noted, however, that the MAC address of a fixed terminal is not updated. Therefore, it is unnecessary to erase the data contents at the same timing as the communication between portable and fixed terminals.

Therefore, CPU 31 (machine identification information erasing unit 218) may erase the data contents of MAC address list saving area 88# saving the MAC addresses of communication between portable and fixed terminals at a timing different from the timing of erasing the data contents of MAC address list saving area 88 saving the MAC addresses of communication between portable terminals.

Though MAC address list saving areas 88 and 88# on the main body side have been described, the same approach may be taken for the MAC address list saving areas 70 and 70# on the side of wireless communication module 38.

<Other Embodiment>

Though game machine 1 has been described as a typical example of the information processing apparatus in accordance with the present invention, it is not limiting. As a program in accordance with the present invention, an application executable by a personal computer may be provided. In that case, the program in accordance with the present invention may be incorporated as a function of various applications executed by a personal computer.

Tough only an information processing system using a portable game machine has been described in the embodiment above, the present invention is similarly applicable to a portable terminal such as a portable telephone and a PDA, in place of the portable game machine.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An information processing system including a plurality of information processing apparatuses, wherein
each information processing apparatus includes
storage;
wireless communication circuitry configured to receive information comprising apparatus identification information and application program identification information, transmitted from another one of the information processing apparatuses, the apparatus identification information identifying the other information processing apparatus and the application program identification information identifying an application program;
processing circuitry comprising at least one hardware processor, the processing circuitry configured to control the information processing apparatus to at least:
determine, based on the received apparatus identification information and the received application program identification information, whether or not to execute an exchange data communication process for transmitting transmission exchange data to the other information processing apparatus and/or for receiving, as reception exchange data, transmission exchange data transmitted from the other information processing apparatus;
control the exchange data communication process based on the determination;
register in the storage, if the exchange data communication process is executed with respect to the other information processing apparatus, at least the apparatus identification information of the other information processing apparatus, in order to identify the other information processing apparatus as a partner with which the exchange data communication process has been performed;
wherein
if the received apparatus identification information is already registered in the storage, the processing circuitry determines not to execute the exchange data communication process,
if the received apparatus identification information is not already registered in the storage, the processing circuitry further determines if the received application program identification information corresponds to application identification information for an application program executable by the information processing apparatus by comparing the received application program identification information to application program identification information for multiple different application programs executable by the information processing apparatus,
if the received apparatus identification information is not already registered in the storage and the received application program identification information does not correspond to application program identification information for any of the multiple different executable application programs, the processing circuitry determines not to execute the exchange data communication process, and
if the received apparatus identification information is not already registered in the storage and the received application program identification information corresponds to application program identification information for any of the multiple different executable application programs, the processing circuitry determines to execute the exchange data communication process.

2. The information processing system according to claim 1, wherein
the at least one hardware processor comprises at least one first processor and at least one second processor, the at least one first processor being configured to provide an exchange data communication control unit for the control of the exchange data communication process and the at least one second processor being configured to provide an exchange data communication determining unit for the determining of whether or not to execute an exchange data process, an apparatus identification information registration control unit for the registering in the storage of at least the apparatus identification information, and a notifying unit; and each information processing apparatus further comprises
a wireless module including
the wireless communication circuitry, and
the at least one second processor,
the notifying unit configured to send a notice to the exchange data communication control unit, if the exchange data communication determining unit determines that the exchange data communication process is to be executed; and
the exchange data communication control unit is configured to transition to a sleep state, wherein the exchange data communication control unit cancels the sleep state and executes the exchange data communication process when the notice is received from the notifying unit.

3. The information processing system according to claim 1, wherein
the wireless communication circuitry receiver is configured to repeatedly execute a searching process of transmitting a search signal including information comprising apparatus identification information and application program identification information to an unspecified partner or waiting until a search signal is received, to receive information comprising apparatus identification information and application program identification information; and
the processing circuitry is configured to determine whether or not to execute the exchange data communication process, each time information comprising apparatus identification information and application program identification information is received in accordance with the searching process.

4. The information processing system according to claim 1, wherein
after the exchange data communication process with the other information processing apparatus is executed, the wireless communication circuitry repeatedly executes a searching process of transmitting a search signal including information comprising apparatus identification information and application program identification information to an unspecified partner or waiting until a search signal is received, to receive information comprising apparatus identification information and application program identification information;
the processing circuitry is configured to determine whether or not to execute the exchange data communication process, each time information comprising apparatus identification information and application program identification information is received in accordance with the searching process; and
the processing circuitry executes the exchange data communication process for every determination to execute the exchange data communication process.

5. The information processing system according to claim 1, wherein
the processing circuitry is configured to designate transmission exchange data to be transmitted to the other information processing apparatus.

6. The information processing system according to claim 5, wherein
the storage is configured to store data usable by at least one application program among the multiple different application programs as the transmission exchange data designated to be transmitted to the other information processing apparatus; and the processing circuitry is configured to transmit the stored transmission exchange data to the other information processing apparatus and/or receive, as the reception exchange data, transmission exchange data stored in the other information processing apparatus, based on the determination to execute the exchange data communication process.

7. The information processing system according to claim 1, wherein
the processing circuitry is configured to erase the apparatus identification information registered in the storage, based on prescribed conditions.

8. The information processing system according to claim 7, wherein
the processing circuitry is configured to erase the apparatus identification information registered in the storage after a prescribed time period.

9. The information processing system according to claim 7, wherein
the processing circuitry is further configured to designate transmission exchange data to be transmitted to the other information processing apparatus and to erase, when the transmission exchange data is designated, the apparatus identification information registered in the storage.

10. The information processing system according to claim 1, wherein
the storage is configured to store data usable by at least one application program among the multiple different application programs as the transmission exchange data to be transmitted to the other information processing apparatus; and
the processing circuitry is further configured to
determine whether or not apparatus identification information corresponding to the received apparatus identification information is registered in the storage, and
determine whether or not the received application program identification information corresponds to application program identification information for the transmission exchange data stored in the storage.

11. The information processing system according to claim 1, wherein
the processing circuitry is configured to designate transmission exchange data to be transmitted to the other information processing apparatus;
the received information includes obtaining conditions data for determining whether or not the exchange data is to be obtained in accordance with a combination of transmission exchange data to be transmitted to the other information processing apparatus and/or reception exchange data to be received from the other information processing apparatus; and
the processing circuitry is further configured to
determine whether or not apparatus identification information corresponding to the received apparatus identification information is registered in the storage, and
determine whether or not the obtaining conditions data satisfy prescribed conditions.

12. The information processing system according to claim 11, wherein
the information further includes comparison identification data for designating the obtaining conditions data to be one comparing method among a plurality of comparing methods.

13. The information processing system according to claim 11, wherein the obtaining conditions data includes offering attribute data related to the transmission exchange data to be transmitted to the other information processing apparatus and requested attribute data related to the reception exchange data to be received from the other information processing apparatus; and the processing circuitry is further configured to determine whether or not the offering attribute data included in the obtaining conditions data transmitted to the other information processing apparatus corresponds to the requested attribute data included in the obtaining conditions data received from the other information processing apparatus, and determine whether the requested attribute data included in the obtaining conditions data transmitted to the other information processing apparatus corresponds to the offering attribute data included in the obtaining conditions data received from the other information processing apparatus.

14. The information processing system according to claim 13, wherein the obtaining conditions data includes determination setting data setting whether or not data used for determination is valid/invalid;

the processing circuitry is configured to determine whether or not mask offering attribute data in accordance with the determination setting data related to the offering attribute data included in the obtaining conditions data transmitted to the other information processing apparatus matches mask requested attribute data in accordance with the determination setting data related to the requested attribute data included in the obtaining conditions data received from the other information processing apparatus; and the processing circuitry is further configured to determine whether or not the mask requested attribute data in accordance with the determination setting data related to the requested attribute data included in the obtaining conditions data transmitted to the other information processing apparatus matches the mask offering attribute data in accordance with the determination setting data related to the offering attribute data included in the obtaining conditions data received from the other information processing apparatus.

15. The information processing system according to claim 1, wherein the processing circuitry is further configured to change the apparatus identification information under prescribed conditions.

16. The information processing system according to claim 15, wherein the processing circuitry is configured to change the apparatus identification information at prescribed time periods.

17. The information processing system according to claim 15, wherein the storage includes first and second storage areas for registering apparatus identification information of the other information processing apparatus corresponding to currently used apparatus identification information, and apparatus identification information of the other information processing apparatus corresponding to last used apparatus identification information, respectively;

the processing circuitry is further configured to erase apparatus identification information registered in the storage based on the prescribed conditions and to erase the apparatus identification information stored in the second storage area, when the currently used apparatus identification information is changed.

18. The information processing system according to claim 1, wherein the processing circuitry is further configured to designate transmission exchange data to be transmitted to the other information processing apparatus;

after the exchange data communication process with the other information processing apparatus is executed, the wireless communication circuitry repeatedly executes a searching process of transmitting a search signal including information comprising apparatus identification information and application program identification information to an unspecified partner or waiting until a search signal is received, to receive information comprising apparatus identification information and application program identification information;

the processing circuitry is further configured to determine whether or not apparatus identification information corresponding to the received apparatus identification information is registered in the storage, each time the information comprising apparatus identification information and application program identification information is received in accordance with the searching process; and execute the exchange data communication process for every determination to execute the exchange data communication process.

19. An information processing apparatus, comprising:

storage;

wireless communication circuitry configured to receive information comprising apparatus identification information and application program identification information, transmitted from another information processing apparatus, the apparatus identification information identifying the other information processing apparatus and the application program identification information identifying an application program;

processing circuitry including at least one hardware processor, the processing circuitry configured to control the information processing apparatus to at least:

determine, based on the received apparatus identification information and the received application program identification information, whether or not to execute an exchange data communication process for transmitting transmission exchange data to the other information processing apparatus and/or for receiving, as reception data, transmission exchange data transmitted from the other information processing apparatus;

control the exchange data communication process based on the determination;

register in the storage, if the exchange data communication process is executed with respect to the other information processing apparatus, at least the apparatus identification information of the other information processing apparatus, in order to identify the other information processing apparatus as a partner with which the exchange data communication process has been performed; wherein if the received apparatus identification information is already registered in the storage, the processing circuitry determines not to execute the exchange data communication process, if the received apparatus identification information is not already registered in the storage, the processing circuitry further determines if the received application program identification information corresponds to application identification information for an application program executable by the information processing apparatus by comparing the received application program identification information to application program identification information for multiple different application programs executable by the information processing apparatus, if the received apparatus identification information is not already registered in the storage and the received application program identification information does not correspond to application program identification information for any of the multiple different executable application programs, the processing circuitry determines not to execute the exchange data communication process, and if the received apparatus identification information is not already registered in the storage and the received application program identification information corresponds to application program identification information for any of the multiple different executable application programs, the processing circuitry determines to execute the exchange data communication process.

20. A method of controlling an information processing apparatus, comprising:

receiving information comprising apparatus identification information and application program identification information, transmitted from another information processing apparatus, the apparatus identification information identifying the other information processing apparatus and the application program identification information identifying an application program;

determining, based on the received apparatus identification information and the received application program identification information, whether or not to execute an exchange data communication process for transmitting transmission exchange data to the other information processing apparatus and/or for receiving, as reception exchange data, transmission exchange data transmitted from the other information processing apparatus;

controlling the exchange data communication process based on the execution determination;

registering in storage, if the exchange data communication process is executed with respect to the other information processing apparatus, at least the apparatus identification information of the other information processing apparatus, in order to identify the other information processing apparatus as a partner with which the exchange data communication process has been performed; wherein if the received apparatus identification information is already registered in the storage, the determining determines that the exchange data communication process is not to be executed, if the received apparatus identification information is not already registered in the storage, the determining further determines if the received application program identification information corresponds to application identification information for an application program executable by the information processing apparatus by comparing the received application program identification information to application program identification information for multiple different application programs executable by the information processing apparatus, if the received apparatus identification information is not already registered in the storage and the received application program identification information does not correspond to application program identification information for any of the executable application programs, the determining determines that the exchange data communication process is not to be executed, and if the received apparatus identification information is not already registered in the storage and the received application program identification information corresponds to application program identification information for any of the multiple different executable application programs, the determining determines that the exchange data communication process is to be executed.

21. A non-transitory storage medium storing a control program which is executable by a computer of an information processing apparatus, wherein the control program includes:

receiving instructions to receive information comprising apparatus identification information and application program identification information transmitted from another information processing apparatus, the apparatus identification information identifying the other information processing apparatus and the application program identification information identifying an application program;

exchange data communication determining instructions to determine whether or not to execute an exchange data communication process for transmitting transmission exchange data to the other information processing apparatus and/or for receiving, as reception exchange data, transmission exchange data transmitted from the other information processing apparatus, based on the received apparatus identification information and the received application program identification information;

exchange data communication control instructions to control the exchange data communication process based on the determination by the exchange data communication determining instructions; and apparatus identification information registration control instructions to register in storage, if the exchange data communication process is executed with respect to the other information processing apparatus, at least the apparatus identification information of the other information processing apparatus, in order to identify the other information processing apparatus as a partner with which the exchange data communication process has been performed; and wherein the exchange data communication determining instructions determine that the exchange data communication process is not to be executed, if the received apparatus identification information is already registered in the storage, if the received apparatus identification information is not already registered in the storage, the exchange data communication determining instructions further determine if the received application program identification information corresponds to application identification information for an application program executable by the information processing apparatus by comparing the received application program identification information to application program identification information for multiple different application programs executable by the information processing apparatus, if the received apparatus identification information is not already registered in the storage and the received application program identification information does not correspond to application program identification information for any of the executable application programs, the exchange data communication determining instructions determine that the exchange data communication process is not to be executed, and if the received apparatus identification information is not already registered in the storage and the received application program identification information corresponds to application program identification information for any of the executable application programs, the exchange data communication determining instructions determine that the exchange data communication process is to be executed.

22. An information processing system including a plurality of information processing apparatuses and a plurality of fixed terminals, wherein each information processing apparatus includes
storage;
wireless communication circuitry configured to receive information comprising first identification information identifying an information processing apparatus or a fixed terminal and second identification information identifying an application program, transmitted from another one of the information processing apparatuses or from a fixed terminal;
processing circuitry including at least one hardware processor, the processing circuitry configured to control the information processing apparatus to at least:
determine, based on the received first and second identification information, whether or not to execute an exchange data communication process for transmitting transmission exchange data to the other information processing apparatus or the fixed terminal and/or for receiving, as reception exchange data, transmission exchange data transmitted from the other information processing apparatus or the fixed terminal;
control the exchange data communication process based on the determination;
register in the storage, if the exchange data communication process is executed with respect to the other information processing apparatus or the fixed terminal, at least the identification information of the other information processing apparatus or the fixed terminal, in order to identify the other information processing apparatus or the fixed terminal as a partner with which the exchange data communication process has been performed; wherein
if the received first identification information is already registered in the storage, the processing circuitry determines not to execute the exchange data communication process;
if the received first identification information is not already registered in the storage, the processing circuitry further determines if the received second identification information corresponds to application identification information for an application program executable by the information processing apparatus by comparing the received second identification information to application program identification information for multiple different application programs executable by the information processing apparatus, if the received first identification information is not already registered in the storage and the received second identification information does not correspond to application program identification information for any of the executable application programs, the processing circuitry determines not to execute the exchange data communication process, and if the received first identification information is not already registered in the storage and the received second identification information corresponds to application program identification information for any of the executable application programs, the processing circuitry determines to execute the exchange data communication process.

23. The information processing system according to claim 22, wherein the storage includes a first area registering the identification information of the other information processing apparatus, and a second area registering the identification information of the fixed terminal.

24. An information processing apparatus, comprising:
storage;
wireless communication circuitry configured to receive information comprising first identification information identifying an information processing apparatus or a fixed terminal and second identification information identifying an application program, transmitted from another information processing apparatus or from a fixed terminal;
processing circuitry including at least one hardware processor, the processing circuitry configured to control the information processing apparatus to at least:
determine, based on the received first and second identification information, whether or not to execute an exchange data communication process for transmitting transmission exchange data to the other information processing apparatus or the fixed terminal and/or for receiving, as reception exchange data, transmission exchange data transmitted from the other information processing apparatus or the fixed terminal;
control the exchange data communication process based on the determination;
register in the storage, if the exchange data communication process is executed with respect to the other information processing apparatus or the fixed terminal, at least the identification information of the other information processing apparatus or the fixed terminal in order to identify the other information processing apparatus or the fixed terminal as a partner with which the exchange data communication process has been performed; wherein
if the received first identification information is already registered in the storage, the processing circuitry determines not to execute the exchange data communication process;
if the received first identification information is not already registered in the storage, the processing circuitry further determines if the received second identification information corresponds to application identification information for an application program executable by the information processing apparatus by comparing the received second identification information to application program identification information for multiple different application programs executable by the information processing apparatus, if the received first identification information is not already registered in the storage and the received second identification information does not correspond to application program identification information for any of the executable application programs, the processing circuitry determines not to execute the exchange data communication process, and if the received first identification information is not already registered in the storage and the received second identification information corresponds to application program identification information for any of the executable application programs, the processing circuitry determines to execute the exchange data communication process.

25. A method of controlling an information processing apparatus, comprising:

receiving information comprising first identification information identifying an information processing apparatus or a fixed terminal and second identification information identifying an application program, transmitted from another information processing apparatus or from a fixed terminal;

determining, based on the received first and second identification information, whether or not to execute an exchange data communication process for transmitting transmission exchange data to the other information processing apparatus or the fixed terminal and/or for receiving, as reception exchange data, transmission exchange data transmitted from the other information processing apparatus or the fixed terminal;

controlling the exchange data communication process based on the execution determination; and registering in a storage, if the exchange data communication process is executed with respect to the other information processing apparatus or the fixed terminal, at least the identification information of the other information processing apparatus or the fixed terminal, in order to identify the other information processing apparatus or the fixed terminal as a partner with which the exchange data communication process has been performed; wherein if the received first identification information is already registered in the storage, the determining determines that the exchange data communication process is not to be executed;

if the received first identification information is not already registered in the storage, the determining further determines if the received second identification information corresponds to application identification information for an application program executable by the information processing apparatus by comparing the received second identification information to application program identification information for multiple different application programs executable by the information processing apparatus, if the received first identification information is not already registered in the storage and the received second identification information does not correspond to application program identification information for any of the executable application programs, the determining determines that the exchange data communication process is not to be executed, and if the received first identification information is not already registered in the storage and the received second identification information corresponds to application program identification information for any of the executable application programs, the determining determines that the exchange data communication process is to be executed.

26. A non-transitory storage medium storing a control program executed by a computer of an information processing apparatus, wherein the control program includes:

receiving instructions to receive information comprising first identification information for identifying an information processing apparatus or a fixed terminal and second identification information for identifying an application program, transmitted from another information processing apparatus or a fixed terminal;

exchange data communication determining instructions to determine whether or not to execute an exchange data communication process for transmitting transmission exchange data to the other information processing apparatus or the fixed terminal and/or for receiving, as reception exchange data, transmission exchange data transmitted from the other information processing apparatus or the fixed terminal based on the received first and second identification information;

exchange data communication control instructions to control the exchange data communication process based on the determination by the exchange data communication determining instructions; and identification information registration control instructions to register in storage, if the exchange data communication process is executed with respect to the other information processing apparatus or the fixed terminal, at least the identification information of the other information processing apparatus or the fixed terminal, in order to identify the other information processing apparatus or the fixed terminal as a partner with which the exchange data communication process has been performed; and wherein the exchange data communication determining instructions determine that the exchange data communication process is not to be executed, if the received first identification information is already registered in the storage, if the received first identification information is not already registered in the storage, the exchange data communication determining instructions further determine if the received second identification information corresponds to application identification information for an application program executable by the information processing apparatus by comparing the received second identification information to application program identification information for multiple different application programs executable by the information processing apparatus, if the received first identification information is not already registered in the storage and the received second identification information does not correspond to application program identification information for any of the executable application programs, the exchange data communication determining instructions determines that the exchange data communication process is not to be executed, and if the received first identification information is not already registered in the storage and the received second identification information corresponds to application program identification information for any of the executable application programs, the exchange data communication determining instructions determine that the exchange data communication process is to be executed.

27. A portable information processing apparatus comprising:
- a wireless transmitter/receiver for receiving partner identifier information and application program identifier information for an application program transmitted from a possible data exchange partner;
- memory for storing partner identifier information of one or more data exchange partners with which the information processing apparatus has previously exchanged data;
- a processor configured to determine whether the received partner identifier information corresponds to any partner identifier information stored in the memory, to determine whether the received application program identifier information corresponds to application program identifier information associated with any one of multiple different application programs executable by the portable information processing apparatus, and to exchange data with the possible data exchange partner if the received partner identifier information is determined to not correspond to any partner identifier information stored in the memory and if the received application program identifier information corresponds to application program identifier information associated with any of the executable application programs.

28. The portable information processing apparatus according to claim 27, wherein the partner identifier information comprises a MAC address.

29. The portable information processing apparatus according to claim 27, wherein the possible data exchange partner is another portable information processing apparatus.

30. The portable information processing apparatus according to claim 27, wherein the possible data exchange partner is a fixed terminal apparatus.

31. The portable information processing apparatus according to claim 27, wherein the information processing apparatus is embodied as a portable telephone.

32. The portable information processing apparatus according to claim 27, wherein the information processing apparatus is embodied as a portable game machine.

* * * * *